US012705942B2

(12) United States Patent
Boerger et al.

(10) Patent No.: US 12,705,942 B2
(45) Date of Patent: Aug. 11, 2026

(54) METHODS AND APPARATUS TO MONITOR AND MANAGE LOADING DOCKS AND FACILITY OPERATIONS

(71) Applicant: Rite-Hite Holding Corporation, Milwaukee, WI (US)

(72) Inventors: James C. Boerger, Franksville, WI (US); John Jeffers, Franklin, WI (US); Richard Mews, Bonduel, WI (US); Adam White, River Hills, WI (US); Kyle Wurster, Richfield, WI (US); Viswa Teja Yerramsetty, Mountain View, CA (US); Kenneth C. Bowman, Cedarburg, WI (US); Brian J. Peschel, Saukville, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 18/771,776

(22) Filed: Jul. 12, 2024

(65) Prior Publication Data

US 2025/0014406 A1 Jan. 9, 2025

Related U.S. Application Data

(63) Continuation of application No. 16/979,416, filed as application No. PCT/US2019/021514 on Mar. 9, 2019, now Pat. No. 12,106,621.

(Continued)

(51) Int. Cl.

| | |
|---|---|
| ***G06Q 10/083*** | (2024.01) |
| ***B65G 67/04*** | (2006.01) |

(Continued)

(52) U.S. Cl.

CPC ............... *G07C 9/10* (2020.01); *B65G 67/04* (2013.01); *G05D 1/0225* (2013.01); *G05D 1/661* (2024.01); *G06Q 10/08* (2013.01); *G06F 9/541* (2013.01)

(58) Field of Classification Search

CPC .......... G07C 9/10; B65G 67/04; B65G 67/02; B65G 2207/40; B65G 69/2882;

(Continued)

(56) References Cited

U.S. PATENT DOCUMENTS

| | | | |
|---|---|---|---|
| 4,843,373 | A | 6/1989 | Trickle et al. |
| 5,453,735 | A | 9/1995 | Hahn |

(Continued)

FOREIGN PATENT DOCUMENTS

| | | | |
|---|---|---|---|
| CN | 105722770 | A | 6/2016 |
| CN | 210313072 | U | 4/2020 |

(Continued)

OTHER PUBLICATIONS

Rite-Hite, "DOK-Manager A Productivity System," Mar. 1991, 2 pages.

(Continued)

*Primary Examiner* — Jamara A Franklin
(74) *Attorney, Agent, or Firm* — Hanley, Flight & Zimmerman, LLC

(57) ABSTRACT

Methods and apparatus to monitor and manage loading docks and facility operations are disclosed. An example apparatus includes a data analyzer to: monitor first data indicating whether a truck trailer is present at a dock of the material handling facility; and monitor second data indicating a condition associated with a door at the dock, the second data being different than the first data. The apparatus further includes a notification generator to generate a notification based on the first data and the second data.

22 Claims, 57 Drawing Sheets

Related U.S. Application Data

(60) Provisional application No. 62/701,381, filed on Jul. 20, 2018, provisional application No. 62/641,078, filed on Mar. 9, 2018.

(51) Int. Cl.

| | |
|---|---|
| ***G05D 1/00*** | (2006.01) |
| ***G05D 1/661*** | (2024.01) |
| ***G06Q 10/08*** | (2023.01) |
| ***G07C 9/10*** | (2020.01) |
| *G06F 9/54* | (2006.01) |

(58) Field of Classification Search
CPC ...... G05D 1/661; G06Q 10/08; G06Q 10/083; G06F 9/541
See application file for complete search history.

(56) References Cited

U.S. PATENT DOCUMENTS

| | | | |
|---|---|---|---|
| 12,106,621 | B2 | 10/2024 | Boerger et al. |
| 2001/0024093 | A1 | 9/2001 | Naganuma |
| 2002/0161509 | A1 | 10/2002 | Fawcett et al. |
| 2003/0199996 | A1 | 10/2003 | Reynard et al. |
| 2004/0075548 | A1 | 4/2004 | Beggs et al. |
| 2004/0181467 | A1 | 9/2004 | Raiyani et al. |
| 2006/0181391 | A1 | 8/2006 | McNeill et al. |
| 2010/0146719 | A1 | 6/2010 | Swessel et al. |
| 2013/0117078 | A1* | 5/2013 | Weik, III ................ B60R 25/00 705/13 |
| 2014/0225509 | A1 | 8/2014 | Wiegel et al. |
| 2015/0006430 | A1 | 1/2015 | Ben-Alexander |
| 2017/0320685 | A1 | 11/2017 | Hoofard et al. |
| 2020/0125074 | A1 | 4/2020 | Ramos et al. |

FOREIGN PATENT DOCUMENTS

| | | | |
|---|---|---|---|
| DE | 102005038343 | A1 | 2/2007 |
| EP | 2474944 | A1 | 7/2012 |
| EP | 3061713 | A1 | 8/2016 |
| JP | H09256736 | A | 9/1997 |
| JP | H1129209 | A | 2/1999 |
| JP | 2007510228 | A | 4/2007 |
| JP | 2009150143 | A | 7/2009 |
| JP | 2009259116 | A | 11/2009 |
| WO | 2015034803 | A1 | 3/2015 |
| WO | 2017062638 | A1 | 4/2017 |
| WO | 2022125428 | A1 | 6/2022 |

OTHER PUBLICATIONS

Plant Engineering, "4SIGHT helps facilities capitalize on productivity using real-time data," Jan. 18, 2011, available at https://www.plantengineering.com/articles/4sight-helpsfacilities-capitalize on-productivity-using-real-time-data, 7 pages.

United States Postal Service, "Yard Management System VOA Manual," Apr. 23, 2012, 100 pages.

Supply Chain Times, "C3 Solutions Claims Dock Scheduling and Yard Management Innovation," available at https://sctimes.io/news/article/27/3264, May 12, 2016, 4 pages.

International Searching Authority, "Invitation to Pay Additional Fees and, where applicable, Protest Fee," issued in connection with International PCT Application No. PCT/US2019/021514, mailed May 31, 2019, 23 pages.

International Searching Authority, "International Search Report and Written Opinion," issued in connection with International PCT Application No. PCT/US2019/021514, mailed Sep. 9, 2019, 62 pages.

International Searching Authority, "International Preliminary Report on Patentability," issued in connection with International PCT Application No. PCT/US2019/021514, mailed Sep. 15, 2020, 31 pages.

Chinese Patent Office, "First Office Action," issued in connection with Chinese Patent Application No. 201980030740.0 issued on Dec. 13, 2021, 4 pages. (English Translation Included).

Intellectual Property Office of Singapore, "Invitation to Respond to Written Opinion," issued in connection with Singapore Patent Application No. 11020200871 9Y issued on Feb. 7, 2022, 11 pages.

Chinese Patent Office, "Second Office Action," issued in connection with Chinese Patent Application No. 201980030740.0 issued on May 13, 2022, 29 pages. (English Translation Included).

Indian Patent Office, "Examination Report," issued on connection with Indian Patent Application No. 202017043456, issued on Jun. 1, 2022, 6 pages.

Chinese Patent Office, "Third Office Action," issued in connection with Chinese Patent Application No. 201980030740.0, issued on Sep. 28, 2022, 33 Pages. (English Translation Included).

Indonesia Directorate General of Intellectual Property, "First Office Action," issued in connection with Indonesia Patent Application No. P00202007161, issued on Nov. 18, 2022, 6 pages. (Machine Translation Attached).

China National Intellectual Property Administration, "Decision of Rejection," issued in connection with Chinese Application No. 201980030740.0 on Jan. 28, 2023, 31 pages. (English Translation Attached).

European Patent Office, "Communication Pursuant to Article 94(3) EPC," issued in connection with European Patent Application No. 19712487.8 on Feb. 20, 2023, 12 pages.

Japanese Patent Office, "Search Report by Registered Search Organization," issued in connection with Japanese Patent Application No. 2020-547055, dated Feb. 28, 2023, 26 pages. [English Translation Included].

Industrial Property Cooperation Center, "Notice of Reasons for Refusal," issued in connection with Japanese Patent Application No. 2020-547055 on Mar. 7, 2023, 20 pages. (Machine Translation Attached).

Canadian Intellectual Property Office, "Office Action," issued in connection with Canadian Patent Application No. 3,093,390, mailed on Jul. 21, 2023, 9 pages.

United States Patent and Trademark Office, "Non-Final Office Action," issued in connection with U.S. Appl. No. 16/979,416, dated Aug. 1, 2023, 10 pages.

Intellectual Property Office of Vietnam, "Notice of Substantive Examination," issued in connection with Vietnamese Patent Application No. 1-2020-05783, dated Aug. 30, 2023, 4 pages. [English Translation Included].

Japan Patent Office, "Notice of Reasons for Rejection," issued in connection with Japanese Patent Application No. 2020-547055, dated Sep. 26, 2023, 9 pages. [English Translation Included].

Australian Government, IP Australia, "Examination Report No. 1," issued in connection with Australian Application No. 2019232022, issued on Jan. 18, 2024, 4 pages.

United States Patent and Trademark Office, "Notice of Allowance and Fee(s) Due," issued in connection with U.S. Appl. No. 16/979,416, dated Feb. 22, 2024, 8 pages.

Intellectual Property Office of Singapore, "Second Written Opinion," issued in connection to Singapore Patent Application No. 11202008719Y, issued on Mar. 20, 2024, 5 pages.

Korean Intellectual Property Office, "Notice of Preliminary Rejection," issued in connection with Korean Patent Application No. 10-2020-7029050, dated Mar. 21, 2024, 10 pages. [English translation Included].

Korean Intellectual Property Office, "Written Decision on Registration," issued in connection with Korean Patent Application No. 10-2020-7029050, issued on Jan. 24, 2025, 6 pages. (English Translation Included).

United States Patent and Trademark Office, "Notice of Allowance and Fee(s) Due," issued in connection with U.S. Appl. No. 16/979,416, dated Apr. 17, 2024, 6 pages.

Mexican Patent Office, "First substantive requirement report," issued in connection with Mexican Patent Application No. MX/a/2020/009399, dated May 20, 2024, 10 pages. [Machine English Translation Included].

(56) References Cited

OTHER PUBLICATIONS

Japanese Patent Office, "Notice of Reasons for Refusal," issued in connection with Japanese Patent Application No. 2020-547055, dated Jun. 4, 2024, 23 pages. [English Translation Included].
United States Patent and Trademark Office, "Notice of Allowability," issued in connection with U.S. Appl. No. 16/979,416, dated Jun. 14, 2024, 6 pages.
Mexican Patent Office, "Notice of Allowance," issued in connection with Mexican Patent Application No. MX/a/2020/009399, dated Jan. 16, 2025, 6 pages. [Machine English Translation Included].
Australian Government, IP Australia, "Notice of acceptance for patent application," issued in connection with Australian Patent Application No. 2019232022, dated Aug. 27, 2024, 3 pages.
Japanese Patent Office, "Decision to Grant a Patent," issued in connection with Japanese Patent Application No. 2020-547055, dated Oct. 8, 2024, 5 pages. [English Translation Included].
Mexican Patent Office, "Second Substantive Requirement Report," issued in connection with Mexican Patent Application No. MX/a/2020/009399, dated Oct. 10, 2024, 16 pages. [Machine English Translation Included].
Australian Government, IP Australia, "Notice of grant for patent," issued in connection with AU Application No. 2019232022, issued on Dec. 17, 2024, 1 page.
Intellectual Property Office of Vietnam, "Substantive Examination Result," in connection with Vietnam Patent Application No. 1-2020-05783, dated Jan. 20, 2025, 3 pages. [English translation included].
European Patent Office, "Communication pursuant to Article 94(3) EPC," issued in connection with European Patent Application No. 19712487.8, Feb. 5, 2025, 16 pages.
Directorate General of Intellectual Property of Indonesia, "Notification of Results of Advanced Substantive Examination," issued in connection with Indonesian Patent Application No. P00202007161, Feb. 18, 2025, 4 pages. [English machine translation included].
Canadian Intellectual Property Office, "Examiner's Requisition," issued in connection with Canadian Patent Application No. 3,093,390, dated Jul. 15, 2025, 5 pages.
Intellectual Property Office of Singapore, "Examination Report," issued in connection with Singapore Patent Application No. 11202008719Y, dated Sep. 1, 2025, 2 pages.
Intellectual Property Office of Singapore, "Notice for Eligibility of Grant," issued in connection with Singapore Patent Application No. 11202008719Y, dated Sep. 2, 2025, 2 pages.
Australian Government, IP Australia, "Examination report No. 1," issued in connection with Australian Patent Application No. 2024224005, dated Oct. 1, 2025, 3 pages.
Intellectual Property Office of Vietnam, "Notice of Substantive Examination," issued in connection with Vietnamese Patent Application No. 1-2020-05783, dated Oct. 8, 2025, 4 pages. [With English translation].
Intellectual Property Office of the Philippines Bureau of Patents, "Substantive Examination Report," issued in connection with Philippine Patent Application No. Jan. 2020/551623, dated Nov. 19, 2025, 7 pages.
Intellectual Property of India, "Hearing Notice," issued in connection with Indian Patent Application No. 202017043456, dated Dec. 4, 2025, 2 pages.
Intellectual Property of India, "Intimation of the grant," issued in connection with Indian Patent Application No. 202017043456, dated Jan. 13, 2026, 1 page.
United States Patent and Trademark Office, "Notice of Allowance and Fee(s) Due," issued in connection with U.S. Appl. No. 19/074,002, dated Jan. 16, 2026, 9 pages.
Japanese Patent Office, "Decision to Grant a Patent," issued in connection with Japanese Patent Application No. 2024-194124, dated Feb. 3, 2026, 5 pages. [English Translation Included].

* cited by examiner

| Dock # | UTILIZATION % | TRAILERS | AVE LOAD TIME | |
|---|---|---|---|---|
| Dock 01 | 82% | 7 | 1 HR 46 MIN | 0 |
| Dock 02 | 74% | 6 | 1 HR 56 MIN | 0 |

Maintenance Complete ×

Load Location: Dock 14

Maintenance is complete
Loading dock is ready for production

Timestamp: 3:14 PM
06-26-18

Save Close

Figure 34:
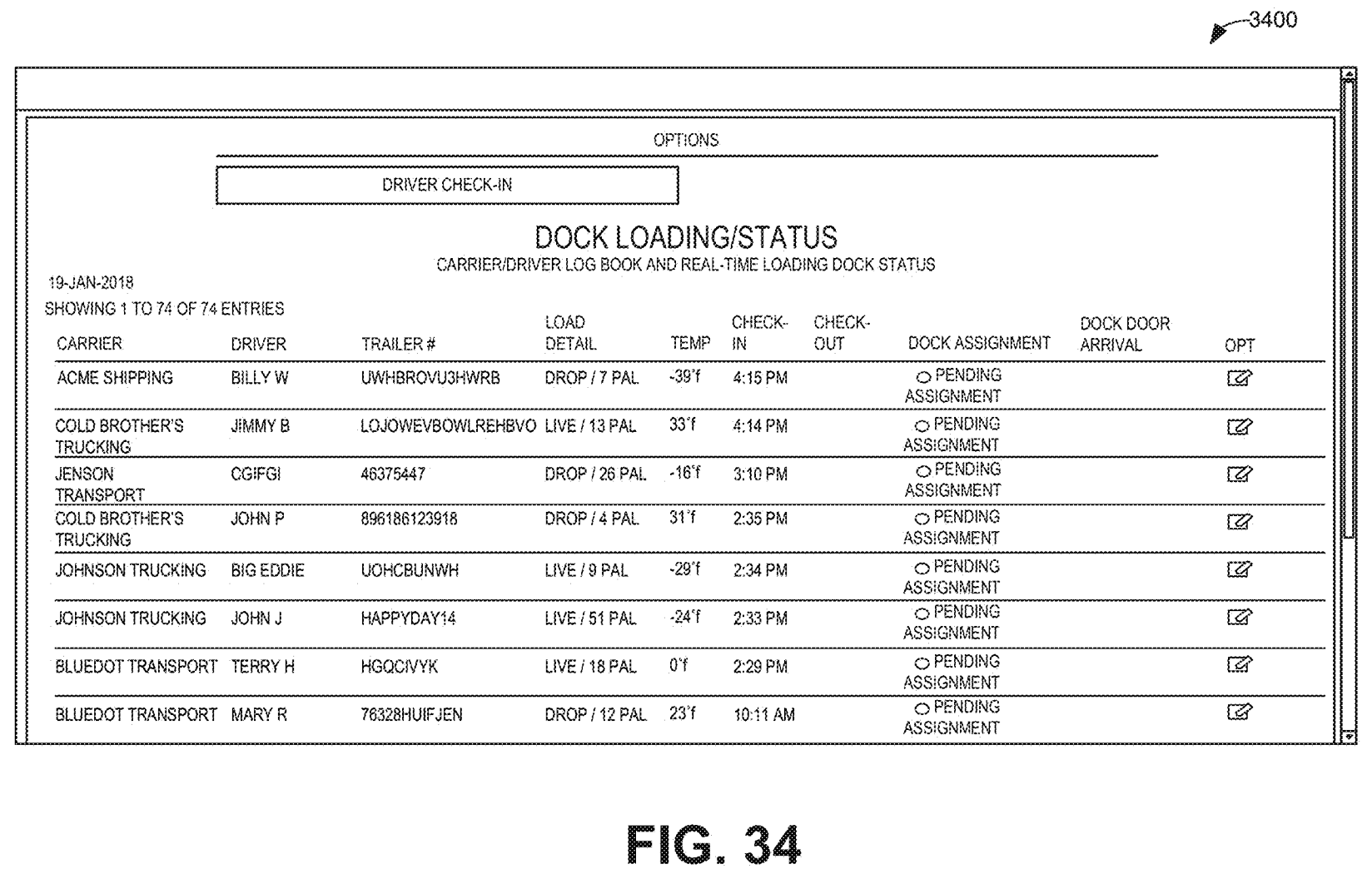

3400

OPTIONS

DRIVER CHECK-IN

DOCK LOADING/STATUS

CARRIER/DRIVER LOG BOOK AND REAL-TIME LOADING DOCK STATUS

19-JAN-2018

SHOWING 1 TO 74 OF 74 ENTRIES

| CARRIER | DRIVER | TRAILER # | LOAD DETAIL | TEMP | CHECK-IN | CHECK-OUT | DOCK ASSIGNMENT | DOCK DOOR ARRIVAL | OPT |
|---|---|---|---|---|---|---|---|---|---|
| ACME SHIPPING | BILLY W | UWHBROVU3HWRB | DROP / 7 PAL | -39˚f | 4:15 PM | | ○ PENDING ASSIGNMENT | | |
| COLD BROTHER'S TRUCKING | JIMMY B | LOJOWEVBOWLREHBVO | LIVE / 13 PAL | 33˚f | 4:14 PM | | ○ PENDING ASSIGNMENT | | |
| JENSON TRANSPORT | CGIFGI | 46375447 | DROP / 26 PAL | -16˚f | 3:10 PM | | ○ PENDING ASSIGNMENT | | |
| COLD BROTHER'S TRUCKING | JOHN P | 896186123918 | DROP / 4 PAL | 31˚f | 2:35 PM | | ○ PENDING ASSIGNMENT | | |
| JOHNSON TRUCKING | BIG EDDIE | UOHCBUNWH | LIVE / 9 PAL | -29˚f | 2:34 PM | | ○ PENDING ASSIGNMENT | | |
| JOHNSON TRUCKING | JOHN J | HAPPYDAY14 | LIVE / 51 PAL | -24˚f | 2:33 PM | | ○ PENDING ASSIGNMENT | | |
| BLUEDOT TRANSPORT | TERRY H | HGQCIVYK | LIVE / 18 PAL | 0˚f | 2:29 PM | | ○ PENDING ASSIGNMENT | | |
| BLUEDOT TRANSPORT | MARY R | 76328HUIFJEN | DROP / 12 PAL | 23˚f | 10:11 AM | | ○ PENDING ASSIGNMENT | | |

Figure 44:
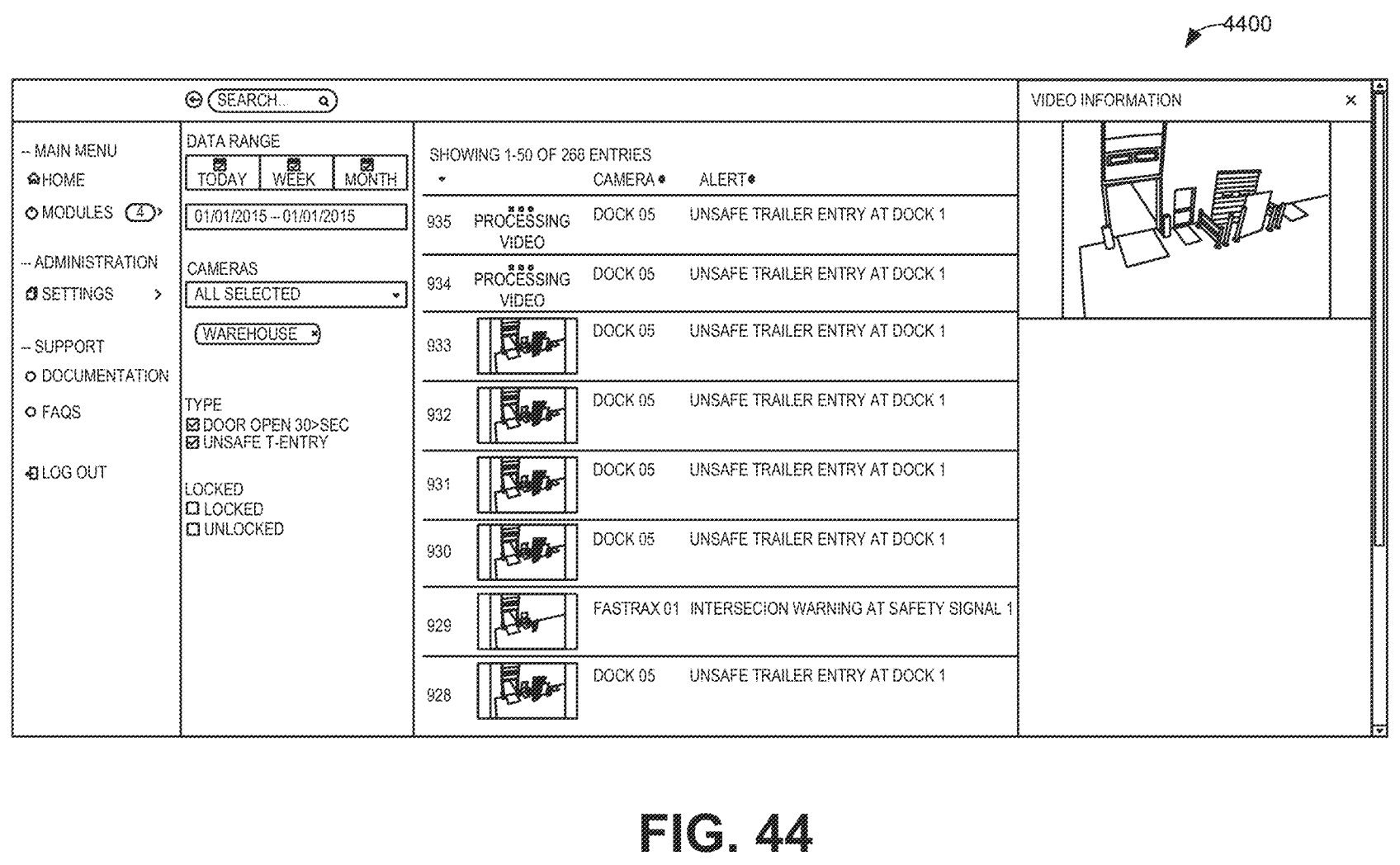

SEARCH...

-- MAIN MENU
HOME
MODULES 4
-- ADMINISTRATION
SETTINGS
-- SUPPORT
DOCUMENTATION
FAQS
LOG OUT

DATA RANGE
TODAY WEEK MONTH
01/01/2015 -- 01/01/2015
CAMERAS
ALL SELECTED
WAREHOUSE
TYPE
☒ DOOR OPEN 30>SEC
☒ UNSAFE T-ENTRY
LOCKED
☐ LOCKED
☐ UNLOCKED

SHOWING 1-50 OF 268 ENTRIES

| | | CAMERA | ALERT |
|---|---|---|---|
| 935 | PROCESSING VIDEO | DOCK 05 | UNSAFE TRAILER ENTRY AT DOCK 1 |
| 934 | PROCESSING VIDEO | DOCK 05 | UNSAFE TRAILER ENTRY AT DOCK 1 |
| 933 | | DOCK 05 | UNSAFE TRAILER ENTRY AT DOCK 1 |
| 932 | | DOCK 05 | UNSAFE TRAILER ENTRY AT DOCK 1 |
| 931 | | DOCK 05 | UNSAFE TRAILER ENTRY AT DOCK 1 |
| 930 | | DOCK 05 | UNSAFE TRAILER ENTRY AT DOCK 1 |
| 929 | | FASTRAX 01 | INTERSECION WARNING AT SAFETY SIGNAL 1 |
| 928 | | DOCK 05 | UNSAFE TRAILER ENTRY AT DOCK 1 |

VIDEO INFORMATION

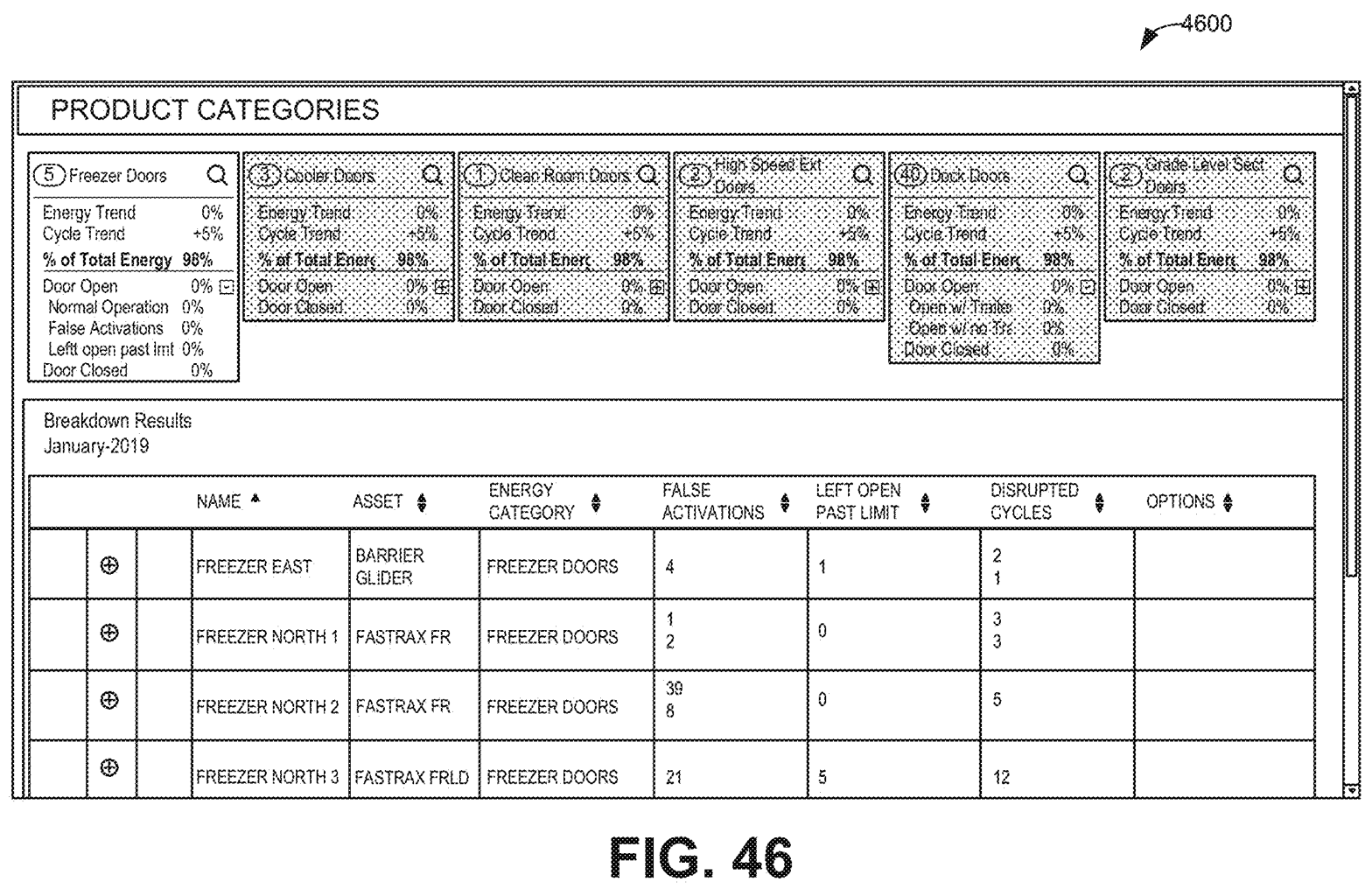

PRODUCT CATEGORIES

| (5) Freezer Doors | |
|---|---|
| Energy Trend | 0% |
| Cycle Trend | +5% |
| **% of Total Energy** | **98%** |
| Door Open | 0% |
| Normal Operation | 0% |
| False Activations | 0% |
| Leftt open past lmt | 0% |
| Door Closed | 0% |

| (3) Cooler Doors | |
|---|---|
| Energy Trend | 0% |
| Cycle Trend | +5% |
| **% of Total Energ** | **98%** |
| Door Open | 0% |
| Door Closed | 0% |

| (1) Clean Room Doors | |
|---|---|
| Energy Trend | 0% |
| Cycle Trend | +5% |
| **% of Total Energ** | **98%** |
| Door Open | 0% |
| Door Closed | 0% |

| (2) High Speed Ext Doors | |
|---|---|
| Energy Trend | 0% |
| Cycle Trend | +5% |
| **% of Total Energ** | **98%** |
| Door Open | 0% |
| Door Closed | 0% |

| (40) Dock Doors | |
|---|---|
| Energy Trend | 0% |
| Cycle Trend | +5% |
| **% of Total Energ** | **98%** |
| Door Open | 0% |
| Open w/ Traile | 0% |
| Open w/ no Trl | 0% |
| Door Closed | 0% |

| (2) Grade Level Sect Doors | |
|---|---|
| Energy Trend | 0% |
| Cycle Trend | +5% |
| **% of Total Energ** | **98%** |
| Door Open | 0% |
| Door Closed | 0% |

Breakdown Results
January-2019

| | | | NAME ▲ | ASSET ♦ | ENERGY CATEGORY ♦ | FALSE ACTIVATIONS ♦ | LEFT OPEN PAST LIMIT ♦ | DISRUPTED CYCLES ♦ | OPTIONS ♦ |
|---|---|---|---|---|---|---|---|---|---|
| | ⊕ | | FREEZER EAST | BARRIER GLIDER | FREEZER DOORS | 4 | 1 | 2<br>1 | |
| | ⊕ | | FREEZER NORTH 1 | FASTRAX FR | FREEZER DOORS | 1<br>2 | 0 | 3<br>3 | |
| | ⊕ | | FREEZER NORTH 2 | FASTRAX FR | FREEZER DOORS | 39<br>8 | 0 | 5 | |
| | ⊕ | | FREEZER NORTH 3 | FASTRAX FRLD | FREEZER DOORS | 21 | 5 | 12 | |

FIG. 46

METHODS AND APPARATUS TO MONITOR AND MANAGE LOADING DOCKS AND FACILITY OPERATIONS

RELATED APPLICATIONS

This patent arises from a continuation of U.S. patent application Ser. No. 16/979,416 (filed on Sep. 9, 2020), which is a national stage entry of International PCT Application No. PCT/US2019/021514 (filed on Mar. 9, 2019), which claims the benefit of both (1) U.S. Provisional Patent Application No. 62/701,381 (filed on Jul. 20, 2018) and (2) U.S. Provisional Patent Application No. 62/641,078 (filed on Mar. 9, 2018). Priority to U.S. patent application Ser. No. 16/979,416, International PCT Application No. PCT/US2019/021514, U.S. Provisional Patent Application No. 62/701,381, and U.S. Provisional Patent Application No. 62/641,078 is claimed. U.S. patent application Ser. No. 16/979,416, International PCT Application No. PCT/US2019/021514, U.S. Provisional Patent Application No. 62/701,381, and U.S. Provisional Patent Application No. 62/641,078 are incorporated herein by reference in their entireties.

BACKGROUND

Field of the Disclosure

This disclosure relates generally to monitoring systems, and, more particularly, to methods and apparatus to monitor and manage loading docks and facility operations.

Background

Loading docks provide an area for vehicles (e.g., trucks, trailers, etc.) to move next to an elevated platform of a building (e.g., a material handling facility) so that cargo can be readily transferred between the vehicle and the building. Some loading docks include equipment such as dock levelers, vehicle restraints, and/or dock doors, any of which may be associated with one or more sensor/monitoring systems. Within material handling facilities there may be additional equipment to facilitate the movement, storage, and/or handling of cargo such as, for example, grade-level doors, HVAC (heating, ventilation, and air conditioning) systems, industrial doors to partition freezer rooms and/or other rooms, conveyor systems, fans for air movement within the facility, lighting and signal systems, etc.

BRIEF DESCRIPTION OF THE DRAWINGS

FIGS. 21-59 illustrate example graphical user interfaces of several example web pages hosted by the web server associated with the example main server(s) of FIGS. 1, 6, and/or 10.

In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for case of referencing multiple elements or components.

DETAILED DESCRIPTION

Figure 1:
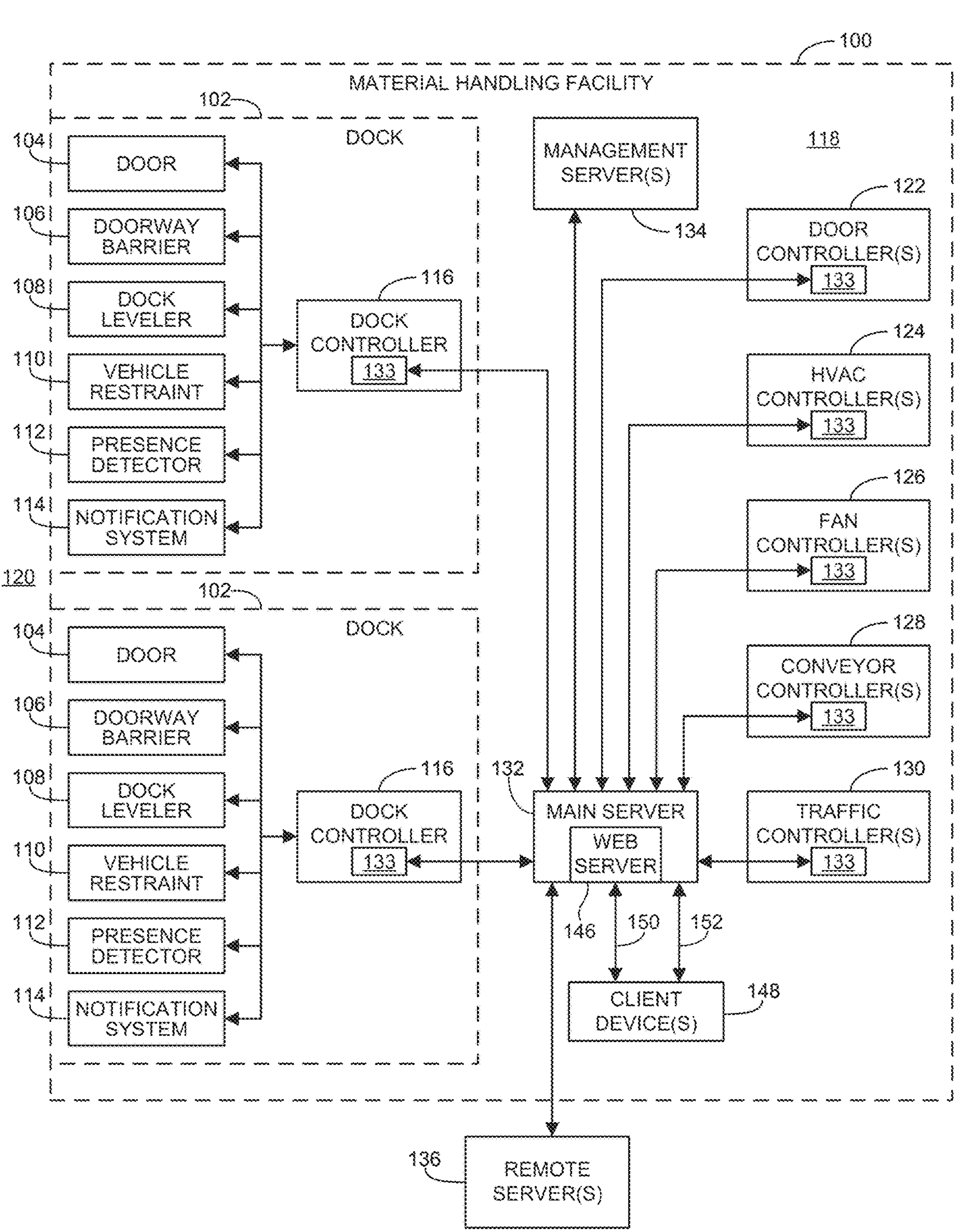
FIG. 1 illustrates an example material handling facility in which teachings disclosed herein may be implemented.
Figure 2:
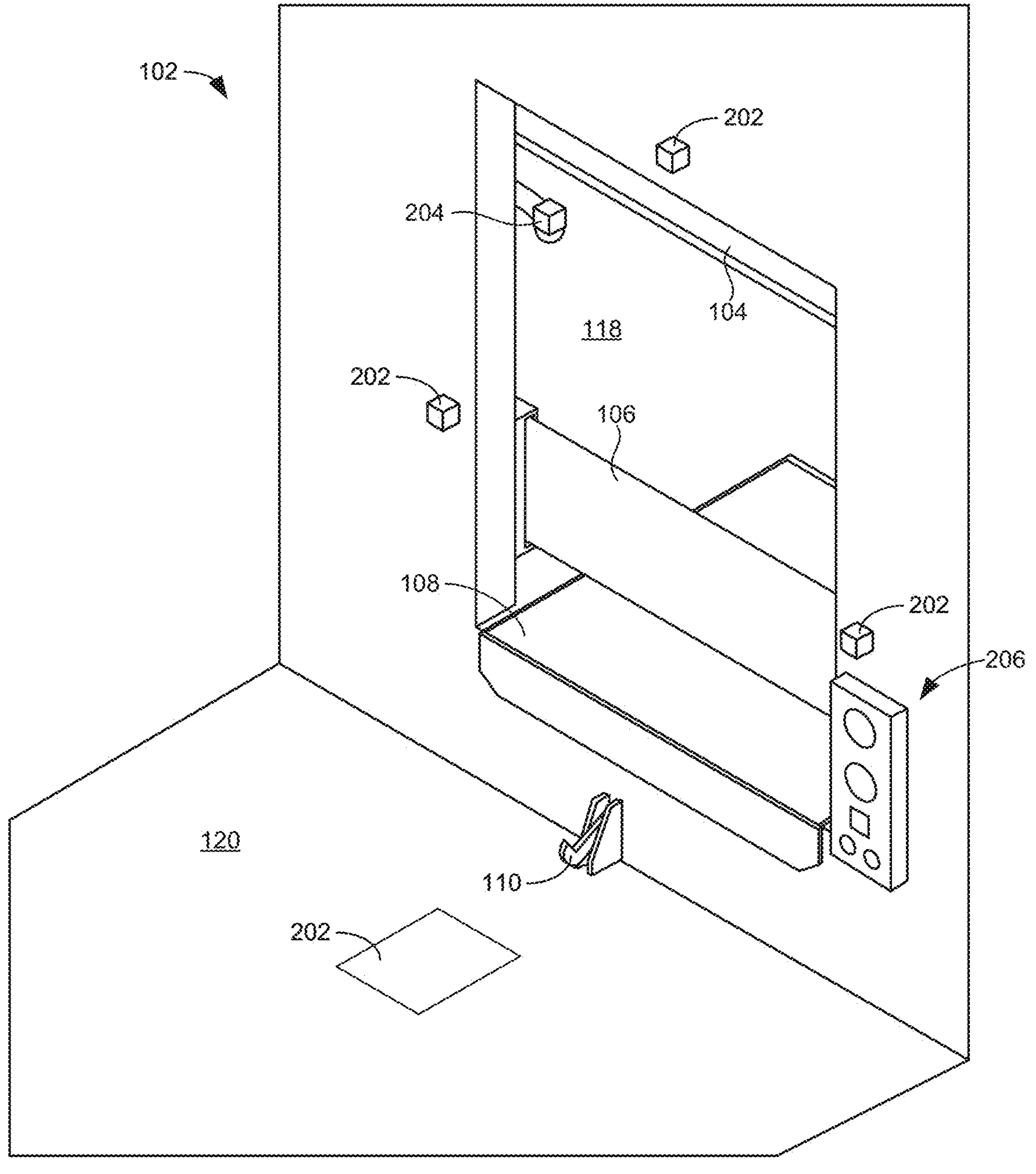
FIG. 2 illustrates the example loading dock of FIG. 1 viewed from an exterior of the material handling facility.
Figure 3:
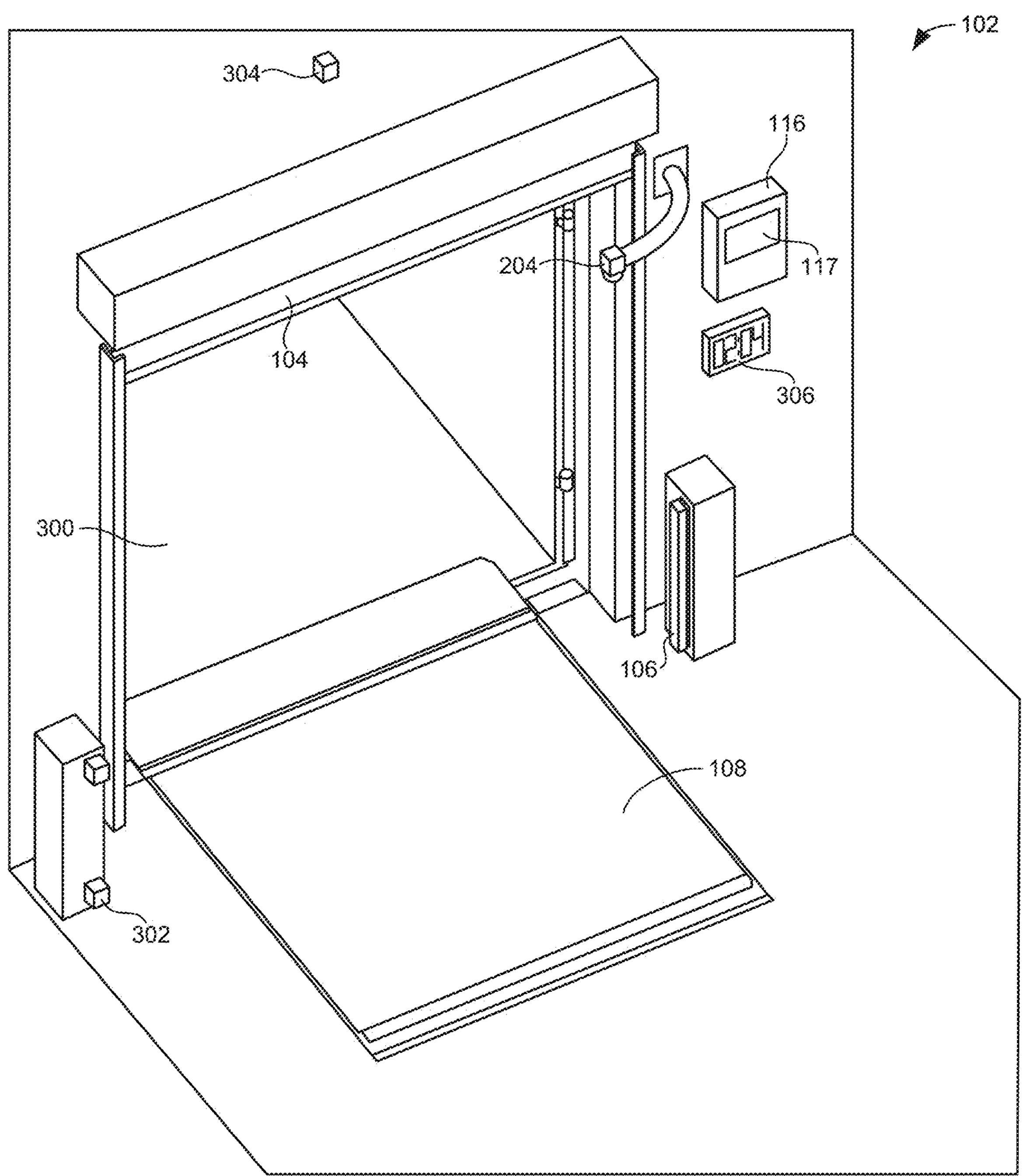
FIG. 3 illustrates the example loading dock of FIG. 1 viewed from an interior of the material handling facility with a trailer parked at the dock.
Figure 4:
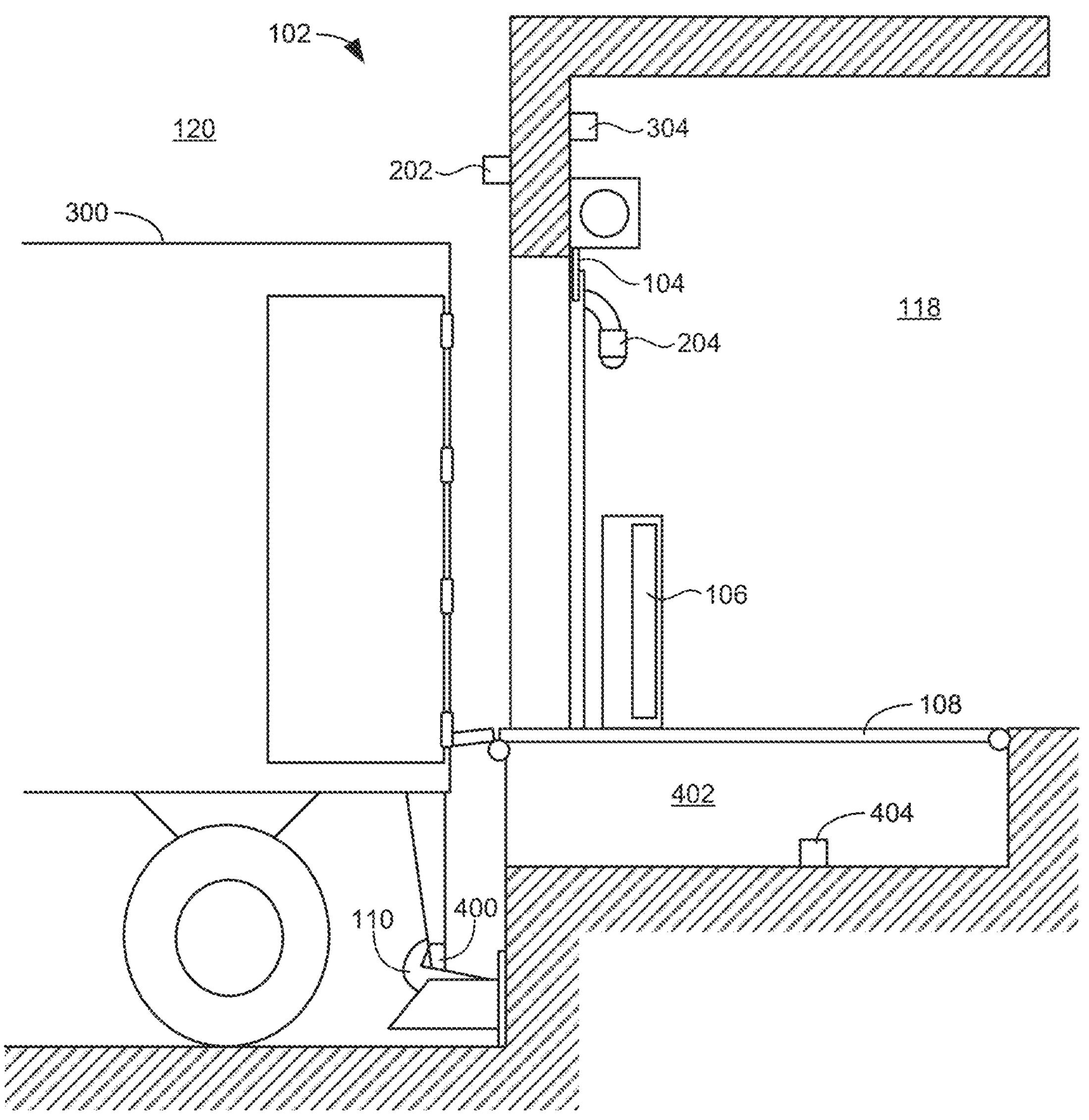
FIG. 4 illustrates a cross-sectional side view of the example loading dock of FIG. 1 with the associated trailer of FIG. 3.

FIG. 1 illustrates an example material handling facility 100 in which teachings disclosed herein may be implemented. The material handling facility 100 may be associated with, for example, a storage warehouse, a distribution center, a manufacturing plant, a retail store, etc. In the illustrated example, the material handling facility 100 includes a plurality of loading docks 102 (two are shown) providing platforms for trucks to back up a trailer (or truck bed) to enable the loading and/or unloading of materials between the inside of the trailer and the material handling facility 100. FIG. 2 illustrates an example loading dock 102 viewed from an exterior of the material handling facility 100. FIG. 3 illustrates the example loading dock 102 viewed from an interior of the material handling facility 100 with a trailer 300 parked at the dock 102. FIG. 4 illustrates a cross-sectional side view of the example loading dock 102 with the associated trailer 300. As shown in FIGS. 1-4, the example dock 102 includes a door 104, a doorway barrier 106, a dock leveler 108, a vehicle restraint 110, a presence/ motion detector 112, and/or a notification system 114. In some examples, the dock 102 may be associated with and/or include other equipment such as, for example, fans, lights, door seals, shelters, trailer stands, etc. In the illustrated example, the docks 102 include a dock controller 116 to monitor and/or control the operation of the door 104, the doorway barrier 106, the dock leveler 108, the vehicle restraint 110, the presence/motion detector 112, the notification system 114 and/or other equipment associated with the dock. In some examples, the dock controller 116 includes a display screen 117 to display information associated with the components being monitored and/or controlled by the controller 116. The display screen 117 may be a touchscreen in which a user may also input commands and/or instructions to operate the controller and/or access specific information associated with the controller, the dock, or the operations involving the dock. In some examples, the display screen 117 may be incorporated into a different device that is separate from but in communication with the dock controller 116. Although a single controller 116 is shown as controlling all equipment associated with the dock 102, in some examples, each dock 102 may be associated with multiple controllers configured to control and/or monitor different ones of the door 104, the doorway barrier 106, the dock leveler 108, the vehicle restraint 110, the presence/motion detector 112, the notification system 114 and/or other equipment associated with the dock.

The doors 104 associated with the docks 102 are moveable between open and closed positions to selectively unblock or close off a doorway between an interior 118 of the material handling facility 100 and an exterior environment 120. Thus, when the trailer 300 or a truck bed is parked at the dock 102, the door 104 provides access to the trailer when the door 104 is in the open position and prevents such access when in the closed position.

In some examples, the doors 104 are associated with one or more sensors and/or door monitoring systems to facilitate the monitoring and control of the operation of the doors 104. For example, one or more door status sensors may monitor and/or detect a status of the door 104 (e.g., whether the door is fully open, fully closed, partially open, partially closed, opening, or closing); one or more impact sensors may monitor and/or detect when the door 104 has been struck (e.g., by a material handling vehicle (e.g., a forklift)); one or more photoelectric eyes arranged on either side of the door 104 may monitor and/or detect the passage of a person or object through the doorway when the door is open; one or more motion and/or presence sensors may monitor and/or detect activity in an area proximate the doorway; one or more radio frequency identification (RFID) sensors may monitor and/or detect the identity of personnel, equipment, and/or material passing through the doorway; one or more temperature sensors may monitor and/or detect the temperature on one or both sides of the door 104; one or more airflow sensors may monitor and/or detect the flow of air passing the door 104 (e.g., air passing the door when in an open or partially open position and/or air leaking passed the door when in the closed position closed); one or more other environmental sensors may monitor and/or detect pressure, humidity, pollutants, particulates, chemicals, etc.; one or more actuator sensors may monitor and/or detect the energy consumption and/or operation of a door actuator (e.g., a motor) used to open and/or close the door; and one or more image and/or video sensors (e.g., a camera) may be implemented to monitor and/or detect particular states of the dock based on image/video analysis. In some examples, the dock controller 116 receives output signals from these sensors to monitor and/or control the operation of the door 104.

In some examples, the doorway barrier 106 is constructed to provide a barrier that extends across the doorway associated with the door 104. The doorway barrier 106 may block passage through the doorway even when the door 104 is in the open position. The doorway barrier 106 may be used in this manner as a safety precaution when, for example, the door 104 is opened but there is no trailer parked at the dock 102 as shown in FIG. 2 or when a trailer at the dock 102 is not restrained. The doorway barrier 106 may also extend across the doorway in front of the door 104 within the interior 118 of the material handling facility 100 when the door 104 is closed to protect the door 104 by reducing the likelihood of material handling equipment colliding with the door 104. In some examples, the doorway barrier 106 is associated with a barrier sensor 302 (FIG. 3) that outputs a signal to the dock controller 116 to indicate a status of the doorway barrier 106 (e.g., whether the barrier is in active use and blocking the doorway (as shown in FIG. 2), stowed away to provide passage through the doorway (as shown in FIGS. 3 and 4), or in some intermediate state). In some examples, the barrier sensor 302 and/or a different sensor detects an impact (e.g., a force) on the barrier 106 that may indicate a collision with the barrier.

Often, when a truck bed or trailer (e.g., the trailer 300 shown in FIGS. 3 and 4) is parked at the dock 102, there may be a gap between the rear edge of the truck bed or trailer and the outside face of the platform of the dock 102. The dock leveler 108 provides an adjustable bridge to span this gap over which material handling equipment can travel between the interior 118 of the material handling facility 100 and the trailer of the vehicle parked at the dock 102. Furthermore, the dock leveler 108 may be vertically adjustable to act as a ramp that accounts for trailers that have different heights relative to the platform of the dock 102. In some examples, the dock leveler 108 includes one or more sensors to facilitate the monitoring and control of the operation of the dock leveler 108. For example, a leveler sensor may produce an output signal indicative of when the dock leveler 108 is in an active state (extended to bridge the gap between the dock platform and a trailer as shown in FIGS. 3 and 4), an inactive state (when the leveler is in a stored position as shown in FIG. 2), or in some intermediate state. In some examples, a trailer being pulled away from the dock 102 while the dock leveler 108 is in an active state is detected by a limit switch (e.g., detecting the leveler dropping when the extended end is no longer supported by the trailer). In such examples, an output of the limit switch may trigger the dock controller 116 to cause the dock leveler 108 to retract to the stored position of the inactive state.

The vehicle restraints 110 associated with the docks 102 are positioned in the exterior environment 120 to engage some part of the vehicle (e.g., the trailer 300) parked at the dock 102 to reduce inadvertent movement of the vehicle (e.g., by the vehicle shifting as a result of material handling equipment moving around within the trailer and/or by a driver prematurely driving away from the platform). In some examples, the vehicle restraint 110 engages a rear impact guard (e.g., an ICC bar 400 as shown in FIG. 4) of the vehicle to restrain the vehicle. In some examples, the vehicle restraint 110 engages a tire and/or any other suitable portion of the vehicle. In some examples, the vehicle restraint 110 includes one or more sensors to facilitate the monitoring and control of the operation of the vehicle restraint 110. For example, a restraint sensor may produce an output signal indicative of when the vehicle restraint 110 is in a locked position (e.g., in position to engage/restrain the vehicle) or an unlocked position (e.g., stored away from the vehicle). Alternatively or in addition, the restraint sensor(s) may produce an output signal indicative of the position of the restraint relative to a reference point and/or the force(s) experienced by the restraint to determine if the restraint is actively engaged/restraining the vehicle or not.

In the illustrated example of FIG. 1, the presence/motion detector 112 represents one or more presence or motion detector systems. In some examples, the presence/motion detector 112 includes a presence detector system to detect the presence of the trailer 300 located at the dock 102. The term "trailer" for purposes of discussion related to sensing presence or motion thereof, pertains to a trailer which may or may not be connected to a tractor or alternatively pertains to a vehicle with a cargo bay or platform. In some examples, the presence of the trailer 300 is detected via one or more trailer sensors 202 (FIG. 2) positioned in the exterior environment 120 either on and/or adjacent the building of the material handling facility 100. The trailer sensor(s) 202 may be implemented using any suitable sensors such as, for example, photoelectric eyes, proximity sensors, motion sensors, inductive loop sensors, a light detection and ranging (LIDAR) system, etc. In some examples, the presence/motion detector 112 may include a presence detector system to detect the presence of personnel/equipment (e.g., people on foot and/or driving material handling equipment, autonomous vehicles, etc.) within a trailer 300 parked at the loading dock 102 (e.g., loading and/or unloading cargo) or outside the facility on the approach of the dock 102. In some examples, the presence of personnel/equipment within the trailer 300 is detected based on a motion sensor 204 (FIGS. 2-4) facing into the trailer from a position within the material handling facility 100. Additionally or alternatively, the presence/motion detector 112 may include a presence detector system to detect the presence of personnel/equipment/materials on the platform of the leveler 108, in the leveler pit and/or otherwise in close proximity to the dock 102. In some examples, the presence of personnel/equipment within the material handling facility 100 in proximity to the dock 102 is detected based on motion sensors 304 (FIGS. 3 and 4) facing the leveler and/or surrounding area. Additionally or alternatively, the presence of personnel/equipment/materials may be detected within a leveler pit 402 (FIG. 4) underneath the dock leveler 108 (e.g., for levelers stored in a vertically upright position) based on one or more presence/motion sensors 404 within the leveler pit 402. In addition to detecting the presence of vehicles, personnel, or material handling equipment, any one of the presence/motion systems represented by the presence/motion detector 112 of FIG. 1 may be enabled to determine the movement (e.g., speed, direction, etc.), the position (e.g., proximity, orientation, etc.), the size, the shape, etc. and combinations thereof of vehicles, personnel, equipment, or other things (e.g., product, materials) and may be capable of differentiating between these things.

The notification system 114 of the illustrated example may include multiple separately functioning notification systems that include one or more visual indicators (e.g., lights, display screens, etc.) and/or one or more audible indicators (e.g., horns, bells, sirens, speakers, etc.) to inform personnel near the docks 102 of particular circumstances, warnings, events, and/or other conditions associated with some aspect or status of the dock 102 and/or the vehicle located at the dock. Additionally or alternatively, some of the visual indicators may be lights intended to illuminate and/or improve visibility of areas associated with the docks 102 without indicating any particular circumstance or condition associated with the docks. The visual and/or audible indicators of the notification system 114 may be located within the interior 118 of the material handling facility 100 and/or located in the exterior environment 120 outside of the material handling facility 100 depending on the purpose of the indicators.

In some examples, at least some indicators within the material handling facility are positioned and/or oriented towards the exterior environment 120 (e.g., on the end of the arm associated with the motion sensor 204 shown in FIGS. 2-4) to illuminate, be visible from, and/or heard from within an interior of a trailer parked at the dock 102 when the door 104 is open. Such indicators may provide greater visibility to personnel entering the trailer to load or remove cargo. Such indicators may also warn personnel within the trailer of potential safety risks such as the vehicle restraint 110 not being engaged and/or of the presence of people near the platform of the dock 102 that may not be visible from within the trailer. Other indicators within the material handling facility 100 may be positioned and/or oriented to illuminate, be visible from, and/or heard from areas within the interior 118 of the facility (e.g., at the dock platform and/or surrounding area). Some such indicators may serve as warnings of potential safety risks such as, for example, the vehicle restraint 110 not being engaged and/or of the presence of someone in the trailer that may be about to come out unexpectedly. Additionally or alternatively, the indicators may indicate the operational state of equipment associated with the dock 102.

In some examples, the notification system 114 of FIG. 1 includes a timing indicator 306 (FIG. 3) positioned adjacent the door 104 that is visible from within the material handling facility 100 to display a timer indicating how long a trailer has been parked at the dock 102. In this manner, personnel may be informed of how much time is left until detention and/or demurrage charges may start being incurred. In some examples, the timing indicator 306 is implemented via the display screen 117 associated with the dock controller 116. In some examples, the timing indicator 306 may countdown instead of counting up. In some examples, the timing indicator 306 may change appearance (e.g., change color, begin flashing, etc.) and/or another indicator may be activated when the timer reaches a threshold to indicate to personnel the near expiration of time related to a particular operational constraint (e.g., the need to quickly finish loading and/or unloading the trailer). In some examples, the timing indicator 306 may indicate (e.g., based on a color, flashing, etc.) a priority for loading and/or unloading a trailer at the corresponding dock 102 relative to the loading and/or unloading of other trailers at other docks 102. In some such examples, the prioritization may be based on predicted time allocation and/or cost incursion across the docks 102 of the material handling facility 100 in light of available operational resources (e.g., personnel on hand, available material handling equipment, pick status, cross dock order status, etc.).

In some examples, one or more indicators are positioned on the outside of the material handling facility 100 to illuminate, be visible from, and/or heard from areas external to the docks 102. In some examples, such indicators may be lights that illuminate the area to provide greater visibility for people in the exterior environment 120 (e.g., a driver backing a trailer up to the dock 102). Additionally or alternatively, in some examples, the indicators may be lights that provide warnings and/or guidance to people in the exterior environment 120. For example, as shown in FIG. 2, light indicators 206 on the exterior of the facility 100 include a stop (red) and go (green) light to direct a truck driver when a trailer (e.g., the trailer 300 of FIGS. 3 and 4) may be backed into the area adjacent the dock 102 and/or when the trailer may be pulled away from the dock 102. In some examples, light and/or audible indicators can be used to indicate to a driver when a vehicle restraint is in override, dock equipment is undergoing maintenance, or there is someone/something in or near the path of the trailer, etc. These conditions may be communicated via separate indicators, utilizing different states of a common indicator (color/tone change, flashing/sounding pattern, etc.) or combinations thereof. Further, in some examples, indicators associated with the dock 102 include lights and/or audible alarms indicating to people standing near the dock approach when a truck is backing in.

In some examples, the dock controller 116 controls the different indicators associated with the notification system 114 based on one or more of the signals received from the various sensors associated with the door 104, the doorway barrier 106, the dock leveler 108, the vehicle restraint 110, and/or the presence detector 112. For instance, in some such examples, the dock controller 116 causes the light indicators 206 to provide a stop light (e.g., a red light) whenever the restraint signal indicates that the vehicle restraint 110 is active and engaged with the trailer. As another example, if the door sensor indicates the door 104 is opened when the presence detector 112 fails to detect a trailer parked at the dock 102, there is a risk that the open door may lead to a drop-off of the dock platform. Accordingly, in some such examples, the dock controller 116 may turn on a warning indicator to caution nearby individuals of the exposed drop. However, in some such examples, the dock controller 116 may not trigger the warning indicator when the barrier sensor 302 provides a signal indicating the doorway barrier 106 is in active use to block passage through the opened doorway. Thus, different signals output from different ones of the various sensors may be used in combination to trigger a change in the activation or state of indicators associated with the notification system 114 to provide warnings, notifications, and/or guidance to people in areas associated with the dock 102.

While the material handling facility 100 includes the docks 102 with various components and/or systems to facilitate the transfer of goods between a trailer and the material handling facility 100, the material handling facility 100 of FIG. 1 also includes other components and/or systems that facilitate the handling, movement, and/or storage of goods within the interior 118 of the material handling facility 100. In some examples, these components and/or systems may operate substantially independent of one another with separate controllers to monitor and/or control their operation. In particular, as shown in FIG. 1, the material handling facility 100 includes one or more door controller(s) 122, heating, ventilation, and air conditioning (HVAC) controller(s) 124, fan controller(s) 126, conveyor controller(s) 128, and/or traffic controller(s) 130. In some examples, the material handling facility 100 may include other equipment associated with the facility (e.g., smart barriers, machine guards, building automation, lighting, fire and security systems, etc.) and respective controllers.

In the illustrated example, the door controller 122 serves to control the operation of an industrial door located internally within the material handling facility 100. In some examples, such doors are positioned at various locations within the material handling facility 100 to partition different rooms and/or areas of the facility. Such doors may include sensors similar to or the same as those described above for the doors 104 at the loading docks 102 to enable the door controller 122 to monitor and/or control the doors. For example, such doors may include one or more door status sensors may indicate a status of the door (e.g., open, closed, opening, closing, etc.); one or more impact sensors may monitor and/or detect when a material handling vehicle has struck the door; one or more photoelectric eyes may monitor and/or detect the passage of a person or object through a doorway associated with the door; one or more motion and/or presence sensors may monitor and/or detect activity in an area proximate the doorway; and one or more RFID sensors may monitor and/or detect the identity of personnel, equipment, and/or material passing through the doorway; one or more temperature sensors may monitor and/or detect the temperature on one or both sides of the door; one or more other environmental sensors may monitor and/or detect pressure, humidity, pollutants, particulates, chemicals, etc.; one or more airflow sensors may monitor and/or detect the flow of air passing the door 104 (e.g., air passing the door when in an open or partially open position and/or air leaking passed the door when in the closed position closed); and one or more actuator sensors may monitor and/or detect the energy consumption and/or operation of a door actuator (e.g., a motor) used to open and/or close the door. In some examples, the door controller 122 includes and/or is communicatively coupled to a local display screen similar to the display screen 117 of the dock controller 116.

In some examples, how the door controller 122 uses signals output by such sensors may depend on the location and/or intended use of the associated door. For example, one or more doors may provide access to a freezer room. In such examples, the associated door controller 122 may monitor a feedback signal provided by a temperature sensor to ensure the temperature on the freezer side of the room remains at or below a temperature set point. Additionally or alternatively, the door controller 122 for a freezer door may monitor how frequently and/or how long the door is opened (based on feedback from the door status sensor) and generate alerts when the frequency or duration of the door being open exceeds corresponding thresholds. In other examples, one or more doors may be used to control access to a cleanroom with a relatively low level of pollutants. In some such examples, the door controller 122 may monitor feedback signals from one or more airflow and/or pressure sensors to ensure the amount of airflow (potentially leading to the spread of contaminants) is maintained at or below a suitable threshold or that a certain pressure differential is maintained across the doorway. In some examples, separate doors may be configured according to an interlock relationship such that the operation of one door is conditioned on the state or operation of a second door (e.g., only one of two doors may be opened at any given point in time). In such examples, signals from sensors monitoring the operation of each door may be provided to separate door controllers 122 associated with each door (or a single controller 122 that controls both doors).

In the illustrated example of FIG. 1, the HVAC controller 124 serves to monitor and/or control the delivery of conditioned air via air ducts to various areas within the material handling facility 100. In some examples, the HVAC controller 124 monitors and/or controls the operation (e.g., speed, energy consumption, etc.) of a blower that forces air through the air ducts. In some examples, the HVAC controller 124 receives feedback signals from temperature sensors positioned throughout the material handling facility 100. In some examples, air flow sensors, humidity sensors, and/or other types of sensors (e.g., monitoring pressure, pollutants, particulates, chemicals, etc.) may also provide inputs to the HVAC controller 124 to facilitate the control and monitoring of an associated HVAC system.

In the illustrated example of FIG. 1, the fan controller 126 serves to monitor and/or control one or more fans within the material handling facility 100. Fans may be positioned within the facility to increase the circulation of air beyond what is provided by air venting from ducts associated with the HVAC controller 124. In some examples, such fans include one or more sensors to detect the status of operational parameters (e.g., on, off, faulted (e.g., cannot start), speed, energy use, etc.) of the fan that may be provided as feedback signals to the fan controller 126.

In the illustrated example of FIG. 1, the conveyor controller 128 serves to monitor and/or control one or more conveyor systems within the material handling facility 100. In some examples, a conveyor system may include multiple separately activated conveyor segments. In some examples, one or more sensors may be implemented to detect the status (e.g., active (moving), inactive (not moving)) of each conveyor segment, the associated speed of a moving conveyor segment, and/or the position and/or shape of each conveyor segment (e.g., incline, telescoping, etc.). Additionally or alternatively, one or more sensors may provide outputs indicative of the energy use of motors used to actuate such conveyor segments. Further, in some examples, the conveyor systems may include one or more sensors to detect faults and/or jams on the conveyors. The outputs of any of these sensors may be used as feedback signals received by the conveyor controller 128 to monitor and/or control the operation of such conveyor systems. In some examples, feedback from a conveyor system may be used to measure and/or infer the amount and/or progress of cargo being moved into or out of trailers at the docks.

In the illustrated example of FIG. 1, a traffic controller 130 serves to monitor the flow of traffic of pedestrians and/or motorized vehicles (e.g., material handling equipment such as forklifts) throughout the material handling facility 100 and control signals directing traffic and/or notifying/warning personnel of oncoming traffic from a different direction. In some examples, a traffic signal system is positioned at an intersection of two or more aisles or travel paths for traffic within the material handling facility 100 with one or more signal light and/or associated display facing in the direction of each aisle or travel path. In some examples, the traffic controller 130 causes the signal lights and/or display of an example traffic signal system to provide different signals based on the traffic detected along each of the aisles and/or travel paths associated with the traffic signal system. In some examples, traffic is detected along each aisle and/or travel path by individual traffic sensors (e.g., motion sensors) facing in the direction of each aisle or travel path. Thus, if two traffic sensors facing separate paths both detect approaching traffic, the traffic controller 130 may cause a signal to be generated on the display facing the directions of the oncoming traffic indicating there is traffic approaching from another direction. Additionally or alternatively, the traffic controller 130 may cause a single light visible from all directions to illuminate to indicate that there is intersecting traffic approaching from at least two directions. In some examples, both the traffic signal displays and the traffic sensors are located at an associated intersection (e.g., within a common housing). In some examples, a traffic signal system includes displays and/or traffic sensors that are remotely positioned relative to an associated intersection and/or relative to the traffic controller 130.

In the illustrated example of FIG. 1, each of the controllers 116, 122, 124, 126, 128, 130 communicates with a main server 132. More particularly, in some examples, the dock controllers 116, the door controllers 122, the HVAC controller 124, the fan controller 126, the conveyor controller 128, and the traffic controllers 130 transmit values corresponding to the operational and/or state parameters configured in the respective controllers and/or feedback signals collected from any sensors associated with the respective controllers. In this manner, the main server 132 aggregates all available data associated with the various and separate systems in the material handling facility 100 into one place. The aggregation of data from the disparate sources enables the main server 132 to analyze and/or integrate the controller data to identify relationships that would not otherwise be possible. As described more fully below, in some examples, the main server 132 organizes the aggregated controller data for presentation to end users via one or more dashboards or graphical user interfaces directed to particular interests of the end users. The graphical user interfaces may be presented by one or more web pages, apps, applets, applications, etc. In some examples, the graphical user interfaces may be configurable to provide notifications and/or alerts when particular events are detected based on the values of a combination of different parameters monitored by one or more of the controllers 116, 122, 124, 126, 128, 130. Further detail regarding the implementation of the example main server 132 is provided below in connection with FIGS. 6-10. Additionally or alternatively, in some examples, the main server 132 may transmit information back to the controllers 116, 122, 124, 126, 128, 130. In some such examples, information transmitted to the controllers is passive in that it does not affect the operation of the components controlled by the controllers. In such examples, the information may be provided to be displayed on a local display screen (e.g., the display screen 117 of the dock controller 116 shown in FIG. 3 and/or a similar local display screen associated with one of the other controllers 122, 124, 126, 128, 130) to be referenced by personnel positioned near the controllers. In other examples, the information transmitted to the controllers from the main server 132 may be active in that it includes commands causing the controllers to implement certain operations. Although the main server 132 is shown as being located within the material handling facility 100 in the illustrated example, in other examples, the main server 132 may be remotely located away from the material handling facility 100.

Figure 5:
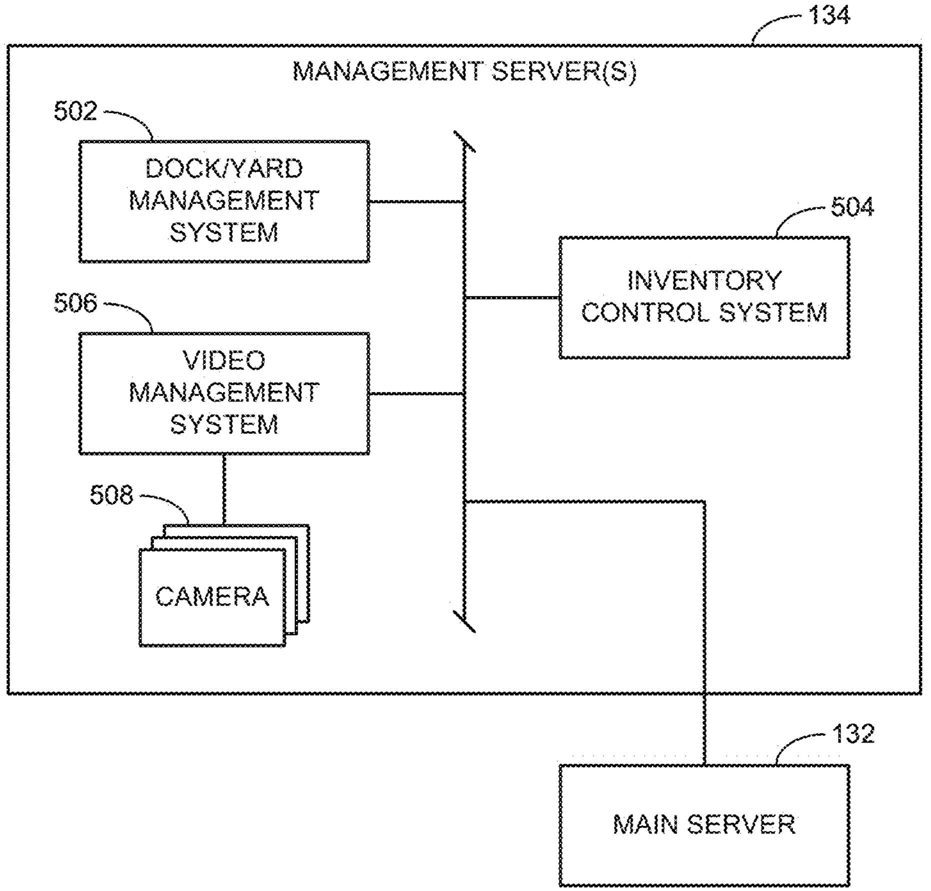
FIG. 5 is a block diagram of the example management server(s) of FIG. 1.

In the illustrated example of FIG. 1, the material handling facility 100 includes one or more management server(s) 134 that facilitate the management of various aspects of the equipment assets and/or working operations of the material handling facility 100. In some examples, the management server(s) 134 communicate with the main server 132 via a bus, local area network (LAN), and/or a wide area network (e.g., the Internet). Example management systems associated with the management server(s) 134 of FIG. 1 are schematically represented in FIG. 5. As shown in FIG. 5, the example management server(s) 134 include a dock/yard management system 502, an inventory control system 504, and a video management system (VMS) 506. In the illustrated example, the dock/yard management system 502, the inventory control system 504, and the video management system 506 are communicatively coupled via a bus and/or network to which the main server 132 is also connected. In some examples, one or more of the blocks illustrated in FIG.

5 may be combined, divided, re-arranged, and/or omitted from the example management server(s) 134. Further, in some examples, additional components and/or management systems (e.g., a warehouse management system (WMS), an enterprise resource planning (ERP) system, etc.) may be associated with the management server(s) 134 along with and/or instead of those shown in the illustrated example. Additionally or alternatively, in some examples, one or more of the dock/yard management system 502, the inventory control system 504, and the video management system 506 may be combined with and/or implemented by the main server 132.

The example dock/yard management system 502 of FIG. 5 monitors and tracks all rolling stock (e.g., delivery trucks, trailers, forklifts, hand trucks, push carts, etc.) and/or other equipment associated with operations surrounding the exterior of the material handling facility 100. In some examples, the dock/yard management system 502 generates alerts and/or notifications for scheduled maintenance, repair, and/or replacement of equipment assets.

The example inventory control system 504 of FIG. 5 monitors and tracks inventory stored at the material handling facility 100. More particularly, this may be accomplished by identifying and monitoring the contents of trucks being loaded and unloaded at the docks 102. In some examples, the inventory control system 504 timestamps the actual transfer of goods into or out of the facility. In some examples, the inventory control system 504 tracks the location and amounts of material/products in the material handling facility 100.

The example video management system 506 of FIG. 5 manages access to and collects video data from one or more cameras 508 positioned throughout the material handling facility 100. The cameras 508 may be internet protocol (IP) cameras, universal serial bus (USB) cameras, analog cameras, closed-circuit television (CCTV) cameras, and/or any other suitable type of camera. The cameras 508 may be located within the interior 118 of the facility and/or located outside to monitor the docks 102 or the yard. Additionally or alternatively, the cameras 508 may be positioned to monitor other spaces within the material handling facility such as those associated with one or more of the door controller 122, the HVAC controller 124, the fan controller 126, the conveyor controller 128, and/or the traffic controller 130. In some examples, the video management system 506 extracts and/or generates video segments in response to the detection of particular events being triggered in the material handling facility 100. As described more fully below, such events may be based on the data collected by the main server 132 from the different controllers 116, 122, 124, 126, 128, 130. In some examples, the generated video segments may capture the circumstances giving rise to the detected event. In some examples, the video management system 506 may be implemented by and/or incorporated with the main server 132. Additional detail regarding the implementation of the video management system 506 in association with the main server 132 is provided below in connection with FIGS. 6 and 8.

Returning to the illustrated example of FIG. 1, the main server 132 may also communicate with one or more remote server(s) 136 that are not located at the material handling facility 100. In some examples, the remote server(s) 136 correspond to additional servers, comparable to the main server 132, that are located at other material handling facilities and/or other locations associated with the business enterprise operating the material handling facility 100 of FIG. 1. Additionally or alternatively, in some examples, the remote server(s) 136 may correspond to a server maintained by a manufacturer of equipment associated with one or more of the dock controllers 116, the door controller 122, the HVAC controller 124, the fan controller 126, the conveyor controller 128, and/or the traffic controller 130, or remote asset management systems for other equipment in the facility. For example, the remote server 136 may provide equipment warranty information, equipment version and/or update information, equipment installation dates, records of technician and/or service calls, etc.

For purposes of explanation, the data reported to the main server 132 from the different controllers 116, 122, 124, 126, 128, 130 of FIG. 1 is referred to herein as IO (input/output) data because it includes the inputs and outputs monitored and/or provided by the respective controllers. In the illustrated example, the IO data collected by the main server 132 is transmitted from the controllers 116, 122, 124, 126, 128, 130 over a wireless mesh network (other network types could also be used (e.g., wired, or wireless non-mesh)). Accordingly, as shown in the illustrated example of FIG. 1, each of the controllers 116, 122, 124, 126, 128, 130 is equipped with an IO communication board 133 that includes a wireless transceiver (e.g., a radio) to transmit the IO data according to any suitable communications protocol. In some examples, the IO boards of the controllers 116, 122, 124, 126, 128, 130 transmit IO data directly to a receiver associated with the main server 132. In other examples, the IO data from one controller may be transmitted to the main server 132 indirectly via the IO communication board 133 in a different controller and/or via any other device or component capable of communicating on the mesh network (e.g., one or more gateways, relays, repeaters, etc.). In some examples, the IO boards of the controllers 116, 122, 124, 126, 128, 130 are implemented with a reusable firmware module that converts and normalizes data collected by the different controllers into a common format corresponding to the particular communication protocol. The reusable nature of the firmware enables the firmware to be embedded into existing products so that they may be modified for integration in the monitoring system of the main server 132. Enabling each of the controllers 116, 122, 124, 126, 128, 130 to transmit data in a common format according to a single communications protocol enables the main server 132 to directly integrate and associate data collected from different types controllers regardless of the original source of the data and/or nature and/or type of sensors used to generate such data.

In some examples, transmissions from the controllers 116, 122, 124, 126, 128, 130 reporting IO data include device identification information that includes an identifier, name and/or type for the device or controller sending the message as well as an address for the device on the network. The device identification information enables the main server 132 to determine the source of the message (e.g., the controller that sent the message). In some examples, each controller is modelled as a collection of generic data points with a corresponding address to identify each data point. In such examples, each data point represents a value of a particular IO parameter monitored and/or generated by the controller. In some examples, the values of the IO parameters correspond to measured outputs of sensors monitored by the corresponding controller (e.g., an output of a door sensor indicating whether the door 104 is open or closed). In other examples, the values of the IO parameters are not directly measured or sensed but are derived based on one or more measured values (e.g., deriving the transitional state of the door 104 (e.g., opening or closing) based on the last state of the door sensor and a signal from an actuator sensor indicating the door actuator is moving the door).

In some examples, messages transmitted to the main server 132 include the current values of one or more data points (e.g., IO parameters) associated with the device sending the message along with the unique address for each data point. Such messages are referred to herein as IO messages. The main server 132 is able to determine the meaning or significance of reported data points (e.g., values of IO parameters) in an IO message based on configuration data associated with the IO parameters that the main server 132 has stored in a database. The main server 132 is able to identify the correct configuration data specific to each IO parameter based on the address for the IO parameter included in the transmitted message along with the value of the IO parameter. In some examples, a controller may provide the configuration data for every data point associated with the controller to the main server 132 for uploading to the database when the controller is initially configured on the wireless network. The uploading of configuration data to the database may be accomplished automatically when the associated controller implements the reusable firmware module mentioned above that serves to format and normalize all values reported to the main server 132. Where a controller or other device does not include the firmware module (e.g., devices manufactured by a third party), the uploading of configuration parameters may be accomplished manually.

In some examples, the nature of the IO board and the associated radio used for transmitting IO messages to the main server 132 depends upon the nature and/or construction of the corresponding controller. In some examples, the IO board and associated radio are integrated onto the main printed circuit board (PCB) of an associated controller. That is the reusable firmware module that implements the communications protocol is implemented directly by the main PCB of the controller. In the illustrated example of FIG. 1, the door controller 122 includes such an integrated radio 138.

In other examples, a radio may be constructed on a limited purpose interface board that is communicatively coupled with the main PCB of an associated controller via a serial port connection. In some such examples, the limited purpose radio relies on the memory and processor of the main PCB to provide the IO communication functionality associated with generating and formatting the IO data for wireless transmission via the radio. That is, the main PCB of the controller may be modified to include the reusable firmware module without needing a significant redesign of the controller because the radio is separately provided on a daughter board. In the illustrated example of FIG. 1, the dock controllers 116 include such a limited purpose radio interface board 140.

In other examples, the IO board and associated radio may be constructed on a general purpose interface board with a local processor and memory that implements the reusable firmware module to handle the processing and formatting of the IO data for transmission via the radio. In some examples, such an IO board may be communicatively coupled to a controller in parallel with the main PCB of the controller. That is, in such examples, the IO board directly monitors the inputs and outputs associated with the controller independent of the main PCB of the controller. Such general purpose interface boards may be retrofitted to controllers and/or associated equipment that is not otherwise capable of generating IO data that conforms to the particular communications protocol used to report to the main server 132 (e.g., devices that cannot be modified to include the reusable firmware module). In the illustrated example of FIG. 1, the HVAC controller 124, the conveyor controller 128, and the traffic controller 130 include such a general purpose radio interface board 142. In some such examples, the radio may be on an interface board separate from the rest of the IO board to enable replacement of one without the other. Further, using separate boards enables the system to be configured for all digital IO, all analog IO, serial communication, ethernet and/or any combination of digital IO, analog IO, serial communication, and ethernet depending on the application for which the interface boards are used.

In some examples, any one of the integrated radio 138, the limited purpose radio interface board 140, or the general purpose radio interface board 142 may include a USB (universal serial bus) connection to facilitate the setup and commissioning of the associated devices. Additionally or alternatively, in some examples, setup and commissioning may be accomplished via a Bluetooth connection provided by any one of the integrated radio 138, the limited purpose radio interface board 140, and/or the general purpose radio interface board 142.

In the illustrated example of FIG. 1, the fan controller 126 monitors associated fans using the Modbus protocol. In some examples, the fan controller 126 includes a wireless radio interface board 144 that includes a reusable Modbus module to snoop and wirelessly stream the Modbus communications to the main server 132 without any modifications to the format of the data. Thus, in some examples, the main server 132 includes the ability to interpret the IO data received from the fan controller 126 to be normalized and aggregated with the other IO data received from the other controllers 116, 122, 124, 128, 130.

As mentioned above, the main server 132 serves as a central hub to aggregate and/or integrate data associated with the disparate systems operating throughout the material handling facility 100. In some examples, the main server 132 includes and/or is associated with a web server 146 that hosts one or more web pages accessible by a user via a client device 148. Client devices 148 may be any suitable computing device with a browser to access the web pages hosted by the web server 146. Thus, the client devices 148 may correspond to one or more operator stations located at the material handling facility (e.g., in the logistics office of the facility). In some examples, the client devices may be portable devices (e.g., tablets, smartphones, etc.) carried by personnel throughout the material handling facility 100 and/or remotely away from the facility. Further, some client devices 148 may be portable devices used by truck drivers hauling trailers to or from the material handling facility 100 and/or yard jockeys who reposition trailers at the docks 102 and/or within the yard of the material handling facility 100.

The different web pages may include different graphical user interfaces designed to present different types of information in a format that is easy to understand and facilitates a user in recognizing the relationship of data collected from different sources within the material handling facility 100. In some examples, the main server 132 automatically causes the one or more of the web pages to be updated through web-based communications 150 any time new data is collected that is relevant to the particular web pages. Further, in some examples, the web pages are designed to receive user input that is provided back to the main server 132. In some examples, web page updates are implemented based on pull requests from the client devices requesting updated information. Additionally or alternatively, in some examples, updates may be pushed to web pages actively opened by specific client devices for dynamic updating through the use of push requests. In some examples, user input received at one web page may be pushed to other web pages that are displaying information relating to the user input (e.g., other web pages being accessed by other client devices 148). Although graphical user interfaces are disclosed in connection with web pages herein, the graphical user interfaces may be presented using something other than web pages (e.g., via an app, applet, application, etc.)

In some examples, the main server 132 analyzes information provided from the separate systems within the material handling facility 100 to identify circumstances, conditions, and/or events (collectively referred to herein as events) that may need a response or other resolution. In some examples, the identification of such events is based on configurable rules that depend on feedback (e.g., particular IO data) from multiple different ones of the controllers 116, 122, 124, 126, 128, 130 and/or the servers 134, 136. In some examples, the main server 132 triggers particular responses based on the detection of particular events (e.g., when the conditions of associated event rules are satisfied). In some examples, the response may include providing information and/or instructions back to one or more of the controllers 116, 122, 124, 126, 128, 130 to cause such controllers to initiate some action in the equipment associated with the corresponding controller (e.g., open or close a door; change the operational state of a fan, a blower, or conveyor; switch the status of an indicator light; etc.). In some examples, the main server 132 may respond to particular events by generating alerts, warnings, notifications, log entries, and/or reports (collectively referred to herein as notifications) that are provided to one or more client devices 148. In some examples, such notifications may be provided via the web communications 150 as the web pages are updated. Additionally or alternatively, the main server 132 may provide notifications to the client devices 148 independent of the web server 146 using other forms of network communications 152 such as, for example, email messages, SMS (Short Message Service) messages, push notifications, etc. Additionally or alternatively, the main server 132 may transmit notifications for rendering via a local display screen (e.g., the display screen 117) associated with one of the controllers 116, 122, 124, 126, 128, 130 throughout the facility 100. In this manner, such notifications provide information to personnel located in proximity with the same controllers that reported information to the main server 132 that was used to generate the notifications.

Providing automatic notifications to individuals, as disclosed herein, enables those individuals to become aware of certain events that would otherwise remain unknown. This is a significant improvement to the efficient use and operation of the control systems described above because the events may correspond to activities disruptive to efficient loading, unloading, and/or storage of goods at the facility 100, activities that pose safety risks to personnel within and/or around the facility 100, activities that lead to the loss of energy resulting in increased burdens on HVAC systems (and associated increases in cost), etc. Through the monitoring of the various systems and operations within the material handling facility 100 and the automatic generation and transmission of notifications, examples disclosed herein enable relevant individuals to implement appropriate action responding to the various notifications (e.g., reversing actions previously taken that triggered the notification, providing additional training to reduce or eliminate the trigger event, scheduling and/or implementing preventative and/or maintenance activities, restructuring process flows and/or equipment usage procedures, etc.).

Figure 6:
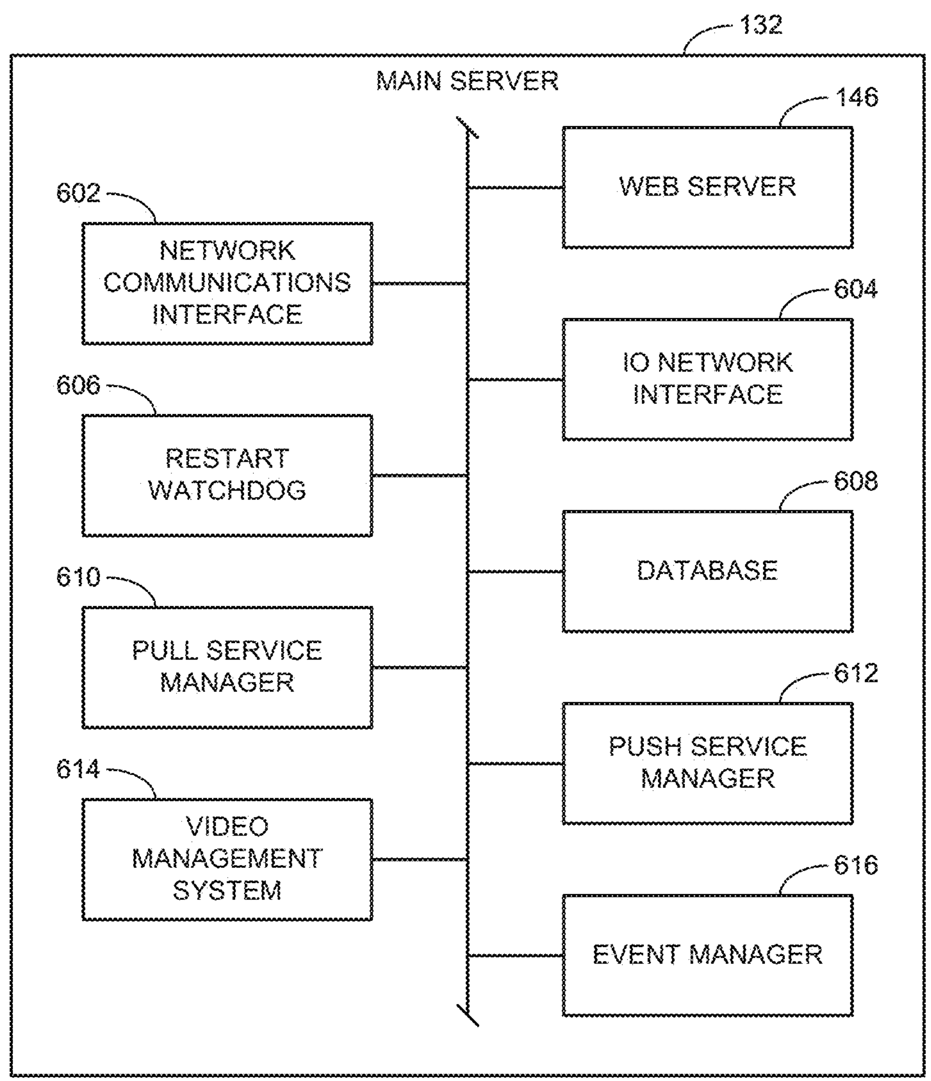
FIG. 6 is a block diagram of the example main server of FIG. 1.

FIG. 6 is a block diagram illustrating an implementation of the example main server 132 of FIG. 1. As shown in FIG. 6, the example main server 132 includes the web server 146, an example network communications interface 602, an example IO network interface 604, an example restart watchdog 606, an example database 608, an example pull service manager 610, an example push service manager 612, an example video management system 614, and an example event manager 616.

The example network communications interface 602 of FIG. 6 enables communications with the client devices 148 independent of the web server 146. For instance, the network communications interface 602 may send out email messages and/or SMS messages to one or more client devices 148. Additionally, in some examples, the network communications interface 602 may send data to and/or receive data from the local management server(s) 134 and/or the remote server(s) 136. In some examples, data received from the servers 134, 136 is stored in the database 608.

The example IO network interface 604 of FIG. 6 enables communications with the controllers 116, 122, 124, 126, 128, 130 in accordance with the communications protocol that normalizes the data associated with each controller into a consistent format. That is, the IO network interface 604 receives IO data reported by the controllers 116, 122, 124, 126, 128, 130 and may store the data in the database 608 for subsequent analysis by the event manager 616. In some examples, the IO network interface 604 formats and/or normalizes the data received from the different controllers before the data is provided to the database 608 for storage and/or to the event manager 616 for analysis.

The example restart watchdog 606 of FIG. 6 starts and monitors the web server 146 and the IO network interface 604 for potential failures. When a failure is detected, the restart watchdog 606 may automatically restart the web server 146 and/or the IO network interface 604. Such a restart may trigger a process to label any OI data in the database that was collected or transmitted via the IO network interface 604 at or around the time of the fault/failure as possibly being incorrect, and subsequently may request new IO data to replace it. Additionally, in some examples, the restart watchdog 606 logs any detected failures within the database 608. In this manner, the cause of the failure and possible remedies may be determined through subsequent analysis.

As mentioned above, the example database 608 stores IO data and associated configuration data for IO parameters monitored by any of the controllers 116, 122, 124, 126, 128, 130. The database 608 may also store data received from any of the other servers 134, 136. Additionally, in some examples, the database 608 stores configuration data defining events, the corresponding rules or conditions that trigger the events, and the actions to be taken in response to an event trigger being detected. Additional detail regarding the nature of some of the information stored in the database is described below in connection with FIG. 7.

Figure 7:
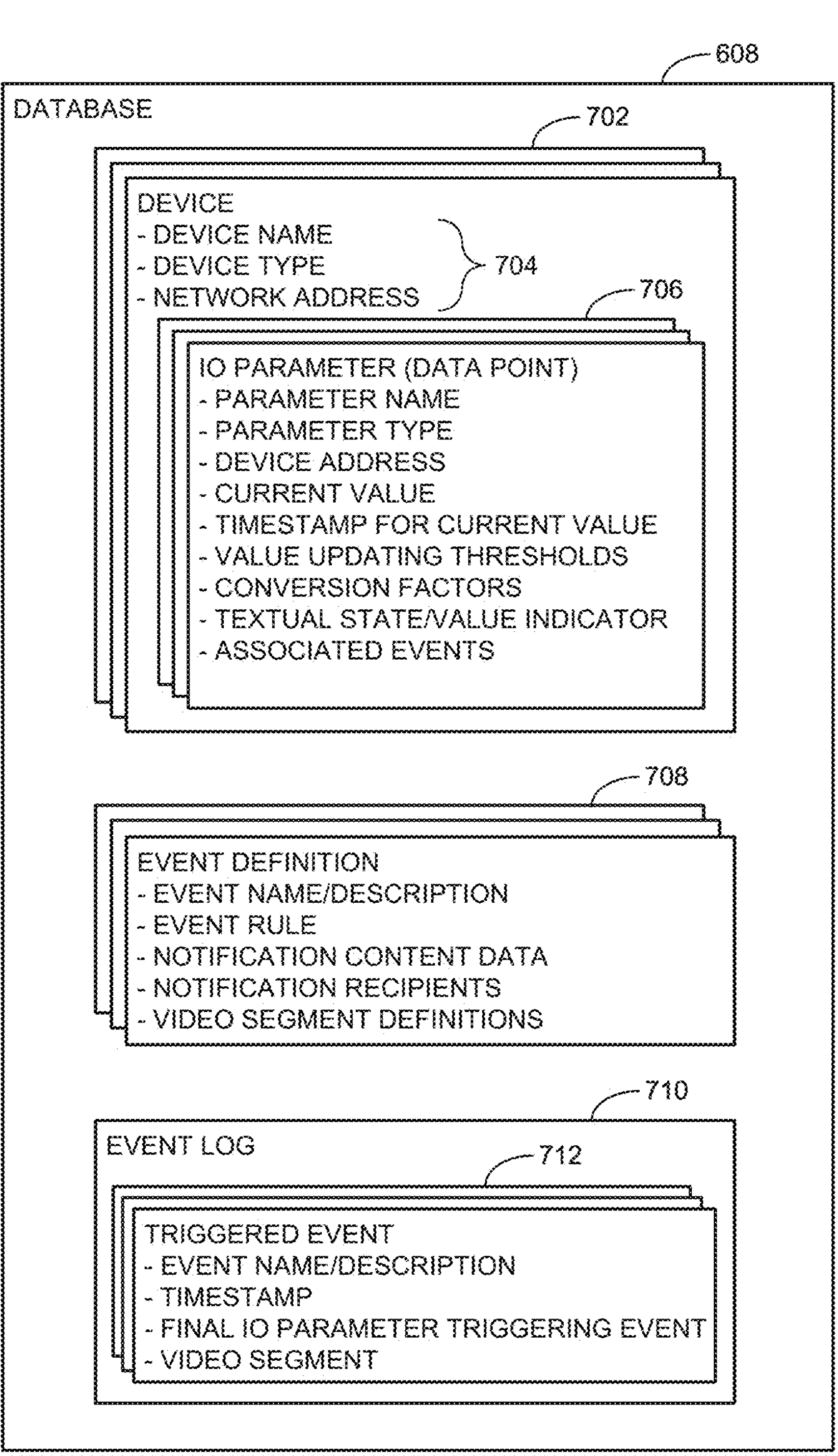
FIG. 7 is a block diagram of an example database associated with the example main server of FIG. 1.

FIG. 7 is a block diagram illustrating the example database 608 storing different types of information including the configuration data associated with IO parameters corresponding to different devices or controllers in communication with the main server 132. In some examples, the database 608 is implemented using SQL (structured query language) to store data in accordance with the format of the communications protocol used by the IO communication boards of the controllers 116, 122, 124, 126, 128, 130. As represented in the illustrated example, the database 608 stores device information 702 corresponding to different devices wirelessly networked with the main server 132. In some examples, the device information 702 associated with each device includes device identification information 704 and IO parameter information 706 for individual IO parameters (e.g., data points) associated with each device. As shown in FIG. 7, the device identification information 704 includes a device name, a device type, and an address for the device on the wireless network. Including the IO parameter information 706 within the device information 702 enables a device-wide log of all data points that increases the efficiency with which the data may be historically archived relative to generating individual history logs for each IO parameter. Further, in some examples, the efficiency with which data reported from the controllers and/or other devices is improved by the devices storing such data locally in a compressed format. In this manner, when the main server 132 requests the data, the devices can respond more quickly because the data is already compressed for transmission.

The IO parameter information 706 includes a name for the IO parameter, an indication of the type of the IO parameter, and a unique address relative to other IO parameters associated with the corresponding device. Additionally, the IO parameter information 706 stored in the database 608 includes a current value for the parameter along with a timestamp for the current value. Further, the IO parameter information 706 includes configuration data that enables the main server 132 to interpret the value of the IO parameter and to determine whether any actions need to be taken based on the reported value of the IO parameter. In some examples, the configuration data includes one or more value updating thresholds that define when a change is significant enough to update the current value. That is, in some examples, minor variations of the reported parameter value relative to the current value may be ignored if the difference in the value is less than a threshold. In some examples, when a significant change to the IO parameter value has been received, the main server 132 transmits a confirmation that the new value has been saved to the database 608. In some such examples, the controller that originally reported the data implements an interlock scheme that holds the detected IO change until such confirmation of the data being saved is received.

In some examples, the configuration data stored in the database 608 includes conversion factors that are used by the main server 132 to convert the reported value of the IO parameter into something that is intelligible to a human operator. For instance, an analog data point may have a value ranging anywhere from 0 to 4096 to represent a temperature ranging from 50° F. to 120° F. The value by itself may be meaningless to an operator. Accordingly, in some examples, the conversion factors (e.g., based on the slope and intercept equation for linear relationships) enable the conversion of the reported value to the actual temperature. If the IO parameter corresponds to a non-linear measurement (e.g., an output signal of a thermistor), the conversion factors may include a linearization table that is selected based on the type of thermistor as identified by the parameter type stored with the IO parameter information 706. In some examples, both the converted value and the non-converted value for the parameter may be stored in the database.

As shown in FIG. 7, the configuration data may include textual state and/or value indicators that provide a textual description and/or indication of the meaning of the value of the IO parameter. For instance, in the temperature example mentioned above, the textual value indicator may include the string "degrees F." to include with the converted value of the parameter so that a user viewing the converted value can understand its meaning. In the case of a discrete and/or digital value, the textual state indicator may provide a text-based indication of what the parameter value represents (e.g., a text string of "Open" or "Closed" for a door).

In some examples, the IO parameter information includes an identification of events associated with the parameter. That is, the parameter may be the basis of a condition defined for one or more event rules. By identifying all event rules implicated by the IO parameter in the database 706 as shown in FIG. 7, the main server 132 is enabled to identify all of the event rules that need to be analyzed whenever a change in value for the IO parameter is detected. This can significantly improve the efficiency of the main server 132 relative to other systems where every event rule must be evaluated every time new parameter values are collected.

In the illustrated example of FIG. 7, the database 608 stores event definitions 708 that are configurable to define particular events and the conditions or rules that trigger such events. In some examples, the event definitions 708 include a name and/or description of the event as well as the event rule that defines when the event is to be triggered. In some examples, an event rule includes one or more conditions (e.g., using AND and/or OR blocks) that are evaluated based on the value(s) of one or more of the IO parameters stored in the database 608. This is how particular IO parameters become associated with particular events as described above. Additionally, in some examples, the event definitions include information configuring the response and/or actions that are to be taken when the event is triggered. One response may be to generate and transmit a notification to particular recipients that may be interested in learning of the event. Accordingly, in some examples, the event definitions 708 includes notification content data defining what information is to be included in the notification and/or how the notification is to be generated and/or delivered (e.g., via email, SMS message, pop-ups on dashboards, etc.). Further, the event definitions 708 include a list of notification recipients for whom the notification is intended along with their contact information (e.g., email address, phone number) to send the notification. In some examples, a notification may be transmitted to a particular device without reference to a particular recipient or user associated with the device.

In some examples, one or more of the cameras 508 associated with the video management system 506 of FIG. 5 (and/or the video management system 614 as described below) may be positioned to capture the circumstances that may have led to the event occurring. Events that occur within the recordable scope of one or more cameras are referred to herein as video capturing events. In some examples, the event definitions may include video segment definitions that identify the relevant camera(s) 508, pre-event time intervals, and post-event time intervals that identify a window of time beginning before the event and ending after the event for which the relevant camera(s) 508 are to capture video for the video segment. That is, a pre-event time interval defines the duration of the video segment corresponding to before an event is triggered, whereas a post-event time interval defines the duration of the video segment continuing after the event is triggered. For instance, one video segment may be defined with a pre-event time interval of 10 seconds and a post-event time interval of 20 seconds resulting in a video segment of 30 seconds in duration with the event occurring 10 seconds into the segment. In other examples, the post-event time interval may begin after the detection of a second event associated with the initial event (e.g., the termination of the condition causing the initial event to be triggered). For instance, if the condition triggering the event lasts for 15 seconds, the total duration for the video segment in the above example would be 45 seconds (10 seconds for the pre-event time interval, 15 seconds during which the event was triggered, and 20 seconds for the post-event time interval). In some such examples, the initial event and the second event are treated as the beginning and ending of a single event for archival purposes. In other examples, the video segment definitions may include timing parameters defined based on a full video duration (e.g., duration from beginning to end of the video segment) and a temporal offset for the event (e.g., duration after the beginning of the video segment when the event is to occur). For instance, to produce the same video as in the above example, the full video duration would be defined as 30 seconds with the temporal off-set being defined as 10 seconds. Additionally, the video segment definitions may include a thumbnail offset time defining the point in time within a video segment that a video frame is to be extracted as a thumbnail for the video segment.

In addition to the event definitions 708, the example database 608 of FIG. 7 includes an event log 710 that archives every time an event is triggered. Thus, as shown in the illustrated example, the event log includes triggered event information 712 corresponding to a series of triggered events. In some examples, the triggered events information 712 includes a name and/or description of the event, a timestamp indicating when the event occurred, the final IO parameter(s) that triggered the event, and one or more video segments for the event captured by one or more of the camera(s) 508 set up around the material handling facility 100.

The example pull service manager 610 of FIG. 6 enables communications with client devices 148 via web pages hosted by the web server 146. More particularly, in some examples, the pull service manager 610 enables pull requests from a client device 148 accessing a web page to initially load the relevant data in the web page from the database 608. Additionally, the pull service manager 610 enables the dynamic retrieval of data from the database 608 to update the content of web pages in substantially real-time. In some examples, the pull service manager 610 enables pull requests to request new data in response to an end user (e.g., at a client device 148) inputting data into an available user-entry field within the web page. In some examples, the new data may be retrieved while the user enters (e.g., types) the data and before the user actually submits the data.

The example push service manager 612 of FIG. 6 uses a push request communications protocol to push data between different live web pages (e.g., being accessed by different client devices 148) to provide updates to all relevant web pages in substantially real-time. That is, the push service manager 612 enables the web server 146 to transmit updated data to different ones of the web pages without having to wait for a client device 148 to request a data update (e.g., via a pull request). Additionally, the push service manager 612 enables user input data provided by an end user via one web page to be provided to other web pages for substantially real-time updates between disparate and/or unrelated web pages without the separate web pages requesting such data from the web server 146 and/or without the web server 146 needing to be modified. The example pull service manager 610 and the example push service manager 612 are collectively referred to herein as example notification generators. As used herein, an example notification generator generates information that is provided for rendering via a display (e.g., via one or more web pages and/or graphical user interface associated with other applications implemented on a computer), or otherwise provided for access by a user (e.g., transmitted in an email message, stored in a historical log of events, etc.).

In some examples, push updates are accomplished by configuring the separate web pages with a push request that subscribes for dynamic (e.g., substantially real-time) updates of particular types of information identified based on specific strings included in the scripting for the web pages. In some examples, the information associated with a particular string corresponds to a particular type of device (e.g., a particular controller 116, 122, 124, 126, 128, 130). For example, a web page may include the string "DockSubscribe" to subscribe for updates when any IO data reported from the dock controller 116 changes. Thus, when one IO parameter value reported by the dock controller 116 has changed, the push service manager 612 causes the new value to be pushed to the subscribing web page. In some examples, multiple IO parameters may be grouped for reporting together based on their interrelationship associated with the content to be displayed on the web page. Accordingly, in some examples, when any one of the IO parameters in the group changes, the push service manager 612 may cause all associated IO parameters to be sent to the subscribing web page. In other examples, only the new IO parameter may be reported to the web page and the web page may then initiate a pull request to retrieve the other relevant parameters.

In some examples, as soon as a user accesses a particular web page via a client device 148, the scripting in the web page may subscribe for a push request. In other examples, the web page may not initiate the subscription until the user begins inputting data via the web page. The push service manager 612 monitors all web pages opened on all client devices 148 to track all subscriptions made by any currently open web pages. If the main server 132 collects new IO data from one or more controllers that is associated with a particular subscription, the new data may be automatically pushed to the web pages corresponding to the subscription.

This same approach may be followed to take user input data received at one web page and distribute it to other web pages hosted by the web server 146. In particular, when a user inputs data (via a client device 148), the data is provided to the main server 132 (via the web server 146). Based on the type of information that is being provided, the push service manager 612 causes the information to be pushed to all other active web pages that have subscribed for the same type of information based on including the same specific string in the scripting of the web pages. Thus, the specific strings serve as destination addresses for other web pages to send the user input data. This enables user input data to be sent between different websites without the server being modified to incorporate new routing paths between new web pages not previously hosted by the web server 146.

In some examples, the separate web pages that are updated may be different instances of the same web page (e.g., accessed by two different client devices 148) and/or may be completely different web pages hosted by the web server 146. For instance, different web pages that may subscribe for updates of common information may include a web page for a truck driver to sign in and sign out, a web page for display in a lounge or waiting area for drivers, a web page to provide driver specific status updates (e.g., on a driver's personal smartphone), a web page for display at a logistics office dock assignment center, a web page for a logistics office yard map dashboard, and/or a web page for an event log notification center.

In some examples, the main server 132 is able to distinguish between updated information collected from the controllers 116, 122, 124, 126, 128, 130 and user input data from another web page manually entered via a client device 148. In some examples, an indication of the type of update for data associated with a particular parameter (e.g., whether sensor reported data or manually updated data) is stored along with the collected data in the database 608. In some examples, the indication of the type of update is communicated to the web pages when the web pages request or otherwise receive the corresponding data. Thus, in some examples, web pages may provide an indication when updated information is based on sensor data (e.g., from controllers) versus human input data.

In the illustrated example of FIG. 6, the video management system 614 may function substantially the same as the video management system 506 of FIG. 5. In some examples, the video management system 614 of FIG. 6 may be omitted when the video management system 506 of FIG. 5 is implemented. Similarly, in other examples, the video management system 506 of FIG. 5 may be omitted when the video management system 614 of FIG. 6 is implemented by the main server 132. In some examples, the system may not include a video management system. That is, in some examples, both the video management system 506 of FIG. 5 and the video management system 614 of FIG. 6 may be omitted. Additional detail regarding the implementation of the video management system 614 of FIG. 6 (and/or the video management system 506 of FIG. 5) is illustrated in FIG. 8.

Figure 8:
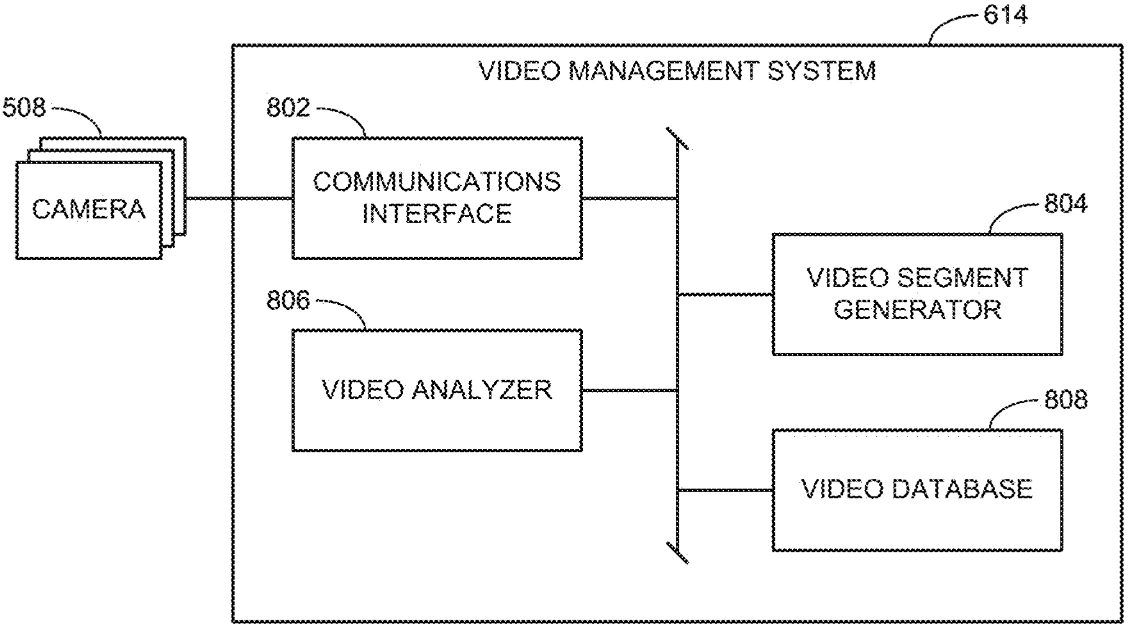
FIG. 8 is a block diagram of the example video management system of the example main server of FIG. 6.

As shown in FIG. 8, the video management system 614 of FIG. 6 (and/or the video management system 506 of FIG. 5) includes an example communications interface 802, an example video segment generator 804, an example video analyzer 806, and an example video database 808. As shown in the illustrated example, the communications interface 802 receives video data from the cameras 508. In some examples, the communications interface 802 also enables communication with the main server 132.

In some examples, the video segment generator 804 may generate segments of videos associated with particular events detected in connection with the operation of the material handling facility 100. In some examples, the detected events correspond to events detected by the main server 132 based on an analysis of the IO data collected by the main server 132 as described more fully below. In some examples, a video segment generated by the video segment generator 804 includes video extending a period of time (e.g., 10 seconds, 30 second, 1 minutes, 5 minutes, etc.) before the detected event and a period of time after the detected event. The duration of the video segment both before and after the detected event may be separately configured based on the nature of the particular event being detected. In some examples, the video segment generator 804 provides the generated video segments to the main server 132 to be stored for future reference by and/or sent (e.g., as an attachment in an email) to one or more clients devices (e.g., associated with a warehouse manager and/or other interested individuals).

In some examples, the video analyzer 806 analyzes images and/or video streams provided by one or more of the cameras 508 to identify safety events (e.g., near misses, erratic fork lift behavior, etc.) and/or other configurable circumstances (e.g., identifying individuals based on facial recognition, detecting a missing or misplaced pallet, etc.) associated with the operation of the material handling facility 100. In some examples, the video analyzer 806 is limited to analyzing video segments generated by the video segment generator 804. That is, in some examples, the video analyzer 806 is invoked in response to detected events. In other examples, the video analyzer 806 may continuously analyze the video stream of one or more of the cameras 508 for safety events. Safety events may include collisions, near misses, and/or other accidents occurring within the material handling facility 100. In some examples, the video analyzer 806 analyzes images and/or video captured by the cameras 508 to detect and/or monitor the location and/or movement of people within and/or in a perimeter surrounding the material handling facility 100. Identifying people may be useful in determining who was the cause of triggering the initial event that resulted in the video segment being generated. In some examples, the video analyzer 806 uses facial recognition technology to identify a detected person (e.g., to determine if the person works at the material handling facility or is an unrecognizable guest or intruder).

As shown in the illustrated example, the video management system 614 includes the video database 808 to store video data received from the cameras 508. In some examples, the cameras 508 capture video continuously and the captured data is archived for an extended period of time (e.g., 24 hours, one week, one month, etc.) within the database 808. Additionally or alternatively, the video database 808 may store the video segments generated by the video segment generator 804 for subsequent retrieval and/or analysis. In some examples, the video segments are stored for a threshold period of time (e.g., 24 hours, one week, one month, etc.) unless a user has requested the video segment be stored for a longer duration (e.g. indefinitely). In some examples, the video database 808 also stored annotations and/or comments received from users after reviewing the video segment. Further, the video database 808 may store the video segment definitions outlining the timing and duration of the video segment relative to a detected event. In some examples, the database 808 of FIG. 8 may be incorporated into the example database 608 of FIG. 6.

Returning to the illustrated example of FIG. 6, the example event manager 616 of the main server 132 analyzes IO data received from the controllers 116, 122, 124, 126, 128, 130 to detect the occurrence of particular events. For example, the event manager 616 may determine that specific alarm conditions have been satisfied to trigger an alarm. In some examples, the conditions and/or rules used to detect relevant events are stored in the database 608 as described above. In the illustrated example, the event manager 616 causes the network communications interface 602 to update all relevant web pages associated with a detected event. More particularly, in some examples, the event manager 616 instructs the push service manager 612 to route events detected from the data received at the IO network interface 604 to web pages with subscriptions for dynamic updates using a push request. Additionally or alternatively, in some examples, the event manager 616 instructs the push service manager 612 to route changes received from one client device 148 (e.g., based on user input at a corresponding web page) to all other client devices 148 or accounts of one or more types as specified in the scripting of the corresponding web page. Additionally or alternatively, the event manager 616 may generate an email and/or SMS message to send to one or more of the client devices 148 via the network communications interface 602 in response to detecting a particular event.

Further, in response to detecting a particular event, the event manager 616 may cause the video segment generator 804 to generate a video segment associated with the detected event. In some examples, the video segments generated by the video segment generator 804 may be included as an attachment to such messages. In some examples, the event manager 616 may send out an initial email automatically in response to the event being detected and then send a second email with the video segment attached soon thereafter (e.g., after the video segment has been generated to include the configured post-event time interval associated with the segment). In some examples, the event manager 616 may wait until the video segment has been generated to include such in an initial email notification.

Additional detail regarding the implementation of the event manager is provided below in connection with FIG. 9. Specifically, as shown in the illustrated example of FIG. 9, the event manager 616 includes an example device identifier 902, an example configuration engine 904, an example data analyzer 906, an example timestamper 908, an example parameter value converter 910, an example event analyzer 912, an example event logger 914, an example notification engine 916, and an example web page analyzer 918.

Figure 9:
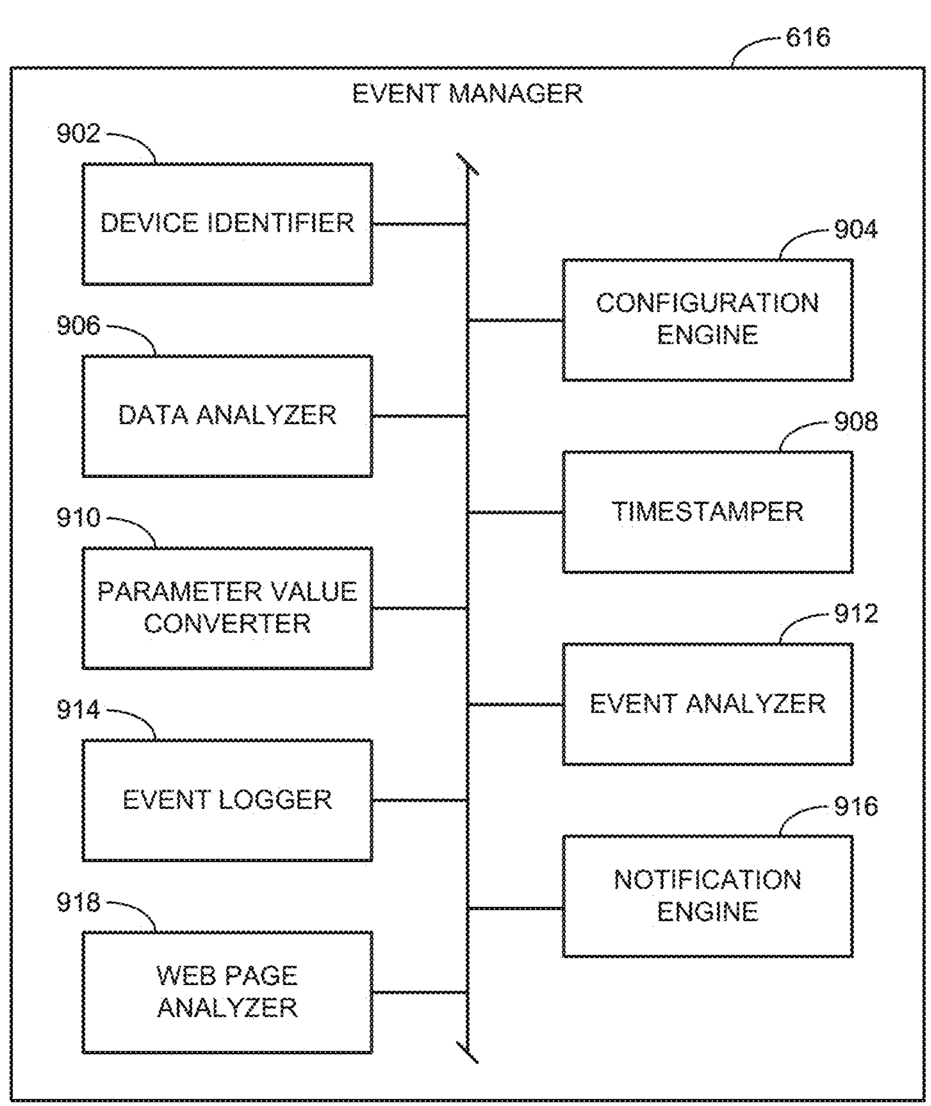
FIG. 9 is a block diagram of the example event manager of the example main server of FIG. 6.

In the illustrated example of FIG. 9, the example device identifier 902 identifies the devices transmitting messages containing IO data. In some examples, IO data reported by any one of the controllers 116, 122, 124, 126, 128, 130 and/or any other device to the main server 132 is transmitted within an IO message that includes a name or identifier of the transmitting device and an associated address. The device identifier 902 may identify the device from which an IO message is received by looking up the corresponding identifier and/or address for the device that is stored in the database 608 when the device is configured and commissioned within the system. That is, when devices (e.g., the controllers 116, 122, 124, 126, 128, 130) are configured and commissioned within the system, the main server 132 stores the name and address of the device in the database 608. Accordingly, when new IO messages are received, the example device identifier 902 may identify the source of the IO data contained in the message by looking up the device in the database 608. However, in some examples, the main server 132 may receive an IO message from a device that is not represented in the database when, for example, the device is new to the network. In such examples, the device identifier 902 may cause the name and address of the unrecognized device to be stored in the database 608 but ignore the IO data specific to the IO parameter values being reported and/or any other information contained in the IO message until the device has been configured.

In the illustrated example, the configuration and/or commissioning of new devices (and/or the reconfiguration of existing devices) is accomplished via the example configuration engine 904 of FIG. 9. In some examples, in response to receiving an IO message from a device (e.g., a controller) that the device identifier 902 does not recognize (e.g., a new device), the configuration engine 904 may prompt an operator to authorize the automatic uploading of all data associated with the device for configuration. Additionally or alternatively, the name and address of the device may be stored in the database without requesting authorization to upload the relevant data for configuration. Rather, the configuration engine 904 may wait for an operator to initiate the configuration of a device. In such examples, the configuration engine 904 may provide a list of devices discovered on the wireless network that have communicated with the main server 132. Inasmuch as the name and address of the unconfigured device has been stored to the database, the unconfigured device may be included in the list for the operator to select for configuration. In this manner, users are assisted in the commissioning and configuring of new devices to be monitored by the main server 132.

The example data analyzer 906 of FIG. 9 serves to monitor and/or analyze the IO data included in IO messages received from the controllers 116, 122, 124, 126, 128, 130 and/or any other data reported to the main server 132 from any other devices (e.g., the management server(s) 134, the remote server(s) 135, the client devices 148, etc. In some examples, any one of the controllers 116, 122, 124, 126, 128, 130 may report data associated with multiple different IO parameters. Accordingly, in some examples, the data analyzer 906 monitors and/or analyzes the IO data to determine which IO parameter the IO message is associated with. In some examples, the particular IO parameter being reported on is based on looking up the parameter address included in the IO message in the database 608. Once the particular IO parameter is identified, the data analyzer 906 may compare the value of the IO parameter reported in the IO message with the most recent value stored in the database 608. If the value is unchanged, the IO message is not conveying any new information and no further analysis is needed. However, if the value of the IO parameter has changed, the data analyzer 906 may cause the database 608 to be updated with the new value. In some examples, the data analyzer 906 may update the value for an IO parameter when the change in the value exceeds a threshold assigned to the parameter to omit nonconsequential variation within a dead-band range. When the value reported for an IO parameter has changed sufficiently, the example timestamper 908 may timestamp the new value stored in the database 608 to record when the change occurred.

When the value reported for an IO parameter has changed, the example parameter value converter 910 is implemented to convert or translate the value to a human comprehensible form. In some examples, this involves applying one or more conversion factors associated with the IO parameter that are stored in the database 608. The parameter value converter 910 may also convert the value into a textual form corresponding to either a particular state for a digital IO value (e.g., "OPEN" or "CLOSED" for a door) or a descriptive statement for an analog IO value (e.g., "27 degrees F.") associated with the context of the IO parameter. Additionally or alternatively, the parameter value converter 910 may convert the IO parameter value into a visual context specific indicator other than text such as, for example, an image, an icon, a color, etc.

In the illustrated example of FIG. 9, the example event analyzer 912 determines whether an IO parameter reported in an IO message identified by the data analyzer 906 is associated with or implicated in any event rules. That is, the event analyzer 912 determines whether the IO parameter is the basis for a condition defining the triggering of an event. If the IO parameter is associated with one or more event rules, the event analyzer 912 evaluates each of the associated event rules based on the newly reported value for the parameter to determine whether any events have been triggered. If no events have been triggered, no further action is taken. If an event is triggered, the example event logger 914 logs the event in the database 608 with an associated timestamp provided by the example timestamper 908.

Once an event has been triggered or detected, the event manager 616 of the main server 132 may initiate one or more actions in response to the event. In some examples, one response includes the generation and distribution of a notification to relevant individuals. Accordingly, the example event manager 616 is provided with the notification engine 916 to generate such a notification. In some examples, the notification engine 916 generates the content of a notification based on notification content data stored in association with the triggered event. Further, in some examples, the configured data associated with the triggered event identifies intended recipients for the notification along with their contact information (e.g., email address, phone number, etc.) that is used to deliver the notification. In some examples, the notification engine generates notifications for display via particular computing devices and/or display screens without regard to the identity of a particular recipient. For example, a notification may include an update to a display screen in a logistics office of the material handling facility 100. In some examples, the notification engine 916 may generate a notification that is provided to one or more of the controllers 116, 122, 124, 126, 128, 130 of FIG. 1 for display on a local screen (e.g., the display screen 117 of FIG. 3. In some examples, the notification engine 916 may generate a notification to be provided as an update to one or more web pages managed by the web server 146. In some examples, such notifications are handled by the example web page analyzer 918. Thus, the example notification engine 916 and the web page analyzer 918 are additional examples of notification generators (along with the push service manager 610 and the push service manager 612 as described above).

Whether or not a particular event has been triggered, the example web page analyzer 918 of FIG. 9 may determine whether the IO parameter is associated with content displayed via one or more web pages hosted by the web server 146 and cause any newly reported value for the parameter to be sent out to update the relevant web pages. As described above, in some examples, the web page updates may be pushed to the web pages via the push service manager 612 for substantially real-time updates without polling for such updates. Alternatively, the pull service manager 610 could use pull requests to poll for updates.

While an example manner of implementing the main server 132 of FIG. 1 is illustrated in FIG. 6 (and the associated video management system 614 of FIG. 8 and the event manager 616 of FIG. 9), one or more of the elements, processes and/or devices illustrated in FIGS. 6 and 9 may be combined, divided, re-arranged, omitted, eliminated and/or implemented in any other way. Further, the example network communications interface 602, the example IO network interface 604, the example restart watchdog 606, the example database 608, the example pull service manager 610, the example push service manager 612, the example video management system 614 (including any of the example communications interface 802, the example video segment generator 804, the example video analyzer 806, and/or the example video database 808), the example event manager 616 (including any of the example device identifier 902, the example configuration engine 904, the example data analyzer 906, the example timestamper 908, the example parameter value converter 910, the example event analyzer 912, the example event logger 914, the example notification engine 916, and/or the example web page analyzer 918), and/or, more generally, the example main server 132 of FIG. 1 may be implemented by hardware, software, firmware and/or any combination of hardware, software and/or firmware. Thus, for example, any of the example network communications interface 602, the example IO network interface 604, the example restart watchdog 606, the example database 608, the example pull service manager 610, the example push service manager 612, the example video management system 614 (including any of the example communications interface 802, the example video segment generator 804, the example video analyzer 806, and/or the example video database 808), the example event manager 616 (including any of the example device identifier 902, the example configuration engine 904, the example data analyzer 906, the example timestamper 908, the example parameter value converter 910, the example event analyzer 912, the example event logger 914, the example notification engine 916, and/or the example web page analyzer 918), and/or, more generally, the example main server 132 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network communications interface 602, the example IO network interface 604, the example restart watchdog 606, the example database 608, the example pull service manager 610, the example push service manager 612, the example video management system 614 (including any of the example communications interface 802, the example video segment generator 804, the example video analyzer 806, and/or the example video database 808), and/or the example event manager 616 (including any of the example device identifier 902, the example configuration engine 904, the example data analyzer 906, the example timestamper 908, the example parameter value converter 910, the example event analyzer 912, the example event logger 914, the example notification engine 916, and/or the example web page analyzer 918) is/are hereby expressly defined to include a non-transitory computer readable storage device or storage disk such as a memory, a digital versatile disk (DVD), a compact disk (CD), a Blu-ray disk, a USB memory stick, a solid state memory disk device, etc. including the software and/or firmware. Further still, the example main server 132 of FIG. 1 may include one or more elements, processes and/or devices in addition to, or instead of, those illustrated in FIGS. 6, 8, and 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, one or more of the blocks of FIG. 6 (and/or the associated blocks of FIGS. 8 and 9) may be implemented in one or more separate servers. For instance, in some examples, the database 608 may be implemented in a separate server to that of the main server 132. Additionally or alternatively, in some examples, the IO network interface 604 may be implemented in a separate IO server that is distinct from a main server 132 including the event manager 616. Further, as shown in the illustrated example of FIG. 10, a distributed system 1000 may be created in which multiple IO servers 1002 (each including an IO network interface 604) and/or multiple main servers 132 (each including an event manager 616) are implemented and communicatively coupled via one or more routers 1004. In the illustrated example, a single database 608 serves each of the main servers 132. In other examples, the different main servers 132 may include and/or be associated with different databases 608.

Figure 10:
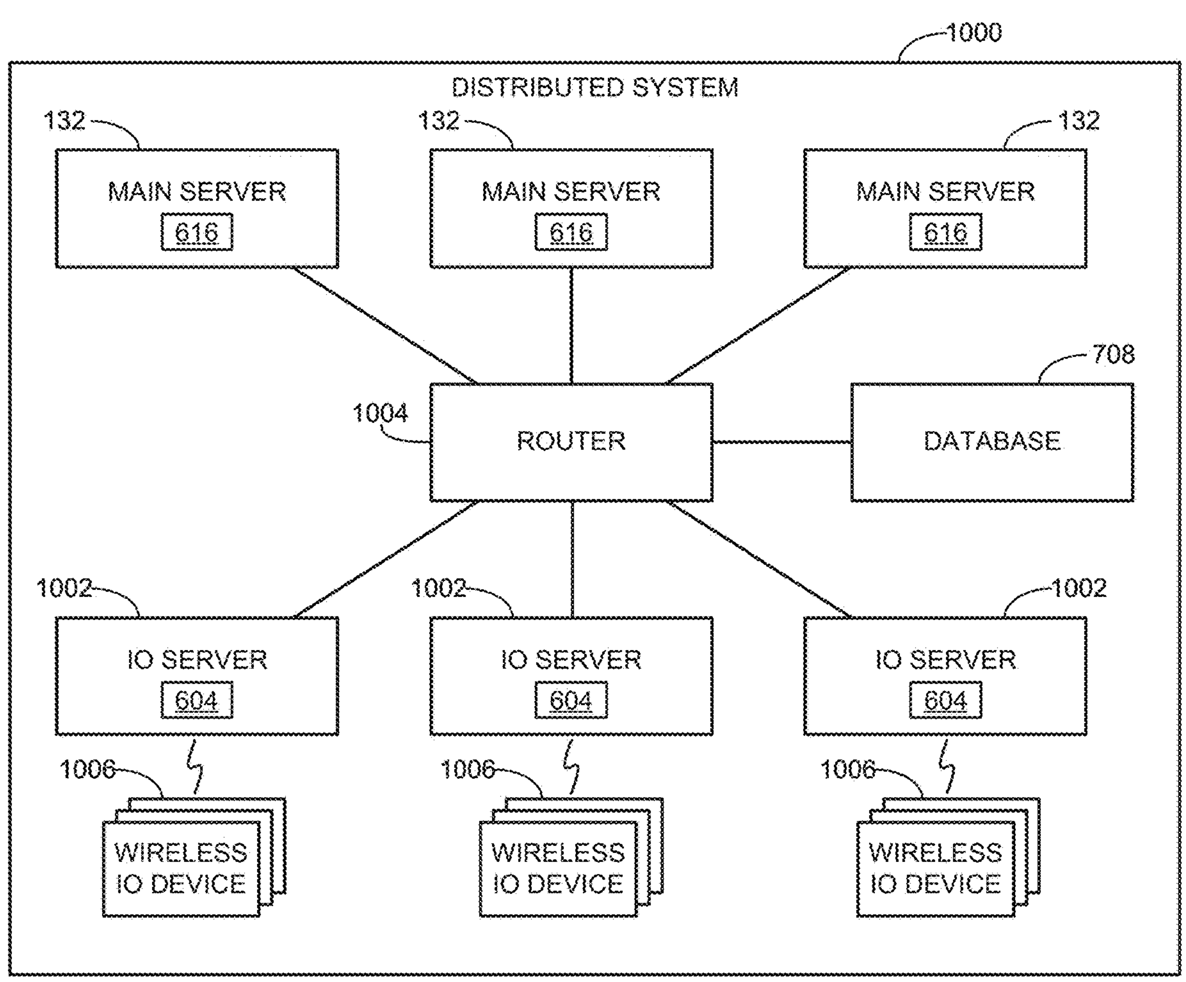
FIG. 10 is a block diagram of an example distributed system that implements teachings disclosed herein.

As represented in FIG. 10, each of the IO servers 1002 is communicatively coupled with a different set of wireless IO devices (e.g., comparable to any of the controllers 116, 122, 124, 126, 128, 130). As shown in the illustrated example, the separate IO servers 1002 communicate with the main server 132 via an example router 1004. This arrangement enables data from geographically dispersed devices (e.g., beyond the signal range of effective wireless communications) to be collected and integrated into a single system. In some examples, the main servers 132 may also be geographically dispersed and/or hosted by a cloud service provider. In the illustrated example, the IO servers 1002 may host only a single TCP (transmission control protocol) connection to the array of main servers 132. By contrast, the main servers 132 and the router 1004 may allow many TCP connections. Thus, while the IO servers 1002 are positioned within wireless range of the wireless IO devices 1006, the router 1004 and/or the servers 132 may be placed beyond the wireless communication range because communications therebetween is based on the TCP connections. Thus, the router 1004 serves as a concentrator of TCP connections for the distributed system shown in FIG. 10. In some examples, the number of main servers 132 may be scaled up or down depending upon considerations of processing capacity and bandwidth (e.g., based on web access demand). In some examples, a single main server 132 may be implemented to receive and aggregate all data from each of the separate IO servers 1002. A distributed system as shown in FIG. 10 may be suitable for applications that extend through multiple buildings in a large campus and/or for an enterprise including multiple facilities in different geographically spaced locations (e.g., different cities, different states, different countries, etc.).

In some examples, at least some of the functionality implemented by the main server 132 may be alternatively and/or separately implemented by any one of the controllers 116, 122, 124, 126, 128, 130 of FIG. 1, except that the analysis and processing of IO data at the respective controllers may be limited to less than all IO data aggregated by the main server 132 from all sources throughout the material handling facility 100. That is, in some examples, the controllers 116, 122, 124, 126, 128, 130 may analyze their respective IO data to identify events that trigger the implementation of particular actions such as, for example, generating a notification to be rendered via a local display screen (e.g., the display screen 117 of FIG. 3) and/or to be transmitted to the main server 132 for storage in the database, and/or further analysis, processing, and/or distribution. While the controllers 116, 122, 124, 126, 128, 130 may be limited to processing IO data collected directly by each corresponding controller, in some examples, the main server 132 may provide additional information obtained from other sources (e.g., a different controller in the material handling facility 100, the client device(s) 148, the management server(s), and/or the remote server(s)).

Figure 11:
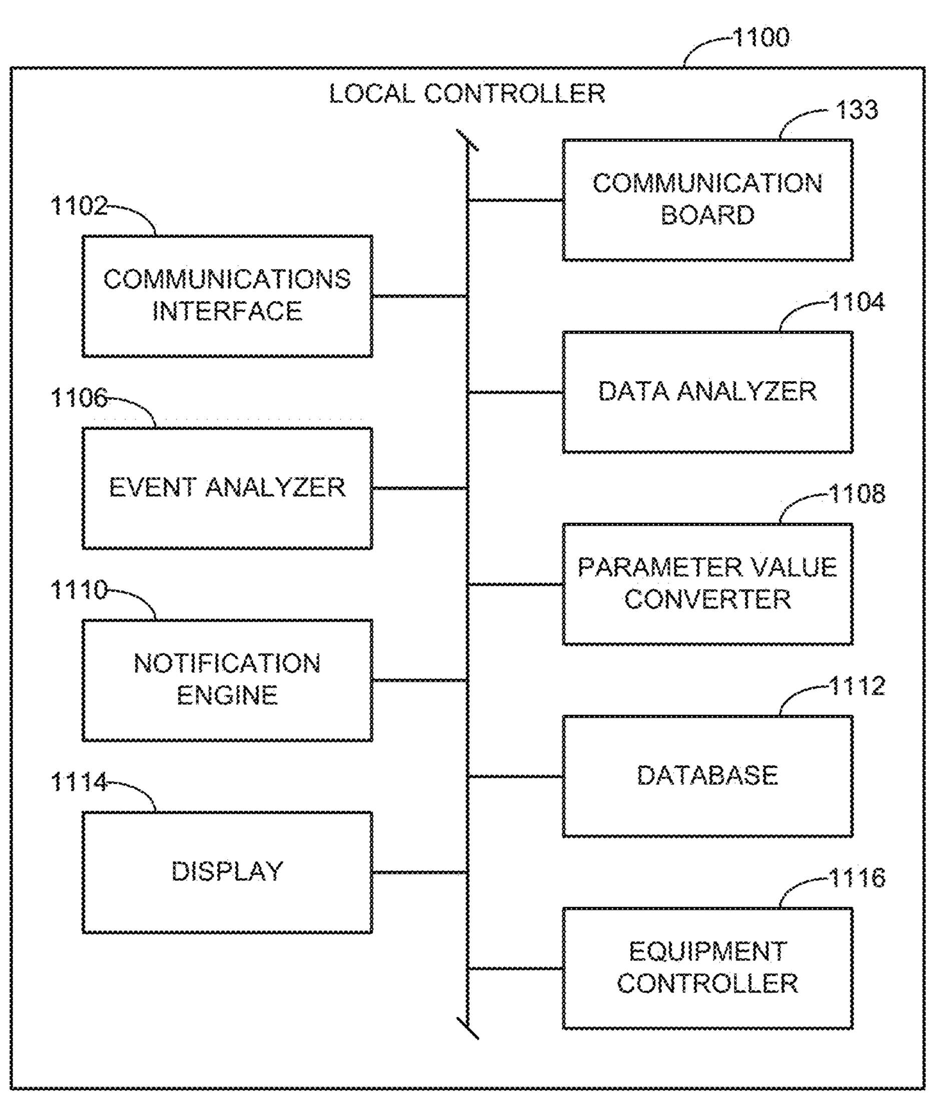
FIG. 11 is a block diagram of an example implementation of an example local controller corresponding to any one of the controllers of FIG. 1.

More particularly, FIG. 11 illustrates an example implementation of a local controller 1100 that may correspond to any one of the controllers 116, 122, 124, 126, 128, 130 of FIG. 1 that are local to the equipment being operated and/or controlled by such controllers. Thus, as shown in the illustrated example, the local controller 1100 includes the example communication board 133 by which the controller 1100 is able to transmit IO data to the main server 132. Further, in some examples, as described above, the controller 1100 may also receive feedback and/or other relevant information from the main server 132. Additionally, as shown in the illustrated example of FIG. 11, the local controller includes an example communications interface 1102, an example data analyzer 1104, an example event analyzer 1106, an example parameter value converter 1108, an example notification engine 1110, an example database 1112, an example display 1114, and an example equipment controller 1116.

The example communications interface 1102 enables the controller 1100 to communicate with the associated equipment monitored and/or controlled by the controller 1100. For example, the communications interface 1102 for the dock controller 116 of FIG. 1 enables the dock controller 116 to send commands or instructions to and receive feedback from actuators, sensors, and/or other equipment associated with the dock including the door 104, the doorway barrier 106, the dock leveler 108, the vehicle restraint 110, the presence detector 112, and the notification system 114. In some examples, the communication board 133 and the communications interface 1102 may be integrated and function as a single component.

In some examples, the example data analyzer 1104, the example event analyzer 1106, the example parameter value converter 1108, the example notification engine 1110, and the example database 1112 shown in FIG. 11 serve the same or similar purpose as the corresponding example data analyzer 906, the example event analyzer 912, the example parameter value converter 910, the example notification engine 916, and the example database 608 of FIGS. 6 and 9 associated with the main server 132. However, the example data analyzer 1104, the example event analyzer 1106, the example parameter value converter 1108, the example notification engine 1110, and the example database 1112 of the example local controller 1100 of FIG. 11 may be limited in the amount and type of data being stored, analyzed, and/or processed as compared with the main server 132.

More particularly, the example data analyzer 1104 of FIG. 11 monitors and/or analyzes IO data received via the communications interface 1102 from the associated equipment or sensors to determine when such data has changed to reflect changes in the state or condition of the equipment or sensors. In some examples, when the example data analyzer 1104 identifies a change in the IO data, the data analyzer 1104 may cause the change to be stored in the database 1112. In some examples, the data analyzer 1104 monitors and/or analyzes the IO data without storing it in the database 1112. Rather, in some such examples, the data analyzer 1104 operates in conjunction with the event analyzer 1106 to determine any suitable actions or operations based on the current values of the IO data as determined by the data analyzer 1104. In some examples, the data analyzer 1104 may also store, monitor, and/or analyze data provided by the main server 132. For example, in the context of the dock controller 116, a maintenance officer may provide, via one of the client device(s) 148, details regarding maintenance of equipment at the dock 102 and/or an indication that the dock is to be taken out of service for maintenance. Additionally or alternatively, information collected by the main server 132 from the portable device of a truck driver (corresponding to another one of the client device(s) 148) regarding details associated with a trailer parked at the associated dock 102 may also be provided to the local dock controller 116 for storage and/or further analysis and/or processing by the data analyzer 1104 and/or the event analyzer 1106 of FIG. 11.

As mentioned above, the example data analyzer 1104 may operate in conjunction with the example event analyzer 1106 of the illustrated example of FIG. 11. In some examples, the data analyzer 1104 and the event analyzer 1106 may be integrated into a single component. The example event analyzer 1106 determines whether particular IO data, associated with particular IO parameters, correspond to a condition defining a triggering of one or more events for which the event analyzer 1106 may store information defining the event and/or initiate an action. In some examples, the action may involve activating a particular piece of equipment (e.g., opening or closing a door, generating an alert, altering the output of a visual and/or audible indicator, etc.). Further, in some examples, the event analyzer 1106 may determine that an appropriate action in response to an event being triggered is to generate a particular notification that may be stored locally, transmitted to the main server 132, and/or displayed via a local display screen, such as the example display 1114.

In some examples, notifications provided to the example display 1114 and/or transmitted to the main server 132 are generated by the notification engine 1110. Thus, the example notification engine 1110 and the web page analyzer 918 are additional examples of notification generators (along with the push service manager 610 and the push service manager 612 of FIG. 6 and the notification engine 916 and the web page analyzer 918 of FIG. 9 as described above). In some examples, such notifications may include and/or be based on an output of the example the parameter value converter 1108. The parameter value converter 1108 of FIG. 11 is implemented to convert or translate values of particular parameters represented in the IO data collected by the communications interface 1102 to a human comprehensible form. In some examples, the parameter value converter 1108 of FIG. 11 operates in a similar manner to the example parameter value converter 910 of FIG. 9 discussed above. The example equipment controller 1116 of FIG. 11 controls operations of equipment being monitored and/or controlled by the local controller 1100 by, for example, transmitting instructions, commands, and/or signals to the relevant equipment via the communications interface 1102.

While an example manner of implementing any one of the example controllers 116, 122, 124, 126, 128, 130 of FIG. 1 is illustrated by the example local controller 1100 of FIG. 11, one or more of the elements, processes, and/or devices illustrated in FIG. 11 may be combined, divided, re-arranged, omitted, eliminated, and/or implemented in any other way. Further, the example communication board 133, the example communications interface 1102, the example data analyzer 1104, the example event analyzer 1106, the example parameter value converter 1108, the example notification engine 1110, the example database 1112, the example display 1114, the example equipment controller 1116, and/or, more generally, the example local controller 1100 of FIG. 11 may be implemented by hardware, software, firmware, and/or any combination of hardware, software, and/or firmware. Thus, for example, any of the example communication board 133, the example communications interface 1102, the example data analyzer 1104, the example event analyzer 1106, the example parameter value converter 1108, the example notification engine 1110, the example database 1112, the example display 1114, the example equipment controller 1116, and/or, more generally, the example local controller 1100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example communication board 133, the example communications interface 1102, the example data analyzer 1104, the example event analyzer 1106, the example parameter value converter 1108, the example notification engine 1110, the example database 1112, the example display 1114, and/or the example equipment controller 1116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example local controller 1100 of FIG. 11 may include one or more elements, processes, and/or devices in addition to, or instead of, those illustrated in FIG. 11, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions, hardware implemented state machines, and/or any combination thereof for implementing the main servers 132 of FIGS. 1, 6, and/or 10 are shown in FIGS. 12-15. The machine readable instructions may be one or more executable programs or portion(s) of an executable program for execution by a processor such as the processor 6012 shown in the example processor platform 6000 discussed below in connection with FIG. 60. The program may be embodied in software stored on a non-transitory computer readable storage medium such as a CD-ROM, a floppy disk, a hard drive, a DVD, a Blu-ray disk, or a memory associated with the processor 6012, but the entire program and/or parts thereof could alternatively be executed by a device other than the processor 6012 and/or embodied in firmware or dedicated hardware. Further, although the example program is described with reference to the flowcharts illustrated in FIGS. 12-15, many other methods of implementing the example main server 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 12-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 12:
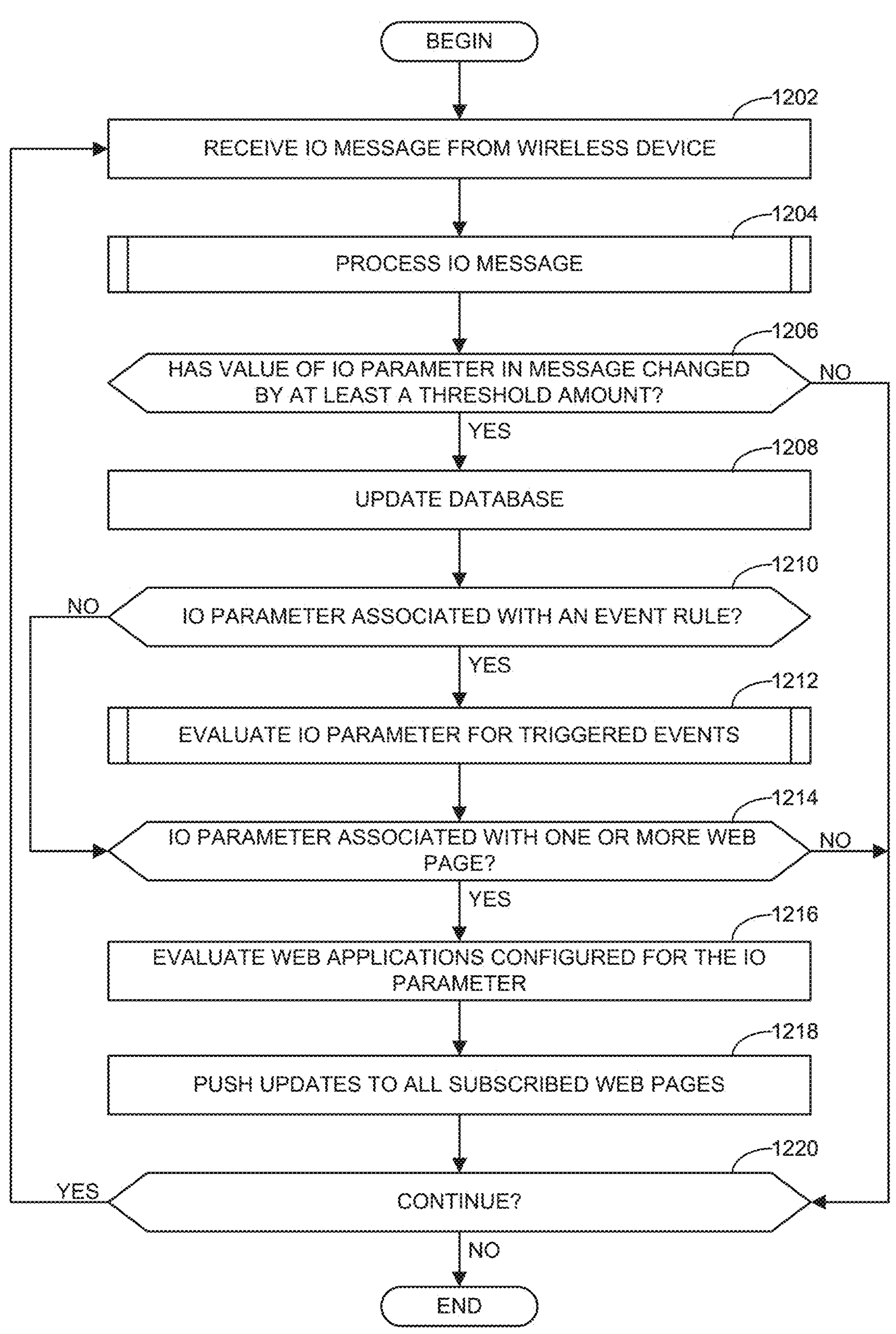
FIGS. 12-15 are flowcharts representative of example machine readable instructions for implementing the example main server of FIGS. 1, 6, and/or 10.

The program of FIG. 12 begins at block 1202 where the example IO network interface 604 receives an IO message from a wireless device. The wireless device may correspond to any of the controllers 116, 122, 124, 126, 128, 130 of FIG. 1 and/or any other device that communicates with the main server 132. The IO message includes IO data corresponding to a particular IO parameter that is monitored by the reporting device. At block 1204, the example event manager 616 processes the IO message. Further detail regarding the implementation of block 1204 is provided below in connection with FIG. 13.

At block 1206, the example data analyzer 906 determines whether the value of an IO parameter in the message has changed by at least a threshold amount. In some examples, this determination is made by comparing the IO parameter value to the most recent value for the parameter as stored in the example database 608. The threshold for the change may be defined in the configuration data stored in connection with the parameter in the database 608. In some examples, the threshold may be zero. That is, in some examples, any amount of change in the IO parameter value may be sufficient. If the example data analyzer 906 determines that the value of the IO parameter has changed by at least the threshold amount (block 1206), the example data analyzer 906 updates the database 608 (block 1208). If the example data analyzer 906 determines that the value of the IO parameter has not changed by at least the threshold amount, there is nothing to update. Accordingly, control advances to block 1220. In some examples, certain IO parameters may trigger an event based on a lack of change exceeding a threshold period of time. In such examples, rather than control advancing to block 1220, control may advance to block 1210 for further analysis of the IO parameter.

At block 1210, the example event analyzer 912 determines whether the IO parameter is associated with an event rule. That is, the example event analyzer 912 determines whether the value of the IO parameter corresponds to a condition or rule that serves to detect or trigger an event. If the IO parameter is associated with an event rule, the example event manager 616 evaluates the IO parameter for triggered events (block 1212). Further detail regarding the implementation of block 1212 is provided below in connection with FIG. 14. Thereafter, control advances to block 1214. Returning to block 1210, if the example data analyzer 906 determines that the IO parameter is not associated with an event rule, control advances directly to block 1214.

At block 1214, the example web page analyzer 918 determines whether the IO parameter is associated with one or more web pages. That is, the example web page analyzer 918 determines whether one or more web pages include content that is generated based on the value of the IO parameters. In some examples, this is determined based on whether the web page has subscribed for dynamic updates for the type of data corresponding to the IO parameter. If the IO parameter is associated with one or more web pages, the example web page analyzer 918 evaluates web applications configured for the IO parameter (block 1216). That is, the web page analyzer 918 determines if and how the content generated by the web applications changes based on the changes to the IO parameter value. Thereafter, at block 1218, the example push service manager 612 pushes updates to all subscribed web pages. Example graphical user interfaces of web pages that may be updated are described below in connection with FIGS. 21-59. In some examples, the updates include adding any newly created video segments to a video event archive web page 4400 shown and described below in connection with FIG. 44. Control then advances to block 1220. Returning to block 1214, if the IO parameter is not associated with any web pages, control advances directly to block 1220. At block 1220, the program determines whether to continue. If so, control returns to block 1202 to receive and process another IO message. Otherwise, the example program of FIG. 12 ends. Although blocks 1214-1218 are described with respect to web pages and associated web applications, in some examples, the main server 132 may implement an application that provides graphical user interfaces (such as those shown in connection with FIGS. 21-59) via a display screen independent of web pages, web applications, and/or the Internet.

Figure 13:
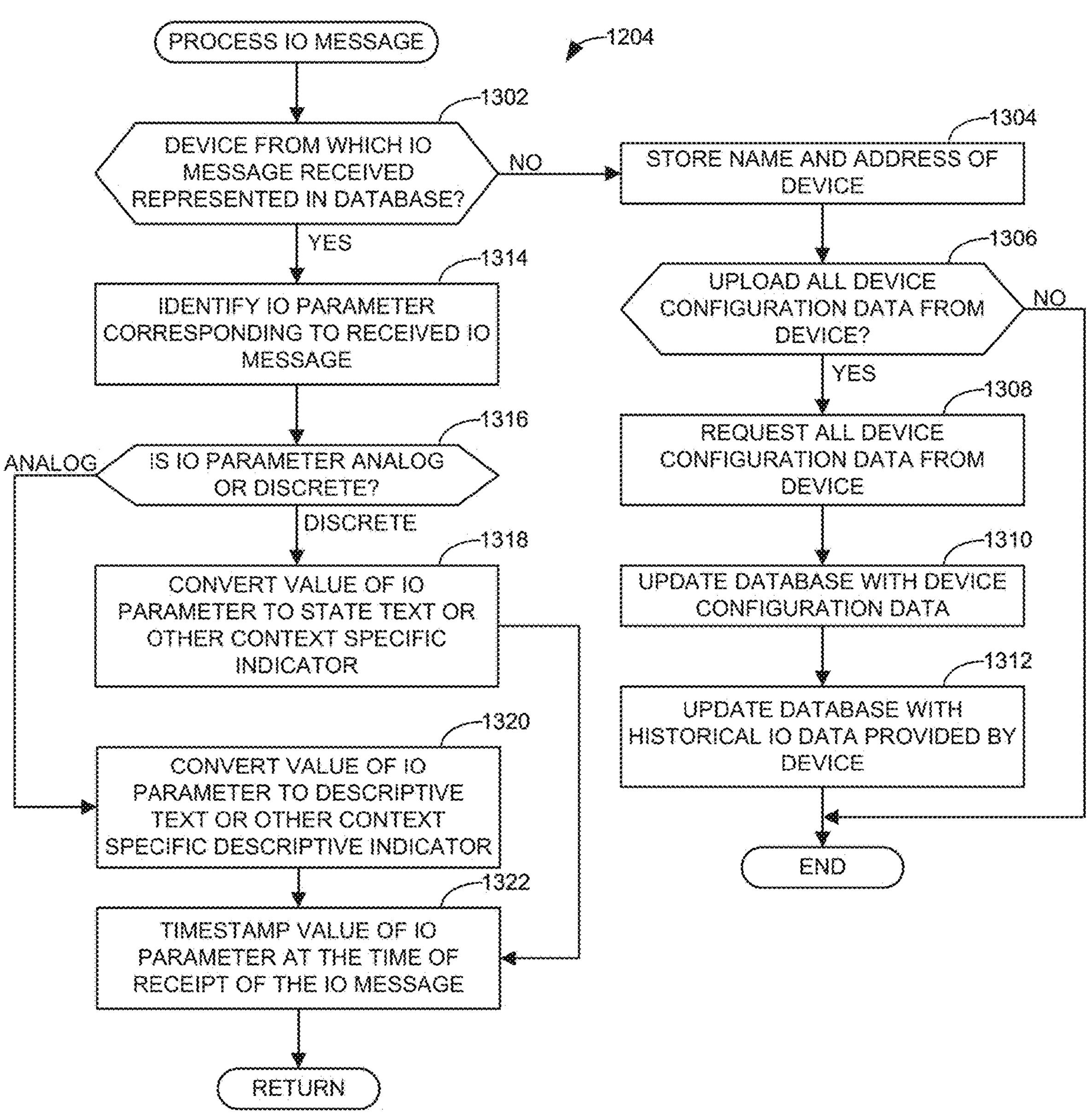

FIG. 13 is a flowchart illustrating an example implementation of block 1204 of FIG. 12. The example program of FIG. 13 begins at block 1302 where the example device identifier 902 determines whether the device from which the IO message was received (at block 1202 of FIG. 12) is represented in the database 608. If not, control advances to block 1304 where the example device identifier 902 stores the name and address of the device in the database 608. In this manner, there is no need for subsequent discovery of the device on the network when an operator seeks to configure the device. At block 1306, the example configuration engine 904 determines whether to upload all device configuration data from the device. As described above in connection with FIG. 7, the configuration data from the device includes both the device identifying information 704 as well as the IO parameter information 706 for every IO parameter (data point) associated with the device. In some examples, the configuration engine 904 determines whether to upload the device configuration data based on user-input. If the configuration engine 904 does not receive a command to upload the device configuration data (block 1306), the example program of FIG. 13 ends.

If the configuration engine 904 does receive a command to upload the device configuration data (block 1306), control advances to block 1308 where the example configuration engine 904 requests all device configuration data from the device. In some examples, the device configuration data includes device information associated with the device as well as IO parameter information corresponding to each IO parameter the device is equipped to monitor and/or report on. At block 1310, the example configuration engine 904 updates the database 608 with the device configuration data.

In some examples, the device from which the IO message was received that has not yet been commissioned (e.g., is not represented in the database 608) is configured to locally store generated IO data to be made available once the device is commissioned and in active communication with the main server 132. For instance, in some examples, the device may include a circular buffer for historical data that stores the most recently generated IO data that may overwrite the oldest IO data stored in the memory. In some such examples, control advances to block 1312 where the example configuration engine 904 updates the database 608 with the historical IO data provided by the device. In some examples, where the device is not configured to store historical IO data, block 1312 may be omitted. Thereafter, the example program of FIG. 13 ends. With all of the device configuration data stored in the database, a user may readily access the IO parameters identified in the device configuration data to configure them to be associated with one or more event rules and/or web pages.

Once a device is commissioned and configured in the manner described above in connection with blocks 1304-1312, subsequent IO messages received from the device will follow a different path in the example flowchart because the device is now represented in the database 608 resulting in a different outcome at block 1302. That is, returning to block 1302, if the example device identifier 902 determines that the device from which the IO message was received is represented in the database 608, control advances to block 1314. At block 1314, the example data analyzer 906 identifies the IO parameter corresponding to the received IO message. In some examples, the data analyzer 906 identifies the IO parameter based on a lookup of the parameter address provided in the IO message in the configuration data stored in the database 608.

At block 1316, the example parameter value converter 910 determines whether the IO parameter is analog or discrete. If the IO parameter is discrete, the example parameter value converter 910 converts the value of the IO parameter to state text or other context specific state indicator (block 1318). That is, rather than the value being a binary 0 or 1, the example parameter value converter 910 may convert the value to a text-based state represented by the value (e.g., On, Off, Opened, Closed, etc.) or some other binary indicator (e.g., one of two icons, one of two colors (e.g., red/green), show/hide icon, etc.). Thereafter, control advances to block 1322. If the example parameter value converter 910 determines that the IO parameter is analog (block 1316), control advances to block 1320 where the example parameter value converter 910 converts the value of the IO parameter to descriptive text or other context specific descriptive indicator. Similar to block 1318, the conversion at block 1320 is intended to convert the IO parameter value into an indicator that is readily understandable to a human based on the context represented by the IO parameter value. In some examples, the descriptive indicator may be a text-based description and/or an image, number, or icon that is readily comprehensible to an end user. For some analog-based values, the parameter value converter 910 may also apply one or more conversion factors in connection with generating the descriptive indicator. In some examples, blocks 1316-1320 may be omitted such that the IO parameter value is not converted to a context specific indicator. At block 1322, the example timestamper 908 timestamps the value of the IO parameter at the time of receipt of the IO message. That is, in the illustrated example, the timestamper 908 causes the time of receipt of the IO message to be saved in the example database 608 along with the reported IO parameter value. Thereafter, the example program of FIG. 13 ends and returns to complete the process of FIG. 12.

Figure 14:
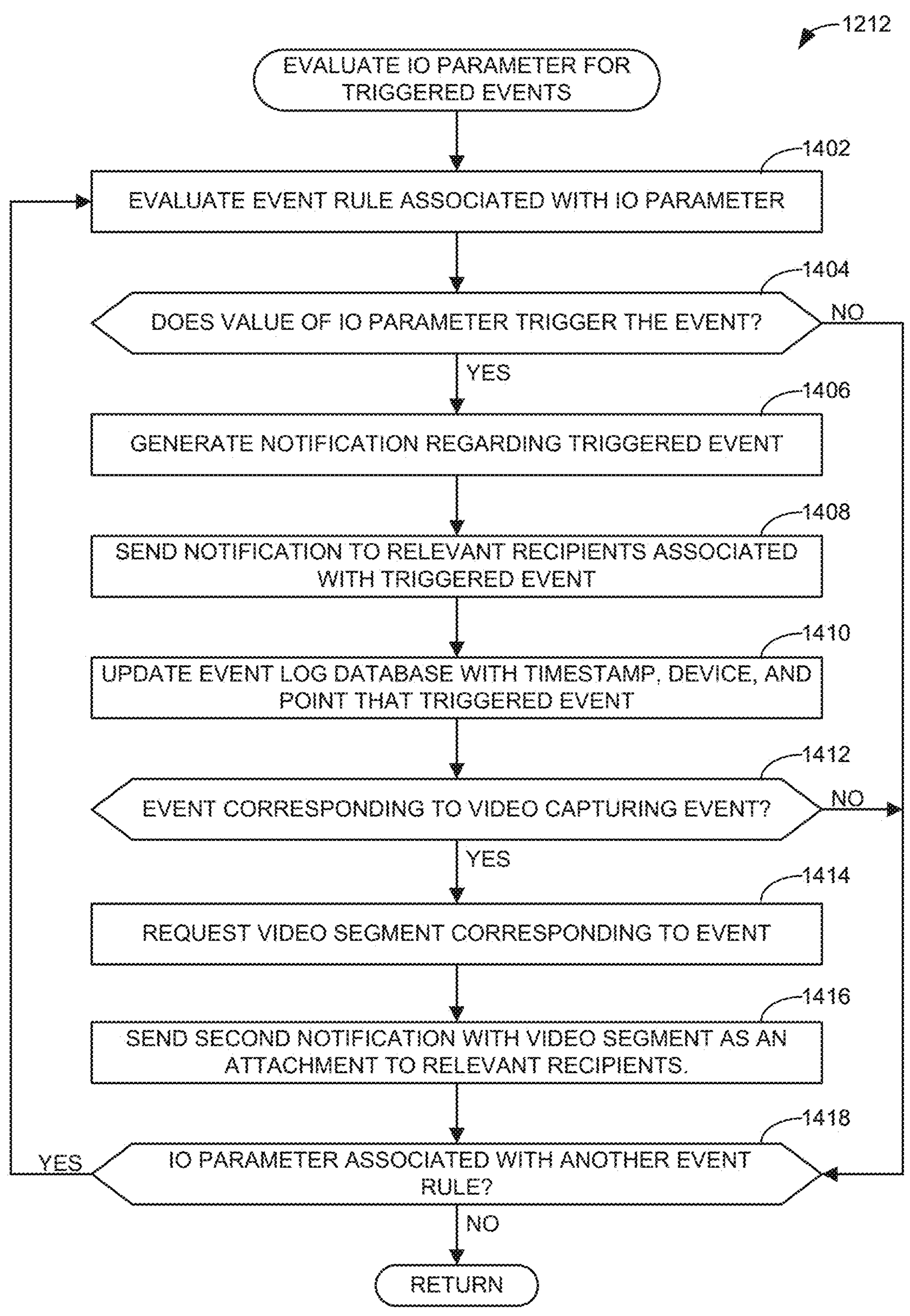

FIG. 14 is a flowchart illustrating an example implementation of block 1212 of FIG. 12. The example program of FIG. 14 begins at block 1402 where the example event analyzer 912 evaluates an event rule associated with the IO parameter. At block 1404, the event analyzer 912 determines whether the value of the IO parameter triggers the event. If so, at block 1406, the example notification engine 916 generates a notification regarding the triggered event. At block 1408, the notification engine 916 sends the notification to relevant recipients associated with the triggered event. In some examples, the relevant recipients are saved in the database 908 as configuration data associated with the event.

At block 1410, the example event logger 914 updates an event log in the database 608. In some examples, the event logger 914 generates a log entry that identifies the IO parameter, the value of the IO parameter, the device reporting the parameter value, and the timestamp of when the parameter value was received (indicative of when the event was detected or triggered). At block 1412, the example event analyzer 912 determines whether the event corresponds to a video capturing event. An event corresponds to a video capturing event if the event is configured with definitions for a video segment to be captured during a window of time surrounding the triggered event. If so, at block 1414, the event analyzer 912 requests a video segment corresponding to the event. In some examples, the request is sent to the video management system 614 to generate the video segment. Thereafter, at block 1416, the example notification engine 916 sends a second notification with the video segment as an attachment to the relevant recipients. The recipients of the second notification (sent at block 1418) may be the same as or different than the recipients of the first notification (sent at block 1408) as defined by the configuration data assigned to the event for which the notifications are generated.

After sending the second notification (block 1416), control advances to block 1418. Returning to block 1412, if the example event analyzer 912 determines that the event does not correspond to a video capturing event, control advances directly to block 1418. At block 1418, the example event analyzer 912 determines whether the IO parameter is associated with another event rule. If so, control returns to block 1402. Otherwise, the example process of FIG. 14 ends.

In some examples, blocks 1412-1416 may be omitted from the example program of FIG. 14 because the video management system 614 is configured to independently determine when a video segment is needed and to generate and send out the associated notification without receiving a request from the event analyzer 912 as described above. An example process to implement the video management system 614 in this manner is described more fully below in connection with FIG. 15.

Figure 15:
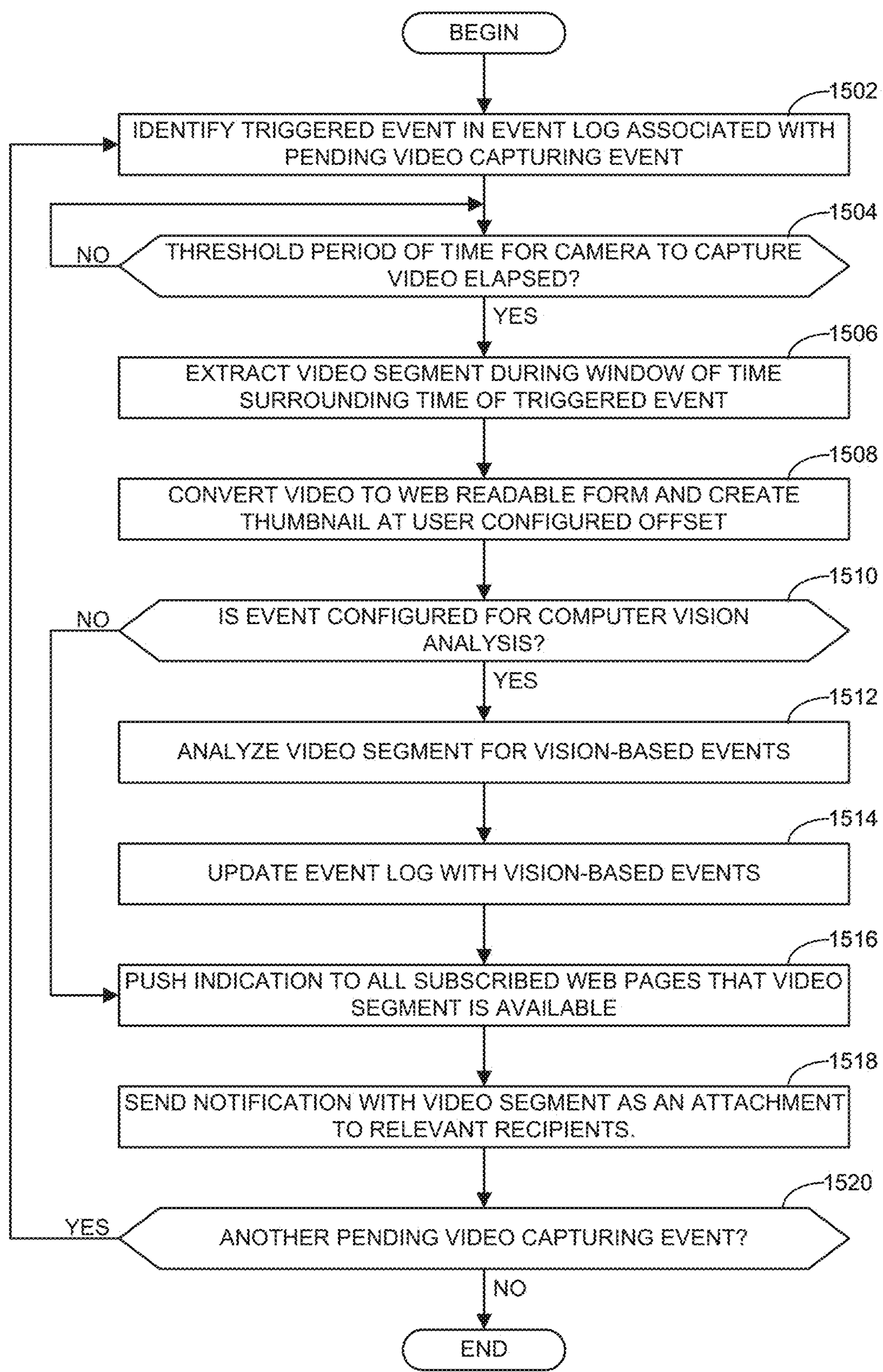

FIG. 15 is a flowchart representative of an example program to implement the video management system 614 of the main server 132. The example program of FIG. 15 may alternatively be implemented by the video management system 506 of FIG. 5 independent of the main server 132. The example program of FIG. 15 begins at block 1502 with the example video segment generator 804 identifying a triggered event in the event log associated with a pending video capturing event. As described above in connection with block 2810 of FIG. 28, each time an event is triggered (e.g., detected), the triggered event is logged in an event log. Accordingly, in some examples, the video segment generator 804 monitors the event log for changes and determines whether newly detected events are associated with a video capturing event. In this manner, the video management system 614 may automatically initiate the process to generate a video segment without receiving a request from the event manager 616 as described above.

At block 1504, the example video segment generator 804 determines whether a threshold period of time for a camera (e.g., the cameras 508) to capture the video elapsed. If not, control remains at block 1504 until the threshold period of time has elapsed. In some examples, the threshold period of time is defined based on the post-event time interval configured for the particular event identified. For example, if the post-event time interval is defined as 1 minute, the video segment generator 804 will wait for at least 1 minute following the detection of the event before proceeding. As described above, in some examples, the post-event time interval may not begin until the event is no longer triggered (or a second event indicating the condition triggering the initial event no longer applies is detected). In some examples, the threshold period of time also includes a post processing period to account for the lag in time for the camera to capture, encode, and store the video stream corresponding to the desired video segment.

Once the threshold period of time has elapsed, the video segment generator 804 extracts a video segment during window of time surrounding the time of the triggered event (block 1506). In some examples, the beginning and ending time for the video segment is defined by the pre-event time interval and the post-event time interval configured for the event as stored in the example database 608. In some examples, the extracted video segment is stored in the video database 808. At block 1508, the example video segment generator 804 converts the video segment to a web readable format and creates a thumbnail at a user configured thumbnail offset time. In some examples, the web readable format is the MP4 format. The thumbnail offset time defines a point in time during the video segment from which a frame is selected for a thumbnail image to be associated with the video segment. In some examples, the thumbnail offset time is defined with respect to the beginning time of the video segment. Thus, if the thumbnail offset time is set to 0 seconds and the pre-event interval for the video segment is 20 seconds, the thumbnail would correspond to the video frame occurring 20 seconds before the event. In other examples, the thumbnail offset time is defined with respect to the time of the event such that the offset set to 0 seconds would result in the thumbnail correspond to the video frame captured at the time the event was detected. The thumbnail offset time may be configured to any point in time during the video segment. In some examples, the offset may default to the time of the event and/or a short period thereafter (e.g., 1 second, 2 seconds, 5 seconds, etc.) so that the thumbnail is likely to represent the effects of the event and/or its immediate aftermath. For some types of events, the thumbnail offset time may be configured to occur before the event so that the thumbnail is likely to capture the person or circumstance that ultimate led to the event occurring.

At block 1510, the example video analyzer 806 determines whether the event is configured for computer vision analysis. If so, the example video analyzer 806 analyzes the video segment for vision-based events (block 1512). Vision-based events are events that may be identified through image analysis of the video stream of the cameras 508. Vision-based events are beneficial when it may be difficult or impossible to configure a sensor to directly detect the event. Some example vision-based events include certain safety events such as collisions and/or near misses between people and/or material handling equipment moving about the material handling facility 100. As an example, the video analyzer 806 may determine that a moving vehicle (e.g., a forklift) came within a certain number of inches to a person working in the area. In such examples, where there is no collision, damage, or injury, it may be unlikely for the participants to report the event (whether or not they even realized it happened) making it difficult to reduce such potentially dangerous situations from occurring. However, using video analysis as disclosed herein, these events may be detected and automatically captured on camera. In other examples, image analysis may include facial recognition analysis to identify people captured in the video segment. At block 1514, the video analyzer 806 updates the event log with identified vision-based events. Thereafter, control advances to block 1516. If the example video analyzer 806 determines that the event is not configured for computer vision analysis (block 1510), control advances directly to block 1516.

At block 1516, the example push service manager 612 pushes an indication to all subscribed web pages that the video segment is available. At block 1518, the example network communications interface 602 sends a notification with the video segment as an attachment to relevant recipients. At block 1520, the example video segment generator 804 determines whether there is another pending video capturing event. If so, control returns to block 1502. In some examples, control returns to block 1502 for the same triggered event if the event is associated with multiple different cameras 508. That is, in some examples, the process of extracting video segments and analyzing such video segments may be implemented in connection with multiple cameras for a single triggered event. If the example video segment generator 804 determines there are no pending video capturing event (block 1520), the example process of FIG. 15 ends.

The aggregation of data from the various controllers 116, 122, 124, 126, 128, 130 and/or the servers 134, 136 at the main server 132 enables the main server 132 to detect configurable events occurring in connection with any aspect of the operation of the material handling facility 100 of FIG. 1. Further, the main server 132 may initiate certain actions and/or responses based on the detection of the events defined in the systems. As described in connection with the flowcharts of FIGS. 12-15, the actions initiated by the main server 132 include generating notifications that are sent to designated recipients to report the detection of events and/or capture video segments associated with the events (that may be sent as an attachment along with ones of the notifications) . Further, the main server may automatically generate reports and/or update a log of events detected based on an analysis of the data aggregated by the main server 132. Additionally or alternatively, as described above, the main server 132 may integrate the collected data and cause various web pages and/or web applications hosted by the web server 146 to display current data that is relevant to some aspect of the conditions and/or operations of the material handling facility 100. In some examples, such web pages are dynamically updated so that the current data is provided to client devices 148 that are accessing a particular web page in substantially real time. Additionally or alternatively, the main server 132 may generate one or more graphical user interfaces for rendering via a display independent of web pages and/or associated web applications.

In some examples, different ones of the graphical user interfaces (whether provided via web pages or otherwise) may be structured with different types of information corresponding to different aspects of the material handling facility 100 that a particular user may be interested in. FIGS. 21-59, described further below, illustrate example graphical user interfaces of several example web pages hosted by the web server 146. While FIGS. 21-59 are described as web pages, in other examples, the same or similar graphical user interfaces may be generated by applications other than a web application for display on a screen independent of a web page.

As mentioned above, individual ones of the controllers 116, 122, 124, 126, 128, 130 may implement the same or similar functionality as the main server 132 based on the limited set of IO data collected by each particular controller (and any additional data provided by the main server). Flowcharts representative of example hardware logic, machine readable instructions, hardware implemented state machines, and/or any combination thereof for implementing the local controller 1100 of FIG. 11 (representative of any one of the controllers 116, 122, 124, 126, 128, 130 of FIG. 1) is shown in FIGS. 16-20. The machine readable instructions may be one or more executable programs or portion(s) of an executable program for execution by a computer processor such as the processor 6112 shown in the example processor platform 6100 discussed below in connection with FIG. 61. The program may be embodied in software stored on a non-transitory computer readable storage medium such as a CD-ROM, a floppy disk, a hard drive, a DVD, a Blu-ray disk, or a memory associated with the processor 6112, but the entire program and/or parts thereof could alternatively be executed by a device other than the processor 6112 and/or embodied in firmware or dedicated hardware. Further, although the example program is described with reference to the flowcharts illustrated in FIGS. 16-20, many other methods of implementing the example local controller 1100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 16-20 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information).

Figure 16:
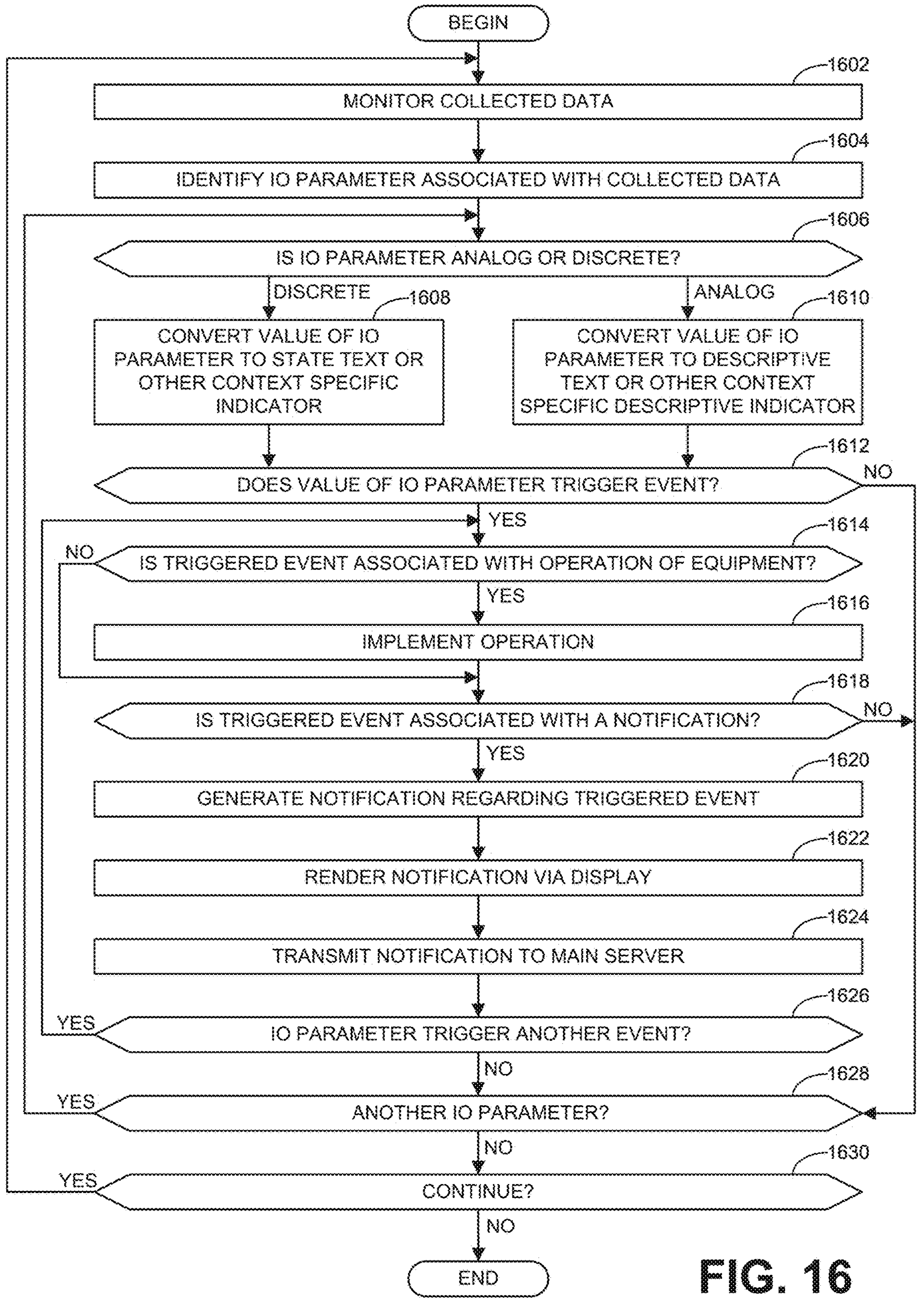
FIGS. 16-20 are flowcharts representative of example machine readable instructions for implementing either the example main server of FIGS. 1, 6, and/or 10 or the example local controller of FIG. 11.

The example program of FIG. 16 begins at block 1602 where the example data analyzer 1104 monitors collected data. In some examples, the collected data include IO data provided by the equipment and/or associated sensors being controlled and/or monitored by the controller 1100. Additionally or alternatively, the collected data may include information received from the main server 132. At block 1604, the example data analyzer 1104 identifies an IO parameter associated with the collected data. At block 1606, the example parameter value converter 1108 determines whether the IO parameter is analog or discrete. If the IO parameter is discrete, the example parameter value converter 1108 converts the value of the IO parameter to state text or other context specific state indicator (block 1608). That is, rather than the value being a binary 0 or 1, the example parameter value converter 1108 may convert the value to a text-based state represented by the value (e.g., On, Off, Opened, Closed, etc.) or some other binary indicator (e.g., one of two icons, one of two colors (e.g., red/green), show/hide icon, etc.). Thereafter, control advances to block 1612. If the example parameter value converter 1108 determines that the IO parameter is analog (block 1606), control advances to block 1610 where the example parameter value converter 1108 converts the value of the IO parameter to descriptive text or other context specific descriptive indicator before control advances to block 1612. Similar to block 1608, the conversion at block 1610 is intended to convert the IO parameter value into an indicator that is readily understandable to a human based on the context represented by the IO parameter value. In some examples, the descriptive indicator may be a text-based description and/or an image, number, or icon that is readily comprehensible to an end user. For some analog-based values, the parameter value converter 1108 may also apply one or more conversion factors in connection with generating the descriptive indicator. In some examples, blocks 1606-1610 may be omitted such that the IO parameter value is not converted to a context specific indicator.

At block 1612, the example event analyzer 1106 determines whether the value of the IO parameter triggers an event. In some examples, an event may be triggered based on multiple different parameters having particular values and/or satisfying particular thresholds based on event rules stored in the example database 1112. Accordingly, in some examples, the determination at block 1612 is based on an analysis of multiple IO parameters being monitored by the data analyzer 1104. If an event is triggered, control advances to block 1614 where the example event analyzer 1104 determines whether the triggered event is associated with the operation of equipment. That is, while the events identified by the main server 132 are related to changes in data to update web pages and/or other graphical user interfaces and/or to generate notifications information particular individuals of the events, the local controller 1100 is implemented to control equipment in the material handling facility 100 such that events monitored by the example event analyzer 1106 are associated with the operation of such equipment. If the triggered event is associated with the operation of equipment, control advances to block 1616 where the example equipment controller 1116 implements the operation. Thereafter, control advances to block 1618. If the triggered event is not associated with the operation of equipment (block 1614), control advances directly to block 1618.

At block 1618, the example event analyzer 1106 determines whether the triggered event is associated with a notification. If so, control advances to block 1620 where the example notification engine 1110 generates a notification regarding the triggered event. At block 1620, the example notification engine 1110 renders the notification via a display. In some examples, the display corresponds to the display 1114 associated with the local controller 1100. In other examples, the notification may be rendered via a display separate from but proximate to the local controller 1100. At block 1624, the example communication board 133 transmits the notification to the main server 132. In some examples, the notification rendered via the display (block 1622) and the notification to the main server 132 (block 1624) is the same notification. In other examples, although pertaining to the same triggered event, the notifications may contain different information. In some examples, either block 1622 or block 1624 may be skipped such that the notification generated at block 1620 is either rendered via the display or transmitted to the main server 132.

At block 1626, the example data analyzer 1104 determines whether the IO parameter triggered another event. If so, control returns to block 1614. Otherwise, control advances to block 1628. Returning to block 1612, if the example event analyzer 1106 determines that the value of the IO parameter does not trigger an event, control advances directly to block 1628. Similarly, control advances directly to block 1628 from block 1618 when the example event analyzer 1106 determines that the triggered event is not associated with a notification. At block 1628, the example data analyzer 1104 determines whether there is another IO parameter. If so, control returns to block 1608. Otherwise, control advances to block 1630 where the process determines whether to continue. If so, control returns to block 1602. Otherwise, the example process of FIG. 16 ends.

While FIG. 16 illustrates an example general process flow that may be implemented by any one of the controllers 116, 122, 124, 126, 128, 130 of FIG. 1, FIGS. 17-19 provide specific example processes that outline particular event rules and/or actions that may be implemented by the dock controller 116 in response to detecting particular events associated with the corresponding dock 102. Further, FIG. 20 provides a specific example process that outlines particular event rules and/or actions that may be implemented by the door controller 122 in response to detecting particular event associated with a door in the material handling facility 100. Inasmuch as the dock 102 includes a door 104, the example process of FIG. 20 may alternatively be implemented by the dock controller 116. For purposes of explanation, the implementation of the example processes of FIGS. 17-20 will be described with reference to the local controller 1100. However, inasmuch as the IO data collected by the various controllers 116, 122, 124, 126, 128, 130 is aggregated by the main server 132, the example processes may additionally or alternatively be implemented by the main server 132.

Figure 17:
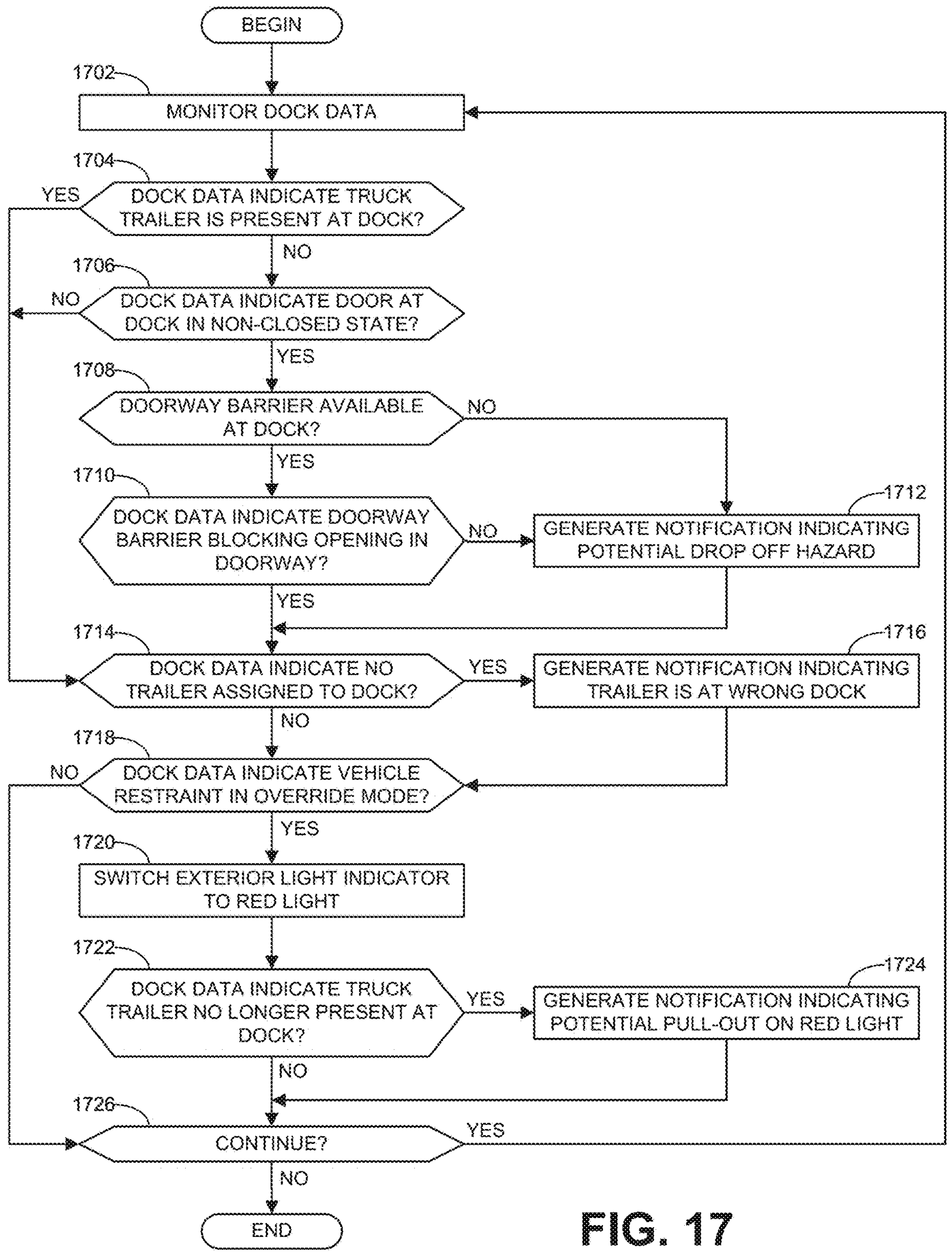

The example process of FIG. 17 begins at block 1702 where the example data analyzer 1104 monitors dock data. As mentioned above, FIG. 17 is specific to the dock controller 116. Accordingly, as used herein, dock data refers to all data available to the dock controller 116 and may include IO data received via the example communications interface 1102 from equipment and/or sensors communicatively coupled to the dock controller 116 as well as any data received from the main server 132 via the example communication board 133. At block 1704, the example event analyzer determines whether the dock data indicates a truck/trailer (e.g., the trailer 300 of FIGS. 3 and/or 4) is present at the dock 102. Different types of dock data may be used to make this determination. In some examples, the dock data indicating such is based on feedback from a trailer sensor 202. Additionally or alternatively, the presence of a trailer 300 may be inferred based on the vehicle restraint 110 being in an engaged position and/or based on the dock leveler 108 being deployed and in an active state. Additionally or alternatively, the presence of a trailer 300 may be determined based on information received from the main server 132 forwarding information indicative of a message sent by a truck driver reporting (via a client device 148) that the trailer 300 has been parked at the designated dock 102.

If the event analyzer 1106 determines that no trailer is present at the dock 102, control advances to block 1706 where the example event analyzer 1106 determines whether the dock data indicates the door (e.g., the door 104) is in a non-closed state (e.g., based on feedback from a door sensor). If so, control advances to block 1708 where the event analyzer 1106 determines whether a doorway barrier (e.g., the barrier 106) is available at the dock. If not, control advances to block 1712 where the example notification engine 916 generates a notification indicating a potential drop-off hazard. In some examples, generation of the notification may involve rendering the notification via a screen local to the controller 116 such as, for example, the display screen 117. Additionally or alternatively, generating the notification may involve transmitting the notification to the main server 132 to distribute the notification to particular recipients and/or to render the notification and/or graphics indicative of the notification via one or more relevant web pages and/or other graphical user interfaces. As mentioned above, in some examples, the main server 132 may independently implement the example process of FIG. 17 to determine whether this notification needs to be generated without an explicit communication from the controller 116 regarding such. After generating the notification, control advances to block 1714. Returning to block 1708, if a doorway barrier 106 is available, control advances to block 1710. At block 1710, the example event analyzer 1106 determines whether the dock data indicates the doorway barrier 106 is blocking the opening in the doorway (due to the door being in a non-closed state as determined at block 1704). If so, then there is no need to generate the notification because the barrier 106 serves as a protection against the drop-off hazard. Accordingly, control advances directly to block 1714. However, if the barrier 106 is not blocking the opening, control advances to block 1712 to generate the notification as described above.

At block 1714, the example event analyzer 1106 determines whether the dock data indicates that no trailer is assigned to the dock. In some examples, this determination is made based on dock assignment information provided to the dock controller 116 from the main server 132, which may have received the information from a dock management system (e.g., the dock management system 502). If no trailer is assigned to the dock (but a trailer is detected as being present as determined at block 1704), control advances to block 1716 where the example notification engine 1110 generates a notification indicating the trailer 300 is at the wrong dock. Thereafter, control advances to block 1718. If a trailer is assigned to the dock, control advances directly to block 1718.

At block 1718, the example event analyzer 1106 determines whether the dock data indicates a vehicle restraint (e.g., the vehicle restraint 110) is in an override mode. If so, control advances to block 1720 where the example equipment controller 116 switches an exterior light indicator (e.g., the light indicator 206) to a state indicating the truck trailer should not be moved (e.g., red light). At block 1722, the example event analyzer 1106 determines whether the dock data indicates the truck trailer is no longer present at the dock. If so, control advances to block 1724 where the example notification engine 1110 generates a notification indicating a potential pull-out on a red light. Thereafter, control advances to block 1726. If the trailer is still present at the dock (block 1722), control advances directly to block 1726. At block 1726, the example process determines whether to continue. If so, control returns to block 1702. Otherwise, the example process of FIG. 17 ends.

Figure 18:
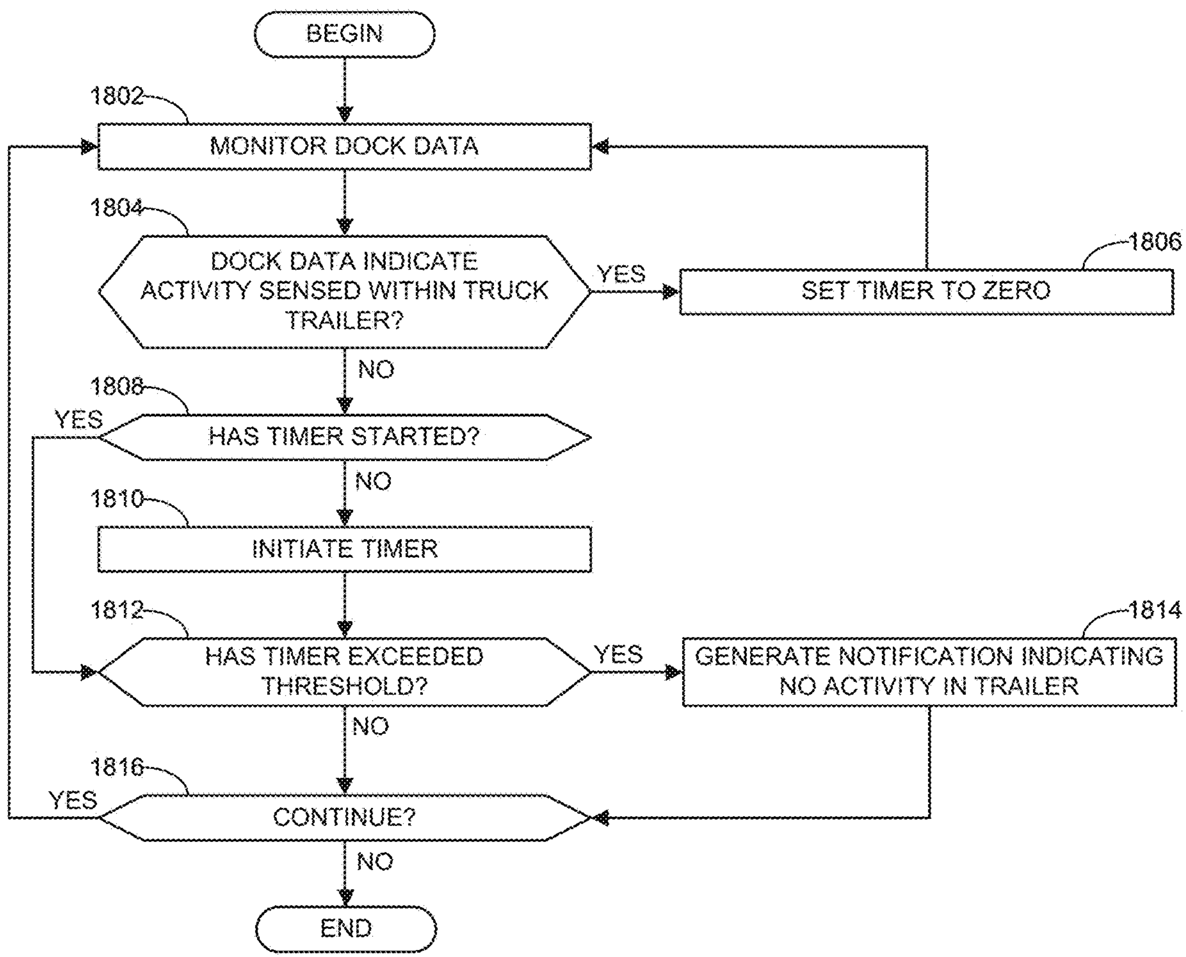

The example process of FIG. 18 begins at block 1802 where the example data analyzer 1104 monitors dock data. At block 1804, the example event analyzer 1106 determines whether the dock data indicates activity sensed within a truck trailer. In some examples, this determination is made based on feedback from the example motion sensor 204 monitoring movement within the trailer 300. If activity is sensed within the trailer, control advances to block 1806 where the example event analyzer sets a timer to zero. Thereafter, control returns to block 1802. If no activity is sensed in the trailer 300, control advances to block 1808 where the example event analyzer 1106 determines whether the timer has started. If not, the event analyzer 1106 initiates the timer at block 1810. Thereafter, control advances to block 1812. If the timer has already started as determined at block 1808, control advances directly to 1812. At block 1812, the example event analyzer 1106 determines whether the timer has exceeded a threshold (e.g., 5 minutes, 10 minutes, 15 minutes, a set or calculated time based on load-, carrier-, and/or facility-specific data, etc.). If so, control advances to block 1814 where the example notification engine 1110 generates a notification indicating no activity in the trailer 300. Thereafter, control advances to block 1816. If the time has not exceeded the threshold (block 1812), control advances directly to block 1816. At block 1816, the example process determines whether to continue. If so, control returns to block 1802. Otherwise, the example process of FIG. 18 ends.

Figure 19:
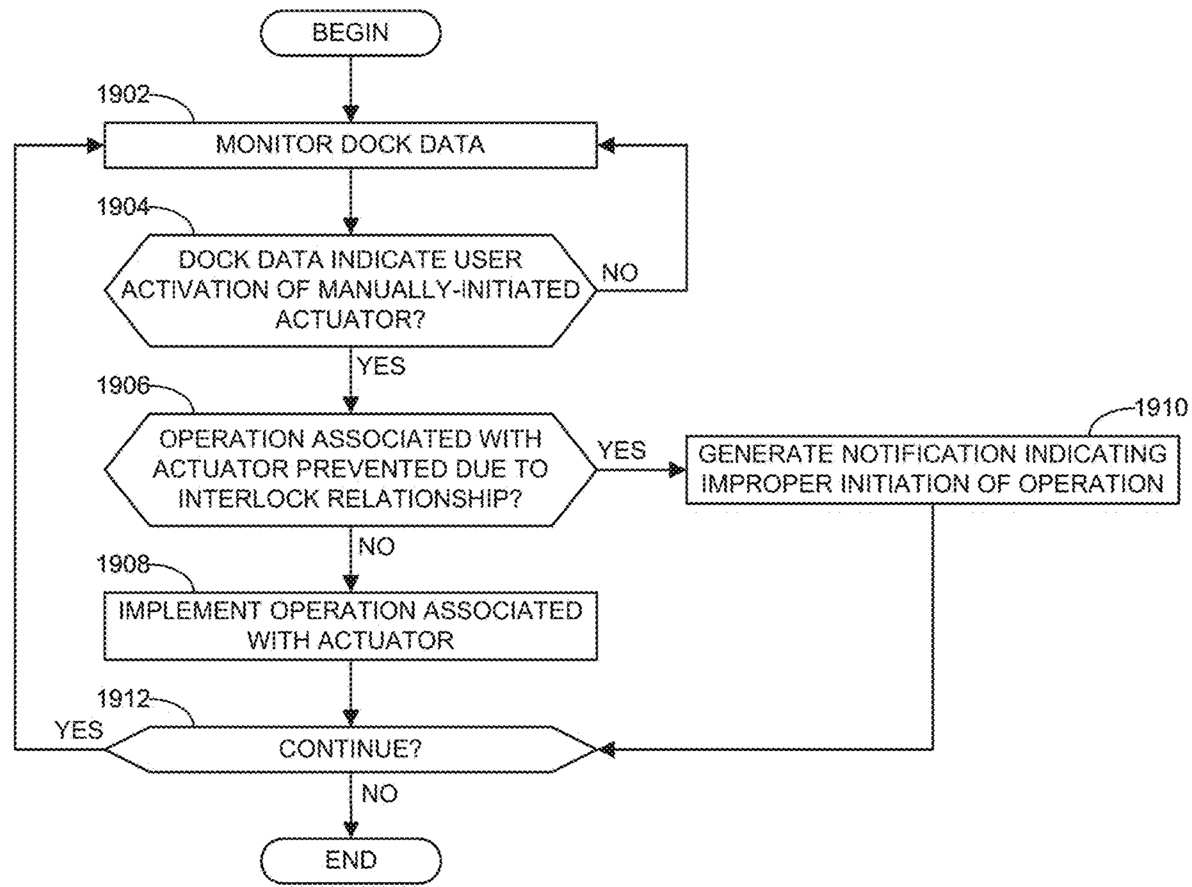
Figure 20:
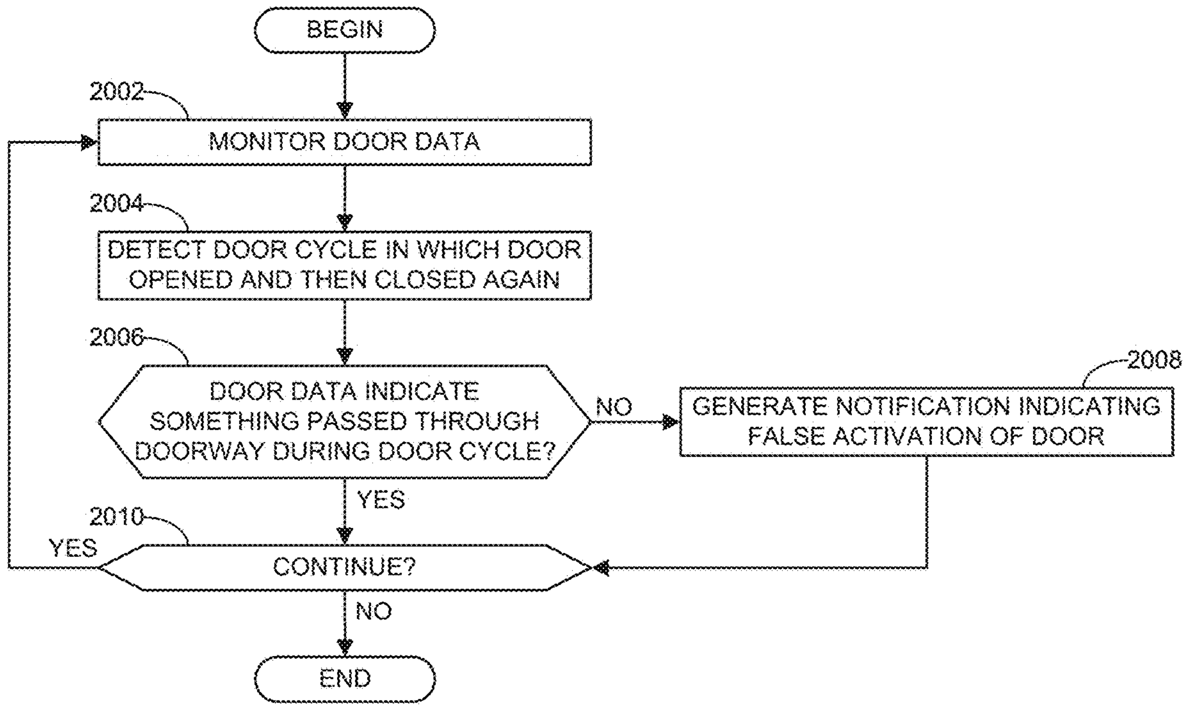

The example process of FIG. 19 begins at block 1902 where the example data analyzer 1104 monitors dock data. At block 1904, the example event analyzer 1106 determines whether the dock data indicates user activation of a manually-initiated (i.e., selectively-initiated) actuator. The manually-initiated actuator may be activated by a user based on the user pushing a button, selecting an option on a touch screen, and/or through any other suitable means. As a specific example, a user may seek to cause the door 104 to open or close, the vehicle restraint 110 to move to the engaged or disengaged position, and/or the leveler 108 to extend into the active position or retract to the stored position. If a user has not activated the manually-initiated actuator, control returns to block 1902. If a user has activated the manually-initiated actuator, control advances to block 1906 where the example event analyzer 1106 determines whether the operation associated with the actuator is prevented due to an interlock relationship. The interlock relationship may depend on the particular operation the user is attempting to implement. For example, the opening of the door may be interlocked or conditioned on the trailer 300 being present and/or the vehicle restraint 110 being engaged with the trailer 300. That is, opening of the door is prevented unless a trailer 300 is sensed as being present and/or the restraint 110 is in the engaged position. Further, operation of the leveler 108 may be interlocked or conditioned on the door 104. That is, the leveler may only be activated after the door 104 is opened. These interlocking relationships ensure that a correct order of operations is followed to maintain safety at the dock. If the event analyzer 1106 determines at a block 1906 that there are no interlock relationships preventing the operation, control advances to bock 1908 where the equipment controller 1116 implements the operation associated with the actuator. Thereafter, control advances to block 1912.

If a user attempts to implement a particular operation out of sequence or when an interlock relationship prevents the operation for some other reason, the interlock will prevent the operation from occurring. While this ensures the safety of the user and any other personnel involved, the action of the user attempting to implement the operation may indicate the user does not understand the correct sequence of operations and/or simply ignores them. This may indicate the need for the user to receive training. However, there is no way to track this behavior to be made aware of such need because nothing actually happens as a result of the user attempting to initiate the actuator because of the interlock. However, examples disclosed herein overcome that difficulty. In particular, when the event analyzer 1106 determines that the operation is prevented due to an interlock relationship, control advances to block 1910 where the example notification engine 1110 generates a notification indicating an improper initiation of the operation. In some examples, such events may be logged and tracked over time (e.g., by the main server 132) to determine whether the event was an isolated incident or a recurring problem to enable a dock manager or other personnel to identify the potential need to provide training to whomever is attempting to implement the operations contrary to established procedures. Thereafter, control advances to block 1912. At block 1912, the example process determines whether to continue. If so, control returns to block 1902. Otherwise, the example process of FIG. 19 ends.

The example process of FIG. 20 begins at block 2002 where the example data analyzer 1104 monitors dock data. At block 2004, the example event analyzer 1106 detects a door cycle in which the door 104 opens and then closes again. At block 2006, the example event analyzer 1106 determines whether the door data indicates that something passed through the doorway during the door cycle. If so, control advances to block 2010. If nothing passed through the doorway, control advances to block 2008 where the example notification engine 1110 generates a notification indicating a false activation of the door 104. Thereafter, control advances to block 2010. At block 2010, the example process determines whether to continue. If so, control returns to block 2002. Otherwise, the example process of FIG. 20 ends.

Although the example processes of FIGS. 16-20 have been described with reference to the local controller 1100 of FIG. 11, the example processes of FIGS. 16-20 may additionally or alternatively be implemented by the main server 132 based on IO data received from the corresponding controller 116, 122, 124, 126, 128, 130. That is, in some examples, the example data analyzer 906, the example parameter value converter 910, the example event analyzer 912, and the example notification engine 916 of FIG. 9 may perform the corresponding functions and/or operations described in FIGS. 16-20 in connection with the corresponding example data analyzer 1104, the example parameter value converter 1106, the example event analyzer 1106, and the example notification engine 1110 of FIG. 11.

Figure 21:
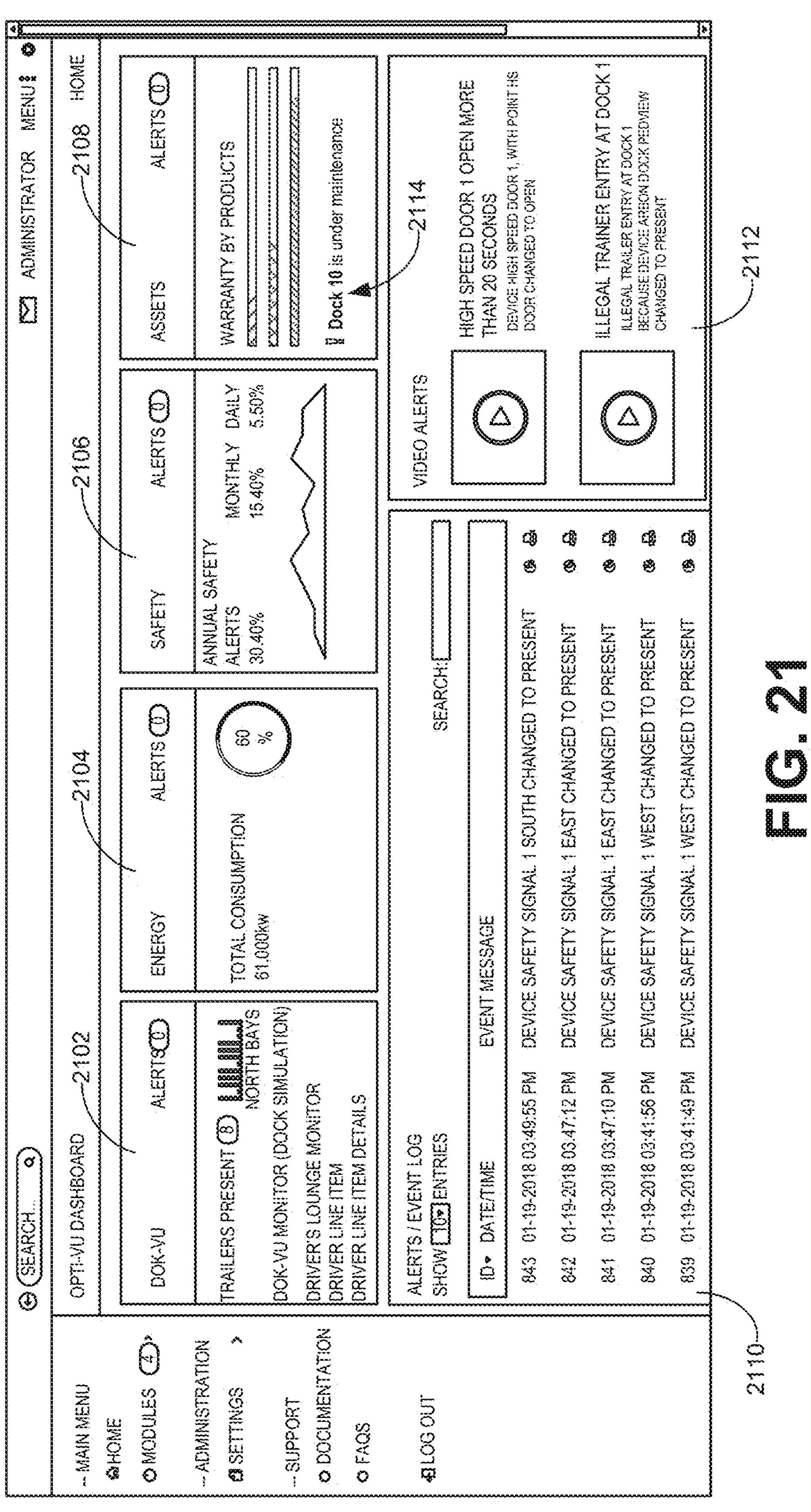

FIG. 21 is an example graphical user interface presented by an overview web page 2100 providing summary information associated with the operation and/or conditions of the material handling facility 100 that may be of interest to particular users. In particular, the overview web page 2100 includes an example dock and yard summary block 2102, an example energy summary block 2104, an example safety summary block 2106, an example maintenance and asset management summary block 2108, an example event log 2110, and an example video log 2112.

The example dock and yard summary block 2102 provides a summary of the number and location of trailers currently parked at the docks 102 of the material handling facility 100. The dock and yard summary block 2102 may include an indication of the number of active alerts and/or associated events that have been triggered in connection with the docks 102 and/or the associated loading and unloading of trailers at the docks. In some examples, the dock and yard summary block 2102 provides links to one or more other web pages such as those shown in FIGS. 23-43 and 47-50 described further below.

The example energy summary block 2104 provides a summary of the amount of energy consumed by the material handling facility 100 and/or particular portions of the material handling facility. Such information may be useful where the material handling facility 100 includes one or more cold storage rooms. In some examples, the energy summary block 2104 provides an indication of the amount of energy consumed relative to a threshold value to indicate whether more or less energy is being consumed than expected. If more energy is being consumed than expected, this may indicate that one or more doors of one or more freezer rooms (monitored and controlled by corresponding door controllers 122 of FIG. 1) may be opened too long and/or too frequently, resulting in the loss of energy. In some examples, these scenarios are associated with configurable events and/or alerts that may be triggered. In some such examples, the energy summary block 2104 includes an indication of the number of active alerts and/or associated events that have been triggered. In some examples, the energy summary block 2104 provides links to one or more other web pages that provide additional detail about freezer rooms, their associated doors, and/or other items of interest relating to energy consumption in the material handling facility 100, such as the example web pages shown in FIGS. 45 and 46 described further below.

The example safety summary block 2106 provides a summary of safety conditions and/or detected events and/or alerts indicative of potential safety risks. Safety events may relate to the unloading and loading of trailers at the docks 102 (e.g., whether a vehicle restraint 110 is not in place securing a trailer) and/or relate to the movement and handling of material within the material handling facility 100 (e.g., collisions and/or near misses). In some examples, the safety summary block 2106 provides links to one or more other web pages such as those shown in FIGS. 50-56 described further below.

The example maintenance and asset management summary block 2108 provides a summary of information relating to the maintenance, repairs, and/or warranties for equipment assets used in the material handling facility 100. In some examples, the maintenance and asset management summary block 2108 provides links to one or more other web pages such as those shown in FIGS. 57-59 described further below.

The example event log 2110 provides a list of events that have been triggered within the material handling facility 100 along with summary information including the time of occurrence, a brief description of the event, and/or a link to a video segment associated with the detected event. The example video log 2112 provides a list of the most recent video segments that have been captured and their association with the events detected in the material handling facility 100. In some examples, the event log 2110 and/or the video log 2112 may be provided on a separate web page independent of the summary blocks 2102, 2104, 2106, 2108.

Figure 22:
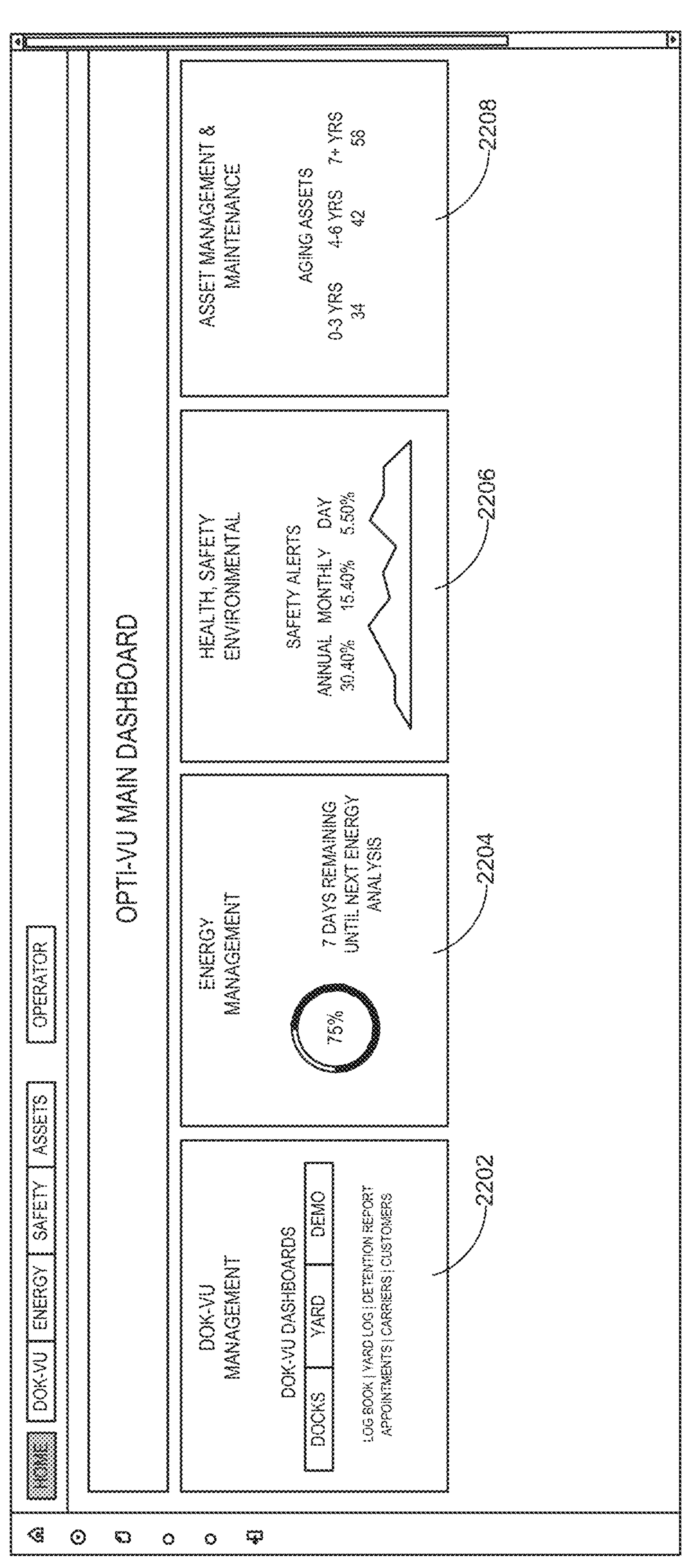

FIG. 22 is another example graphical user interface presented by an overview web page 2200 providing summary information associated with the operation and/or conditions of the material handling facility 100 that may be of interest to particular users. Similar to the overview web page 2100 of FIG. 1, the example overview web page 2200 of FIG. 22 includes an example dock and yard summary block 2202, an example energy summary block 2204, an example safety summary block 2206, and an example maintenance and asset management summary block 2208. As shown in the illustrated example of FIG. 22, the summary blocks 2202, 2204, 2206, 2208 show similar information to the summary blocks 2102, 2104, 2106, 2108 of FIG. 21 described above. Further, by selecting particular ones of the summary blocks 2202, 2204, 2206, 2208 of FIG. 22, a user may be directed to other web pages providing more detailed information.

Figure 23:
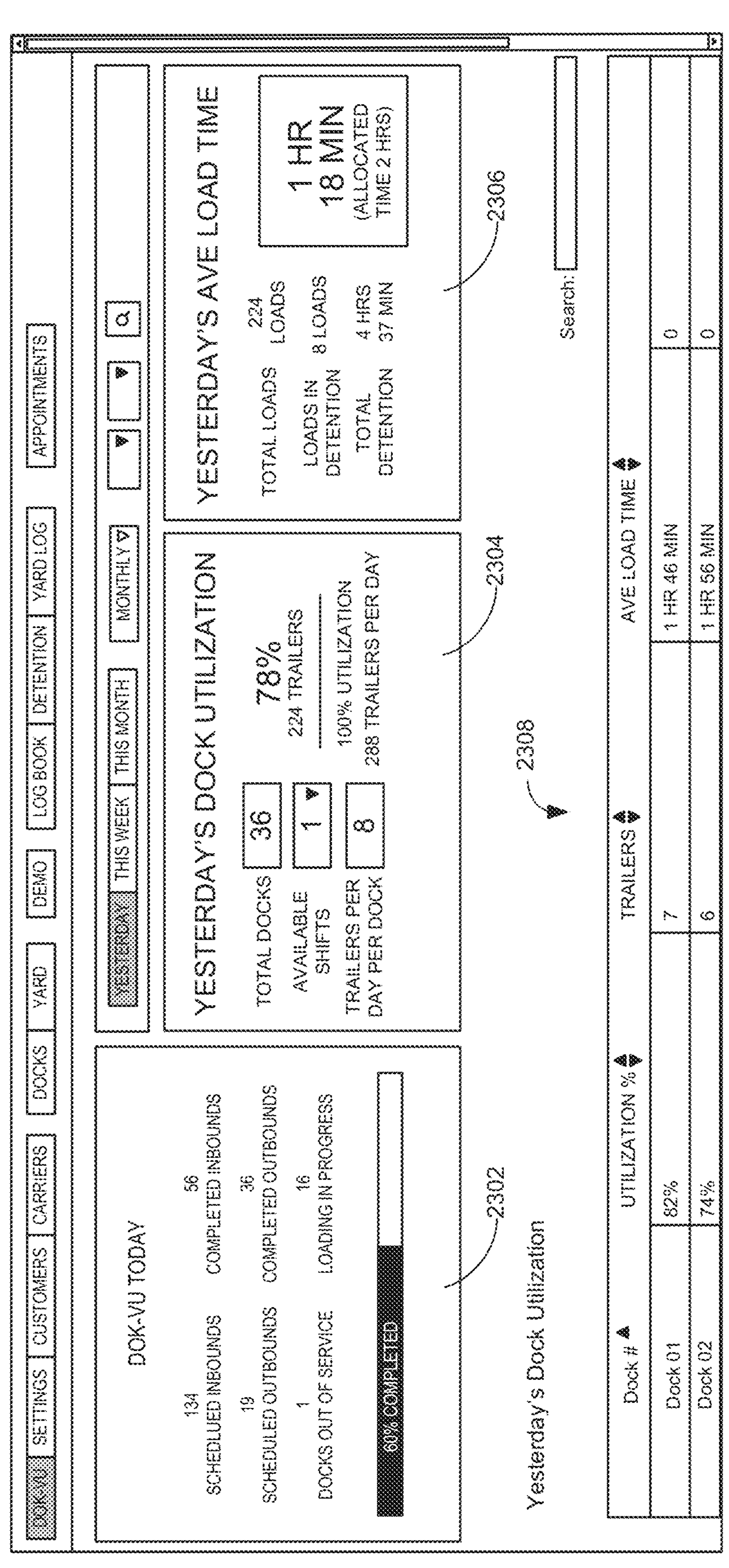

FIG. 23 is an example graphical user interface presented by an example dock monitoring web page 2300. As shown in the illustrated example, the dock monitoring web page 2300 includes an example current period summary block 2302, an example historical utilization summary block 2304, and an example historical load time summary block 2306. The example current period summary block 2302 presents the number of inbound and/or outbound trailers scheduled to be loaded and/or unloaded during a current period of time (e.g., the current day), the number of inbound and/or out trailers for which the loading and/or unloading has been completed, and the number of trailers currently in the process of being loaded or unloaded. Further, the example current period summary block 2302 provides an indication of progress of all trailers for the current period of time. The example historical utilization summary block 2304 and the example historical load time summary block 2306 provide an indication of the utilization of docks in the material handling facility 100 and an indication of the average time it takes to load and/or unload a trailer over a specified historical period of time (e.g., previous day, last week, last month, custom period). In some examples, the historical period of time may be selected by a user. Further, as shown in the illustrated example, the dock monitoring web page 2300 provides a table 2308 with utilization and load time for individual docks in the material handling facility 100.

Figure 24:
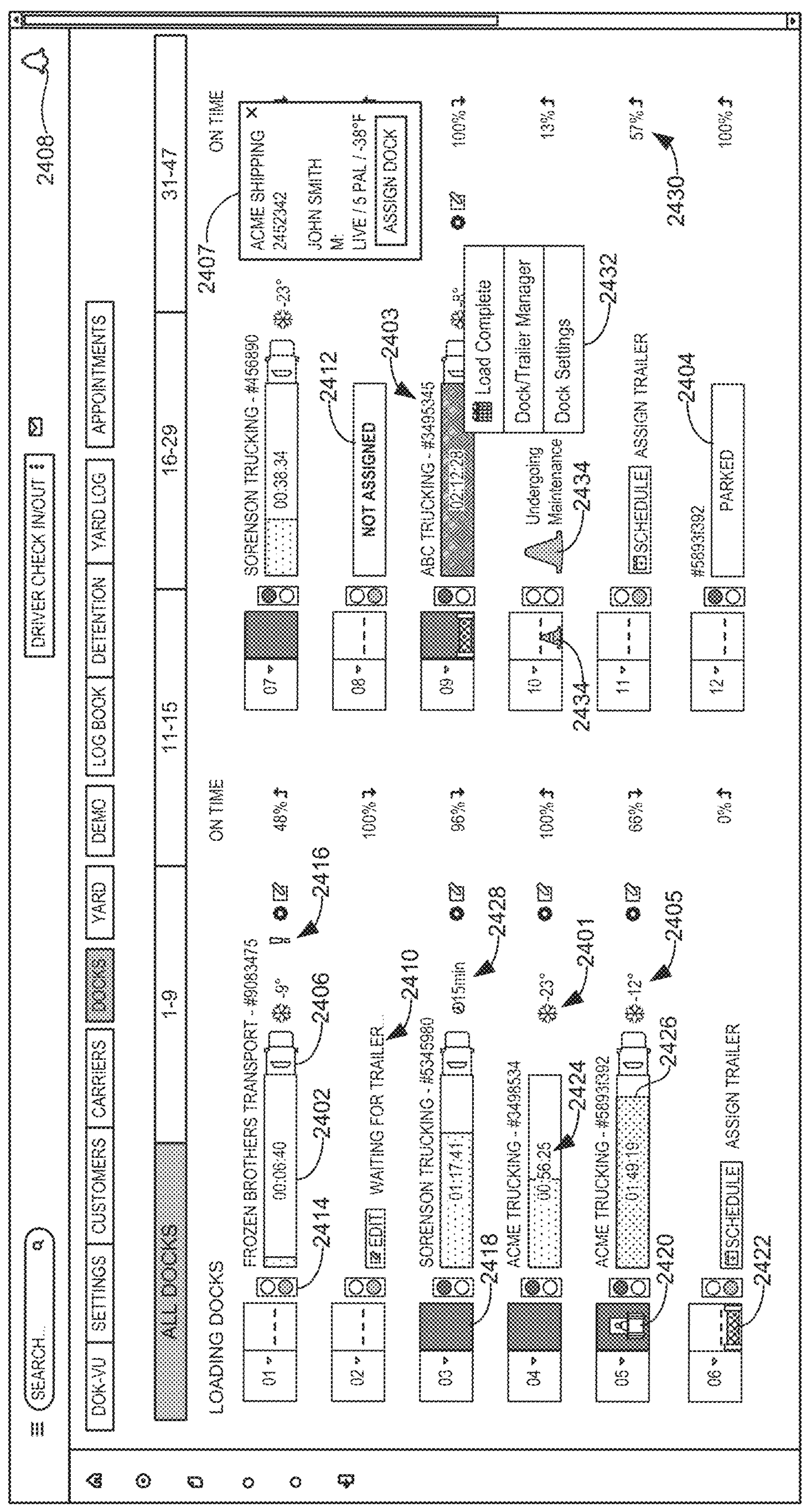
Figure 24B:
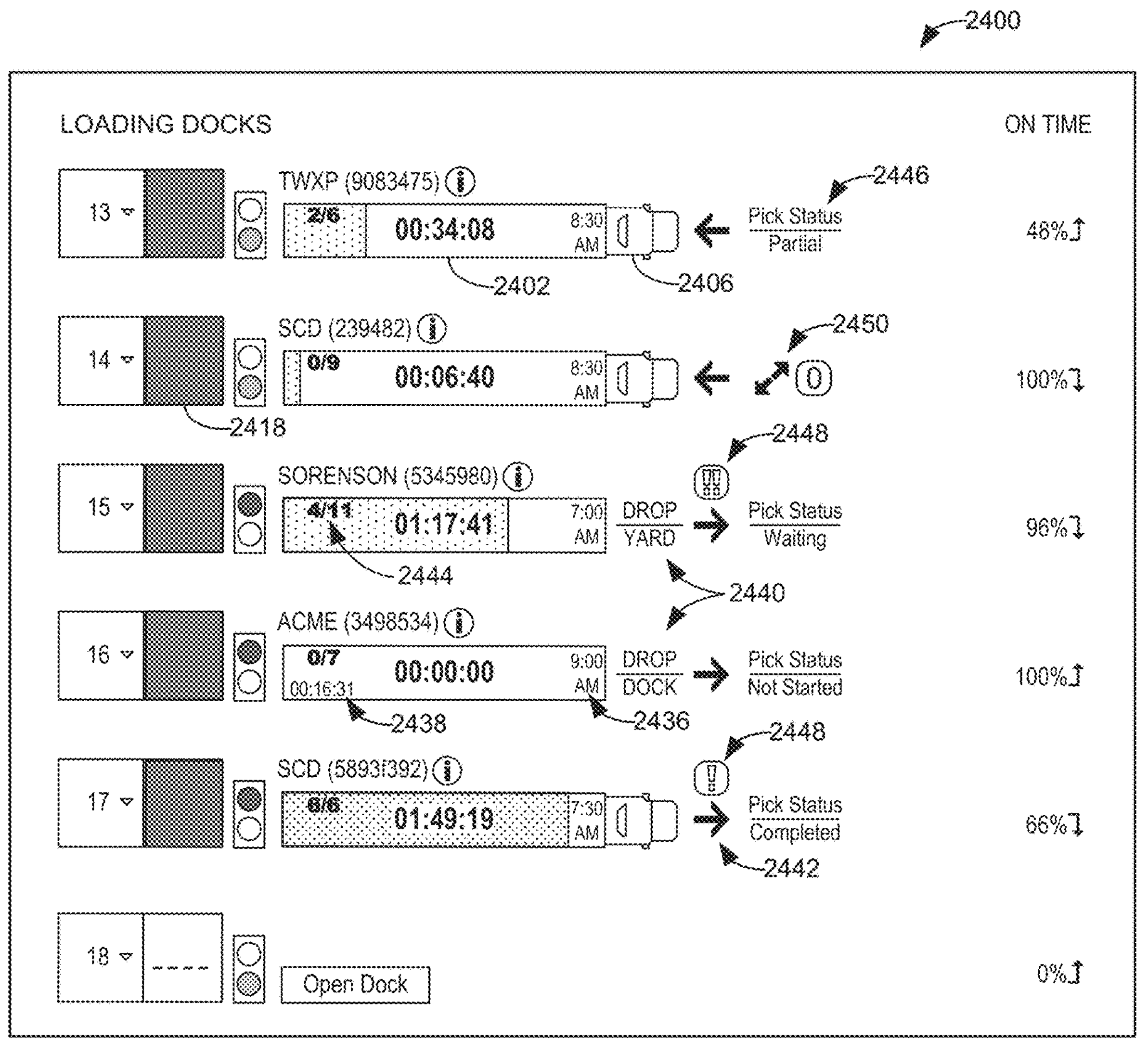

FIG. 24 is an example graphical user interface presented by an example dock monitoring web page 2400. As shown in the illustrated example, the dock monitoring web page 2400 includes a series of graphics, icons, and/or associated information representative of the conditions of a series of docks 102 of the material handling facility 100 as determined based on the data collected by the main server 132 from the dock controllers 116 and/or other devices in communication with the main server 132. For example, when a trailer sensor 202 detects and/or generates a signal indicative of the presence of a trailer at a corresponding dock, a trailer icon 2402 is shown at the corresponding dock within the dock monitoring web page 2400. In some examples, the carrier code, the carrier company name, the load number, and the trailer number may also be identified next to the trailer icon 2402 (e.g., above the trailer icon as identified by load identification reference 2403 shown in connection with the ninth dock in FIG. 24). The trailer icon 2402 or load identification reference 2403 may be an active link which when selected redirects to or opens another webpage or window/pop-up with information related to the particular load. As illustrated in FIG. 24B, a symbol/icon adjacent the load identification reference may function similarly. In some examples, once a trailer is detected or verified at a particular dock (e.g., based on feedback from a trailer sensor 202), the main server retrieves the carrier and trailer number information collected from the driver (as described further below) and pushes the information to the dock monitoring web page 2400 for rendering. Alternatively, this may occur on assignment of a trailer to a particular loading dock.

Whether a tractor unit icon 2406 is represented with the trailer icon 2402 may be based on feedback from a separate sensor and/or based on input provided by the truck driver or the carrier when checking in as to whether the trailer is being dropped off (e.g., the spotted trailer at dock four in FIG. 24) or the trailer is to be live loaded/unloaded (e.g., the trailer at dock three in FIG. 24). In situations where a trailer is not being actively loaded or unloaded (whether as a dropped or spotted load or as a live load), a parked trailer icon 2404, with a "parked" indicator or trailer stand icon, may be shown at the corresponding dock (e.g., at dock twelve in the illustrated example). In some examples, a logistics officer assigns a particular name to a parked trailer that may be shown next to the parked trailer icon 2404.

In some examples, a refrigeration indicator 2401 is associated with the trailer icons 2402 corresponding to refrigerated or temperature controlled loads. In the illustrated example, the temperature control indicator 2401 is a snowflake but may be any other indicator. For instance, in some examples the temperature control indicator 2401 is represented by rendering the trailer icon 2402 and/or the tractor unit icon 2406 with a blue or red bar, outline, and/or fill. In some examples, a current temperature indicator 2405 of the trailer is also shown on the dock monitoring web page 2400 in connection with the temperature control indicator 2401 based on feedback from a temperature sensor with the respective trailers. In some examples, the current temperature indicator 2405 may serve as the temperature control indicator 2401. In some examples, the main server 132 monitors the current temperature relative to a threshold temperature or and upper and lower threshold of a temperature range. If the temperature rises above or below the threshold temperature or moves out of the range, the main server may generate an alert or notification to a dock manager at the logistics office that the trailer temperature at the specified dock is above or below the threshold or outside of the acceptable range. Monitoring the temperature in this manner can assist the dock manager to maintain cold chain for the products within the trailer to be unloaded. In some examples, the temperature of individual pallets and/or other cargo units or sections (e.g., divided by bulkheads) within the trailers and/or within the material handling facility 100 may be displayed and/or accessible for display via the example dock monitoring web page 2400.

Figure 25:
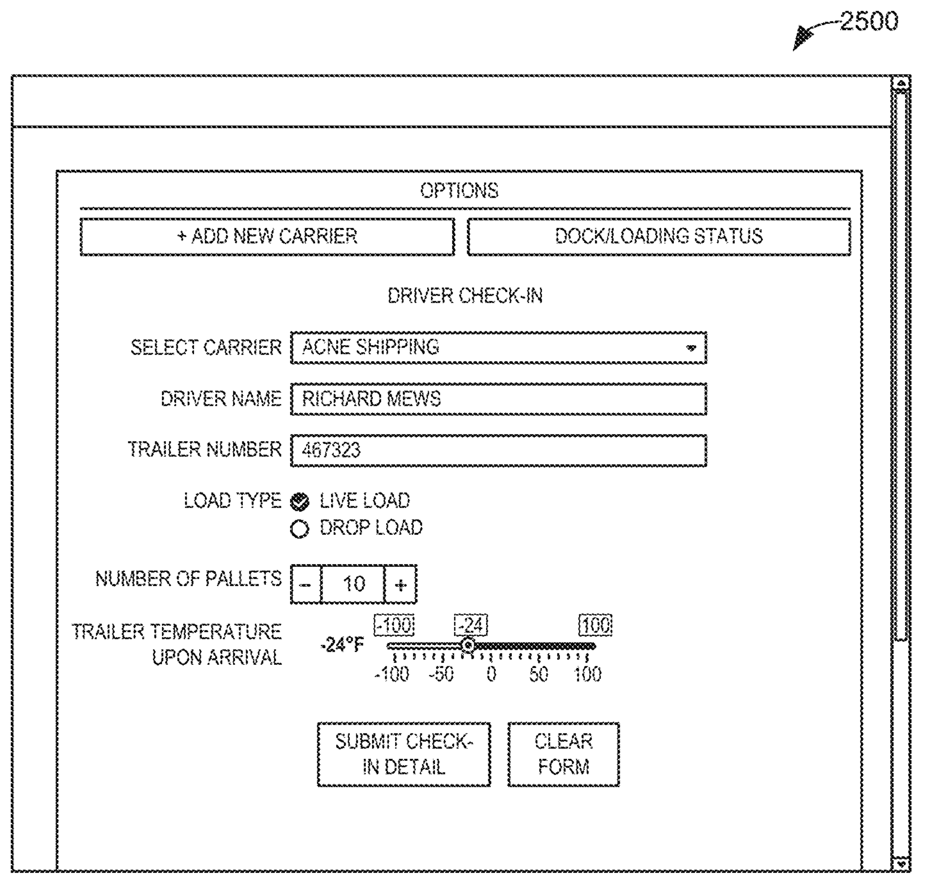
Figure 26:
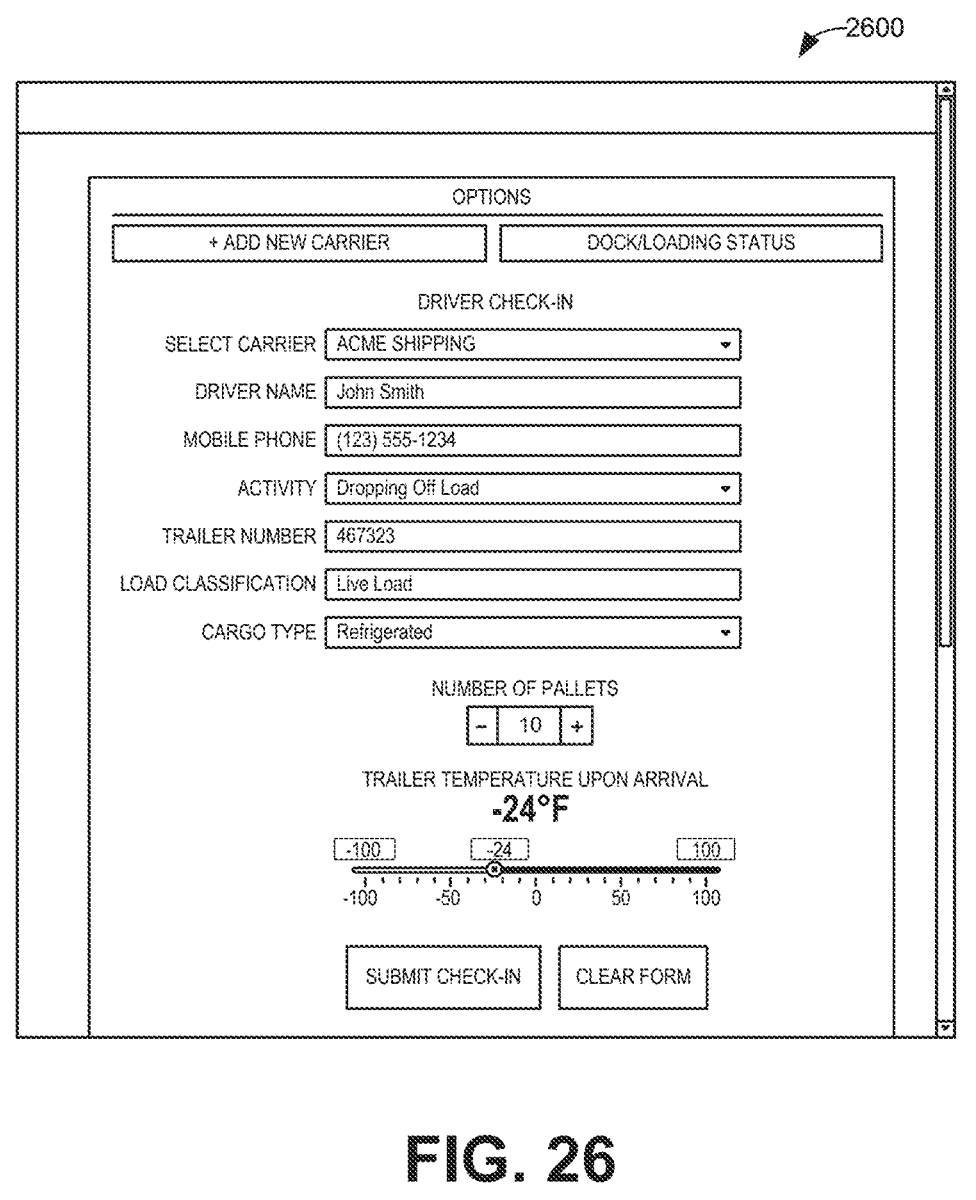

In some examples, drivers arriving at the facility with trailers for loading and/or unloading may check-in at a kiosk corresponding to one of the client devices 148 of FIG. 1 that provides access to an example driver check-in web page 2500 as shown in FIG. 25. That is, in some examples, the kiosk is implemented with a client device 148 maintained by operators of the material handling facility 100. Additionally or alternatively, the driver may be able to access the driver check-in web page 2500 using their own smartphone or other portable device (e.g., corresponding to different client device 148). In some examples, as shown in FIG. 25, drivers may provide their mobile phone number that is then used to transmit text messages to the drivers to provide instructions and/or indicate the status of the loading and/or unloading of their trucks. For example, a driver may complete the entry fields shown in the illustrated example of FIG. 25. As shown in the illustrated example, for refrigerated or temperature controlled trailers, the driver may be prompted to enter the current temperature of the trailer. Another example driver check-in web page 2600 is shown in the illustrated example of FIG. 26.

Once the driver submits the information, the main server 132 may generate a first notification directly on the web page confirming the check-in information was received and sent to the logistics office. The notification may further instruct the driver to check the dock status page for a dock assignment. Additionally or alternatively, if the driver included a mobile phone number, the main server 132 may transmit instructions and/or confirmation via a text message confirming receipt of the check-in information and indicating that a subsequent text message will be sent containing a dock assignment.

Figure 27:
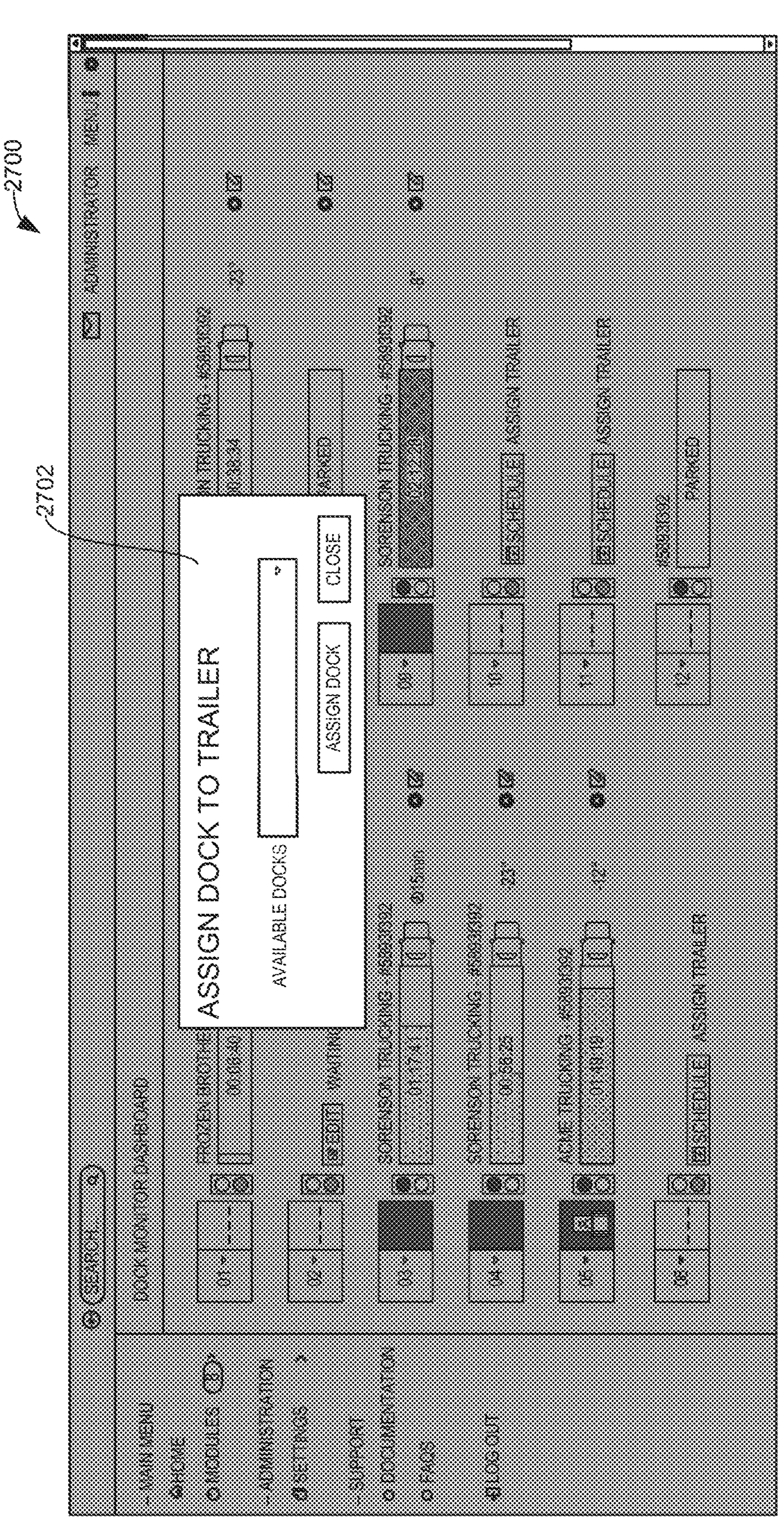

In addition to providing confirmation notices to a driver, upon receipt of new check-in information as described above, the main server 132 generates a separate notification to inform a dock manager (or other personnel) in the logistics office of the new arrival and need for a new dock assignment. In some examples, the notification is a check-in popup 2407 that appears within the dock monitoring web page 2400 of FIG. 24 with relevant information and the option for a user (e.g., a dock manager) to assign the truck to a particular dock. If the user chooses to assign the dock, a dock assignment web page 2700 may appear as shown in FIG. 27 with a dock assignment popup 2702 that provides a list of available docks. In some examples, the list of available docks corresponds to the docks that have not sensed the presence of a trailer and that are not otherwise scheduled for a different truck.

In some examples, once a truck is assigned to a particular dock, the information may be conveyed back to the driver via the driver check-in web page 2500, 2600 and/or another similar web page. In some such examples, facility related information that may be pertinent to the driver (e.g., an indication that the docks are icy, an estimate of completion time to load/unload the truck based on current activity at all docks and available material handling equipment and/or personnel working at the docks) may be pushed to the web page for review by the driver. Thus, in some examples, a driver and a dock manager (or other personnel) may communicate relevant information to one another in substantially real-time in accordance with teachings of this disclosure.

Figure 28:
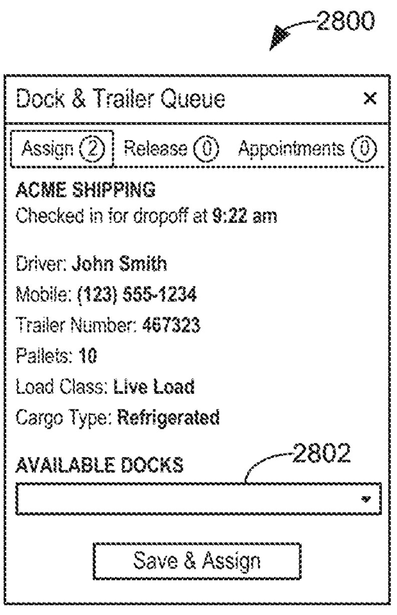

In some examples of FIG. 24, the notification to a dock manager that a trailer needs to be assigned to a dock may include a visual indicator other than an automatic popup such as, for example a bell icon 2408 that illuminates, becomes visible, and/or otherwise changes appearance. In some such examples, when a user selects the bell icon 2408, a dock and trailer queue popup 2800, as shown in FIG. 28, may appear that includes the check-in information on an assignment tab. In some examples, if the trailer temperature as entered by the driver is above a certain temperature threshold, the popup 2800 may include an alert that the trailer is over temperature. Additionally or alternatively, the main server 132 may transmit a separate notification to the dock manager and/or the shipping and receiving manager to report the over temperature trailer to address the issue by, for example, refusing the shipment. In some examples, the assignment tab of the dock and trailer queue popup 2800 includes a dropdown selector 2802 that lists only the docks that are available for assignment. That is, the dropdown selector 2802 would not list any of the docks shown in the dock monitoring web page 2400 that are already have a trailer assigned to them. As mentioned above, the main server 132 determines whether any particular dock is associated with a trailer based on trailer sensors and/or some other sensor or device associated with the dock (e.g., the vehicle restraint being engaged). Thus, as can be seen, the main server is able to facilitate the management of a dock by collecting data and analyzing data obtained from disparate locations. This is only possible in the technical environment of the material handling facility disclosed herein in which the sensors at the docks are monitored by respective dock controllers 116 that report to the main sever 132 and that the server is also able to receive network communications from a driver providing the check-in information and transmit the collected information to a logistics officer to make a determination of where to assign the new truck.

Once a particular dock is selected and assigned to the trailer, the main server 132 may generate a timestamp for the action and again generate multiple notifications that are transmitted to the appropriate recipients and update the appropriate web page interfaces. For example, a first notification may be displayed on the web page viewed by the logistics officer that made the dock assignment confirming the trailer has been assigned. Separately, the main server 132 may transmit details associated with the trailer (e.g., the carrier name, customer name, trailer number, etc.) to the dock controller 116 for the assigned dock to display the information via the display screen 117. Further, in some examples, the main server 132 may transmit another text message to the truck driver to indicate the assigned dock. In some examples, the text message may include directions to the where the dock is located, the timestamp to indicate the time of check-in, and/or any other suitable information (e.g., the time of a scheduled appointment). In some examples, the main server 132 updates the dock monitoring web page 2400. In particular, although the dock is assigned, it may take a brief period for the truck driver to move the trailer into position at the dock. Accordingly, in some examples, an indication such as the "waiting for trailer" message 2410 shown at the second dock in FIG. 24 is provided to indicate the dock has been assigned but no trailer has yet arrived. Once the trailer is detected, the main server 132 updates the dock monitoring web page 2400 again to show the trailer icon 2402. In some examples, a second timestamp is generated when the trailer is first detected. In this manner, the time between initial check-in (e.g., dock assignment) and the actual arrival of the trailer at the dock may be monitored. This can facilitate the appropriate determination of detention fees incurred by the owner of the material handling facility.

A trailer may be positioned at a dock to which the trailer was not assigned. In some such examples, when the trailer is detected at a dock, but no trailer is assigned to the dock, the main server 132 may generate an alert and display a "not assigned" indicator 2412 as shown at dock eight in the illustrated example of FIG. 24. In some examples, the indicator 2412 may flash to draw the attention of a logistics operator that the trailer is at the wrong dock. In some examples, the flashing may be stopped once an operator has acknowledged the alert and/or otherwise silenced or bypassed the alarm. In some examples, additional actions may also be taken when a trailer is detected at a dock that has not been assigned to receive a trailer. For example, the dock door may be interlocked so that it cannot be opened as a security measure. Additionally or alternatively, an alarm signal at the dock may be set off to inform the driver and/or other personnel at the dock that the trailer is not where it is supposed to be. Similar to above, the alarm signal may be turned off when a person acknowledges the alarm, silences the alarm, bypasses the alarm, and/or otherwise responds to the alarm.

In some examples, once a trailer has been positioned at the correct dock, the vehicle restraint 110 is activated to secure the trailer in position. Whether the vehicle restraint 110 is in an active state (engaging a trailer), in an override state, or in a stored state (not engaging a trailer) may be represented in the example dock monitoring web page 2400 by a restraint signal icon 2414. In some examples, the restraint signal icon 2414 matches and/or is similar to the light indicators 206 shown in the FIG. 2 that provide a stop light (e.g., a red light) whenever the restraint signal indicates that the vehicle restraint 110 is active or in an override mode and a go light (e.g., a green light) when the vehicle restraint is not active or in a stored position. In some examples, an event rule may cause an alert to be triggered when the presence of a trailer is sensed at a particular dock but the vehicle restraint 110 is not active and engaged therewith as in the case of the first dock of the example dock monitoring web page 2400 of FIG. 24. In such examples, an alert icon 2416 may be displayed adjacent the corresponding dock. In some examples, additional detail regarding the triggered event associated with the alert may pop up when a user (e.g., the logistics operator) clicks on the alert icon 2416. In some examples, a video segment captured in connection with the event may popup and automatically begin playing.

In the illustrated example of FIG. 24, the dock monitoring web page 2400 includes a door icon 2418 to graphically represent whether the door 104 at the corresponding dock is closed (e.g., as represented at the first and second docks represented in FIG. 24) or open (e.g., as represented at the third and fourth docks represented in FIG. 24). In some examples, the door 104 is represented as being open so long as the door is at least partially open (e.g., not closed). Whether the door is closed or open (e.g., not closed) may be determined based on sensor feedback provided to the associated dock controller 116 and subsequently reported to the main server 132. That is, in some examples, after the dock controller 116 receives and executes a command to open the door (e.g., from a forklift operator or other person local to the door), a sensor (e.g., a limit switch) associated with the door 104 may generate an output indicating the door has opened. Once the dock controller 116 received this sensor feedback, the dock controller 116 transmits a network communication to the main server (e.g., an IO message) indicating the door is open. Upon receipt of such a message, the main server 132 updates the dock monitoring web page 2400 (e.g., via push notifications to all active instances of the web page that subscribe to such information) so that the door icon 2418 graphically represents that the door at the corresponding dock is open. At substantially the same time that the dock controller 116 reports that the door is open, the dock controller 116 may receive feedback from the motion sensor 204 facing into the trailer indicating motion has been detected within the trailer (which is likely indicative of the presence of one or more workers moving around within the trailer). In some examples, when the motion sensor 204 detects the presence of a worker within the trailer, the dock controller 116 sends second network transmission (e.g., IO message) to the main server 132. In response to this second message, the main server 132 may again update the dock monitoring web page 2400 to include a forklift icon 2420 within the open door icon 2418 (as shown in connection with the fifth dock in FIG. 24) to represent that someone has been detected in the trailer. In some examples, if no motion has been sensed within the trailer for a threshold period of time, the main server 132 may infer that no one is working in the trailer and, therefore, remove the forklift icon 2420.

Further, in some examples, a barrier icon 2422 may be rendered across the door icon 2418 corresponding to doors when sensor feedback associated with the barrier 106 of FIGS. 1-4 indicates the barrier is in active use across the doorway of the door. The barrier icon 2422 may be rendered when the door icon 2418 indicates the door is closed (as in the sixth dock of FIG. 24) or when the door is open (as in the ninth dock of FIG. 24).

In some examples, the duration that each trailer has been parked at a corresponding dock is represented graphically in the illustrated example of FIG. 24 with a timer 2424 displayed on the trailer icon 2402. In some examples, the time represented by the timer 2424 on the dock monitoring web page 2400 of FIG. 24 corresponds to (e.g., is synchronized with) the time indicated by the timing indicator 306 located at the dock as shown and described in connection with FIG. 3. In some examples, the timing indicator 306 and the timer 2424 are automatically initiated in response to a driver checking in via the driver check-in web page 2500, 2600 of FIG. 25 or 26. In other examples, the timer 2424 is triggered based on another input and/or a combination of inputs. For instance, the timer 2424 may additionally and/or alternatively be triggered based on at least one of when a presence detector 112 detects the presence of a trailer at the dock, when the vehicle restraint 110 is activated to engage the trailer, when the door 104 is first opened, and/or when the dock leveler 108 is activated and extended into the trailer. In some examples, the particular trigger(s) to begin the timer may be configured by a user. In some examples, the trigger(s) may be defined globally (e.g., for all docks or a selected group of docks) or set individually for separate docks. In some examples, the triggers for the timer 2424 may be dependent on some other user-defined parameter (e.g., different trigger(s) may be defined for different carriers).

Additionally or alternatively, in some examples, a timer progress bar 2426 is displayed on the trailer icon 2402 that advances across the length of the trailer icon 2402 as time progresses towards a threshold loading/unloading time configured for the expected duration to load and/or unload the trailer. In the illustrated example, the threshold time is set to a default duration of 2 hours. However, in other examples, the threshold loading/unloading time may be different. Further, in some examples, different threshold loading/unloading times may be configured for different trailers and/or based on specific information provided by the driver via the check-in web page 2500 and/or based on carrier, customer, and/or contract information. For instance, in some examples, drivers may provide time sensitive information (e.g., the driver's work schedule and how much time is remaining in the driver's current shift) and/or load-related information (e.g., how full the truck is of materials to be unloaded) that may be used to adjust the threshold time. In some examples, the threshold time may be automatically adjusted based on such driver inputs. In other examples, such driver input may be provided to a dock manager to assess whether the threshold time for the particular truck is to be adjusted based on available resources in light of other trucks being loaded and/or unloaded. In some examples, as the timer approaches the threshold loading/unloading time (e.g., the threshold time is less than 30 minutes away, 75% of time has elapsed, etc.), the appearance of the timer progress bar 2426 may change (e.g., from green to yellow, flashing, and/or bolded, etc.) as represented by the difference between the fourth dock and the fifth dock in the illustrated example. Further, the appearance of the timer progress bar 2426 may change again (e.g., to red, flashing, and/or bolded etc.) once the threshold loading/unloading time is reached and/or exceeded as represented in connection with the ninth dock in the illustrated example. In some examples, the same color changing scheme is implemented on the display of the timing indicator 306 of FIG. 3 so that personnel working at the dock have the same indicators as are represented in the dock monitoring web page 2400 viewed in the logistics office. Providing the visual timers in a consolidated manner for multiple docks, as represented by FIG. 24, enables dock managers and/or other personnel to identify trailers for which loading and/or unloading may be falling behind. As a result, the dock manager may quickly reallocate resources to speed up the process at certain docks to reduce detention fees.

In some examples, a no activity warning 2428 may be generated in response to no motion being sensed within a trailer for a threshold period of time (e.g., 15 minutes) while the timer 2424 is going. In some examples, the warning may change as the period of time without activity increases between different intervals (e.g., 15, 30, 45, 60, 90, or 120 minutes). This may provide information about whether progress is being made in loading and/or unloading a particular trailer to complete the task within the allotted timeframe (e.g., the threshold loading/unloading time).

The example dock monitoring web page 2400 of FIG. 24 provides an on-time metric 2430 for each dock indicative of the percentage of trailers at the dock over a given period of time (e.g., one week, one month, etc.) that were loaded or unloaded within the allotted amount of time (e.g., 2 hours). The on-time metric 2430 may also include a trend indicator (e.g., an arrow pointing up or down) to indicate whether the percentage of on-time loading or unloading at the particular dock is increasing or decreasing. In this manner, the docks associated with a greater number of delays, resulting in detention fees may be identified and actions can be taken to reduce such costs.

Figure 29:
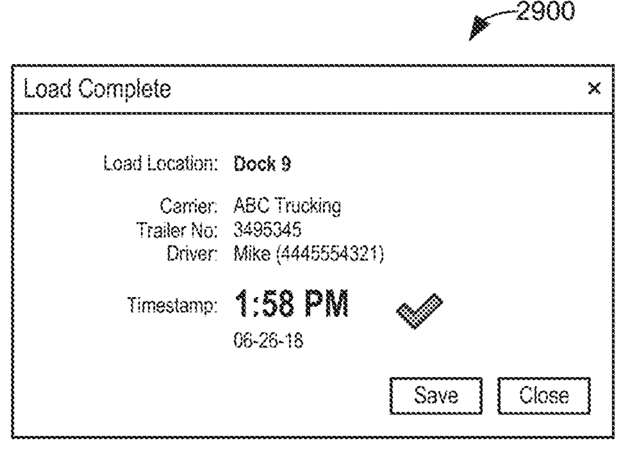

In some examples, selecting a particular dock and/or trailer within the dock monitoring web page 2400 produces a menu 2432 of options through which a dock manager may indicate the loading and/or unloading of the associated trailer is complete. In some examples, the options presented via the menu 2432 are dynamically updated based on available information regarding the dock and/or the trailer located at the dock. For example, if no trailer is present at the dock available options listed in the menu 2432 will be limited to information pertaining to the dock itself. However, once a trailer is detected at the location, the menu 2432 may automatically update to enable a user to access information pertaining to the trailer (e.g., driver and/or carrier information, appointment information, load information, etc.). In some examples, the completion of a load (either loading or unloading) may trigger additional options available on the menu 2432 for the associated trailer. In some examples, a forklift operator may alternatively access the dock monitoring web page 2400 via a portable device (e.g., a remote client device 148) to indicate the completion of a trailer load. Additionally or alternatively, the display screen 117 on the dock controller 116 may include a button on the graphical user interface that may be pressed to indicate completion of the loading and/or unloading. When a user indicates a load is complete, the main server 132 may generate a load complete popup 2900 as shown in FIG. 29 that provides details associated with the particular trailer selected for the user to confirm the correct trailer has been selected. Once the user confirms the load is complete, the main server 132 may generate a second notification confirming that the trailer has been successfully checked out of active status in the dock management system. In some examples, the trailer icon 2402 on the dock monitoring web page 2400 is updated to reflect this change in status (e.g., with a check mark positioned over the trailer) until the trailer is removed from the dock. In some examples, the main server 132 transmits a notification, via a text message, to the driver that the loading is complete and requesting the driver to safely proceed to the logistics office for paperwork. At the same time, the information associated with the completed trailer may be added to a release tab of the dock and trailer queue popup 2800 as shown in FIG. 30.

Figure 30:
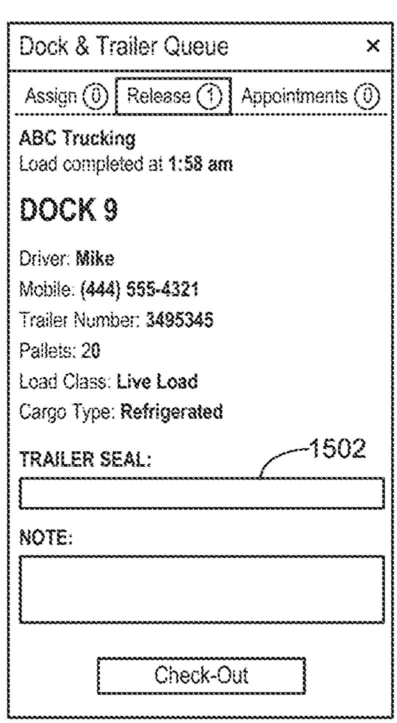

As shown in the illustrated example of FIG. 30, the popup 2800 includes a trailer seal entry field 3002 in which the trailer seal identification number may be entered. The seal may be entered by a dock manager in the logistics office, by a forklift operator at the dock (via a remote device accessing the dock monitoring web page 2400), or by a yard jockey or spotter in the dock yard. Recording the seal in this manner enables the creation of an electronic seal log that is linked with the other information generated for the trailer including the particular load and its timing. Once the trailer seal has been recorded and all other paperwork has been completed (e.g., the driver has physically checked boxes verifying bills of lading, trailer temperature, seal number, etc.) the dock manager may finalize the transaction by checking out the trailer. In some examples, the main server 132 transmits a second text notification to the driver to confirm the paperwork is complete and that the driver may safely proceed to their trailer for departure.

For purposes of illustration, FIG. 24B is a close up view of a portion of the example dock monitoring web page 2400 with different trailer icons 2402 located at different docks (e.g., dock numbers 13-18) of the material handling facility 100. FIG. 24B shows additional and/or alternative graphics that may be provided to a user to enable the user to understand circumstances associated with the trailers at the respective docks. In some examples, an appointment time 2436 is rendered within the trailer icon 2402 to indicate the time of the appointment (for arrival and/or departure) scheduled for the trailer. In some examples, if a trailer arrives before the time of the scheduled appoint, an appointment countdown 2438 is provided to indicate the amount of time remaining until the scheduled appointment start time. In some examples, an additional timer may be triggered to begin counting when the time of the appointment is reached whether or not the trailer has arrived and/or whether or not the trailer is loaded to be ready to be hauled away. Such a timer may be monitored to determine the incursion of demurrage or detention charges. In some examples, when this timer reaches a threshold, a notification may be triggered to inform relevant individuals of the delay past the scheduled appointment.

Trailers associated with a dropped load are indicated as such in the illustrated example by the trailer icons 2402 that do not have an associated tractor unit icon 2406 (e.g., the trailers at dock numbers 15 and 16), the dock monitoring web page 2400 may include a drop status indicator 2440 that indicates whether the dropped trailer is to remain at the dock or be moved to the yard once the loading or unloading is complete.

In the illustrated example, a load direction indicator 2442 is rendered in connection with each trailer. The load direction indicator 2442 indicates whether the load is an inbound load to be unloaded at the facility (with the arrow of the indicator 2442 pointing towards the door icon 2418) on an outbound load to be loaded at the facility (with the arrow of the indicator 2442 pointing away from the door icon 2418). In some examples, the dock monitoring web page 2400 includes a load counter 2444 that keeps track of the progress of moving (loading or unloading) the associated load and the total size of the load. More particularly, as shown in the illustrated example, the load counter includes two numbers with the first number indicating the number of cargo units (e.g., pallets, racks, parcels, or other load units) that have been moved and the second number indicating the total number of cargo units to be moved to complete the load. Additionally or alternatively, in some examples, a pick status indicator 2446 is rendered to give an indication of the progress of the load being compiled in a staging environment associated with the loading dock. In this example, the pick status indicator 2446 is associated with one of four states including (1) not started (as in the case of dock number 16), (2) partially complete or in progress (as in the case of dock number 13), (3) waiting (as in the case of dock number 15), and (4) completed (as in the case of dock number 17). The waiting status is intended to convey the idea that cargo to be loaded is still being prepared within the material handling facility 100 or elements of the load are not available for picking. In some examples, a checkmark is also displayed adjacent an associated trailer that has a pick status of completed.

In some examples, different docks and/or the associated trailers at the docks may be assigned different priorities for loading or unloading. In the illustrated example, the trailer at dock number 17 is designated as having priority over other trailers as indicated by the priority indicator 2448 that includes a single exclamation point. Further, in this example, the trailer at dock number 15 is given higher priority (e.g., double priority) over dock number 17 as indicated by the priority indicator 2448 with two exclamations marks.

In some situations, the load or cargo in one trailer at a particular dock may need to be moved into a different trailer at a different dock. This scenario may be represented in the dock monitoring web page 2400 via a cross dock status indicator 2450 as shown adjacent the trailer icon at dock number 14 in the illustrated example of FIG. 24B. In some examples, the cross dock status indicator 2450 includes a direction indicator that includes two arrows pointing either outwards away from each other (as shown) or inwards toward each other. Outward pointing direction indicators represent that cargo within the trailer needs to be moved out to one or more different trailers. By contrast, inward pointing arrows represent that cargo from one or more other trailers needs to be moved into the corresponding trailer. In some examples, the cross dock status indicator 2450 also includes a cross dock trailer involvement indicator to indicate the number of other trailers that are currently located at a different dock in or from which cargo is to be transferred from or to the corresponding trailer. In this example, the number is zero indicating that the trailer that it to receive the cargo in the trailer at dock number 14 is not currently at the material handling facility 100. In other examples, the cross trailer involvement indicator 2450 may include both trailers currently at a different dock and trailers expected but not yet arrived at a different dock upon which the load at the corresponding dock depends. The cross dock status indicator may be an active link which when selected redirects to or opens another webpage or window/pop-up with information related to the cross dock relationship and status.

Figure 31:
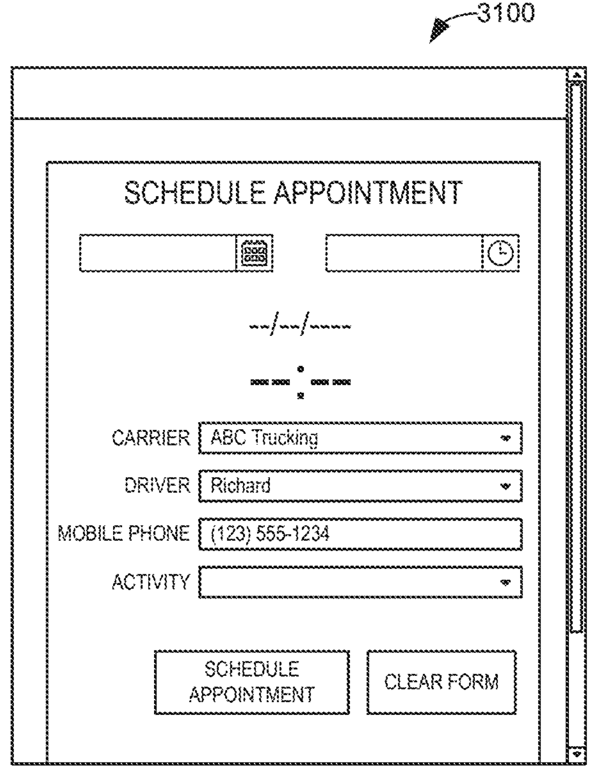

FIG. 31 illustrates an example graphical user interface presented by a dock scheduling web page 3100. The dock scheduling web page 3100 of FIG. 31 enables the arrangement or schedule of business to business appointments (e.g., between a carrier and the material handling facility 100). In particular, the example web page 3100 of FIG. 31 may be accessed by truck drivers and/or other personnel from a carrier to set up an appointment to drop off and/or pick of a trailer. In some examples, once the appointment information has been entered, the main server 132 transmits notifications (e.g., via text or email) to an operator in the logistics office, the shipping and receiving manager, and/or other relevant recipients. Further, in some examples, the bell 2408 may be activated to indicate new information is accessible through the dock and trailer queue popup 2800 of FIGS. 28 and 30. Specifically, the received appointment information may be provided in the appointment tab of the popup 2800.

Figures 32, 33:
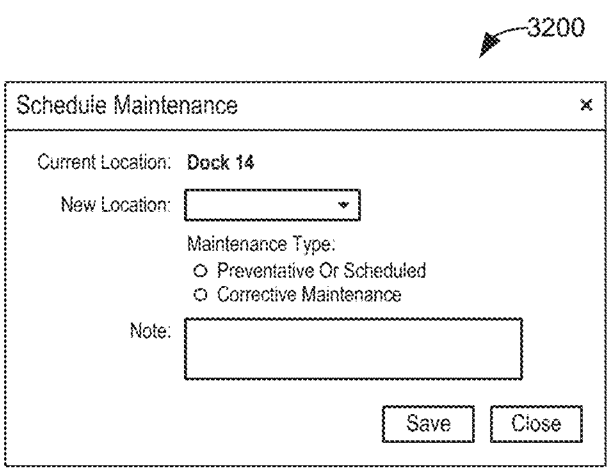

On occasion, a particular dock may need to be taken out of service for maintenance (e.g., to repair or update equipment). Accordingly, in some examples, the main server 132 may provide a maintenance schedule popup 3200, as shown in FIG. 32, to schedule maintenance. As shown in the illustrated example of FIG. 32, the maintenance may be preventative or scheduled, or may be corrective (e.g., based on an equipment failure). In either case, when maintenance for a particular dock is designated, the main server 132 generates a notification confirming the action taken by the user. The main server 132 may also transmit a notification (e.g., via text or email) to the maintenance manager to indicate the particular dock door has been put out of service for maintenance. Additionally, the main server 132 updates the dock monitoring web page 2400 by rendering one or more maintenance icons 2434 (e.g., orange cones) associated with the particular door designated for maintenance (e.g., the tenth door in the illustrated example of FIG. 24). Additionally or alternatively, the maintenance status of the door may be reflected in the example maintenance and asset management summary block 2108 of the overview web page 2100 of FIG. 21 (as represented at reference numeral 2114). Further, the main server 132 may transmit the status of the door to the dock controller 116 associated with the particular dock to display a notification on the local display screen 117 that the door is down for maintenance and/or out of service.

Once maintenance is complete, a user may indicate such through a maintenance completion popup 3300 as shown in FIG. 33. As shown in the illustrated example, completion of maintenance may be timestamped to track when maintenance on each dock occurs. After indicating the completion of maintenance, the main server 132 may again update the dock monitoring web page 2400 by removing the maintenance icons 2434 and designating the dock as being available for trailers.

FIG. 34 illustrates an example graphical user interface corresponding to a dock status web page 3400. In some examples, the dock status web page 3400 of FIG. 34 includes similar information of that shown in the dock monitoring web page 2400 of FIG. 24, except that the information in FIG. 34 is represented in a tabular format to enable reordering and/or filtering of the data. In some examples, the dock status web page 3400 of FIG. 34 may include additional and/or different information from the dock monitoring web page 2400 of FIG. 24. For instances, as shown in FIG. 34, the example dock status web page 3400 may include information identifying the driver, the company, the type of loading and/or unloading, the amount of cargo to be loaded and/or unloaded, the time of check-in and check-out, overage charge rules associated with the driver/company, etc.

Figure 35:
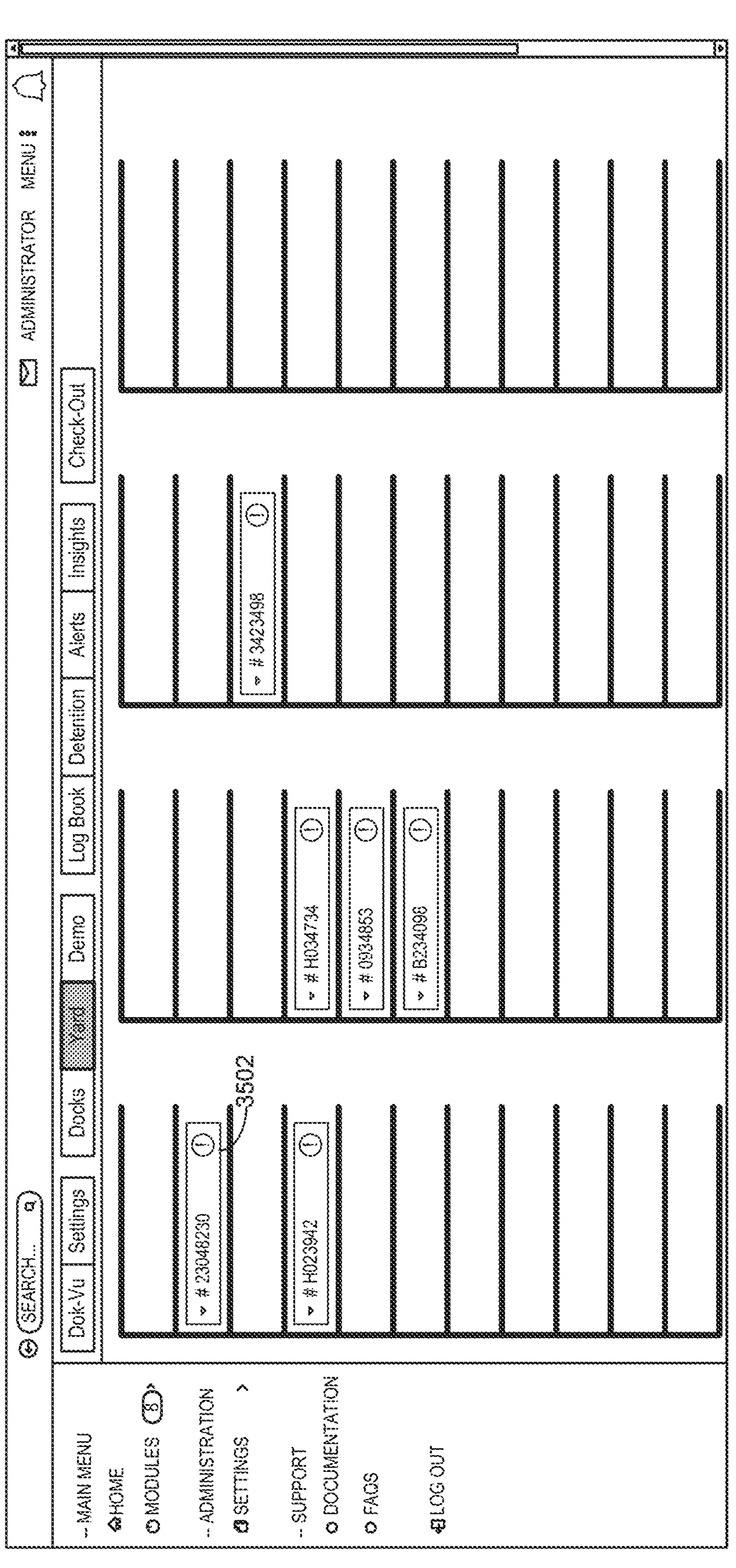
Figure 36:
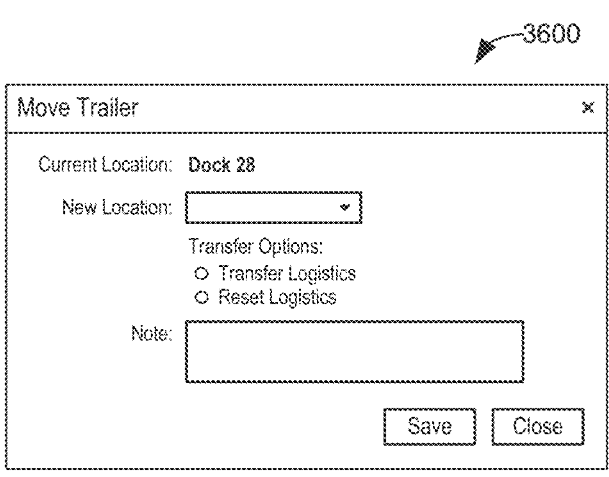

FIG. 35 illustrates an example graphical user interface presented by a yard management web page 3500 that included trailer icons 3502 similar to the trailer icons 2402 of FIG. 24 located within parking lots representative of the yard of the material handling facility. In some examples, a user may identify a particular trailer to be moved, either to a new parking spot within the yard or to a particular dock, using the trailer movement popup 3600 shown in FIG. 36. In some examples, once the new location for the selected trailer has been specified, the main server 132 automatically transmits a notification to the yard jockey or spotter in the yard indicated what trailer needs to be moved and to where. Additionally, the main server 132 may automatically update the yard management web page 3500 and/or the dock monitoring web page 2400 to reflect the changed location of the trailer.

Figure 37:
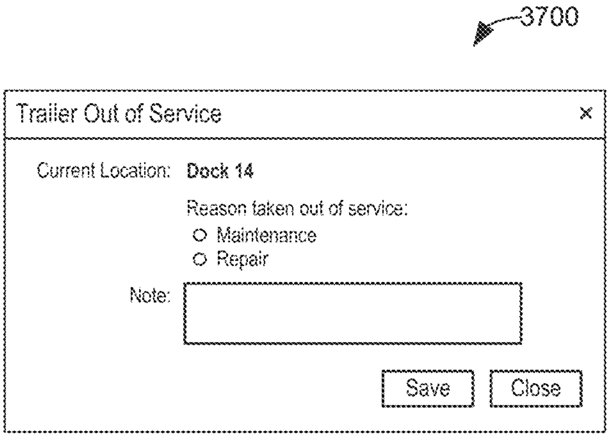

Further, in some examples, a user may designate a particular trailer in the yard to be taken out of service for maintenance or repairs via an out of service popup 3700 shown in FIG. 37. In some such examples, the main server 132 automatically transmits a notification to the yard jockey to take the designated trailer out of service. The main server 132 may also automatically transmit a notification (e.g., via an email) to a trailer maintenance vendor that the trailer has been taken out of service and needs to be repaired.

Figure 38:
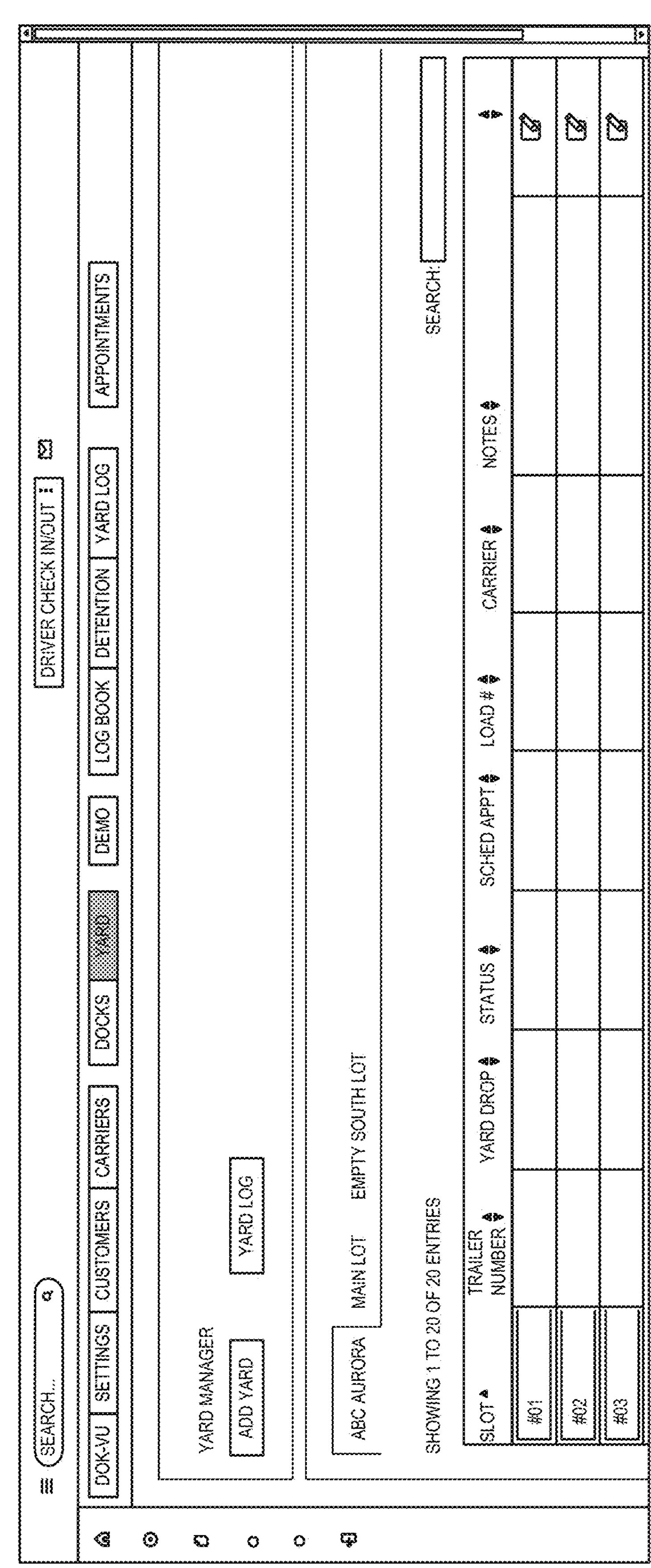

FIG. 38 illustrates an example graphical user interface corresponding to a yard status web page 3800. In some examples, the yard status web page 3800 of FIG. 38 includes similar information of that shown in the yard management web page 3500 of FIG. 35, except that the information in FIG. 38 is represented in a tabular format to enable reordering and/or filtering of the data. In some examples, the yard status web page 3800 of FIG. 38 may include additional and/or different information from the dock monitoring web page 2400 of FIG. 24. For instances, as shown in FIG. 38, the example yard management web page 3500 of FIG. 35 may include information identifying a slot number, a trailer number, a yard drop, a status, a scheduled appointment, a load number, a carrier, etc.

Figure 39:
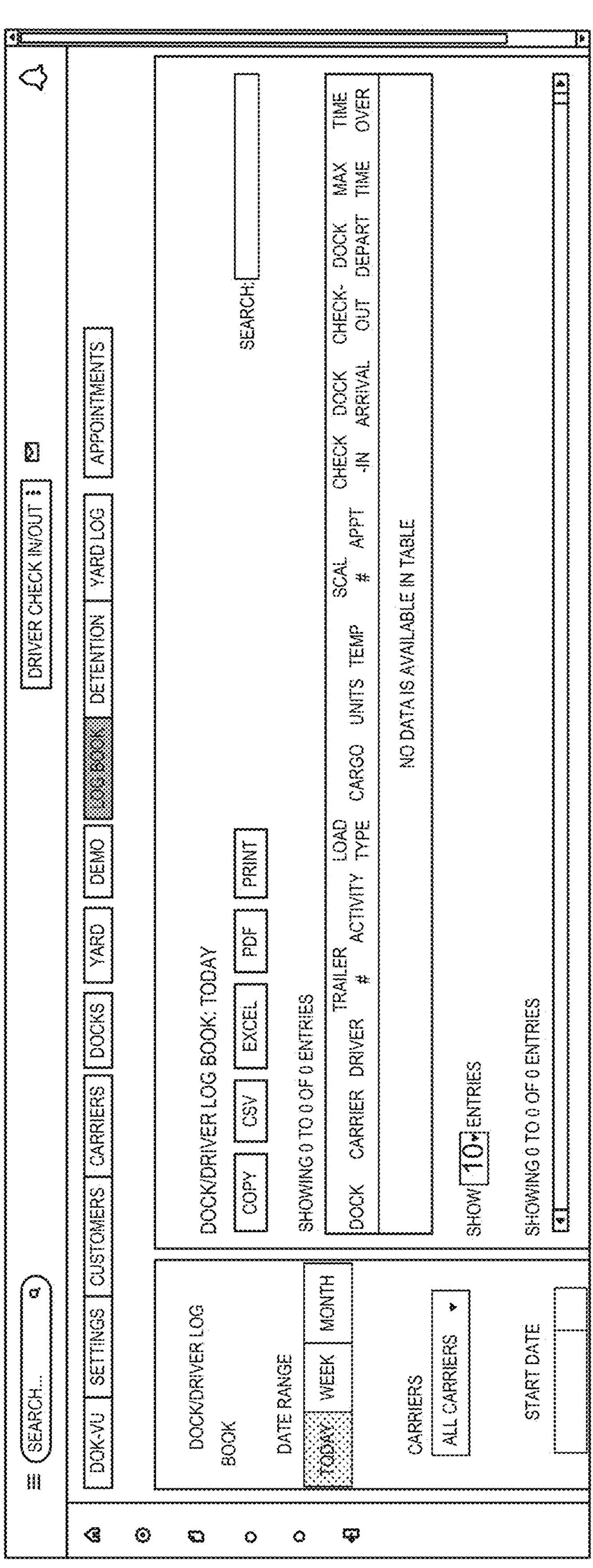
Figure 40:
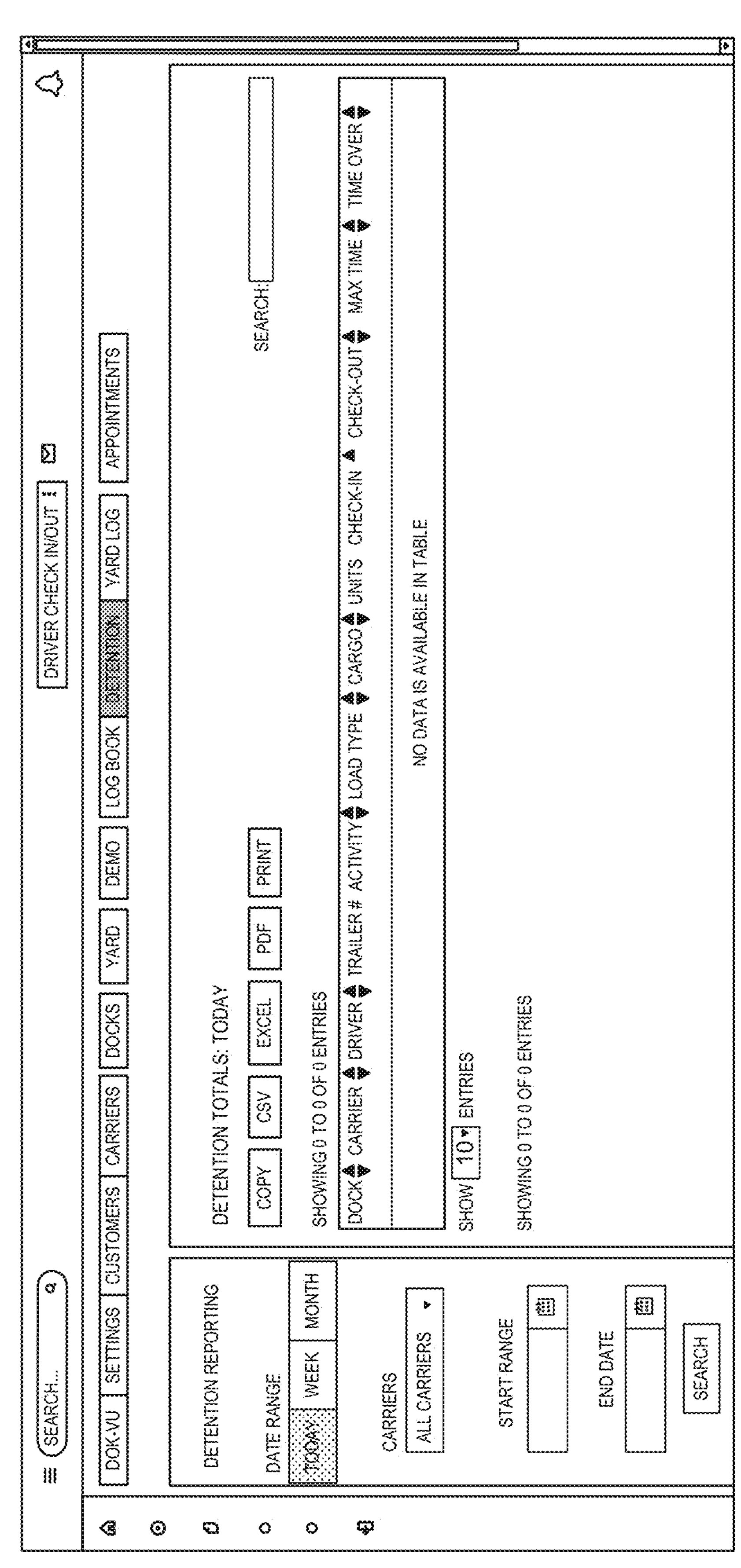
Figure 41:
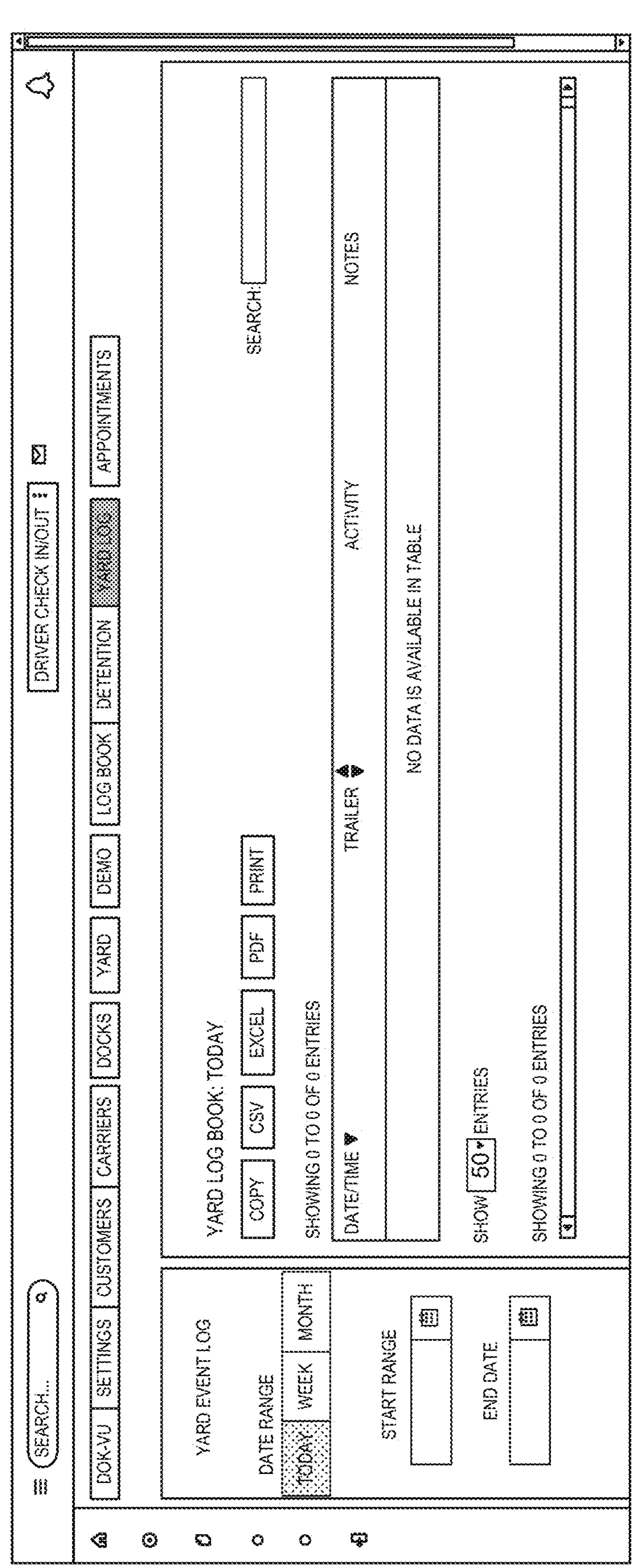
Figure 42:
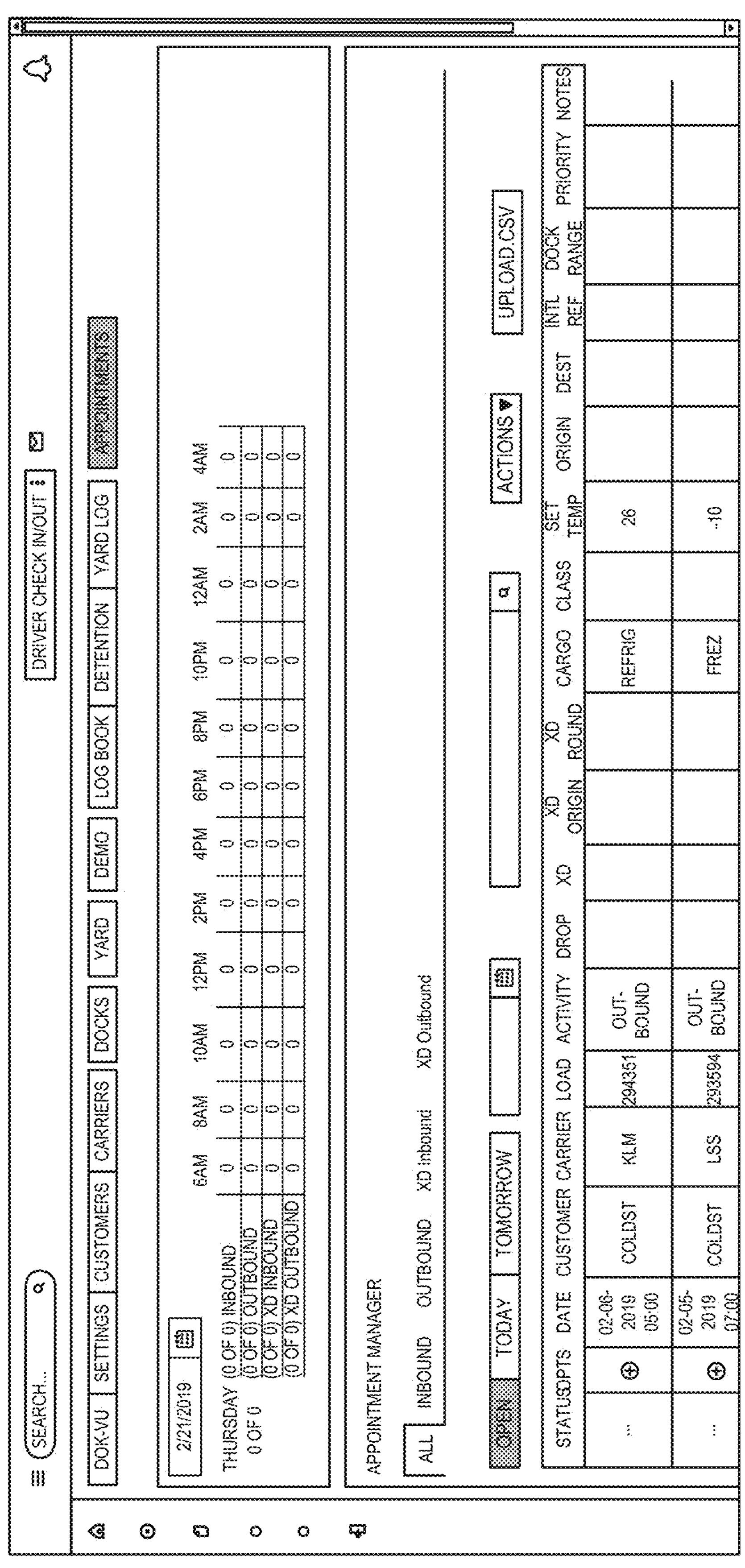

FIG. 39 illustrates an example graphical user interface corresponding to a dock/driver log book web page 3900. The example dock/driver log book web page 3900 is a searchable repository of information pertaining to the loading and unloading of trailers at docks and the associated carriers and drivers of the trucks associated with such trailers. FIG. 40 illustrates an example graphical user interface corresponding to a detention web page 4000. The example detention web page 4000 of FIG. 40 is similar to the dock/driver log book web page 3900 of FIG. 39, except that the information represented in FIG. 40 is specific to trailers and/or docks associated with detention charges. FIG. 41 illustrates an example graphical user interface corresponding to a yard log book web page 4100. The example yard log book web page 4100 of FIG. 41 is similar to the dock/driver log book web page 3900 of FIG. 39, except that the information represented in FIG. 41 is specific to trailers parked in the yard associated with the material handling facility 100. FIG. 42 illustrates an example graphical user interface corresponding to an appointment summary web page 4200. The appointment summary web page 4200 provides a summary of scheduled appointments of trailers and relevant information associated with such appointments.

Figure 43:
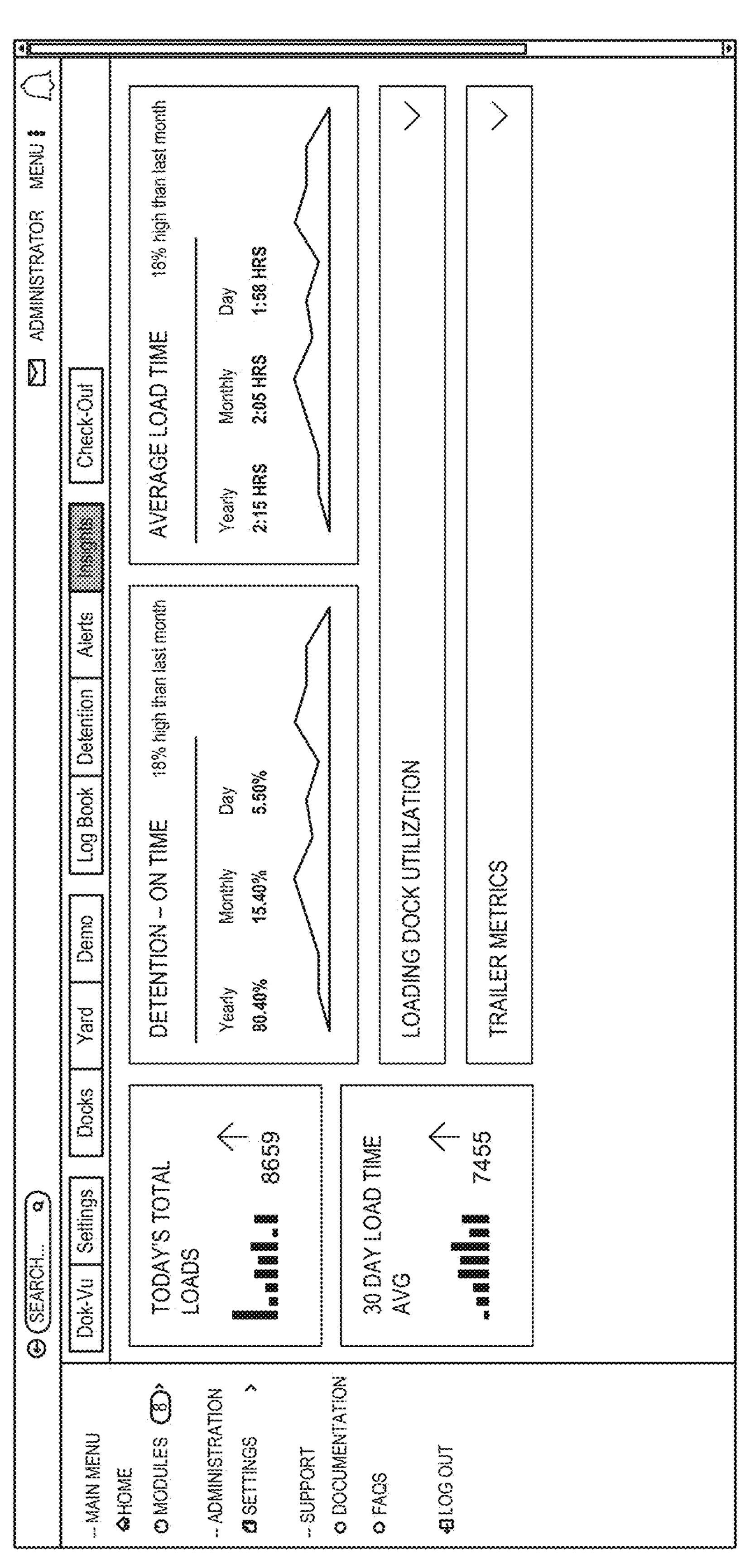

FIG. 43 illustrates an example graphical user interface presented by a loading dock statistics web page 4300 that provides various statistics about the efficiency and utilization of different docks in the material handling facility. For example, the example web page 4300 provides statistics about detention and average loading times. In some examples, users may manually input loading dock capacities.

FIG. 44 illustrates an example graphical user interface corresponding to a video event archive web page 4400. The example video event archive web page 4400 provides a list of detected events that are associated with a captured video segment. In the illustrated example, the video events are listed with the most recently detected events on top. In some examples, recently occurring events may not yet have the video available because the post-event time interval and subsequent processing has not yet elapsed. However, in some such examples, the video event is nevertheless listed in the video event archive with an indication that the video segment is still being processed. Once a video has been processed, a thumbnail of the video is provided with the displayed video event. As described above, the thumbnail may be taken from a particular frame of the video segment as defined by the configured thumbnail offset time. In some examples, any particular video segment may be replayed if selected by a user. In some examples, the archived list of video segments may be filtered based on time period, camera, and/or type of event. The types of events selected in the illustrated example include video segments capturing doors being open for longer than 30 seconds and video segments capturing traffic violations.

Figure 45:
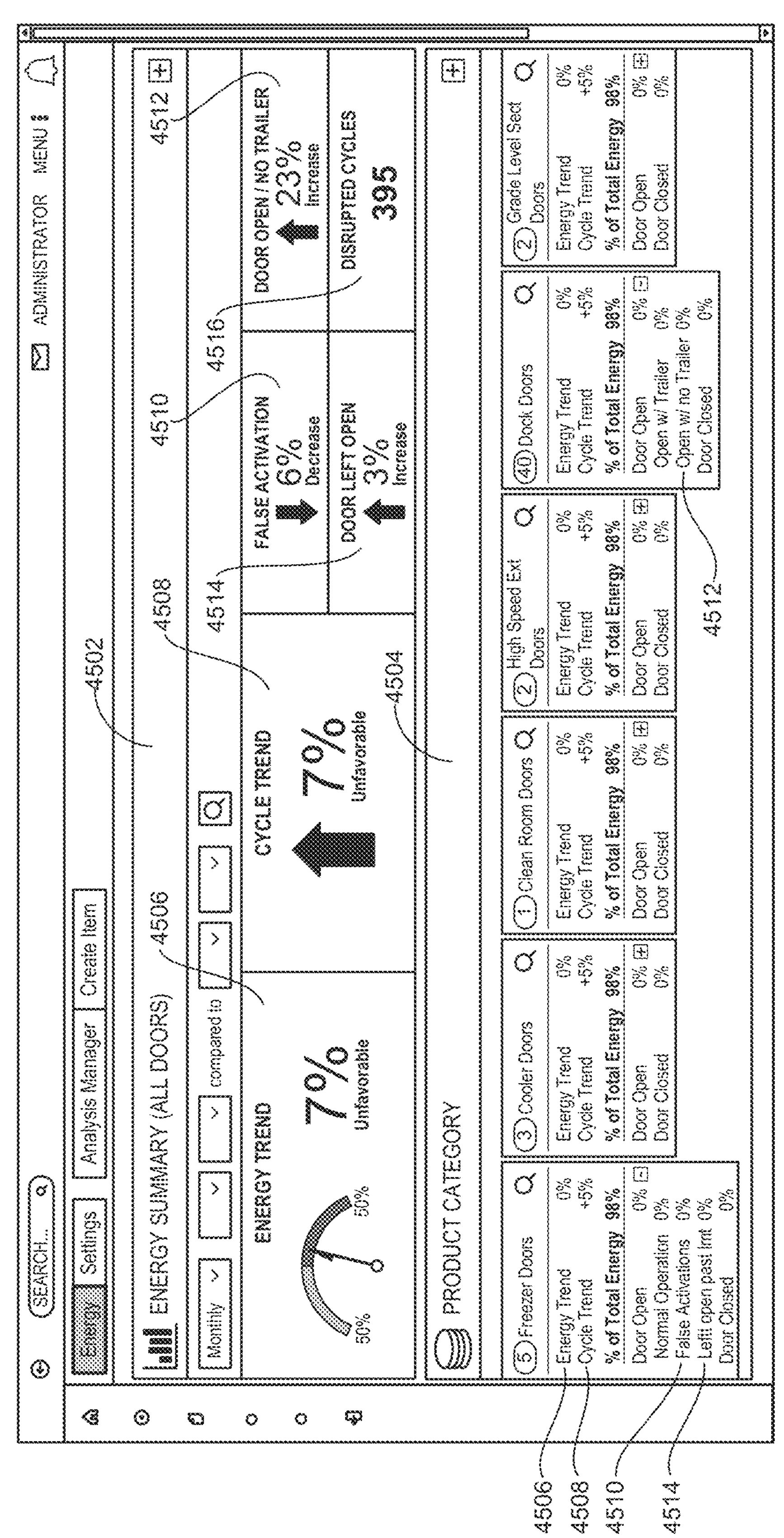

The usage of doors within the material handling facility 100 (both dock doors and internal doors) can have a significant impact on energy consumption because open doors may result in the free transfer of conditioned air (either heated or cooled) from one area to another creating the need for additional heat generation or cooling of the air in certain designated areas. When the doors are kept closed and/or opened only as needed, transfer of heat between partitioned areas is significantly reduced. Accordingly, examples disclosed herein monitor the usage of doors within the material handling facility 100 to identify when doors are opened too long, opened too frequently, opened when not necessary, and/or used in other matters having a deleterious impact on the energy requirements of the facility. In some examples, information corresponding to the monitored doors is provided via an energy monitoring web page 4500 as shown in FIG. 45.

The example energy monitoring web page 4500 provides summary statistics related to the use of doors through the material handling facility 100. In some examples, a facility summary block 4502 is provided that includes summary information representative of all doors within the facility. Additionally or alternatively, a product category summary block 4504 includes summary information broken down by different products or types of doors used in the facility. The types of doors may include freezer door, cooler doors, clean room doors, high speed exterior doors, dock doors (e.g., the dock doors 104 of FIG. 1), grade level sectional doors, etc. In the illustrated example, the facility summary block 4502 and the product category summary block include energy trend indicators 4506, cycle trend indicators 4508, false activation indicators 4510, no trailer door opening indicators 4512, door left open indicators 4514, and a disrupted cycles indicator 4516 (shown only in the facility summary block 4502 of the illustrated example). The indicators 4506, 4508, 4510, 4512, 4514, 4516 within the facility summary block 4502 indicate values corresponding to all doors being monitored within the material handling facility 100. By contrast, the indicators 4506, 4508, 4510, 4512, 4514 within the product category summary block 4504 indicate corresponding values but limited to the particular type of door in each represented product category.

The example energy trend indicators 4506 indicate a trend of energy usage calculated based on the usage of doors (e.g., the frequency and duration they are opened) and relevant energy characteristics associated with doors (e.g., temperature/humidity/pressure differences on either side of a door) within the material handling facility 100. In some examples, the trend is based on a comparison of a current period of time (e.g., current month) relative to a previous period of time (e.g., the previous month). The particular period of time used to calculate the trend may be any suitable period of time (e.g., 3 days, one week, two weeks, one month, etc.). In some examples, if the trend falls below a threshold (e.g., becomes negative), the main server 132 may automatically transmit a notification to the warehouse manager, general manager, and/or other relevant personnel to alert them to the fact that a negative energy trend has been detected and that they may refer to the energy monitoring web page 4500 for additional detail. Additionally or alternatively, an alert may be represented within the energy summary block 2104 on the overview web page 2100 shown in FIG. 21.

The example cycle trend indicators 4508 indicate a trend of the number of cycles (e.g., the number of times a door opens and closes) undergone by the associated doors within the material handling facility 100 over a period of time (e.g., one week, two weeks, one month) relative to a previous period of time. In some examples, if the trend exceeds a threshold, the main server 132 may automatically transmit a notification to the warehouse manager, general manager, and/or other relevant personnel to alert them to the fact that relatively high activity for the doors has been detected and that they may refer to the energy monitoring web page 4500 for additional detail. Additionally or alternatively, an alert may be represented within the energy summary block 2104 on the overview web page 2100 shown in FIG. 21. In some examples, rather than indicating a trend, the cycle trend indicators 4508 may represent an absolute value of the number of cycles for one or more doors over a relevant period. In some such examples, the alert and/or notification may be triggered when the number of cycles for the relevant door(s) exceeds a particular threshold.

The example false activation indicators 4510 indicate a trend of the false activations undergone by the associated doors within the material handling facility 100 over a period of time (e.g., one week, two weeks, one month) relative to a previous period of time. As used herein, a false activation refers to the circumstance when a door moves from a closed position (e.g., partially or fully opened) and subsequently closes without any traffic passing therethrough. Thus, false activations are associated with unnecessary door openings that can unnecessarily increase energy consumption at a material handling facility and pose increased burdens on HVAC systems to maintain controlled temperature environments. Monitoring false activations depends upon a unique combination of sensors that detect when a door opens and closes (e.g., based on feedback from a limit switch) and sensors that detect whether a person or object passes through the open doorway (e.g., based on feedback from a photoelectric eye that extends across the opening associated with the door). Thus, feedback from this combination of sensors needs to be synchronized in time so that the presence detection corresponds to periods when the door is open. In some examples, if the false activation trend exceeds a threshold, the main server 132 may automatically transmit a notification to the warehouse manager, general manager, and/or other relevant personnel to alert them to the fact that relatively high rate of false activations for the doors has been detected and that they may refer to the energy monitoring web page 4500 for additional detail. Additionally or alternatively, an alert may be represented within the energy summary block 2104 on the overview web page 2100 shown in FIG. 21. In some examples, rather than indicating a trend, the false activation indicators 4510 may represent an absolute value of the number of false activations for one or more doors over a relevant period. In some such examples, the alert and/or notification may be triggered when the number of false activations exceeds a particular threshold.

The example no trailer door opening indicators 4512 indicate a trend of the number of times the dock doors have been opened when no trailer was present at the dock over a period of time (e.g., one week, two weeks, one month) relative to a previous period of time. As with the false activation indicators 4510, the no trailer door opening indicators 4512 are generated based on a combination of sensors including sensors that monitor the status (e.g., open or closed) of a door and separate sensors that monitor the presence of a trailer at the dock. In some examples, if the trend exceeds a threshold, the main server 132 may automatically transmit a notification to the warehouse manager, general manager, and/or other relevant personnel to alert them to the fact that relatively high activity for the doors has been detected and that they may refer to the energy monitoring web page 4500 for additional detail. Additionally or alternatively, an alert may be represented within the energy summary block 2104 on the overview web page 2100 shown in FIG. 21. In some examples, rather than indicating a trend, the no trailer door opening indicators 4512 may represent an absolute value of the number of doors and/or the number of times one or more particular doors are open when no trailer is present over a relevant period. In some such examples, the alert and/or notification may be triggered when the number of door openings with no trailer present exceeds a particular threshold.

The example door left open indicators 4514 indicate a trend of the number of doors that are left open beyond a threshold duration (e.g., 1 minute, 2 minutes, 5 minutes, etc.) over a period of time (e.g., one week, two weeks, one month) relative to a previous period of time. In some examples, if the trend exceeds a threshold, the main server 132 may automatically transmit a notification to the warehouse manager, general manager, and/or other relevant personnel to alert them to the fact that the rate at which doors are being maintained in an open state is relatively high. Additionally or alternatively, an alert may be represented within the energy summary block 2104 on the overview web page 2100 shown in FIG. 21. In some examples, rather than indicating a trend, the door left open indicators 4514 may represent an absolute value of the number of times one or more doors are left open beyond the corresponding threshold duration over a relevant period. In some such examples, the alert and/or notification may be triggered when the number of door openings beyond the duration limit exceeds a particular threshold.

The example disrupted cycles indicator 4516 indicates the number of times a disrupted cycle for the relevant doors is detected over a period of time (e.g., one week, two weeks, one month). A disrupted cycle refers to when a door was in the process of being closed but then reversed direction because something was detected as crossing through the doorway under the path of the door. Although the absolute value of the number of disrupted cycles are provided in the illustrated example, in other examples, the disrupted cycles indicator 4516 may be representative of a trend in the number of disrupted cycles during a current period of time relative to a previous period of time.

As described above, FIG. 45 illustrates summary statistics at the facility level (e.g., within the facility summary block 4502) and at the product category level (e.g., within the product category summary block 4504). In some examples, a user may drill down further levels to access energy related information associated with individual doors as shown in the example product summary web page 4600 of FIG. 46. In some such example, similar information as described above may be provided except that the information is specific to the individual door(s) selected for display via the energy monitoring web page 4500.

In some examples, a warehouse manager, a general manager, and/or other personnel may desire to track or compare the impact of the usage of doors on energy consumption after making corrective actions in response to any of the negative energy trends outlined above. Accordingly, in some examples, the energy monitoring web page 4500 provides a user with the ability to set or schedule a timeframe during which energy metrics are collected and monitored and then automatically generate an energy corrective action report at the scheduled point of time in the future. In some examples, once the scheduled time arrives, the main server 132 generates the report and transmits a notification to the warehouse manager, general manager, and/or other relevant individuals to confirm the report is ready.

Figure 47:
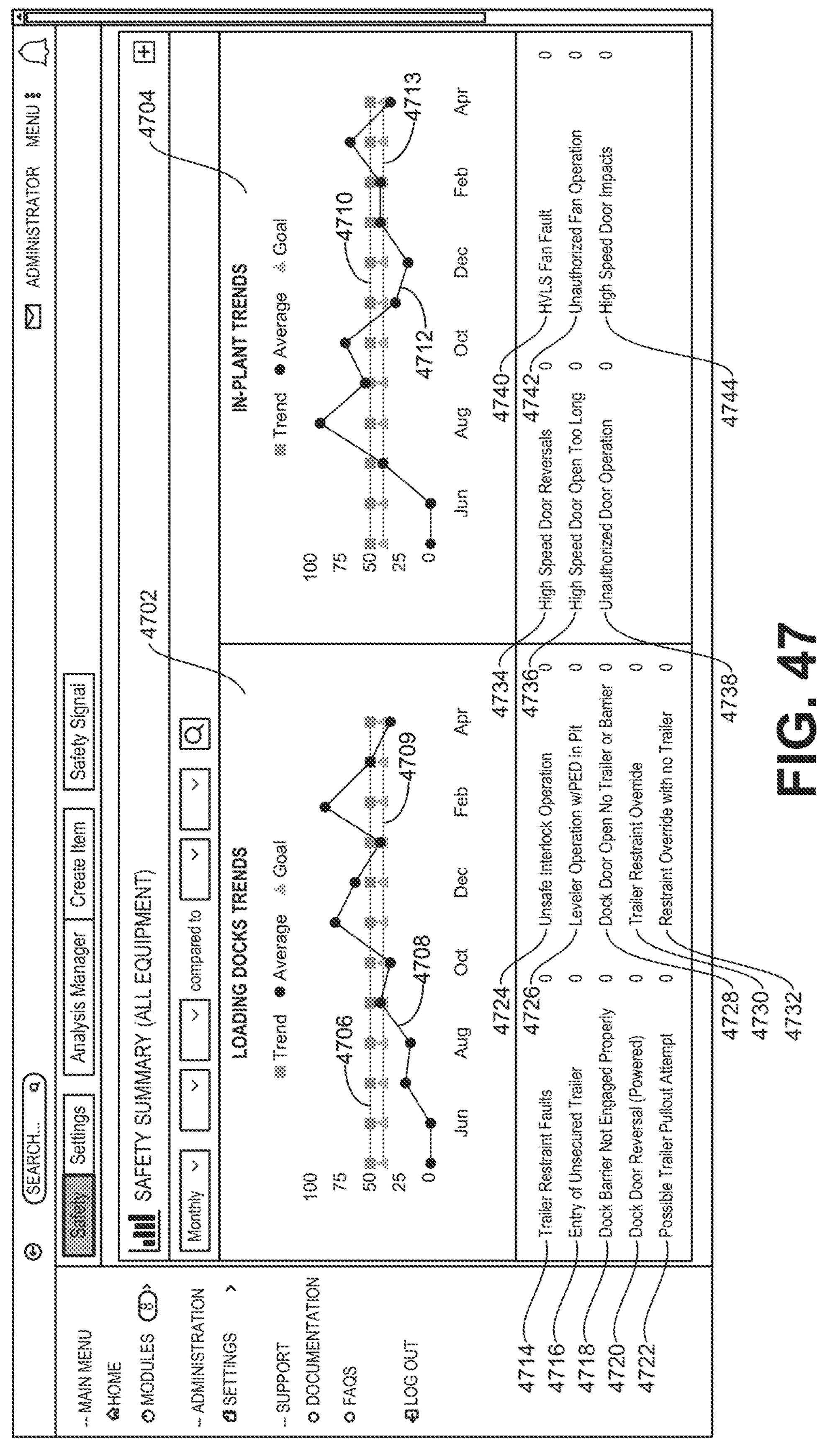

FIG. 47 illustrates an example graphical user interface presented by a safety monitoring web page 4700 that provides summary statistics of events associated with safety within and around the material handling facility 100. The example safety monitoring web page 4700 includes a loading dock trend summary 4702 and an in-plant trend summary 4704. The example loading dock trend summary 4702 includes a long-range trendline 4706 representative of a trend of the number of safety events detected at the loading docks 102 shown in FIG. 1 over an extended period of time (e.g., a twelve-month moving average). Further, the example loading dock trend summary 4702 includes a short-term trendline 4708 representative of a short-term change in the number of safety events detected from one period to the next (e.g., month-to-month in the illustrated example). The example loading dock trend summary 4702 also includes a goal line 4709 representative a user-defined target for the number of safety events detected within a relevant period (e.g., one month). The example in-plant trend summary 4704 includes similar long-range and short-term trendlines 4710, 4712 representative of trends of the number of safety events detected at locations within the material handling facility 100 during corresponding periods of time along with a corresponding goal line 4713 indicating the target number of associated safety events.

In some examples, specific values (e.g., counts) of particular types of safety events that contribute to the trendlines 4706, 4708, 4710, 4712 are also provided on the safety monitoring web page 4700 with the corresponding loading dock trend summary 4702 and/or the in-plant trend summary 4704. An example type of safety event associated with the loading docks 102 includes trailer restraint faults 4714. A trailer restraint fault event may be detected when the vehicle restraint 110 fails to operate as expected. In some such examples, in addition to representing the occurrence of such a fault on the safety monitoring web page 4700, the main server 132 may also automatically transmit a notification to report the detected trailer restraint fault to relevant individuals.

Another example type of safety event associated with the loading docks includes the entry of an unsecured trailer 4716. An entry of an unsecured trailer event may be detected when the motion sensor 204 detects movement within a trailer while the vehicle restraint 110 is not engaged with the trailer (e.g., based on feedback from a restraint sensor). In some such examples, the main server 132 automatically transmits a notification to the safety manager, the shipping and receiving manager, and/or other personnel to report the unsafe entry into an unsecured trailer at the corresponding dock. Additionally or alternatively, the main server 132 may record the detected event in an alert or event log for later access and review. Further, the main server 132 may transmit relevant information back to the dock controller 116 associated with the particular dock to provide a notification on the local display screen 117 that the trailer is not secure.

Another example type of safety event associated with the loading docks includes a dock barrier not engaged properly 4718. Such an event may be detected when there is not feedback from the barrier sensor (e.g., a magnetic resonance switch) indicating the doorway barrier 106 has been extended across a doorway associated with a door 104 that is opened with no trailer being detected as present. In some such examples, the main server 132 automatically transmits a notification to the safety manager, the shipping and receiving manager, and/or other personnel to report the improper engagement of the barrier at the corresponding dock. Additionally or alternatively, the main server 132 may record the detected event in an alert or event log for later access and review.

Another example type of safety event associated with the loading docks includes a dock door reversal 4720. A dock door reversal corresponds to when a disrupted cycle is detected at a dock door. In some such examples, the main server 132 automatically transmits a notification to the appropriate personnel to report the door reversal at the corresponding dock. Additionally or alternatively, the main server 132 may record the detected event in an alert or event log for later access and review.

Another example type of safety event associated with the loading docks includes a possible trailer pullout attempt 4722. Such an event may be detected when a truck driver or spotter attempts to remove a trailer from a dock when it is unsafe to do so (e.g., the dock leveler 108 is still in an active position, the door 104 is still open, the vehicle restraint 110 is still engaged, etc.). In some such examples, the main server 132 automatically transmits a notification to the safety manager and/or other personnel to indicate the possibility of an unsafe pullout attempt at the particular dock. Additionally or alternatively, the main server 132 may record the detected event in an alert or event log for later access and review. Further, the main server 132 may transmit relevant information to the dock controller 116 associated with the particular dock to enable a notification on the local display screen 117 that indicates a possible pullout attempt has been detected.

Although there may have been no attempt to pullout a trailer, a trailer may nevertheless shift or move relative to the dock during the loading and/or unloading of the trailer. Inadvertent movement of a trailer in this manner is sometimes referred to as "trailer creep." In some situations, trailer creep may position the trailer such that the vehicle restraint 110 cannot be released and disengaged from the trailer. In some examples, a sensor may detect trailer creep, which may trigger the main server 132 to transmit a notification to the yard jockey or spotter to proceed to the corresponding dock to release the trailer (e.g., reposition the trailer to be released from the vehicle restraint 110). Additionally or alternatively, the main server 132 may record the detected event in an alert or event log for later access and review.

Another example type of safety event associated with the loading docks includes an unsafe interlock operation 4724. An unsafe interlock operation may be detected when certain operations are done out of order. For example, door 104, dock leveler 108, and the vehicle restraint 110 may be interlocked relative to one another to control the order of their operation. In particular, when a trailer is being positioned at a dock for loading or unloading the dock leveler 108 may not be activated before the door 104 is opened, and the door 104 may not be opened before the vehicle restraint 110 has engaged the trailer. In some examples, the reverse order of operations is enforced to release a trailer from a loading dock. Thus, an unsafe interlock operation event may be detected when operations are done out of order, or at least, when operations are attempted to be done out of order. In some examples, the improper order of operations may be prevented by the interlock system configured for the components. However, the mere attempt to deviate from the correct sequence of operations can pose a safety concern because it may indicate the person does not understand the correct sequence. This can be a significant concern, especially when other docks may be configured without interlocked components. In some examples, an unsafe interlock operation may constitute a safety event only when the frequency of such an operation exceeds a certain threshold. In some such examples, the main server 132 automatically transmits a notification to the safety manager, the shipping and receiving manager, and/or other personnel to report an unsafe interlock event (or a relatively high trend of such) detected at the particular door. Additionally or alternatively, the main server 132 may record the detected event in an alert or event log for later access and review. Further, the main server 132 may transmit relevant information to the dock controller 116 associated with the particular dock to provide a notification on the local display screen 117 reminding personnel at the dock to follow the safe sequence of operations.

Another example type of safety event associated with the loading docks includes a leveler operation with motion detected in the pit 402 (which may be indicative of a pedestrian in the pit). Such an event may be detected when a person attempts to lower a vertically stored dock leveler 108 while motion (inferred to be a person) is detected in the leveler pit 402. In some such examples, the main server 132 automatically transmits a notification to the safety manager, the shipping and receiving manager, and/or other personnel to report the unsafe operation of a dock leveler at the corresponding dock when a pedestrian may be in the leveler pit. Additionally or alternatively, the main server 132 may record the detected event in an alert or event log for later access and review. Further, the main server 132 may transmit relevant information to the dock controller 116 associated with the particular dock to provide a notification on the local display screen 117 that movement is detected in the leveler pit.

Another example type of safety event associated with the loading docks includes a dock door open with no trailer or barrier 4728. Such an event may be detected when the dock barrier 106 is not crossing the doorway of an open dock door when no trailer is detected as being present. This presents a safety concern because the open door without a trailer presents an unsafe drop-off. In some examples, upon detection of such an event, the main server 132 automatically transmits a notification to the safety manager, the shipping and receiving manager, and/or other personnel to report that the particular dock door is open with no trailer present. Additionally or alternatively, the main server 132 may record the detected event in an alert or event log for later access and review. Further, the main server 132 may transmit relevant information to the dock controller 116 associated with the particular dock to provide a notification on the local display screen 117 instructing personnel in the area to either close the door or extend the barrier across the open doorway.

Another example type of safety event associated with the loading docks includes a trailer restraint override 4730. A trailer restraint override event may be detected when a person deactivates or overrides the operation of the vehicle restraint 110. In some examples, such activity may constitute a safety event only when the frequency at which the override operation occurs exceeds a certain threshold. When a trailer restraint override event is detected, the main server 132 automatically transmits a notification to the safety manager, the shipping and receiving manager, and/or other personnel to report that override event (or the relatively high trend of such activity). Additionally or alternatively, the main server 132 may record the detected event in an alert or event log for later access and review.

Another example type of safety event associated with the loading docks includes a trailer restraint override with no trailer present 4732. This event is similar to the trailer restraint override event discussed above except associated with circumstances where no trailer is detected at the dock. In some examples, when such an event is detected, the main server 132 automatically transmits a notification to the safety manager, the shipping and receiving manager, and/or other personnel to report that the vehicle restraint 110 is in override with no trailer present. Additionally or alternatively, the main server 132 may record the detected event in an alert or event log for later access and review. Further, the main server 132 may transmit relevant information to the dock controller 116 associated with the particular dock to provide a notification on the local display screen 117 instructing personnel in the area to store the vehicle restraint (e.g., remove the override).

An example type of safety event associated with activities within the material handling facility 101 (e.g., that contribute to the in-plant trend summary 4704) include high speed door reversals 4734. A high speed door reversal corresponds to when a disrupted cycle is detected at a high speed internal door. In some examples, high speed door reversals may constitute a safety event only when the frequency of such occurrences exceeds a certain threshold. In some such examples, the main server 132 automatically transmits a notification to the safety manager and/or other personnel to report the door reversal (or a relatively high trend of such at the particular door). Additionally or alternatively, the main server 132 may record the detected event in an alert or event log for later access and review.

Another example type of safety event associated with in-plant activities includes a high speed door open too long 4736. Such an event may be detected when a high speed door is determined to be opened longer than a threshold duration. While such an event can increase energy costs, as described above, a door associated with a cold storage room that is opened too long can also create safety hazards due to potential condensation and buildup of ice. Accordingly, when a door is detected to have been opened too long, the main server 132 may automatically transmit a notification to the safety manager and/or other personnel to report that the relevant door has been left open past the associated time limit. Additionally or alternatively, the main server 132 may record the detected event in an alert or event log for later access and review.

Another example type of safety event associated with in-plant activities includes an unauthorized door operation 4738. An unauthorized door operation may be detected when a person attempts to operate a door in a manner not permitted by the person's security credentials and/or attempts to perform an operation (e.g., change certain parameters associated with the door) without providing the appropriate security password. In some such examples, the main server 132 automatically transmits a notification to the safety manager and/or other personnel to report the unauthorized operation of the relevant door. Additionally or alternatively, the main server 132 may record the detected event in an alert or event log for later access and review. Further, the main server 132 may transmit relevant information to the door controller 122 associated with the particular door at issue to render a notice on a local display screen that access to the attempted operation is denied.

Another example type of safety event associated with in-plant activities includes a high-volume slow-speed (HVLS) fan fault 4740. Such an event may be detected when a fan does not operate as expected. In some such examples, the main server 132 automatically transmits a notification to the safety manager and/or other personnel to report the fan fault. Additionally or alternatively, the main server 132 may record the detected event in an alert or event log for later access and review.

Another example type of safety event associated with in-plant activities includes an unauthorized fan operation 4742. Such an event may be detected when a person attempts to operate a fan in a manner not permitted by the person's security credentials and/or attempts to perform an operation (e.g., change certain parameters associated with the fan) without providing the appropriate security password. In some examples, the main server 132 automatically transmits a notification to the safety manager and/or other personnel to report the unauthorized operation of the relevant fan. Additionally or alternatively, the main server 132 may record the detected event in an alert or event log for later access and review. Further, the main server 132 may transmit relevant information to the fan controller 126 associated with the particular fan at issue to render a notice on a local display screen that access to the attempted operation is denied.

Another example type of safety event associated with in-plant activities includes high speed door impacts 4744. High speed door impacts may be detected when a door sensor detects an object impacting a door. In some examples, the main server 132 automatically transmits a notification to the safety manager and/or other personnel to report that the relevant door has been impacted. Additionally or alternatively, the main server 132 may record the detected event in an alert or event log for later access and review.

Figure 48:
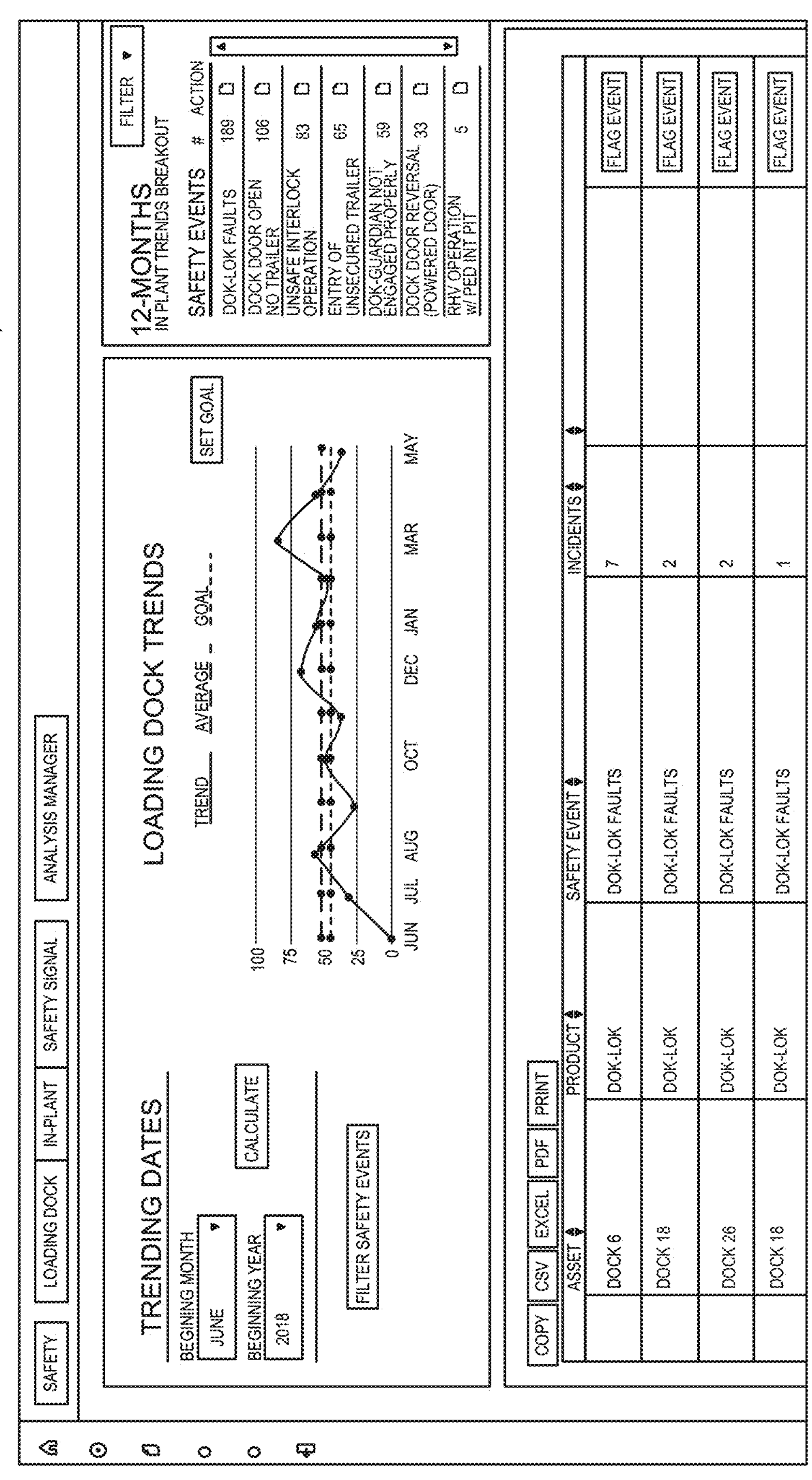
Figure 49:
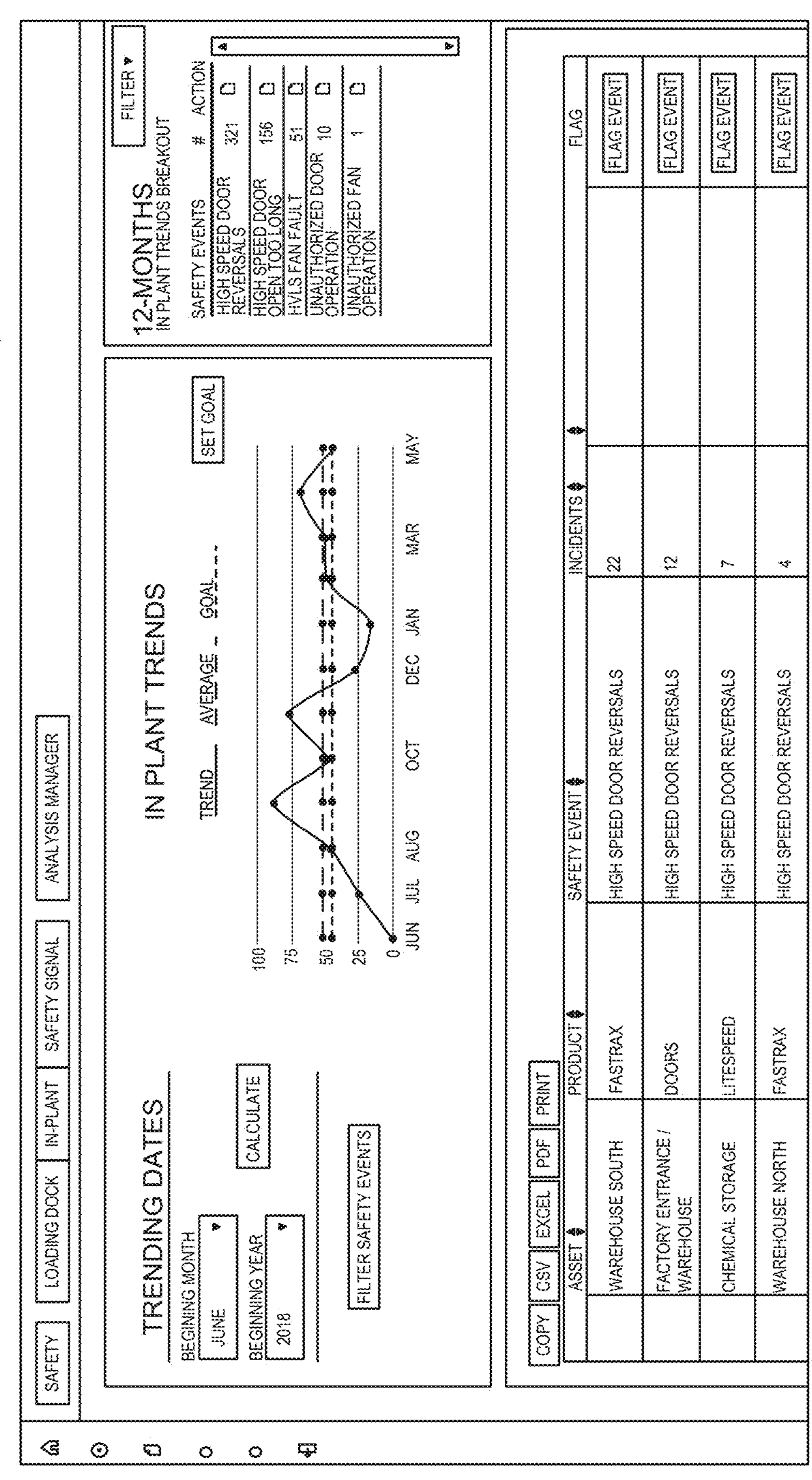

In some examples, by selecting either the loading dock trend summary 4702 or the in-plant trend summary 4704, a user may drill down and access more information. For example, by selecting the loading dock trend summary 4702 of FIG. 7, a detailed loading dock web trends page 4800 may be accessed as shown in FIG. 48. Similarly, by selecting the in-plant trend summary 4704 of FIG. 7, a detailed in-plant trends web page 4900 may be accessed as shown in FIG. 49.

Figure 50:
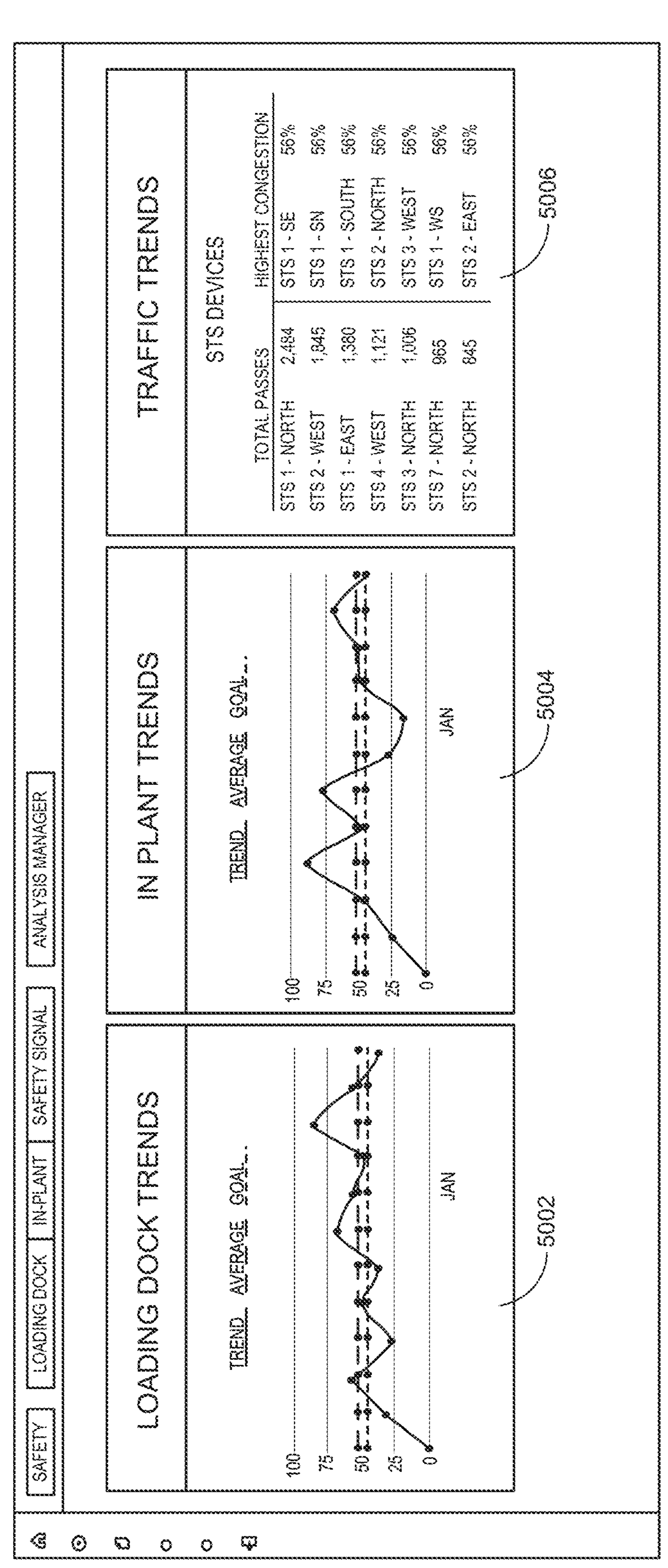

FIG. 50 illustrates another example graphical user interface presented by a safety monitoring web page 5000 that provides summary statistics of events associated with safety within and around the material handling facility 100. As shown in the illustrated example, the safety monitoring web page 5000 includes a loading dock trend summary 5002 and an in-plant trend summary 5004 similar to the loading dock trend summary 4702 and the in-plant trend summary 4704 of FIG. 47. Additionally, the safety monitoring web page 5000 includes a traffic trends summary 5006 that provides summary statistics of the utilization and congestion of different intersections within the material handling facility 100. The congestion statistics are representative of events when two personnel/equipment (people either on foot or in a vehicle (e.g., a forklift) or autonomously operating equipment) approached the same intersection from different directions at substantially the same time.

Figure 51:
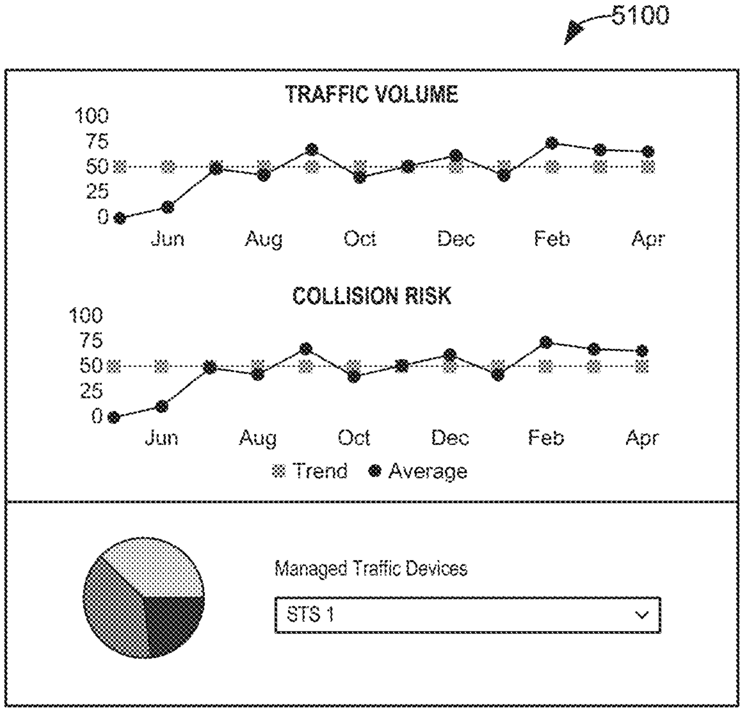

In addition to or instead of the traffic trends summary 5006 shown in FIG. 50, the safety monitoring web page 5000 may include a traffic trend summary 5100 as shown in FIG. 51. The traffic trend summary 5100 provides trend statistics pertaining to the congestion or volume of traffic at one or more intersections within the material handling facility 100 being monitored by traffic sensors. Further, the traffic trend summary 5100 provides trend statistics corresponding to collision risks at one or more intersections. Collision risks are determined based on the number and/or frequency of traffic approaching a single intersection from at least two different directions at the same time. In some example, if the collision risk trend for a particular intersection exceeds a threshold, the main server 132 automatically transmits a notification to the safety manager and/or other personnel to indicate that the intersection presents a relatively high risk for collisions.

Figure 52:
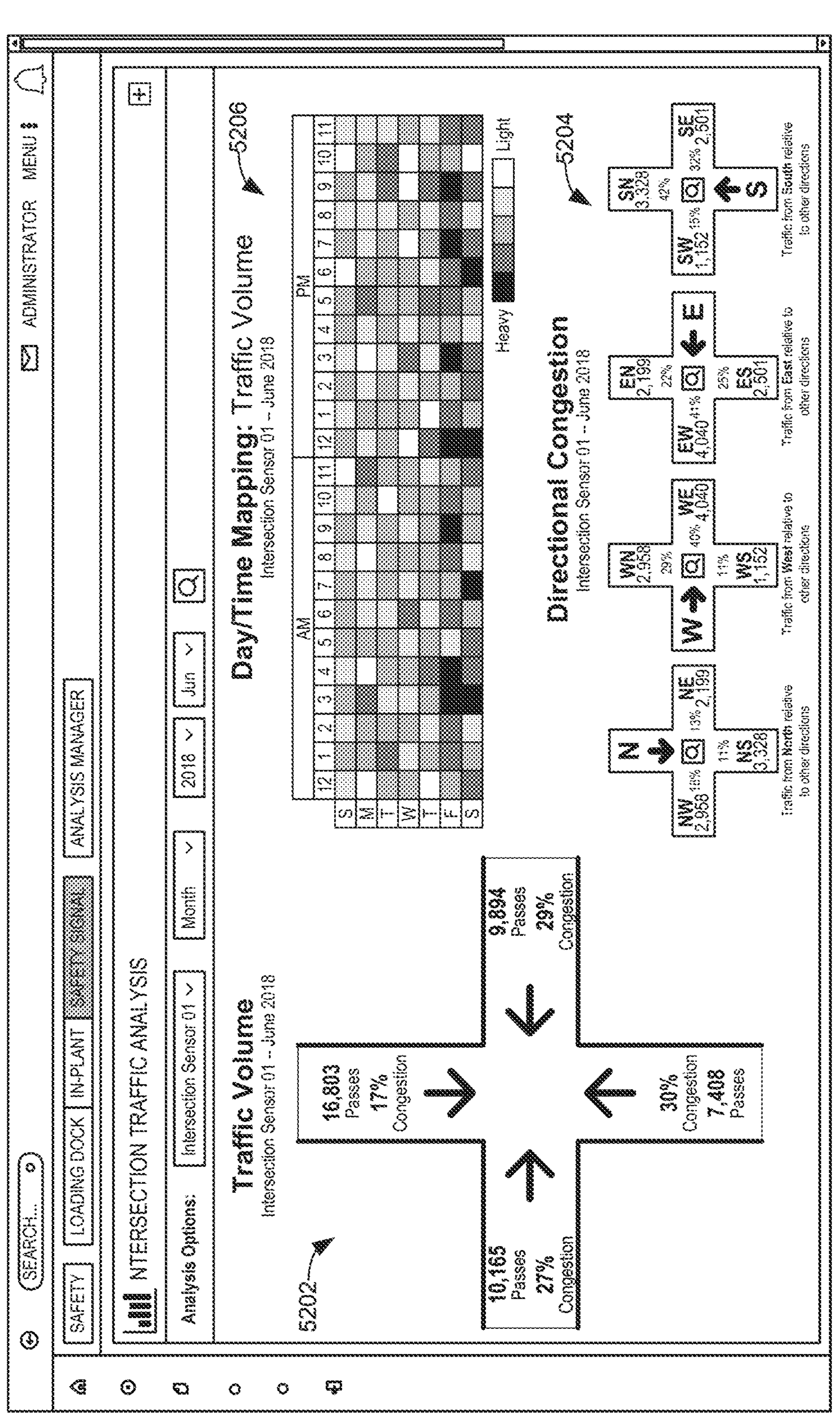
Figure 53:
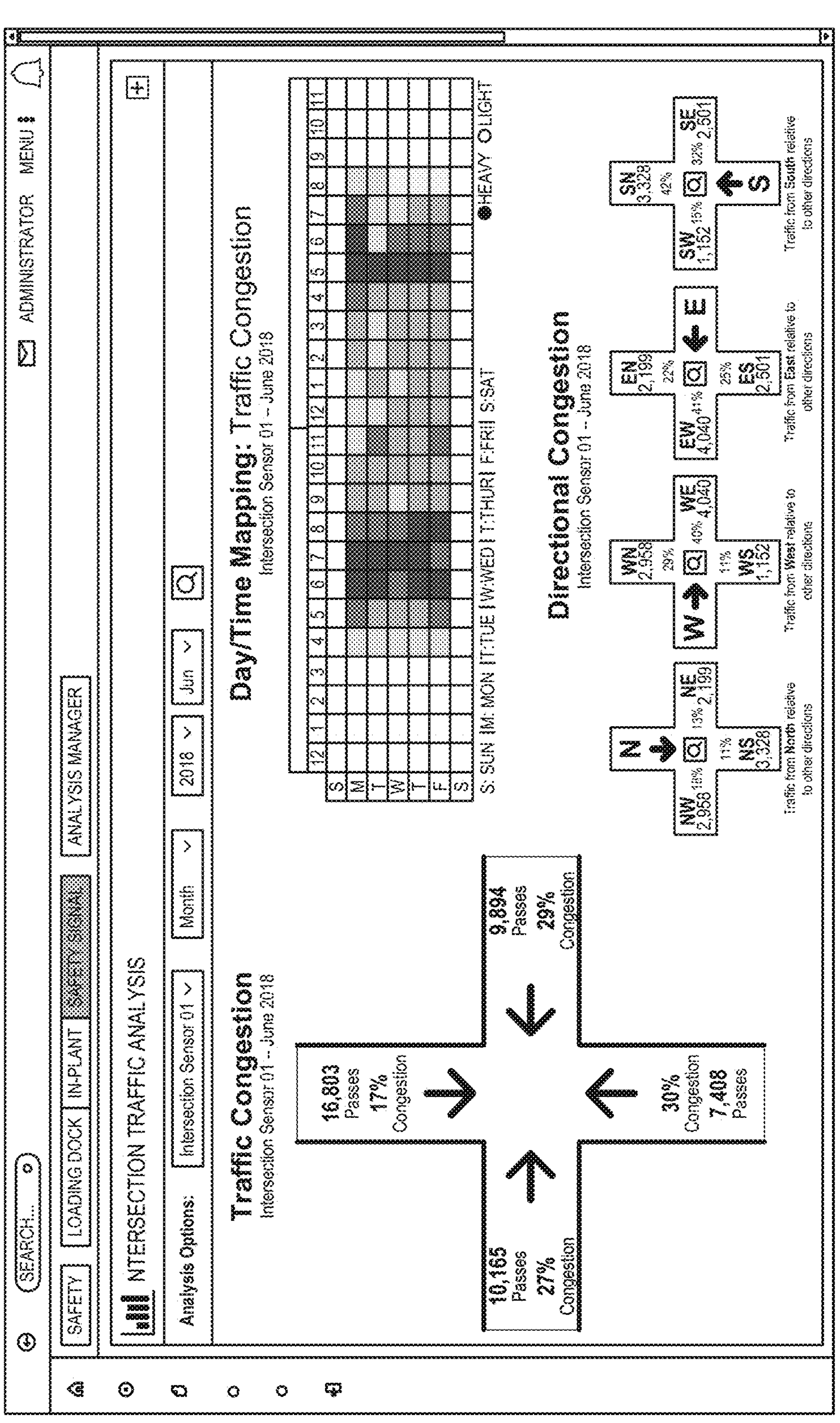

Additional detail regarding the analysis of traffic within the material handling facility 100 may be accessed via an example traffic analysis web page 5200 as shown in FIG. 52. As shown in the illustrated example, an intersection traffic graphic 5202 is provided that represents both the volume and collision risk or congestion of traffic passing through the intersection from each direction over a user-specified period of time for a particular intersection monitored within the material handling facility 100. In the illustrated example, the collision risk or congestion for each direction is calculated as the percentage of all traffic volume from the corresponding direction that approached the intersection at substantially the same time as traffic was approaching from at least one other direction. Further, directional intersection graphics 5204 may be provided to summarize the source of oncoming traffic giving rise to a collision risk based on traffic approaching from each direction.

Figure 54:
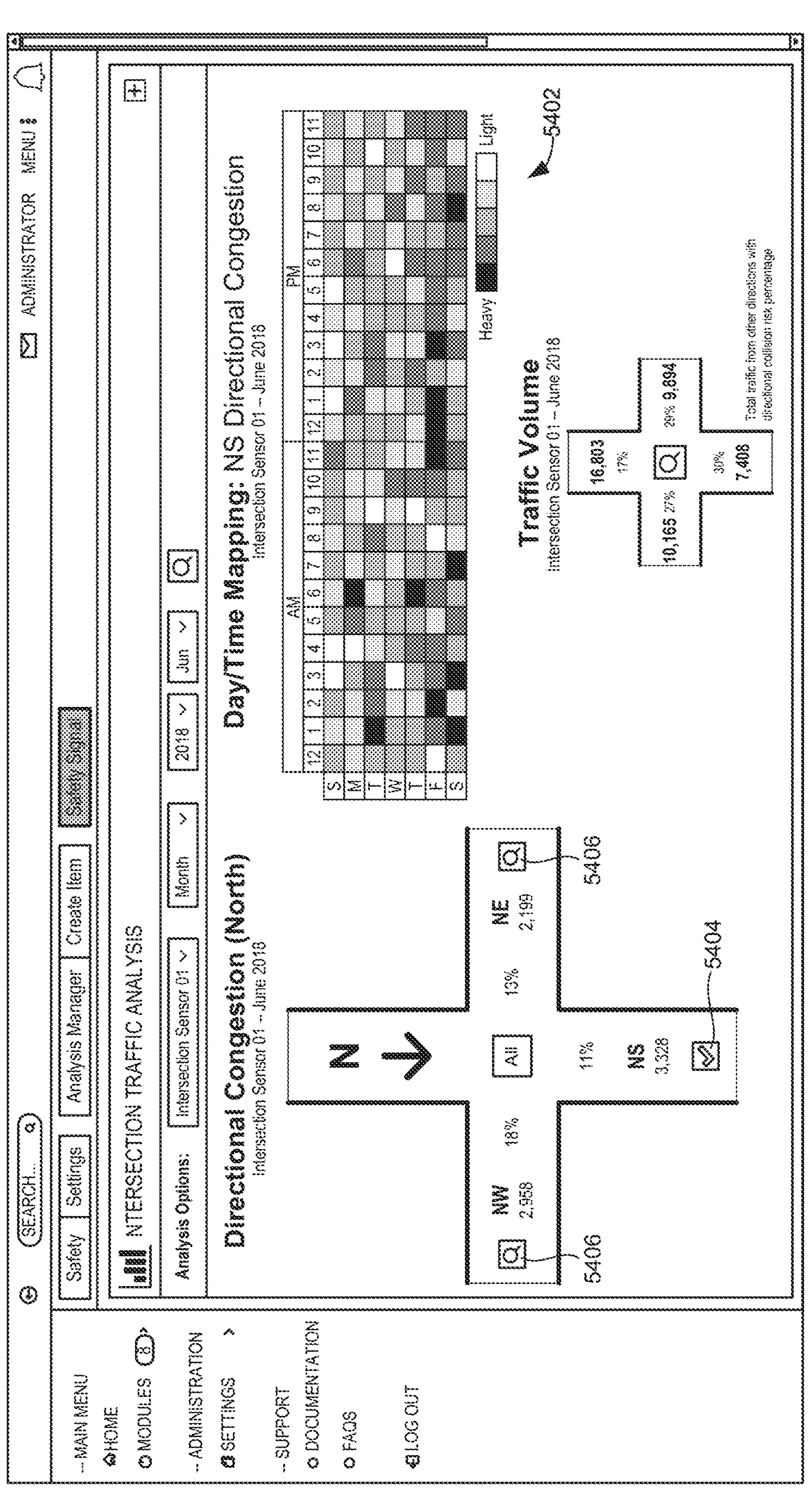

In some examples, the traffic analysis web page 5200 includes a traffic volume heat map 5206 that represents the relative amount of traffic (e.g., traffic volume) and/or the relative congestion (as shown in the example web page 5300 of FIG. 53) at the corresponding intersection during the different hours of the day (horizontal axis) and the different days of the week (vertical axis) over a specified period of time. In the illustrated example of FIG. 52, the heat map 5206 is representative of all traffic detected at a particular intersection. In some examples, a user may toggle between graphics indicative of the total traffic volume or congestion based from all directions detected at a particular intersection (as shown in FIG. 52) and graphics indicative of traffic volume or congestion based on a particular direction of approach associated with the intersection (as shown in FIG. 54). In some examples, the collision risk graphics may be provided with respect to traffic approaching the selected intersection from a particular direction. Thus, as shown in FIG. 54, the traffic analysis web page 5200 may provide a directional heat map 5402 representative of collision risks associated with the traffic specific to a particular direction selected by the user (e.g., the North direction in the illustrated example). More particularly, in the illustrated example, the directional heat map 5402 is selected to represent the collision risk between traffic in the North direction relative to traffic approaching the intersection from another particular direction (e.g., South as indicated by the checkmark 5404 shown in FIG. 54). The collision risk between the selected direction (e.g., North) and one of the other directions (e.g., East or West) can be represented in the heatmap 5402 by selecting the corresponding analysis icon 5406. Further, the directional heat map 5402 may indicate collision risks from the North direction with respect to all of the other directions by selecting the all icon 5408. Thus, there are four separate heat maps 5402 that may be represented with respect to the collision risks associated with traffic approaching the corresponding intersection from the North direction. Similar heat maps can be generated for any other selected direction. These various heatmaps enable a safety manager to identify potential trends and/or high risk traffic flows associated with particular directions and/or at particular times to determine whether certain personnel need additional training and/or whether traffic needs to be rerouted to reduce congestion and collision risks.

In some examples, a safety manager and/or other personnel may desire to track or compare trends in safety events and/or traffic patterns and collision risks after making corrective actions in response to potentially unsafe conditions detected as outlined above. Accordingly, in some examples, the safety monitoring web page 4700 provides a user with the ability to set or schedule a timeframe during which safety metrics are collected and monitored and then automatically generate a safety corrective action report at the scheduled point of time in the future. In some examples, once the scheduled time arrives, the main server 132 generates the report and transmits a notification to the safety manager and/or other relevant individuals to confirm the report is ready.

Figure 55:
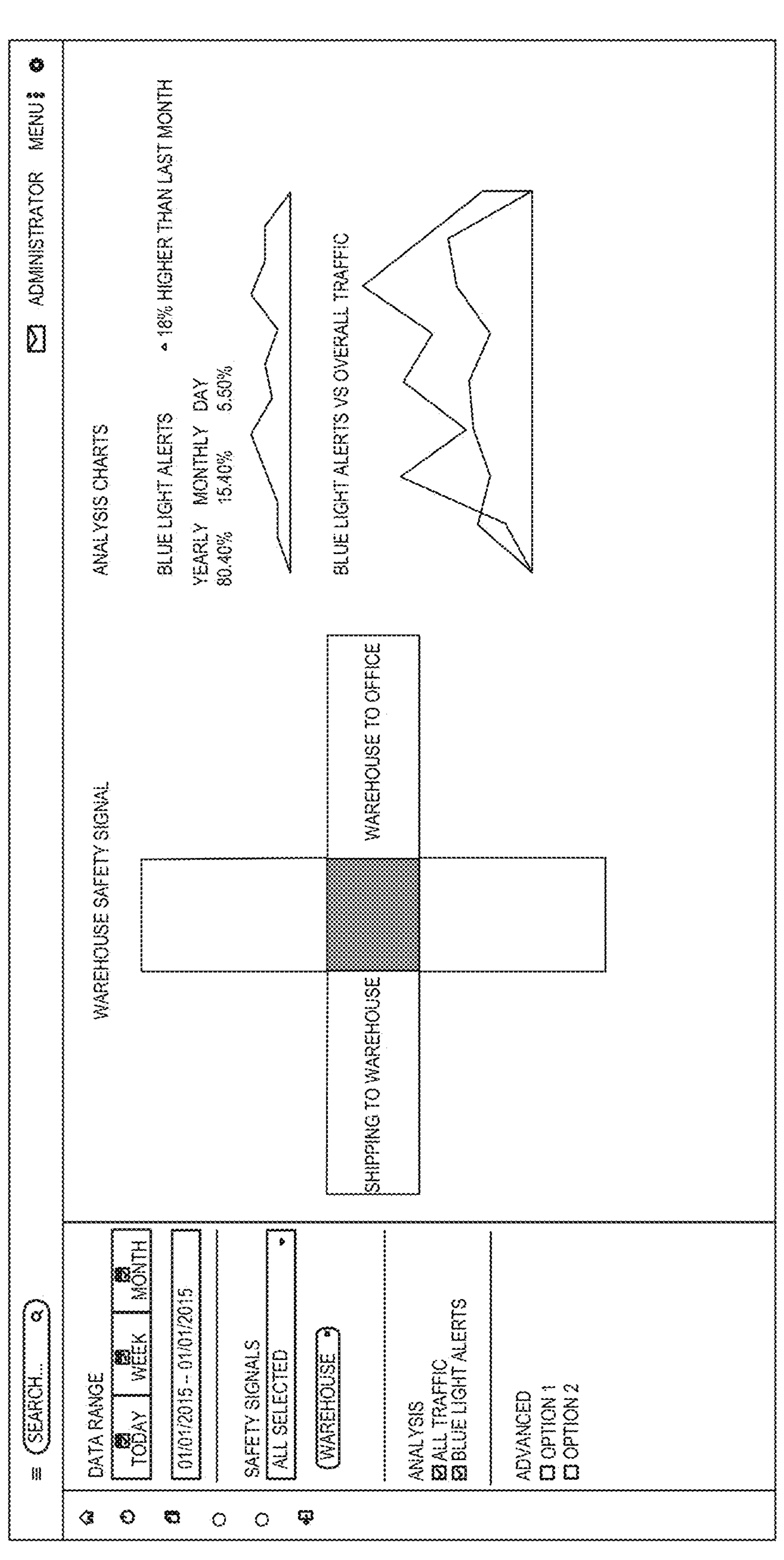

FIG. 55 illustrates an example graphical user interface corresponding to a traffic signal analysis web page 5500 that provides an analysis of traffic events occurring at a particular intersection within the material handling facility 100. In some examples, the traffic events are detected based on signals provided from traffic sensors operated by a corresponding traffic controller 130. As described above, when intersecting traffic is detected (e.g., traffic from two directions is approaching a single intersection at the same time), the traffic controller 130 may cause a traffic signal to be displayed to the individuals corresponding to the detected traffic. In some examples, the traffic signal is a blue light. Accordingly, as shown in the illustrated example of FIG. 55, the number and/or frequency of blue lights (i.e., detected intersecting traffic) for the represented intersection is displayed over a period of time. In some examples, this data is provided for comparison with traffic at other intersections and/or at the same intersection but at different time periods. In this manner, users may be able to evaluate recurring problems at the relevant intersections.

Figure 56:
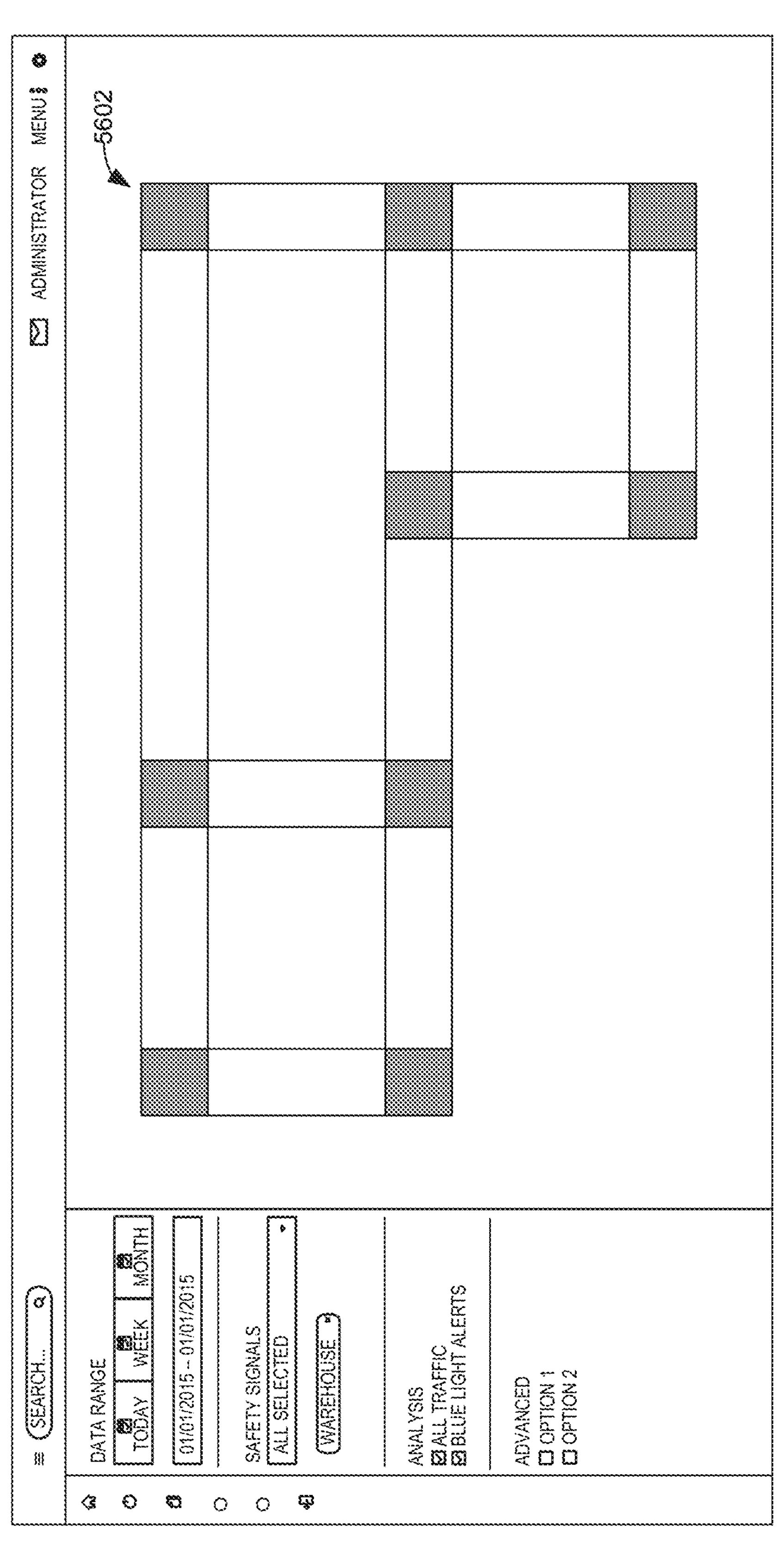

FIG. 56 illustrates an example graphical user interface corresponding to a facility-wide traffic web page 5600 that provides a map 5602 representative of the pathways and intersections throughout the material handling facility 100. In some examples, the map 5602 includes indicators at each intersection identifying the frequency with which traffic passes the intersection and/or the frequency that intersecting traffic events are detected at each intersection. This can facilitate a person in identifying the location of bottlenecks and/or overly congested intersections to potentially identify whether different travel paths and/or traffic patterns may be developed to improve the flow of material handling equipment.

Figure 57:
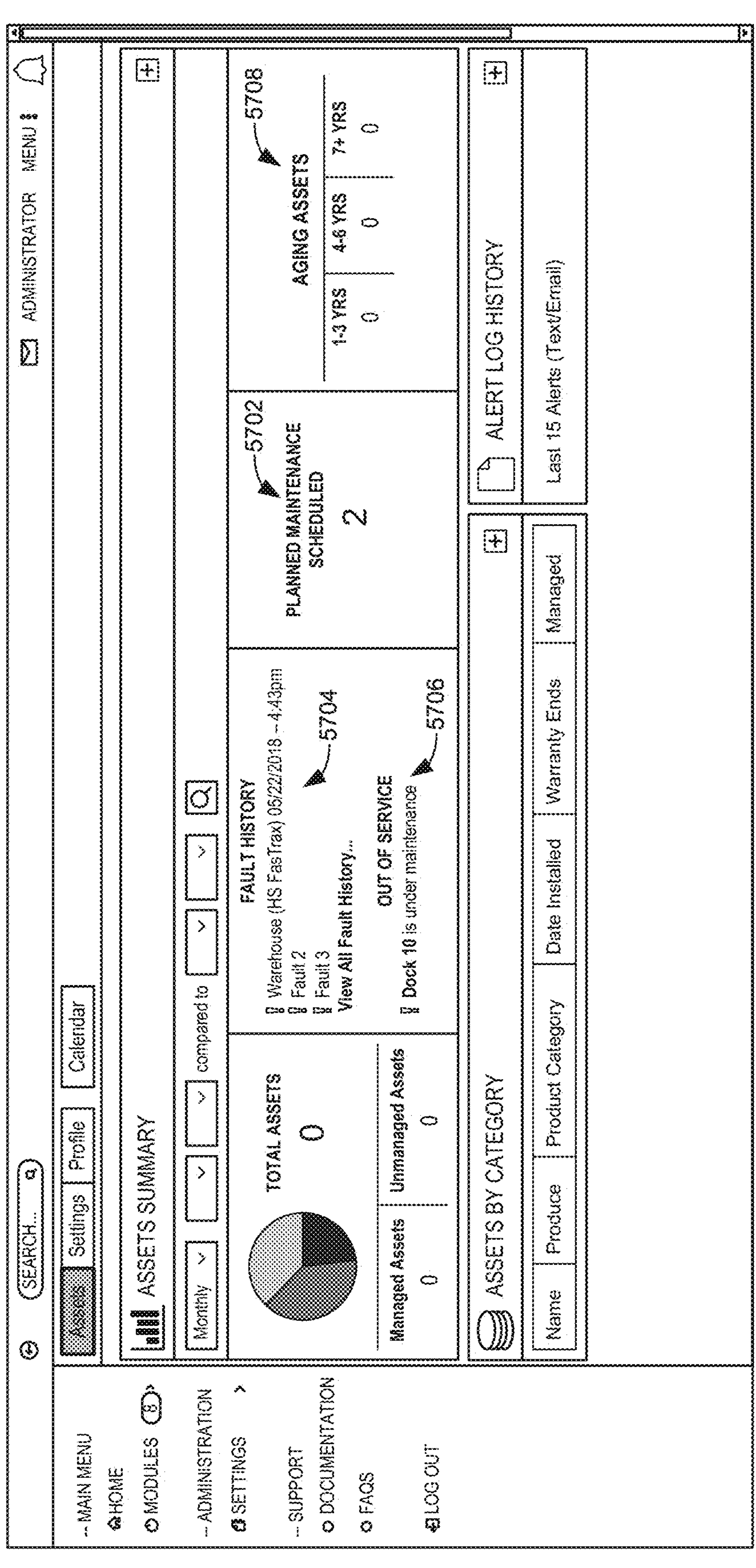

FIG. 57 illustrates an example graphical user interface presented by an asset management web page 5700 that provides summary statistics corresponding to assets within the material handling facility 100. As shown in the illustrated example, the asset management web page 5700 includes a planned maintenance indicator 5702 to indicate the number of planned maintenance events for assets that are scheduled. In some examples, a user may select the calendar button to schedule additional maintenance events. In some examples, when maintenance is planned to occur within a threshold period of time (e.g., 30 days), the main server 132 automatically generates and transmits a notification reminder that planned maintenance for the relevant asset is approaching so that a maintenance manager and/or other personal can contact the manufacturer of the asset to schedule the maintenance.

In the illustrated example, the asset management web page 5700 includes a listing of faults 5704 detected for particular assets as well as listing of out of service assets 5706. In some examples, when an asset is placed out of service, the main server 132 transmits a notification to relevant individuals to report that the corresponding asset is out of service. Further, the main server 132 may transmit the status of the door to the controller associated with the particular asset to display a notification on a local display screen that the asset is out of service.

Figure 58:
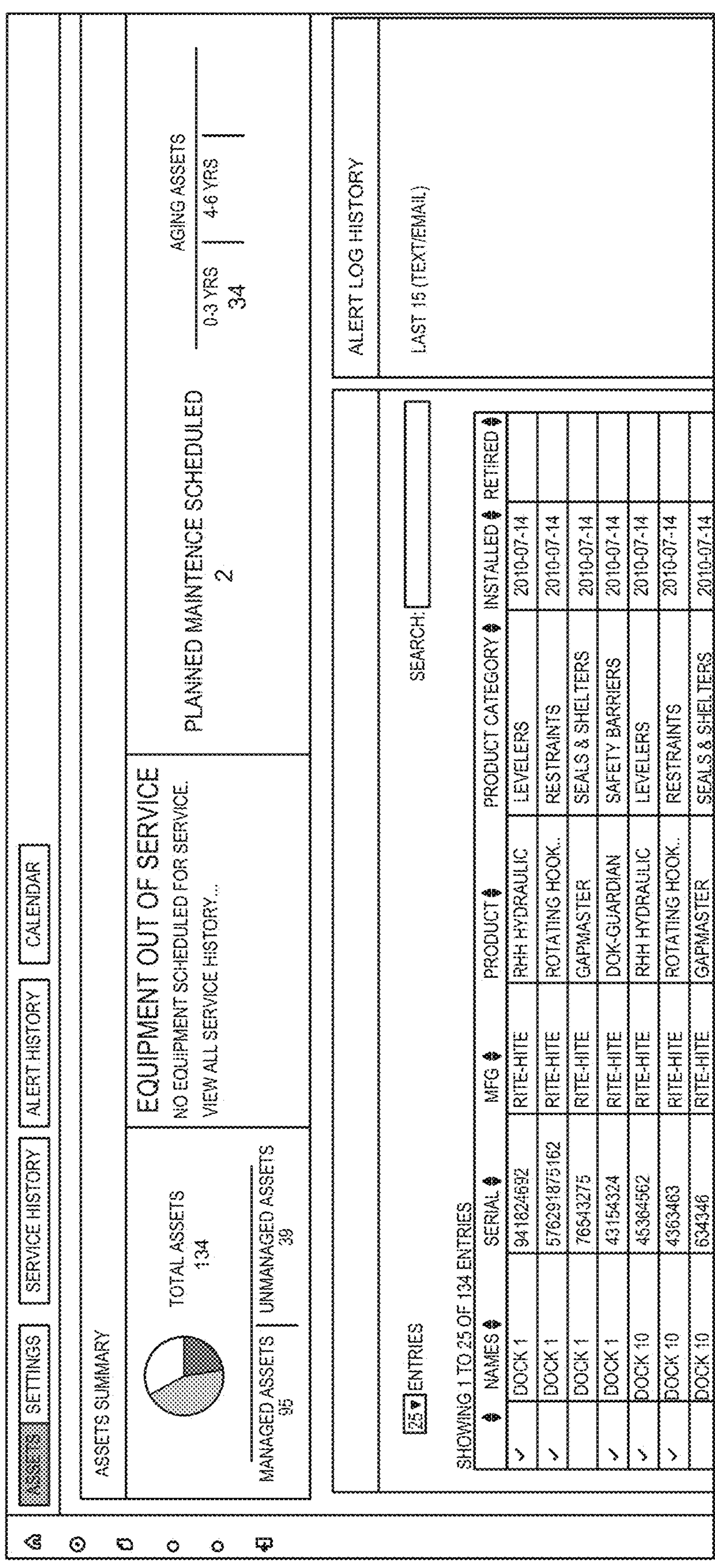

Further, in some examples, the asset management web page 5700 includes an asset age summary 5708 that identifies and keeps track of the age of all assets (e.g., since the manufacturing and/or installation date). In some examples, the asset age summary 5708 may be sorted in different matters including, for example, by the date of installation or by the number of cycles or amount of usage as monitored by sensors associated with the assets. In some examples, a user may schedule the generation of an asset aging report so that the main server 132 transmits a notification that an asset aging report is ready for review at a particular point in time in the future. This can be useful as a reminder to review the life cycle of assets in advance of planning budgets for future maintenance costs at the material handling facility 100. FIG. 58 illustrates another example asset management web page 5800.

Figure 59:
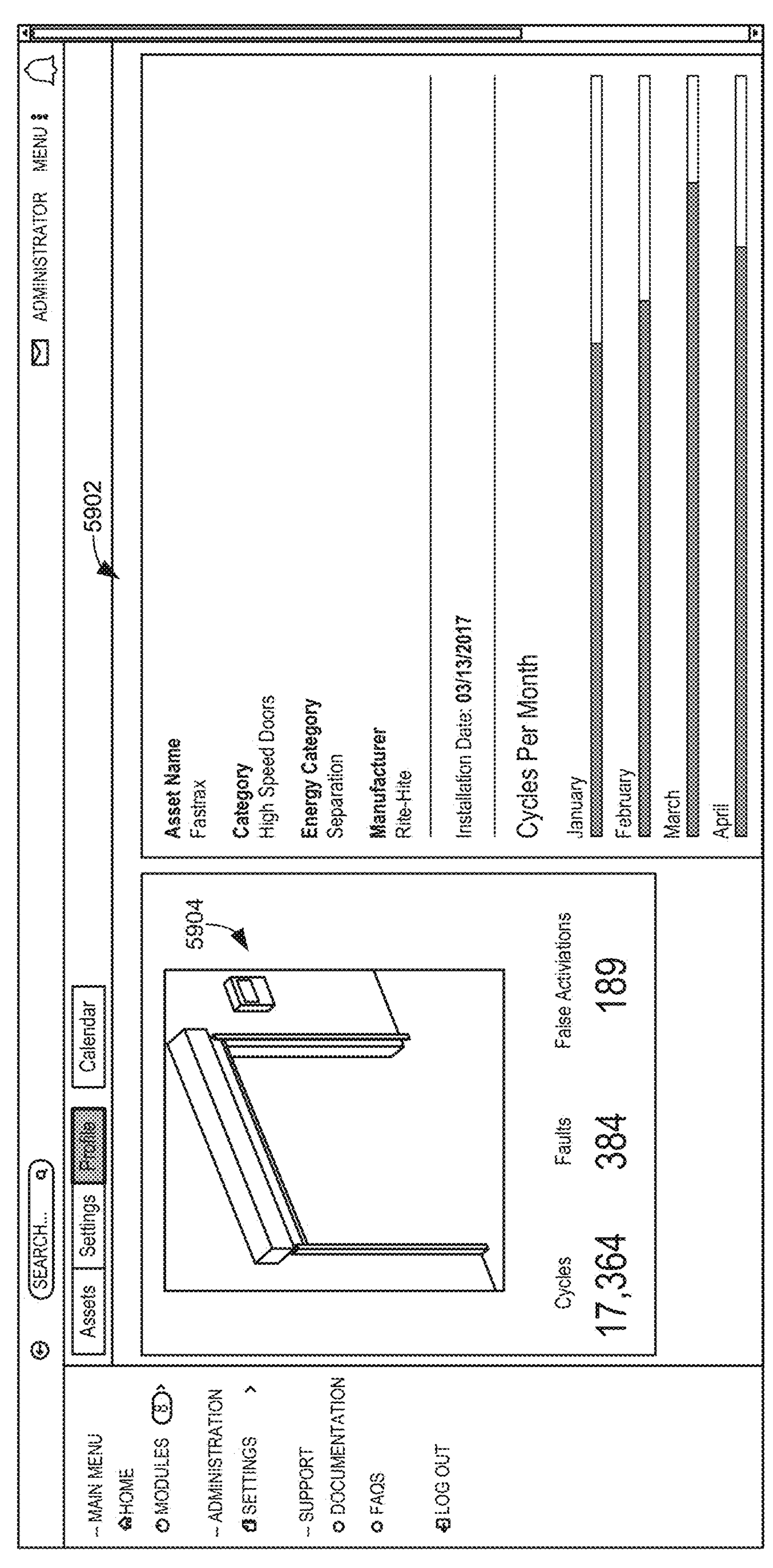

FIG. 59 illustrates the asset management web page 5900 showing an asset profile 5902 for a particular asset in the material handling facility 100. In this example, the particular asset is a high speed door. In some examples, the asset profile 5902 includes an image 5904 of the asset. The image may be a generic image for the asset or a photograph of the actual product as installed within the facility 100. The asset profile 5902 provides equipment details specific to the particular asset being represented such as, for example, the name of the asset, the type of asset, the manufacturer of the asset, and the date of installation. Further, in some examples, the asset profile 5902 includes statistics about the operation and/or usage of the asset. For instance, in the illustrated example, the asset profile 5902 includes an indication of a number of cycles the door has undergone since installation, the number of faults detected for the door, and the number of false activations. In some examples, these statistics may be represented over time (e.g., providing an indication of the number of cycles from one month (or other relevant period) relative to a different month. In some examples, the asset profile 5902 may provide real-time updates of parameter values corresponding to sensors associated with the asset.

As mentioned above, although the example graphical user interfaces shown in FIGS. 21-59 have been described in the context of web pages, any of the graphical user interfaces disclosed herein may be implemented by non-web based applications independent of the Internet and/or web pages.

Figure 60:
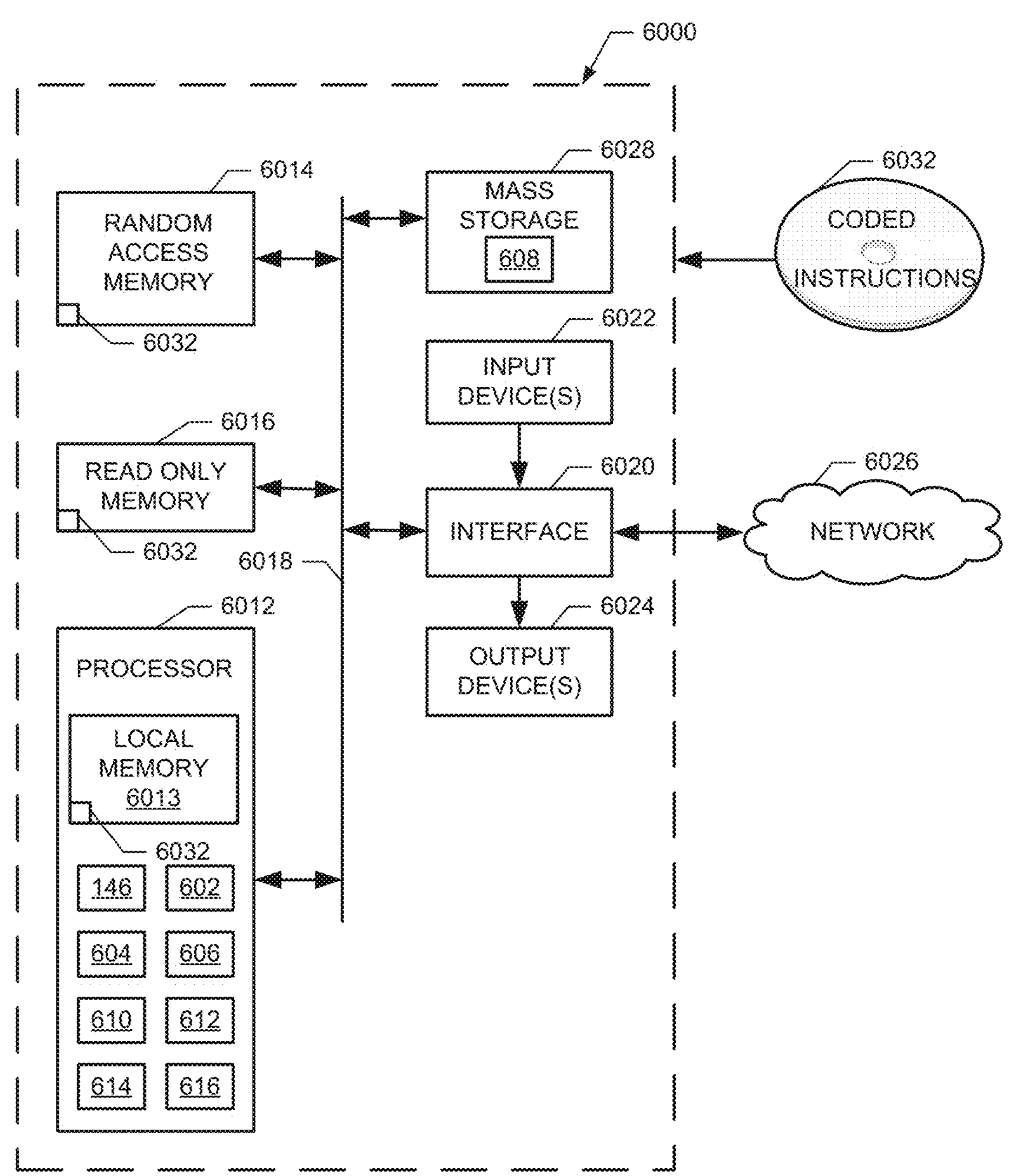
FIG. 60 is a block diagram of an example processor platform structured to execute the instructions of FIGS. 12-20 to implement the example main server(s) of FIGS. 1, 6, and/or 10.

FIG. 60 is a block diagram of an example processor platform 6000 structured to execute the instructions of FIGS. 12-20 to implement the main server 132 of FIGS. 1, 6, and/or 10. The processor platform 6000 can be, for example, a server, a personal computer, a workstation, a self-learning machine (e.g., a neural network), or any other type of computing device.

The processor platform 6000 of the illustrated example includes a processor 6012. The processor 6012 of the illustrated example is hardware. For example, the processor 6012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example web server 146, the example network communications interface 602, the example IO network interface 604, the example restart watchdog 606, the example pull service manager 610, the example push service manager 612, the example video management system 614, and the example event manager 616.

The processor 6012 of the illustrated example includes a local memory 6013 (e.g., a cache). The processor 6012 of the illustrated example is in communication with a main memory including a volatile memory 6014 and a non-volatile memory 6016 via a bus 6018. The volatile memory 6014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 6016 may be implemented by flash memory and/or any other desired type of memory device. Access to the main memory 6014, 6016 is controlled by a memory controller.

The processor platform 6000 of the illustrated example also includes an interface circuit 6020. The interface circuit 6020 may be implemented by any type of interface standard, such as an Ethernet interface, a universal serial bus (USB), a Bluetooth® interface, a near field communication (NFC) interface, and/or a PCI express interface.

In the illustrated example, one or more input devices 6022 are connected to the interface circuit 6020. The input device(s) 6022 permit(s) a user to enter data and/or commands into the processor 6012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 6024 are also connected to the interface circuit 6020 of the illustrated example. The output devices 6024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 6020 of the illustrated example, thus, typically includes a graphics driver card, a graphics driver chip and/or a graphics driver processor.

The interface circuit 6020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 6026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 6000 of the illustrated example also includes one or more mass storage devices 6028 for storing software and/or data. In this example, the mass storage devices 6028 implement the example database 608 of the example main server 132. Examples of such mass storage devices 6028 include floppy disk drives, hard drive disks, compact disk drives, Blu-ray disk drives, redundant array of independent disks (RAID) systems, USB memory sticks, solid state disk drives, and digital versatile disk (DVD) drives.

The machine executable instructions 6032 of FIGS. 12-20 may be stored in the mass storage device 6028, in the volatile memory 6014, in the non-volatile memory 6016, and/or on a removable non-transitory computer readable storage medium such as a CD or DVD.

Figure 61:
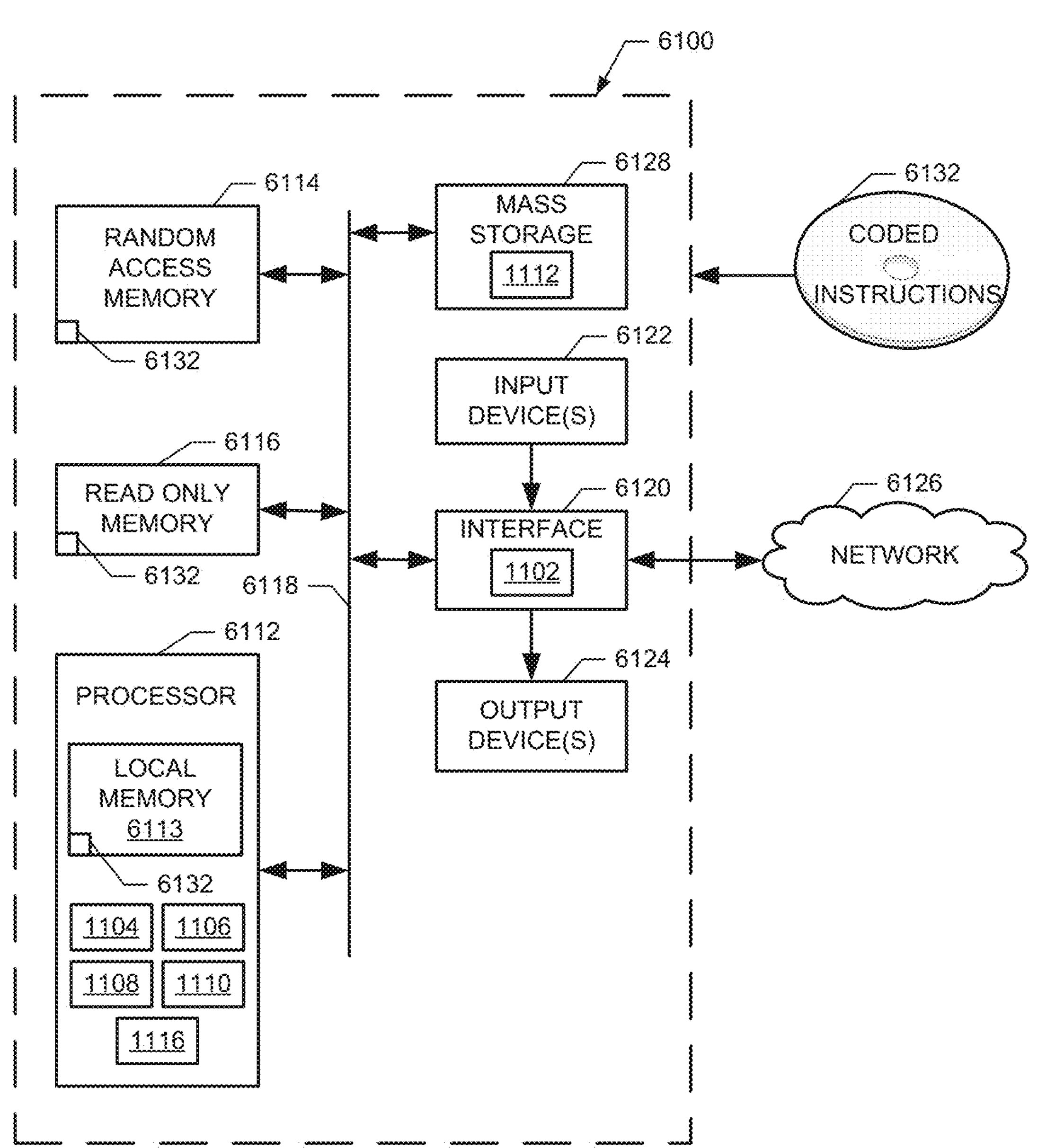
FIG. 61 is a block diagram of an example processor platform structured to execute the instructions of FIGS. 16-20 to implement the example local controller of FIG. 11.

FIG. 61 is a block diagram of an example processor platform 6100 structured to execute the instructions of FIGS. 16-20 to implement the local controller 1100 of FIG. 11 (representative of any one of the controllers 116, 122, 124, 126, 128, 130 of FIG. 1). The processor platform 6100 can be, for example, a server, a personal computer, a workstation, a self-learning machine (e.g., a neural network), or any other type of computing device.

The processor platform 6100 of the illustrated example includes a processor 6112. The processor 6112 of the illustrated example is hardware. For example, the processor 6112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 1104, the example event analyzer 1106, the example parameter value converter 1108, the example notification engine 1110, the example display 1114, the example equipment controller 1116

The processor 6112 of the illustrated example includes a local memory 6113 (e.g., a cache). The processor 6112 of the illustrated example is in communication with a main memory including a volatile memory 6114 and a non-volatile memory 6116 via a bus 6118. The volatile memory 6114 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 6116 may be implemented by flash memory and/or any other desired type of memory device. Access to the main memory 6114, 6116 is controlled by a memory controller.

The processor platform 6100 of the illustrated example also includes an interface circuit 6120. The interface circuit 6120 may be implemented by any type of interface standard, such as an Ethernet interface, a universal serial bus (USB), a Bluetooth® interface, a near field communication (NFC) interface, and/or a PCI express interface.

In the illustrated example, one or more input devices 6122 are connected to the interface circuit 6120. The input device(s) 6122 permit(s) a user to enter data and/or commands into the processor 6112. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 6124 are also connected to the interface circuit 6120 of the illustrated example. The output devices 6124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 6120 of the illustrated example, thus, typically includes a graphics driver card, a graphics driver chip, and/or a graphics driver processor.

The interface circuit 6120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 6126. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 6120 implements the example communications interface 1102.

The processor platform 6100 of the illustrated example also includes one or more mass storage devices 6128 for storing software and/or data. Examples of such mass storage devices 6128 include floppy disk drives, hard drive disks, compact disk drives, Blu-ray disk drives, redundant array of independent disks (RAID) systems, and digital versatile disk (DVD) drives. In this example, the mass storage 6128 implements the example database 1112.

The machine executable instructions 6132 of FIGS. 16-20 may be stored in the mass storage device 6128, in the volatile memory 6114, in the non-volatile memory 6116, and/or on a removable non-transitory computer readable storage medium such as a CD or DVD.

From the foregoing, it will be appreciated that example methods, apparatus, and articles of manufacture have been disclosed that enable the aggregation and integration of data from disparate controllers, sensors, etc. within a material handling facility for subsequent analysis to generate notifications and/or provide outputs via web page (or other application) interfaces that update in substantially real time. Examples disclosed herein improve the efficiency of using electronic devices for monitoring a material handling facility by bringing together the disparate information in a consolidated manner, thereby avoiding redundancies from monitoring multiple isolated systems. Furthermore, the combination of information gathered from different sources enables users to access and/or be made aware of particular circumstances that were not previously possible to detect in an automatic fashion such as, for example, the false activation of doors. Notifications of such circumstances may be generated based on events triggered by the combination of parameters reported from different controllers satisfying certain configurable conditions. In some examples, such events may initiate the generation of video segments that capture the occurrence of the event on camera, which may be included in a notification as an attachment. Further, in some examples, the video segments may undergo a video analysis to detect additional safety events and/or detect people within the video to potentially identify the cause of the initially triggered event. Notifications of events that cannot otherwise be known also contributes to improvements in the efficient use and operation of the control systems with the material handling facility that generate the data that enables the detection of the events in the first place. For example, by informing relevant personnel (e.g., a safety manager) of potential safety risks, the personnel are enabled to make corrective action to reduce or eliminate the risk (e.g., immediately reversing the effect of unsafe behavior, implementing additional and/or different equipment, restructuring the processes and/or procedures giving rise to the risk, providing additional training to personnel, etc.). Furthermore, while isolated safety events may be quickly detected and dealt with, some safety events are based on the repeated occurrence (e.g., above a certain threshold) of certain conditions over a period of time. This cannot be directly detected because of the temporal component. However, by tracking conditions over time in accordance with teachings disclosed herein, such trend-based events may be detected. Once such events are detected and the appropriate personnel are made aware of undesirable trends, the personnel may then implement suitable actions to resolve or reduce the impact of the factors contributing to the undesirable trend. Further, notifications of detected events can also significantly reduce unnecessary energy consumption within the material handling facility by enabling appropriate personnel (e.g., a general manager) to identify conditions and/or trends leading to the loss of energy (e.g., doors opened too frequently and/or too long to let out conditioned air). Based on such notifications, the personnel may then take suitable actions to reduce the conditions and/or behaviors giving rise to the wasted energy. Not only does this save costs but is can also reduce the burden placed on heating and/or cooling systems used to product the conditions air environment. In some examples, the interfaces presenting the collected data may be updated in substantially real-time based on push request subscriptions. In some such examples, updates may include user entered data provided at one web page that is pushed to a different web page based on a subscription to such data by the different web pages.

Example methods, apparatus, systems, and articles of manufacture to monitor and manage loading docks and facility operations are disclosed herein. Further examples and combinations thereof include the following:

Example 1 includes an apparatus to monitor operations at a material handling facility, the apparatus comprising a data analyzer to monitor first data indicating whether a truck trailer is present at a dock of the material handling facility, and monitor second data indicating a condition associated with equipment at the dock, the second data being different than the first data, and a notification generator to generate a notification based on the first data and the second data.

Example 2 includes the apparatus of example 1, wherein the first data is generated by a first data source and the second data is generated by a second data source, the first data source being different than the second data source, the first data source corresponding to at least one of a first sensor at the dock, a vehicle restraint at the dock, a leveler at the dock, a light indicator, or a database for a dock management system associated with the material handling facility, the second data source corresponding to at least one of a second sensor at the dock different than the first sensor, the vehicle restraint, the leveler, the light indicator, or the database.

Example 3 includes the apparatus of example 2, wherein the second data source corresponds to the second sensor, the second sensor to monitor operation of a door, the condition corresponding to whether the door is in a non-closed state, the notification generator to generate the notification when the first data indicates the trailer is not present at the dock while the second data indicates the door is in the non-closed state, the notification indicative of a drop-off hazard associated with the door.

Example 4 includes the apparatus of example 3, wherein the data analyzer is to monitor third data indicative of whether a barrier is blocking passage through a doorway associated with the door in the non-closed state, the barrier being different than the door, the apparatus further including an event analyzer to inhibit generation of the notification when the third data indicates the barrier is blocking passage through the doorway.

Example 5 includes the apparatus of example 2, wherein the second data source corresponds to the light indicator, the light indicator to switch between a first state when the vehicle restraint is in an engaged position and a second state when the vehicle restraint is in a stored position, the vehicle restraint to engage the trailer at the dock when the vehicle restraint is in the engaged position, the light indicator to switch to the first state when the vehicle restraint is put into an override mode regardless of whether the vehicle is in the engaged position or the stored position, the notification generator to generate the notification in response to (1) the first data indicating the trailer is not present at the dock and (2) the second data indicating the light indicator is in the first state associated with the vehicle restraint being in the override mode, the notification indicative of the trailer being pulled away from the dock when the light indicator was in the first state.

Example 6 includes the apparatus of example 2, wherein the second data source corresponds to the database, the database to store dock management data indicative of an assignment of different trailers to different docks of the material handling facility, the notification generator to generate the notification in response to the first data indicating the trailer is present at the dock when the second data indicates no trailer is assigned to the dock, the notification indicative of the trailer being at a wrong dock.

Example 7 includes the apparatus of example 2, wherein the second data source corresponds to the second sensor, the second sensor to monitor activity within the trailer at the dock, the condition corresponding to a duration of non-activity sensed within the trailer, the notification generator to generate the notification in response to the duration exceeding a threshold.

Example 8 includes the apparatus of example 2, wherein the data analyzer is to monitor third data indicative of a user activation of a manually-initiated actuator that enables operation of first equipment associated with the dock, the second data source corresponding to the second sensor, the second sensor to monitor a state of second equipment in an interlock relationship with the operation of the first equipment, the condition corresponding to whether the state of the second equipment prevents the operation of the first equipment based on the interlock relationship, the notification generator to generate the notification in response to the user activation while the second data indicates the state of the second equipment prevents the operation of the first equipment.

Example 9 includes the apparatus of example 1, wherein the notification generator is to render information associated with the notification on a screen located proximate the dock.

Example 10 includes the apparatus of example 1, wherein the notification generator is to render information associated with the notification on a web page accessed by a device remote from the dock.

Example 11 includes the apparatus of example 1, further including an event logger to log an event in a database, the event associated with a content of the notification.

Example 12 includes an apparatus to monitor operations at a material handling facility, the apparatus comprising a data analyzer to monitor first data indicative of when a door associated with the material handling facility is in a non-closed state, monitor second data indicative of passage of at least one of a person or an object through a doorway associated with the door in the non-closed state, and a notification generator to generate a notification in response to the second data indicating no passage of at least one of the person or the object through the doorway during a duration of time in which the first data indicates the door is in the non-closed state, the notification indicative of a false activation of the door.

Example 13 includes an apparatus to monitor operations at a material handling facility, the apparatus comprising a database to aggregate dock data associated with a plurality of docks of the material handling facility, the dock data including (1) an indication of operational states of equipment associated with the plurality of docks, (2) an indication of activity of personnel in proximity of the plurality of docks based on feedback from sensors associated with the plurality of docks, and (3) load information associated with trailers to be at least one of loaded or unloaded at ones of the plurality of docks, and a notification generator to render a plurality of dock icons corresponding to the plurality of docks, and in response to a user selecting a first dock icon of the plurality of dock icons, render a menu of options for the user to select, the options presented in the menu to be dynamically updated based on the dock data.

Example 14 includes the apparatus of example 13, wherein the notification generator is to, in response to the dock data indicating a first trailer is present at a first dock of the plurality of docks render a trailer icon adjacent a first dock icon of the plurality of dock icons, the first dock icon corresponding to the first dock, the trailer icon having a shape representative of a truck trailer, and update the options presented in the menu to include a first option to access the load information associated with the first trailer.

Example 15 includes the apparatus of example 14, wherein the notification generator is to dynamically update a timing indicator within the trailer icon, the timing indicator indicative of a duration the first trailer has been located at the first dock.

Example 16 includes the apparatus of example 15, wherein the timing indicator includes a timer value corresponding to the duration.

Example 17 includes the apparatus of example 15, wherein the timing indicator includes a progress bar corresponding to a first portion of the trailer icon rendered in a different color than a second portion of the trailer icon, the first portion to increase in size in proportion to the duration.

Example 18 includes the apparatus of example 17, wherein the first portion corresponds to an entirety of the trailer icon when the duration exceeds a threshold period corresponding to a detention time period.

Example 19 includes the apparatus of example 14, wherein the notification generator is to render an appointment time indicator within the trailer icon, the appointment time indicator indicating a time of a scheduled appointment for the first trailer.

Example 20 includes the apparatus of example 19, wherein the notification generator is to render an appointment countdown within the trailer icon, the appointment countdown indicating a time remaining until the scheduled appointment.

Example 21 includes the apparatus of example 14, wherein the notification generator is to render a pick status indicator adjacent the trailer icon, the pick status indicator to indicate a status of progress in moving cargo into or out of the first trailer, the status of progress corresponding to at least one of not started, waiting on cargo, partially completed, or completed.

Example 22 includes the apparatus of example 14, wherein the notification generator is to in response to dock data indicating the first trailer is associated with a live load, render a tractor unit icon next to the trailer icon to graphically represent when a tractor unit is connected to the first trailer, and in response to dock data indicating the first trailer is associated with a dropped load, render a drop status indicator adjacent the trailer icon, the drop status indicator to indicate whether the first trailer is to be moved to a trailer yard or remain at the first dock.

Example 23 includes the apparatus of example 22, wherein the notification generator is to modify an appearance of at least one of the trailer icon or the tractor unit icon when the load information indicates the first trailer is temperature controlled.

Example 24 includes the apparatus of example 14, wherein the notification generator is to render a cross dock status indicator adjacent the trailer icon, the cross dock status indicator to indicate when at least one of (1) cargo within the first trailer is to be moved to a different trailer or (2) cargo within the different trailer is to be moved into the first trailer.

Example 25 includes the apparatus of example 14, wherein the notification generator is to render a load direction indicator adjacent the trailer icon, the load direction indicator to indicate whether the first trailer is associated with an inbound load in which cargo on the first trailer is to be unloaded or associated with an outbound load in which cargo is to be loaded onto the first trailer.

Example 26 includes the apparatus of example 14, wherein the notification generator is to render a priority indicator adjacent the trailer icon, the priority indicator to indicate a priority of the first trailer.

Example 27 includes the apparatus of example 26, wherein the priority indicator is to switch between a first appearance indicative of a first priority and a second appearance indicative of a second priority greater than the first priority.

Example 28 includes the apparatus of example 24, wherein the notification generator is to, in response to the dock data indicating the first trailer is associated within an inbound load, render a load counter within the trailer icon, the load counter to indicate a total number of cargo units to be moved out of the first trailer.

Example 29 includes the apparatus of example 28, further including an event analyzer to determine a remaining number of cargo units to be removed from the first trailer based on the activity detected within the trailer, the notification generator is to dynamically update the load counter to indicate the remaining number of cargo units to be moved out of the first trailer, the remaining number rendered alongside the total number.

Example 30 includes the apparatus of example 24, wherein the notification generator is to render at least one of a carrier code or a trailer number adjacent the trailer icon.

Example 31 includes the apparatus of example 13, wherein the notification generator is to render a plurality of restraint signal icons adjacent corresponding ones of the plurality of dock icons, the plurality of restraint signal icons to represent a status of corresponding vehicle restraints at corresponding ones of the plurality of docks, the status of the vehicle restraints including a first state in which the vehicle restraints are engaged with trailers at corresponding ones of the docks and a second state in which the vehicle restraint is in a stored position, and dynamically switch the plurality of restraint signal icons between representing a red light and a green light based on the status of the corresponding vehicle restraint, the red light indicative of the first state and the green light indicative of the second state.

Example 32 includes the apparatus of example 13, wherein the notification generator is to dynamically switch the plurality of dock icons between representing a change in state of corresponding ones of the plurality of docks based on the dock data.

Example 33 includes a non-transitory computer readable medium comprising instructions that, when executed, cause a processor to at least monitor first data indicating whether a truck trailer is present at a dock of the material handling facility, and monitor second data indicating a condition associated with equipment at the dock, the second data being different than the first data, and generate a notification based on the first data and the second data.

Example 34 includes the non-transitory computer readable medium of example 33, wherein the first data is generated by a first data source and the second data is generated by a second data source, the first data source being different than the second data source, the first data source corresponding to at least one of a first sensor at the dock, a vehicle restraint at the dock, a leveler at the dock, a light indicator, or a database for a dock management system associated with the material handling facility, the second data source corresponding to at least one of a second sensor at the dock different than the first sensor, the vehicle restraint, the leveler, the light indicator, or the database.

Example 35 includes the non-transitory computer readable medium of example 34, wherein the second data source corresponds to the second sensor, the second sensor to monitor operation of a door, the condition corresponding to whether the door is in a non-closed state, the instructions further causing the processor to generate the notification when the first data indicates the trailer is not present at the dock while the second data indicates the door is in the non-closed state, the notification indicative of a drop-off hazard associated with the door.

Example 36 includes the non-transitory computer readable medium of example 35, wherein the instructions further cause the processor to monitor third data indicative of whether a barrier is blocking passage through a doorway associated with the door in the non-closed state, the barrier being different than the door, and inhibit generation of the notification when the third data indicates the barrier is blocking passage through the doorway.

Example 37 includes the non-transitory computer readable medium of example 34, wherein the second data source corresponds to the light indicator, the light indicator to switch between a first state when the vehicle restraint is in an engaged position and a second state when the vehicle restraint is in a stored position, the vehicle restraint to engage the trailer at the dock when the vehicle restraint is in the engaged position, the light indicator to switch to the first state when the vehicle restraint is put into an override mode regardless of whether the vehicle is in the engaged position or the stored position, the instructions further causing the processor to generate the notification in response to (1) the first data indicating the trailer is not present at the dock and (2) the second data indicating the light indicator is in the first state associated with the vehicle restraint being in the override mode, the notification indicative of the trailer being pulled away from the dock when the light indicator was in the first state.

Example 38 includes the non-transitory computer readable medium of example 34, wherein the second data source corresponds to the database, the database to store dock management data indicative of an assignment of different trailers to different docks of the material handling facility, the instructions further causing the processor to generate the notification in response to the first data indicating the trailer is present at the dock when the second data indicates no trailer is assigned to the dock, the notification indicative of the trailer being at a wrong dock.

Example 39 includes the non-transitory computer readable medium of example 34, wherein the second data source corresponds to the second sensor, the second sensor to monitor activity within the trailer at the dock, the condition corresponding to a duration of non-activity sensed within the trailer, the instructions further causing the processor to generate the notification in response to the duration exceeding a threshold.

Example 40 includes the non-transitory computer readable medium of example 34, wherein the instructions further cause the processor to monitor third data indicative of a user activation of a manually-initiated actuator that enables operation of first equipment associated with the dock, the second data source corresponding to the second sensor, the second sensor to monitor a state of second equipment in an interlock relationship with the operation of the first equipment, the condition corresponding to whether the state of the second equipment prevents the operation of the first equipment based on the interlock relationship, and generate the notification in response to the user activation while the second data indicates the state of the second equipment prevents the operation of the first equipment.

Example 41 includes the non-transitory computer readable medium of example 33, wherein generating the notification includes rendering information associated with the notification on a screen located proximate the door.

Example 42 includes the non-transitory computer readable medium of example 33, wherein generating the notification includes rendering information associated with the notification on a web page accessed by a device remote from the door.

Example 43 includes a non-transitory computer readable medium comprising instructions that, when executed, cause a process to at least monitoring first data indicative of when a door associated with the material handling facility is in a non-closed state, monitoring second data indicative of passage of at least one of a person or an object through a doorway associated with the door in the non-closed state, and generating a notification in response to the second data indicating no passage of at least one of the person or the object through the doorway while the first data indicates the door is in the non-closed state, the notification indicative of a false activation of the door.

Example 44 includes a non-transitory computer readable medium comprising instructions that, when executed, cause a process to at least aggregating dock data associated with a plurality of docks of the material handling facility, the dock data including (1) an indication of operational states of equipment associated with the plurality of docks, (2) an indication of activity of personnel in proximity of the plurality of docks based on feedback from sensors associated with the plurality of docks, and (3) load information associated with trailers to be at least one of loaded or unloaded at ones of the plurality of docks, rendering a plurality of dock icons corresponding to the plurality of docks, and in response to a user selecting a first dock icon of the plurality of dock icons, rendering a menu of options for the user to select, the options presented in the menu dynamically updated based on the dock data.

Example 45 includes the non-transitory computer readable medium of example 44, wherein the instructions further cause the processor to, in response to the dock data indicating a first trailer is present at a first dock of the plurality of docks render a trailer icon adjacent a first dock icon of the plurality of dock icons, the first dock icon corresponding to the first dock, the trailer icon having a shape representative of a truck trailer, and update the options presented in the menu to include a first option to access the load information associated with the first trailer.

Example 46 includes the non-transitory computer readable medium of example 45, wherein the instructions further cause the processor to dynamically update a timing indicator within the trailer icon, the timing indicator indicative of a duration the first trailer has been located at the first dock.

Example 47 includes the non-transitory computer readable medium of example 46, wherein the timing indicator includes a timer value corresponding to the duration.

Example 48 includes the non-transitory computer readable medium of example 46, wherein the timing indicator includes a progress bar corresponding to a first portion of the trailer icon rendered in a different color than a second portion of the trailer icon, the first portion to increase in size in proportion to the duration.

Example 49 includes the non-transitory computer readable medium of example 48, wherein the first portion corresponds to an entirety of the trailer icon when the duration exceeds a threshold period corresponding to a detention time period.

Example 50 includes the non-transitory computer readable medium of example 45, wherein the instructions further cause the processor to render an appointment time indicator within the trailer icon, the appointment time indicator indicating a time of a scheduled appointment for the first trailer.

Example 51 includes the non-transitory computer readable medium of example 50, wherein the instructions further cause the processor to render an appointment countdown within the trailer icon, the appointment countdown indicating a time remaining until the scheduled appointment.

Example 52 includes the non-transitory computer readable medium of example 45, wherein the instructions further cause the processor to render a pick status indicator adjacent the trailer icon, the pick status indicator to indicate a status of progress in moving cargo into or out of the first trailer, the status of progress corresponding to at least one of not started, waiting on cargo, partially completed, or completed.

Example 53 includes the non-transitory computer readable medium of example 45, wherein the instructions further cause the processor to in response to dock data indicating the first trailer is associated with a live load, render a tractor unit icon next to the trailer icon to graphically represent when a tractor unit is connected to the first trailer, and in response to dock data indicating the first trailer is associated with a dropped load, render a drop status indicator adjacent the trailer icon, the drop status indicator to indicate whether the first trailer is to be moved to a trailer yard or remain at the first dock.

Example 54 includes the non-transitory computer readable medium of example 53, wherein the instructions further cause the processor to modify an appearance of at least one of the trailer icon or the tractor unit icon when the load information indicates the first trailer is temperature controlled.

Example 55 includes the non-transitory computer readable medium of example 45, wherein the instructions further cause the processor to render a cross dock status indicator adjacent the trailer icon, the cross dock status indicator to indicate when at least one of (1) cargo within the first trailer is to be moved to a different trailer or (2) cargo within the different trailer is to be moved into the first trailer.

Example 56 includes the non-transitory computer readable medium of example 45, wherein the instructions further cause the processor to render a load direction indicator adjacent the trailer icon, the load direction indicator to indicate whether the first trailer is associated with an inbound load in which cargo on the first trailer is to be unloaded or associated with an outbound load in which cargo is to be loaded onto the first trailer.

Example 57 includes the non-transitory computer readable medium of example 45, wherein the instructions further cause the processor to render a priority indicator adjacent the trailer icon, the priority indicator to indicate a priority of the first trailer.

Example 58 includes the non-transitory computer readable medium of example 57, wherein the priority indicator is to switch between a first appearance indicative of a first priority and a second appearance indicative of a second priority greater than the first priority.

Example 59 includes the non-transitory computer readable medium of example 45, wherein the instructions further cause the processor to, in response to the dock data indicating the first trailer is associated within an inbound load, render a load counter within the trailer icon, the load counter to indicate a total number of cargo units to be moved out of the first trailer.

Example 60 includes the non-transitory computer readable medium of example 59, wherein the instructions further cause the processor to determine a remaining number of cargo units to be removed from the first trailer based on the activity detected within the trailer, and dynamically update the load counter to indicate the remaining number of cargo units to be moved out of the first trailer, the remaining number rendered alongside the total number.

Example 61 includes the non-transitory computer readable medium of example 45, wherein the instructions further cause the processor to render at least one of a carrier code or a trailer number adjacent the trailer icon.

Example 62 includes the non-transitory computer readable medium of example 44, wherein the instructions further cause the processor to render a plurality of restraint signal icons adjacent corresponding ones of the plurality of dock icons, the plurality of restraint signal icons to represent a status of corresponding vehicle restraints at corresponding ones of the plurality of docks, the status of the vehicle restraints including a first state in which the vehicle restraints are engaged with trailers at corresponding ones of the docks and a second state in which the vehicle restraint is in a stored position, and dynamically switch the plurality of restraint signal icons between representing a red light and a green light based on the status of the corresponding vehicle restraint, the red light indicative of the first state and the green light indicative of the second state.

Example 63 includes the non-transitory computer readable medium of example 44, wherein the instructions further cause the processor to dynamically switch the plurality of dock icons between representing a change in state of corresponding ones of the plurality of docks based on the dock data.

Example 64 includes a method to monitor operations at a material handling facility, the method comprising monitoring first data indicating whether a truck trailer is present at a dock of the material handling facility, and monitoring second data indicating a condition associated with equipment at the dock, the second data being different than the first data, and generating a notification based on the first data and the second data.

Example 65 includes the method of example 64, wherein the first data is generated by a first data source and the second data is generated by a second data source, the first data source being different than the second data source, the first data source corresponding to at least one of a first sensor at the dock, a vehicle restraint at the dock, a leveler at the dock, a light indicator, or a database for a dock management system associated with the material handling facility, the second data source corresponding to at least one of a second sensor at the dock different than the first sensor, the vehicle restraint, the leveler, the light indicator, or the database.

Example 66 includes the method of example 65, wherein the second data source corresponds to the second sensor, the second sensor to monitor operation of a door, the condition corresponding to whether the door is in a non-closed state, the method further including generating the notification when the first data indicates the trailer is not present at the dock while the second data indicates the door is in the non-closed state, the notification indicative of a drop-off hazard associated with the door.

Example 67 includes the method of example 66, further including monitoring third data indicative of whether a barrier is blocking passage through a doorway associated with the door in the non-closed state, the barrier being different than the door, and inhibiting generation of the notification when the third data indicates the barrier is blocking passage through the doorway.

Example 68 includes the method of example 67, wherein the second data source corresponds to the light indicator, the light indicator to switch between a first state when the vehicle restraint is in an engaged position and a second state when the vehicle restraint is in a stored position, the vehicle restraint to engage the trailer at the dock when the vehicle restraint is in the engaged position, the light indicator to switch to the first state when the vehicle restraint is put into an override mode regardless of whether the vehicle is in the engaged position or the stored position, the method further including generating the notification in response to (1) the first data indicating the trailer is not present at the dock and (2) the second data indicating the light indicator is in the first state associated with the vehicle restraint being in the override mode, the notification indicative of the trailer being pulled away from the dock when the light indicator was in the first state.

Example 69 includes the method of example 67, wherein the second data source corresponds to the database, the database to store dock management data indicative of an assignment of different trailers to different docks of the material handling facility, the method further including generating the notification in response to the first data indicating the trailer is present at the dock when the second data indicates no trailer is assigned to the dock, the notification indicative of the trailer being at a wrong dock.

Example 70 includes the method of example 67, wherein the second data source corresponds to the second sensor, the second sensor to monitor activity within the trailer at the dock, the condition corresponding to a duration of non-activity sensed within the trailer, the method further including generating the notification in response to the duration exceeding a threshold.

Example 71 includes the method of example 67, further including monitoring third data indicative of a user activation of a manually-initiated actuator that enables operation of first equipment associated with the dock, the second data source corresponding to the second sensor, the second sensor to monitor a state of second equipment in an interlock relationship with the operation of the first equipment, the condition corresponding to whether the state of the second equipment prevents the operation of the first equipment based on the interlock relationship, and generating the notification in response to the user activation while the second data indicates the state of the second equipment prevents the operation of the first equipment.

Example 72 includes the method of example 66, wherein generating the notification includes rendering information associated with the notification on a screen located proximate the dock.

Example 73 includes the method of example 66, wherein generating the notification includes rendering information associated with the notification on a web page accessed by a device remote from the dock.

Example 74 includes a method to monitor operations at a material handling facility, the method comprising monitoring first data indicative of when a door associated with the material handling facility is in a non-closed state, monitoring second data indicative of passage of at least one of a person or an object through a doorway associated with the door in the non-closed state, and generating a notification in response to the second data indicating no passage of at least one of the person or the object through the doorway while the first data indicates the door is in the non-closed state, the notification indicative of a false activation of the door.

Example 75 includes a method to monitor operations at a material handling facility, the method comprising aggregating dock data associated with a plurality of docks of the material handling facility, the dock data including (1) an indication of operational states of equipment associated with the plurality of docks, (2) an indication of activity of personnel in proximity of the plurality of docks based on feedback from sensors associated with the plurality of docks, and (3) load information associated with trailers to be at least one of loaded or unloaded at ones of the plurality of docks, rendering a plurality of dock icons corresponding to the plurality of docks, and in response to a user selecting a first dock icon of the plurality of dock icons, rendering a menu of options for the user to select, the options presented in the menu dynamically updated based on the dock data.

Example 76 includes the method of example 75, further including, in response to the dock data indicating a first trailer is present at a first dock of the plurality of docks rendering a trailer icon adjacent a first dock icon of the plurality of dock icons, the first dock icon corresponding to the first dock, the trailer icon having a shape representative of a truck trailer, and updating the options presented in the menu to include a first option to access the load information associated with the first trailer.

Example 77 includes the method of example 76, further including dynamically updating a timing indicator within the trailer icon, the timing indicator indicative of a duration the first trailer has been located at the first dock.

Example 78 includes the method of example 77, wherein the timing indicator includes a timer value corresponding to the duration.

Example 79 includes the method of example 77, wherein the timing indicator includes a progress bar corresponding to a first portion of the trailer icon rendered in a different color than a second portion of the trailer icon, the first portion to increase in size in proportion to the duration.

Example 80 includes the method of example 79, wherein the first portion corresponds to an entirety of the trailer icon when the duration exceeds a threshold period corresponding to a detention time period.

Example 81 includes the method of example 76, further including rendering an appointment time indicator within the trailer icon, the appointment time indicator indicating a time of a scheduled appointment for the first trailer.

Example 82 includes the method of example 81, further including rendering an appointment countdown within the trailer icon, the appointment countdown indicating a time remaining until the scheduled appointment.

Example 83 includes the method of example 76, further including rendering a pick status indicator adjacent the trailer icon, the pick status indicator to indicate a status of progress in moving cargo into or out of the first trailer, the status of progress corresponding to at least one of not started, waiting on cargo, partially completed, or completed.

Example 84 includes the method of example 76, further including in response to dock data indicating the first trailer is associated with a live load, rendering a tractor unit icon next to the trailer icon to graphically represent when a tractor unit is connected to the first trailer, and in response to dock data indicating the first trailer is associated with a dropped load, rendering a drop status indicator adjacent the trailer icon, the drop status indicator to indicate whether the first trailer is to be moved to a trailer yard or remain at the first dock.

Example 85 includes the method of example 84, further including modifying an appearance of at least one of the trailer icon or the tractor unit icon when the load information indicates the first trailer is temperature controlled.

Example 86 includes the method of example 76, further including rendering a cross dock status indicator adjacent the trailer icon, the cross dock status indicator to indicate when at least one of (1) cargo within the first trailer is to be moved to a different trailer or (2) cargo within the different trailer is to be moved into the first trailer.

Example 87 includes the method of example 76, further including rendering a load direction indicator adjacent the trailer icon, the load direction indicator to indicate whether the first trailer is associated with an inbound load in which cargo on the first trailer is to be unloaded or associated with an outbound load in which cargo is to be loaded onto the first trailer.

Example 88 includes the method of example 76, further including rendering a priority indicator adjacent the trailer icon, the priority indicator to indicate a priority of the first trailer.

Example 89 includes the method of example 88, wherein the priority indicator is to switch between a first appearance indicative of a first priority and a second appearance indicative of a second priority greater than the first priority.

Example 90 includes the method of example 76, further including, in response to the dock data indicating the first trailer is associated within an inbound load, rendering a load counter within the trailer icon, the load counter to indicate a total number of cargo units to be moved out of the first trailer.

Example 91 includes the method of example 90, further including determining a remaining number of cargo units to be removed from the first trailer based on the activity detected within the trailer, and dynamically updating the load counter to indicate the remaining number of cargo units to be moved out of the first trailer, the remaining number rendered alongside the total number.

Example 92 includes the method of example 76, further including rendering at least one of a carrier code or a trailer number adjacent the trailer icon.

Example 93 includes the method of example 75, further including rendering a plurality of restraint signal icons adjacent corresponding ones of the plurality of dock icons, the plurality of restraint signal icons to represent a status of corresponding vehicle restraints at corresponding ones of the plurality of docks, the status of the vehicle restraints including a first state in which the vehicle restraints are engaged with trailers at corresponding ones of the docks and a second state in which the vehicle restraint is in a stored position, and dynamically switching the plurality of restraint signal icons between representing a red light and a green light based on the status of the corresponding vehicle restraint, the red light indicative of the first state and the green light indicative of the second state.

Example 94 includes the method of example 75, further including dynamically switching the plurality of dock icons between representing a change in state of corresponding ones of the plurality of docks based on the dock data.

Example 95 includes an apparatus comprising an IO network interface to receive IO data reported from a controller associated with a material handling facility, a web server to provide a first web page to a first client device and a second web page to a second client device, the second web page different than the first web page, and a push service manager to push the IO data to both the first and second web pages based on a common string included in both the first and second web pages, the common string identifying a data stream to which the first and second web pages subscribe, the data stream associated with the IO data reported from the controller.

Example 96 includes a system to monitor operation of a door associated with a material handling facility, comprising a first sensor to generate a first output, the first output indicating when the door is in a non-closed state, a second sensor to generate a second output, the second output indicating passage of at least one of a person or an object through a doorway associated with the door in the non-closed state, and a processor to receive the first and second outputs, the processor to detect a false activation of the door when the second output is not generated by the second sensor while the first output indicates the door is in the non-closed state. Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to monitor operations at a material handling facility, the apparatus comprising:

a data analyzer to:

monitor first data indicative of when a door associated with the material handling facility is in a non-closed state, and monitor second data indicative of passage of at least one of a person or an object through a doorway associated with the door in the non-closed state; and a notification generator to generate a notification in response to the second data indicating no passage of at least one of the person or the object through the doorway during a duration of time in which the first data indicates the door is in the non-closed state, the notification indicative of a false activation of the door in which the door moves to the non-closed state and then returns to a closed state without any traffic passing therethrough.

2. The apparatus of claim 1, wherein the data analyzer and the notification generator are to be implemented by a controller located adjacent to the door, the controller to control operations of the door.

3. The apparatus of claim 1, wherein the data analyzer is to determine a trend of false activations over a period of time, and the notification generator is to provide an indication of the trend.

4. The apparatus of claim 3, wherein the notification generator is to generate an alert in response to the trend exceeding a threshold.

5. The apparatus of claim 1, wherein the data analyzer is to track a number of false activations detected over a period of time.

6. The apparatus of claim 1, further including an IO network interface to receive the first and second data communicated from a controller associated with the door, the data analyzer and the notification generator to be remote from the controller.

7. The apparatus of claim 6, wherein the door is one of multiple doors associated with the material handling facility, and the IO network interface is to determine at least one of a trend or a count of false activations for the multiple doors detected over a period of time.

8. A computer readable medium comprising instructions that cause a processor to at least:

monitor first data based on feedback from a first sensor at a door of a material handling facility, the first data indicative of when the door is in a non-closed state, the first sensor different from an actuation system that is to cause the door to move to the non-closed state;

monitor second data based on feedback from a second sensor at the door, the second data indicative of passage of at least one of a person or an object through a doorway associated with the door in the non-closed state, the second sensor different from the first sensor and different from the actuation system; and generate a notification in response to the second data indicating no passage of at least one of the person or the object through the doorway while the first data indicates the door is in the non-closed state, the notification indicative of a false activation of the door.

9. The computer readable medium of claim 8, wherein the processor is implemented by a controller located adjacent to the door, the controller to control operations of the door.

10. The computer readable medium of claim 8, wherein the instructions are to cause the processor to generate an indication of a trend of false activations over a period of time.

11. The computer readable medium of claim 10, wherein the instructions are to cause the processor to generate an alert in response to the trend exceeding a threshold.

12. The computer readable medium of claim 8, wherein the instructions are to cause the processor to track a number of false activations detected over a period of time.

13. The computer readable medium of claim 8, wherein the instructions are to cause the processor to obtain the first and second data communicated from a controller associated with the door, the processor to be remote from the controller.

14. The computer readable medium of claim 13, wherein the door is one of multiple doors associated with the material handling facility, and the instructions are to cause the processor to determine at least one of a trend or a count of false activations for the multiple doors detected over a period of time.

15. A system to monitor operation of a door associated with a material handling facility, comprising:

a first sensor to generate a first output for a duration of time during which the door is in a non-closed state, the first output indicating when the door is in the non-closed state;

a second sensor to generate a second output, the second output indicating passage of at least one of a person or an object through a doorway associated with the door in the non-closed state; and a processor to receive the first and second outputs, the processor to detect a false activation of the door when the second output is not generated by the second sensor while during the duration of time when the first output indicates the door is in the non-closed state.

16. The system of claim 15, wherein the processor is implemented by a controller located adjacent to the door, the controller to control operations of the door.

17. The system of claim 15, wherein the processor is to generate an indication of a trend of false activations over a period of time.

18. The system of claim 17, wherein the processor is to generate an alert in response to the trend exceeding a threshold.

19. The system of claim 15, wherein the processor is to track a number of false activations detected over a period of time.

20. The system of claim 15, wherein the processor is implemented by a server that is remote from the first and second sensors.

21. The system of claim 20, wherein the door is one of multiple doors associated with the material handling facility, and the processor is to determine at least one of a trend or a count of false activations for the multiple doors detected over a period of time.

22. A method to monitor operations at a material handling facility, the method comprising:

monitoring first data based on feedback from a limit switch at a door of the material handling facility, the first data indicative of when the door is in a non-closed state;

monitoring second data indicative of passage of at least one of a person or an object through a doorway associated with the door in the non-closed state; and generating, by executing instructions with at least one programmable circuit, a notification in response to the second data indicating no passage of at least one of the person or the object through the doorway while the first data indicates the door is in the non-closed state, the notification indicative of a false activation of the door.

* * * * *